(12) United States Patent
Green et al.

(10) Patent No.: US 10,386,834 B2
(45) Date of Patent: *Aug. 20, 2019

(54) CONTROL SYSTEMS FOR WATER-SPORTS WATERCRAFT

(71) Applicant: Malibu Boats, LLC, Merced, CA (US)

(72) Inventors: Rachael Marie Green, Loudon, TN (US); Cory Wade Dugger, Maryville, TN (US); Jackie Dale Springer, Jr., Colleyville, TX (US); Adam Andrew McCall, Greenback, TN (US); Daniel Lee Gasper, Atwater, CA (US)

(73) Assignee: Malibu Boats, LLC, Loudon, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,517

(22) Filed: Feb. 9, 2018

(65) Prior Publication Data
US 2018/0284762 A1 Oct. 4, 2018

Related U.S. Application Data

(63) Continuation of application No. 15/210,776, filed on Jul. 14, 2016, now Pat. No. 9,891,620.
(Continued)

(51) Int. Cl.
*G05D 1/00* (2006.01)
*G06F 3/16* (2006.01)
(Continued)

(52) U.S. Cl.
CPC ......... *G05D 1/0016* (2013.01); *G05D 1/0033* (2013.01); *G05D 1/0875* (2013.01);
(Continued)

(58) Field of Classification Search
CPC .. G05D 1/0016; G05D 1/0875; G05D 1/0033; G06F 3/165; G06F 3/0412;
(Continued)

(56) References Cited

U.S. PATENT DOCUMENTS 667,482 A 2/1901 Albarda
704,729 A 7/1902 Zerbe
(Continued)

FOREIGN PATENT DOCUMENTS

CA 2271332 2/2000
CN 2597328 1/2004
(Continued)

OTHER PUBLICATIONS

U.S. Pat. No. 9,260,161 including its prosecution history.
(Continued)

*Primary Examiner* — Anne M Antonucci
(74) *Attorney, Agent, or Firm* — Knobbe, Martens, Olson & Bear, LLP

(57) ABSTRACT

An adjustable surf wake system can enhance a wake formed by a watercraft travelling through water. A rider control device can enable a rider to control the wake of the watercraft while riding the wake, such as for wake surfing. The rider can adjust the speed of the watercraft, can adjust the height of the wake, and/or can change the watercraft between a surf-left configuration and a surf-right configuration. The rider control device can include a position sensor. A drone can position a camera based on the position sensor of the rider control device for filming the rider.

33 Claims, 53 Drawing Sheets

Related U.S. Application Data

(60) Provisional application No. 62/193,036, filed on Jul. 15, 2015, provisional application No. 62/269,892, filed on Dec. 18, 2015.

(51) Int. Cl.
  *G05D 1/08* (2006.01)
  *B63B 35/85* (2006.01)
  *B63B 39/06* (2006.01)
  *G06F 3/0481* (2013.01)
  *G06F 3/0488* (2013.01)

(52) U.S. Cl.
  CPC ............ *G06F 3/165* (2013.01); *B63B 39/061* (2013.01); *B63B 2035/855* (2013.01); *G06F 3/0488* (2013.01); *G06F 3/04817* (2013.01)

(58) Field of Classification Search
  CPC . G06F 3/02; G06F 2203/0384; B63B 39/061; B63B 39/2035; B63B 39/855
  See application file for complete search history.

(56) References Cited

U.S. PATENT DOCUMENTS

| | | |
|---|---|---|
| 1,196,682 A | 8/1916 | Harriss |
| 1,264,320 A | 4/1918 | Metzler |
| 2,081,868 A | 5/1937 | Hampden |
| 2,199,333 A | 4/1940 | Dunklin |
| 2,663,276 A | 12/1953 | Ouellet |
| 2,807,228 A | 9/1957 | Vandre |
| 2,832,304 A | 4/1958 | Elyosius et al. |
| 2,890,673 A | 6/1959 | Chadwick, Jr. |
| 2,994,290 A | 8/1961 | Merchant, Sr. |
| 2,998,791 A | 9/1961 | Light |
| 3,046,928 A | 7/1962 | Sherrill |
| 3,062,167 A | 11/1962 | Bennett |
| 3,079,885 A | 3/1963 | Cooke |
| 3,094,960 A | 6/1963 | Lang |
| 3,106,178 A | 10/1963 | Cale |
| 3,111,103 A | 11/1963 | Bennett |
| 3,159,134 A | 12/1964 | Winnen |
| 3,200,782 A | 8/1965 | Walden et al. |
| 3,247,820 A | 4/1966 | White |
| 3,259,097 A | 7/1966 | Veldhuizen et al. |
| 3,294,052 A | 12/1966 | Jones |
| 3,327,671 A | 6/1967 | Comins |
| 3,372,663 A | 3/1968 | Bue |
| 3,391,667 A | 7/1968 | Bue |
| 3,399,643 A | 9/1968 | Bennett |
| 3,456,610 A | 7/1969 | Beals |
| 3,577,948 A | 5/1971 | Frey |
| 3,628,484 A | 12/1971 | Banner |
| 3,628,486 A | 12/1971 | Bennett |
| 3,628,487 A | 12/1971 | Bennett |
| 3,650,310 A | 3/1972 | Childress |
| 3,670,685 A | 6/1972 | Milessa |
| 3,695,204 A | 10/1972 | Bennett |
| 3,698,343 A | 10/1972 | Boome |
| 3,760,759 A | 9/1973 | Lang |
| 3,763,812 A | 10/1973 | Rowe |
| 3,982,493 A | 9/1976 | Cronin |
| 4,178,871 A | 12/1979 | Hirsch |
| 4,232,626 A | 11/1980 | Kern |
| 4,237,808 A | 12/1980 | Doerffer |
| 4,261,278 A | 4/1981 | Gaudin |
| 4,434,738 A | 3/1984 | Barkemeyer |
| 4,577,580 A | 3/1986 | Diffely, Sr. |
| 4,597,742 A | 7/1986 | Finkl |
| 4,644,893 A | 2/1987 | Zepp |
| 4,718,872 A | 1/1988 | Olson et al. |
| 4,763,219 A | 8/1988 | Nakamura |
| 4,776,295 A | 10/1988 | Kline et al. |
| 4,854,259 A | 8/1989 | Cluett |
| 4,895,093 A | 1/1990 | Dalsbo |
| 4,910,419 A | 3/1990 | Hayashi et al. |
| 4,915,048 A | 4/1990 | Stanford |
| 4,967,682 A | 11/1990 | O'Donnell |
| 5,041,040 A | 8/1991 | Jones et al. |
| 5,058,520 A | 10/1991 | Fahrney |
| 5,113,780 A | 5/1992 | Bennett et al. |
| 5,142,473 A | 8/1992 | Davis |
| 5,193,478 A | 3/1993 | Mardikian |
| 5,224,436 A | 7/1993 | Stricker |
| 5,235,926 A | 8/1993 | Jones |
| 5,263,432 A | 11/1993 | Davis |
| 5,315,951 A | 5/1994 | Finkl |
| 5,359,956 A | 11/1994 | Lee |
| 5,377,610 A | 1/1995 | Goebel |
| 5,385,110 A | 1/1995 | Bennet et al. |
| 5,445,100 A | 8/1995 | Finkl |
| 5,474,012 A | 12/1995 | Yamada et al. |
| 5,474,013 A | 12/1995 | Wittmaier |
| 5,549,071 A | 8/1996 | Pigeon et al. |
| 5,572,944 A | 11/1996 | Slikkers et al. |
| 5,628,272 A | 5/1997 | Thomas |
| 5,664,910 A | 9/1997 | Lochtefeld et al. |
| 5,694,337 A | 12/1997 | Macken |
| 5,787,835 A | 8/1998 | Remnant |
| 5,860,384 A | 1/1999 | Castillo |
| 5,860,766 A | 1/1999 | Lochtefeld et al. |
| 5,881,666 A | 3/1999 | Crews, Jr. |
| 5,911,190 A | 6/1999 | Lochtefeld et al. |
| 6,006,689 A | 12/1999 | Olofsson |
| 6,012,408 A | 1/2000 | Castillo |
| 6,026,759 A | 2/2000 | Hazelett et al. |
| 6,044,788 A | 4/2000 | Larson et al. |
| 6,047,657 A | 4/2000 | Cox |
| 6,105,527 A | 8/2000 | Lochtefeld et al. |
| 6,138,601 A | 10/2000 | Anderson et al. |
| 6,148,756 A | 11/2000 | Pavlov et al. |
| 6,158,375 A | 12/2000 | Stuart, Jr. |
| 6,167,830 B1 | 1/2001 | Pilger |
| 6,213,044 B1 | 4/2001 | Rodgers et al. |
| 6,234,099 B1 | 5/2001 | Jessen et al. |
| 6,354,237 B1 | 3/2002 | Gaynor et al. |
| 6,415,729 B1 | 7/2002 | Nedderman, Jr. et al. |
| 6,427,616 B1 | 8/2002 | Hagen |
| 6,520,104 B1 | 2/2003 | Svensson |
| 6,523,489 B2 | 2/2003 | Simard et al. |
| 6,523,490 B1 | 2/2003 | Watkins |
| 6,603,402 B2 | 8/2003 | Lentine et al. |
| 6,606,959 B1 | 8/2003 | Shen |
| 6,745,715 B1 | 6/2004 | Shen et al. |
| 6,782,839 B1 | 8/2004 | Nozaki |
| 6,827,031 B2 | 12/2004 | Aoyama |
| 6,874,441 B2 | 4/2005 | Pigeon |
| 6,923,136 B1 | 8/2005 | D'Alessandro |
| 6,935,263 B1 | 8/2005 | Bandyopadhyay |
| 6,941,884 B2 | 9/2005 | Moore |
| 6,953,002 B2 | 10/2005 | Jessen et al. |
| 7,004,097 B2 | 2/2006 | Zeromski |
| 7,007,621 B1 | 3/2006 | Bootes |
| 7,018,252 B2 | 3/2006 | Simard et al. |
| 7,063,031 B2 | 6/2006 | Earl, Jr. et al. |
| 7,140,318 B1 | 11/2006 | Gasper |
| 7,174,843 B1 | 2/2007 | Tossavainen |
| 7,188,581 B1 | 3/2007 | Davis et al. |
| 7,201,111 B1 | 4/2007 | Burkett |
| 7,210,422 B1 | 5/2007 | Hickok et al. |
| 7,216,601 B1 | 5/2007 | Mann |
| 7,246,565 B2 | 7/2007 | Snook et al. |
| 7,252,047 B1 | 8/2007 | Baucom, Jr. |
| 7,252,074 B2 | 8/2007 | Chapman et al. |
| 7,311,058 B1 | 12/2007 | Brooks et al. |
| 7,318,389 B2 | 1/2008 | Boning |
| 7,380,514 B2 | 6/2008 | Loui et al. |
| 7,381,108 B1 | 6/2008 | Salmon |
| 7,434,531 B1 | 10/2008 | Zsido et al. |
| 7,467,596 B2 | 12/2008 | Salmon |
| 7,497,748 B2 | 3/2009 | Salmon |
| 7,617,026 B2 | 11/2009 | Gee et al. |
| 7,641,525 B2 | 1/2010 | Morvillo |
| 7,707,956 B2 | 5/2010 | Moore |

(56) References Cited

U.S. PATENT DOCUMENTS

| | | |
|---|---|---|
| 7,780,490 B2 | 8/2010 | Lundgren |
| 7,905,193 B2 | 3/2011 | Beamer |
| 7,958,837 B1 | 6/2011 | Fraleigh |
| 8,096,255 B2 | 1/2012 | Morand et al. |
| 8,100,079 B2 | 1/2012 | Buzzi |
| 8,191,493 B2 | 6/2012 | Baywol |
| 8,201,514 B2 | 6/2012 | Coles |
| 8,216,007 B2 | 7/2012 | Moore |
| 8,251,006 B2 | 8/2012 | Kalil |
| 8,261,682 B1 | 9/2012 | DeVito |
| 8,327,790 B2 | 12/2012 | Snow |
| 8,336,477 B2 | 12/2012 | Walker |
| 8,387,551 B2 | 3/2013 | Muller |
| 8,465,333 B2 | 6/2013 | Sells |
| 8,468,964 B2 | 6/2013 | Hoberman et al. |
| 8,480,445 B2 | 7/2013 | Morvillo |
| 8,522,706 B2 | 9/2013 | Larson et al. |
| 8,534,214 B1 | 9/2013 | Gasper |
| 8,539,897 B1 | 9/2013 | Gasper et al. |
| 8,578,873 B2 | 11/2013 | Gasper et al. |
| 8,622,012 B2 | 1/2014 | Olofsson |
| 8,631,753 B2 | 1/2014 | Morvillo |
| 8,739,723 B1 | 6/2014 | Murphy |
| 8,798,825 B1 | 8/2014 | Hartman |
| 8,833,286 B1 | 9/2014 | Sheedy et al. |
| 8,967,070 B2 | 3/2015 | Kalil |
| 8,968,043 B1 | 3/2015 | Murphy |
| 9,150,289 B1 | 10/2015 | Brendel |
| 9,156,372 B1 | 10/2015 | Guglielmo et al. |
| 9,199,695 B2 | 12/2015 | Gasper et al. |
| 9,254,896 B2 | 2/2016 | Bertalan et al. |
| 9,260,161 B2 | 2/2016 | Gasper et al. |
| 9,272,762 B1 | 3/2016 | Murphy |
| 9,315,235 B1 | 4/2016 | Wood |
| 9,315,236 B2 | 4/2016 | Gasper |
| 9,334,022 B2 | 5/2016 | Gasper et al. |
| 9,540,074 B1 | 1/2017 | Pigeon |
| 9,573,655 B1 | 2/2017 | Pigeon |
| 9,580,147 B2 | 2/2017 | Gasper et al. |
| 9,592,890 B2 | 3/2017 | Christensen |
| D783,021 S | 4/2017 | Peel |
| 9,669,903 B2 | 6/2017 | Gasper et al. |
| 9,694,873 B2 | 7/2017 | Gasper et al. |
| 9,891,620 B2 | 2/2018 | Green et al. |
| 9,914,504 B2 | 3/2018 | Gasper et al. |
| 2004/0261684 A1 | 12/2004 | Pigeon |
| 2005/0124234 A1 | 7/2005 | Sells et al. |
| 2005/0155540 A1 | 7/2005 | Moore |
| 2006/0054067 A1 | 3/2006 | Hoberman et al. |
| 2006/0217011 A1 | 9/2006 | Morvillo |
| 2007/0078575 A1 | 4/2007 | Wilson et al. |
| 2007/0125287 A1 | 6/2007 | Walker |
| 2007/0137550 A1 | 6/2007 | Davis et al. |
| 2007/0202757 A1 | 8/2007 | Moore |
| 2008/0257245 A1 | 10/2008 | Stella |
| 2008/0271660 A1 | 11/2008 | Zsido et al. |
| 2008/0281478 A1 | 11/2008 | Gee et al. |
| 2009/0165694 A1 | 7/2009 | Beamer |
| 2010/0101475 A1 | 4/2010 | Mueller |
| 2010/0121493 A1 | 5/2010 | Christensen et al. |
| 2010/0251952 A1 | 10/2010 | Baywol |
| 2011/0017115 A1 | 1/2011 | Olofsson |
| 2011/0126751 A1 | 6/2011 | Muller |
| 2011/0320072 A1 | 12/2011 | Morvillo |
| 2012/0079977 A1 | 4/2012 | Gai |
| 2013/0000542 A1 | 1/2013 | Muller |
| 2013/0145978 A1 | 6/2013 | Viviani et al. |
| 2014/0026799 A1 | 1/2014 | Kalil |
| 2014/0137787 A1 | 5/2014 | Gasper et al. |
| 2014/0261135 A1* | 9/2014 | Gasper ............... B63B 1/32 114/284 |
| 2015/0066249 A1 | 3/2015 | Bieback et al. |
| 2017/0369126 A1 | 12/2017 | Gasper et al. |

FOREIGN PATENT DOCUMENTS

| | | |
|---|---|---|
| DE | 26 34 573 | 2/1978 |
| DE | 101 59 040 | 9/2002 |
| EP | 1 435 325 | 7/2004 |
| EP | 1 058 645 | 10/2004 |
| FR | 2 556 312 | 6/1985 |
| GB | 332315 | 7/1930 |
| NR | 86945 | 2/1956 |
| SU | 975490 | 11/1982 |
| WO | WO 93/00258 | 1/1993 |
| WO | WO 96/20105 | 7/1996 |
| WO | WO 99/55577 | 11/1999 |
| WO | WO 2005/118384 | 12/2005 |
| WO | WO 2006/058232 | 6/2006 |
| WO | WO 2007/072185 | 6/2007 |
| WO | WO 2009/113923 | 9/2009 |
| WO | WO 2011/099931 | 8/2011 |
| WO | WO 2013/040576 | 3/2013 |
| WO | WO 2013/071148 | 5/2013 |

OTHER PUBLICATIONS

U.S. Pat. No. 9,334,022 including its prosecution history.
U.S. Pat. No. 8,534,214 including its prosecution history.
U.S. Pat. No. 8,539,897 including its prosecution history.
U.S. Pat. No. 8,578,873 including its prosecution history.
U.S. Pat. No. 9,315,236 including its prosecution history.
U.S. Pat. No. 9,199,695 including its prosecution history.
U.S. Appl. No. 14/075,978 including its prosecution history.
U.S. Pat No. 9,580,147 including its prosecution history.
U.S. Pat. No. 9,694,873 including its prosecution history.
U.S. Pat. No. 9,914,504, including its prosecution history.
Ex Parte Reexamination of U.S. Pat. No. 9,260,161 (Control No. 90/013,819), filed Sep. 26, 2016, Gasper et al.
U.S. Pat. No. 9,669,903 including its prosecution history.
U.S. Appl. No. 15/612,663 including its prosecution history.
U.S. Pat. No. 9,891,620 including its prosecution history.
MasterCraft Surf Tab—Screenshots taken from video uploaded on May 26, 2010 at http://www.youtube.com/watch?v=b1Q_MLRO31M.
Tige Convex VX—Screenshots taken from video uploaded on Oct. 10, 2012 at http://www.youtube.com/watch?v=jx5QXC-dU9w.
Centurion Wake Plate—Website dated Aug. 27, 2011—http://www.centurionboats.com/features-and-options/adjustable-wake-plate.html.
Nautique Surf System—Released Jan. 3, 2013—Website printout from http://www.nautique.com/models/nautique-surf-system.
Letter from Edmund J. Haughey of Fitzpatrick, Cella, Harper & Scinto, dated Feb. 3, 2016.
"Debut of new Sanger Surf Series," Wake World forum having postings between Oct. 4, 2008 and Feb. 9, 2009, webpage archive of http://www.wakeworld.com/forum/showthread.php?t=632602 dated May 30, 2012, 171 pages.
Screenshots taken from video titled "Surf Sanger," uploaded on Apr. 30, 2008 at https://www.youtube.com/watch?v=WcVIZZ7QZus.
Email from Edmund J. Haughey of of Fitzpatrick, Cella, Harper & Scinto, dated Feb. 11, 2016.
Humphree Operator's Manual, dated 2009.
Humphree Installation Manual, dated 2009.
"Malibu Makes Boating Easier and More Fun With MaliView," dated Sep. 4, 2008.
Ski Locker—Trim The Waves to Suit Your Personality, Trailer BOATS (as reprinted at http://www.switchbladewake.com/switchblade.pdf), Jul. 2005.
International Search Report dated Dec. 6, 2012 for PCT/US2012/055788.
International Search Report dated Jan. 25, 2013 for PCT/US2012/064504.
Volvo Penta—QL Boat Trim System Brochure—The Declaration of David Kennedy alleges that this brochure became publicly available prior to 2010.

(56) References Cited

OTHER PUBLICATIONS

Volvo Penta—QL Boat Trim System User & Installation Instructions—The Declaration of David Kennedy alleges that these instructions became publicly available prior to 2010.
Declaration of David Kennedy, dated Dec. 13, 2013, in *Malibu Boats, LLC v. Nautique Boat Co.*, Case No. 3:13-cv-00656, in the United States District Court for the Eastern District of Tennessee.
First Look Nautique Surf System Wakeworld in 3 pages, Author: David Williams, Jan. 16, 2013.
Lenco Marine Inc., Electric Trim Tab Kits in 2 pages, Oct. 2007.
QL—Quality Line product news: Trim system with new technology, dated Aug. 16, 2004.
Nautique Launches the Nautique Surf System—Press Release, dated Jan. 3, 2013.
Luke, Surf Expo WBM's Surf Expo-Booth View: MasterCraft, dated Sep. 10, 2009.
Luke, Wakeboarding Mastercraft X-25 2011, Wakeboard Boat Review, Feb. 16, 2011.
Luke, Wakeboarding Mastercraft X-2 2011, Wakeboard Boat Review, Feb. 16, 2011.
Luke, Wakeboarding Zane Schwenk Shreds MasterCrafts New Surf Tabs, Sep. 17, 2009.
Video titled "MasterCraft Rewind 2010—The BIG Review", allegedly uploaded on Dec. 30, 2009 at https://www.youtube.com/watch?v=85CoNjFc-wY.
Machine transcription (using a method from http://www.labnol.org/internet/transcribe-video-to-text/28914/) taken from a video titled "MasterCraft Rewind 2010—The BIG Review", allegedly uploaded on Dec. 30, 2009 at https://www.youtube.com/watch?v=85CoNjFc-wY.
Video titled "MasterCraft Rewind 2010—Surf Tab and Tower Camera Review", allegedly uploaded on Dec. 30, 2009 at https://www.youtube.com/watch?v=UVRra3sMV7A.
Machine transcription (using a method from http://www.labnol.org/internet/transcribe-video-to-text/28914/) taken from a video titled "MasterCraft Rewind 2010—Surf Tab and Tower Camera Review", allegedly uploaded on Dec. 30, 2009 at https://www.youtube.com/watch?v=UVRra3sMV7A.
Video titled "MasterCraft CSX 265 Review", allegedly uploaded on Nov. 11, 2009 at https://www.youtube.com/watch?v=--N30QPJtfQ.
Machine transcription (using a method from http://www.labnol.org/internet/transcribe-video-to-text/28914/) taken from a video titled "MasterCraft CSX 265 Review", allegedly uploaded on Nov. 11, 2009 at https://www.youtube.com/watch?v=--N30QPJtfQ.
Video titled "Z3 Wakesurf Side to Side in Seconds", allegedly uploaded on Jul. 8, 2012 at https://www.youtube.com/watch?v=jVJlVomFjT0.
Machine transcription (using a method from http://www.labnol.org/internet/transcribe-video-to-text/28914/) taken from a video titled "Z3 Wakesurf Side to Side in Seconds", allegedly uploaded on Jul. 8, 2012 at https://www.youtube.com/watch?v=jVJlVomFjT0.
Video titled "The All-New Nautique Surf System", allegedly uploaded on Jan. 3, 2013 at https://www.youtube.com/watch?v=gtaySYhmAdA.
Machine transcription (using a method from http://www.labnol.org/internet/transcribe-video-to-text/28914/) taken from a video titled "The All-New Nautique Surf System", allegedly uploaded on Jan. 3, 2013 at https://www.youtube.com/watch?v=gtaySYhmAdA.
Video titled "Nautique Surf System How-to-Video", allegedly uploaded on Jan. 3, 2013 at https://www.youtube.com/watch?v=GnKfEtMskao.
Machine transcription (using a method from http://www.labnol.org/internet/transcribe-video-to-text/28914/) taken from a video titled "Nautique Surf System How-to-Video", allegedly uploaded on Jan. 3, 2013 at https://www.youtube.com/watch?v=GnKfEtMskao.
MasterCraft Boat Company Recipient of NMMA Innovation Award, Feb. 2010.
MasterCraft Reveals New Innovations for 2010, Aug. 2009.
MasterCraft X-Series Models HV700 and HV450 Owner's Manual in 58 pages, Jul. 24, 2012.

Medallion Instrumentation Systems 2010 MasterCraft Viper System in 41 pages, alleged to have a date of prior to Sep. 16, 2010.
Medallion Instrumentation Systems MasterCraft University Instrumentation Training Part 1, Feb. 2012.
Nautique Surf System The new standard in Wakesurfing in 3 pages, Jan. 16, 2013.
Sanger Boats V237 2008 Wakeboarding Magazine in 4 pages, Jan. 1, 2008.
Video titled "2011 MasterCraft X-25", allegedly uploaded on Mar. 15, 2011 at https://www.youtube.com/watch?v=CpPRDrLznoQ.
Screenshot taken early in a video titled "2011 MasterCraft X-25", allegedly uploaded on Mar. 15, 2011 at https://www.youtube.com/watch?v=CpPRDrLznoQ.
Video titled "MasterCraft Rewind 2009—Day in the Life of the CSX 265", allegedly uploaded on Dec. 24, 2008 at https://www.youtube.com/watch?v=nr5xXu5fA54.
Screenshot taken early in a video titled "MasterCraft Rewind 2009—Day in the Life of the CSX 265", allegedly uploaded on Dec. 24, 2008 at https://www.youtube.com/watch?v=nr5xXu5fA54.
Video titled "The History of Wake Surfing", allegedly uploaded on Sep. 27, 2012 at https://www.youtube.com/watch?v=KWYZf3A7aas.
Screenshot taken early in a video titled "The History of Wake Surfing", allegedly uploaded on Sep. 27, 2012 at https://www.youtube.com/watch?v=KWYZf3A7aas.
Teakgate Modifications & Accessories (p. 1), TheMalibuCrew.com in 13 pages, Oct. 2012.
Teakgate Modifications & Accessories (p. 2), TheMalibuCrew.com in 11 pages, Oct. 2012.
Teakgate Modifications & Accessories (p. 3), TheMalibuCrew.com in 3 pages, Oct. 2012 to Nov. 2012.
Teakgate Modifications & Accessories (p. 4), TheMalibuCrew.com in 5 pages, Nov. 2012 to Mar. 2013.
Video titled "2008 Surfing Sanger 237 Edition", allegedly uploaded on Sep. 17, 2008 at https://www.youtube.com/watch?v=VedGGGD79bM.
Transcription taken from a video titled "2008 Surfing Sanger 237 Edition", allegedly uploaded on Sep. 17, 2008 at https://www.youtube.com/watch?v=VedGGGD79bM.
Video titled "A ride on the wakesurf board", allegedly uploaded on Oct. 15, 2012 at https://www.youtube.com/watch?v=3ru47pbUgyo.
Transcription taken from a video titled "A ride on the wakesurf board", allegedly uploaded on Oct. 15, 2012 at https://www.youtube.com/watch?v=3ru47pbUgyo.
Video titled "Malibu Sunsetter First Crossover", allegedly uploaded on Oct. 14, 2012 at https://www.youtube.com/watch?v=5Wou4sWdTXk.
Transcription taken from a video titled "Malibu Sunsetter First Crossover", allegedly uploaded on Oct. 14, 2012 at https://www.youtube.com/watch?v=5Wou4sWdTXk.
Video titled "Malibu Sunsetter with Teakgate—first water test", allegedly uploaded on Oct. 14, 2012 at https://www.youtube.com/watch?v=u3Bx5k7dOD8.
Transcription taken from a video titled "Malibu Sunsetter with Teakgate—first water test", allegedly uploaded on Oct. 14, 2012 at https://www.youtube.com/watch?v=u3Bx5k7dOD8.
Video titled "Malibu Sunsetter with 'Teakgate'", allegedly uploaded on Oct. 13, 2012 at https://www.youtube.com/watch?v=pUwoFd4wOTs.
Transcription taken from a video titled "Malibu Sunsetter with 'Teakgate'", allegedly uploaded on Oct. 13, 2012 at https://www.youtube.com/watch?v=pUwoFd4wOTs.
Video titled "MasterCraft X10 Featuring Surf Tabs", allegedly uploaded on Feb. 9, 2013 at https://www.youtube.com/watch?v=nVddaDkKR5k.
Transcription taken from a video titled "MasterCraft X10 Featuring Surf Tabs", allegedly uploaded on Feb. 9, 2013 at https://www.youtube.com/watch?v=nVddaDkKR5k.
Video titled "No need surf gates . . . Only a Mastercraft X10", allegedly uploaded on Nov. 23, 2012 at https://www.youtube.com/watch?v=oltkqqKwEes.
Transcription taken from a video titled "No need surf gates . . . Only a Mastercraft X10", allegedly uploaded on Nov. 23, 2012 at https://www.youtube.com/watch?v=oltkqqKwEes.

(56) References Cited

OTHER PUBLICATIONS

Video titled "Riding the Teakgate Wave", allegedly uploaded on Oct. 15, 2012 at https://www.youtube.com/watch?v=VgH-WvdWdSo.
Transcription taken from a video titled "Riding the Teakgate Wave", allegedly uploaded on Oct. 15, 2012 at https://www.youtube.com/watch?v=VgH-WvdWdSo.
Video titled "Steve wake surfing both sides of the wake", allegedly uploaded on Aug. 12, 2007 at https://www.youtube.com/watch?v=TAjUt6Kh-Xw.
Transcription taken from a video titled "Steve wake surfing both sides of the wake", allegedly uploaded on Aug. 12, 2007 at https://www.youtube.com/watch?v=TAjUt6Kh-Xw.
Video titled "Teakgate Dual Gate Test", allegedly uploaded on Nov. 12, 2012 at https://www.youtube.com/watch?v=c6nEgA099fs.
Transcription taken from a video titled "Teakgate Dual Gate Test", allegedly uploaded on Nov. 12, 2012 at https://www.youtube.com/watch?v=c6nEgA099fs.
Video titled "Teakgate Testing", allegedly uploaded on Nov. 12, 2012 at https://www.youtube.com/watch?v=H5tOiz9SdaQ.
Transcription taken from a video titled "Teakgate Testing", allegedly uploaded on Nov. 12, 2012 at https://www.youtube.com/watch?v=H5tOiz9SdaQ.
Video titled "Wakesurfing the Sanger 237", allegedly uploaded on Apr. 29, 2008 at https://www.youtube.com/watch?v=nG0YH8fwCmM.
Transcription taken from a video titled "Wakesurfing the Sanger 237", allegedly uploaded on Apr. 29, 2008 at https://www.youtube.com/watch?v=nG0YH8fwCmM.
Video titled "Wakesurfing Crossover behind a 1987 Sunsetter", allegedly uploaded on Oct. 15, 2012 at https://www.youtube.com/watch?v=yCGsKoyLbYs.
Transcription taken from a video titled "Wakesurfing Crossover behind a 1987 Sunsetter", allegedly uploaded on Oct. 15, 2012 at https://www.youtube.com/watch?v=yCGsKoyLbYs.
Volvo Penta, QL Boat Trim System & Automatic Boat Trim Option in 4 pages, 2008.
Volvo Penta, QL Boat Trim System Brochure in 4 pages, 2007.
Volvo Penta, QL Boat Trim System Marine Accessories, www.qlmarine.com in 2 pages, 2004.
WakeWorld Forum Showthread, Is the Razor Blade the Switch Blade for Surfing in 14 pages, forum posts dated Feb. 8, 2008 and earlier.
WakeWorld MasterCraft Reveals New Innovations for 2010 in 3 pages, Aug. 24, 2009.
2010 Mastercraft Owner's Manual.
2011 Mastercraft Owner's Manual (Part 1—covering pp. #i-#4-33).
2011 Mastercraft Owner's Manual (Part 2—covering pp. #5-1-#24-4).
2012 Mastercraft Owner's Manual.
2013 Mastercraft Owner's Manual (Part 1—covering pp. #i-#2-45).
2013 Mastercraft Owner's Manual (Part 2—covering pp. #3-1-#6-18).
New QL Boat Trim System—Always Perfect Trim, dated Jul. 2007.
Malibu 2009 Owner's Manual.
MasterCraft Reveals 2010 Innovations, dated Sep. 3, 2009.
Machine transcription (using a method from http://www.labnol.org/internet/transcribe-video-to-text/28914/) taken from a video titled "Zane Schwenk—MasterCraft Surf Tabs", allegedly uploaded on May 26, 2010 at http://www.youtube.com/watch?v=b1Q_MLRO31M.
Videos uploaded on Dec. 13, 2016: MCFT0071469—https://youtu.be/4sJZWLWoRiM, MCFT0071470—https://youtu.be/UV-_8qhQ7p0, MCFT0071471—https://youtu.be/6YcERDOWpq0, MCFT0071472—https://youtu.be/LghlFtztrpE, MCFT0071473—https://youtu.be/uw7VbO_6Jjc, MCFT0071474—https://youtu.be/wuG85gQBJqg, MCFT0071475—https://youtu.be/3oo1JP1sZY8, MCFT0071476—https://youtu.be/O0E1yKTBABU, MCFT0071477—https://youtu.be/tDSGnbMBi8E, MCFT0071478—https://youtu.be/vzLNdRnzrrE, MCFT0071479—https://youtu.be/-6v9ThC3bqQ, MCFT0071725—https://youtu.be/wh2Qxcofft4, One or more of these videos were referenced in MasterCraft's Invalidity Contentions dated May 12, 2016 and Nov. 14, 2016.
Tige Boats Generates Remote Control Surf Waves With the New AVX Surf System, dated Sep. 4, 2014.
Tige Boats Releases the All-Empowering Taps3 Surf System With The Surf Link Remote, dated Jul. 20, 2015.
Remote Control Surf Waves? Yes., webiste archive dated Dec. 20, 2014.
New Wave: Tige's TAPS 3 Surf System with Surf Link Remote, dated Oct. 30, 2015.
Nautique Surf System (2 Pages), dated Jan. 3, 2013, http://www.nautique.com/blog/index/nautique-surf-system.
Video titled "X-2 Surfing 2010," allegedly uploaded on Aug. 31, 2010 at https://www.youtube.com/watch?v=1FbuXfaWFwU.
Screenshot taken early in a video titled "X-2 Surfing 2010," allegedly uploaded on Aug. 31, 2010 at https://www.youtube.com/watch?v=1FbuXfaWFwU.
Castle Bravo—Power Trim Tabs, dated May 11, 2011, http://mhkaufman.blogspot.com/2011/05/power-trim-tabs.html.
Wake Plates?—Wakeboarder.com Forum, Posts dated Mar. 23, 2005 to Mar. 24, 2005, http://forums.wakeboarder.com/viewtopic.php?t=40149&sid.
Tips for Proper Boat Weighting, dated Sep. 28, 2012, https://www.wakeutah.com/2012/09/28/tips-for-proper-boat-weighting/.
Nautique Surf Select, Oct. 2, 2015, http://www.nautique.com/models/nautique-surf-system.

* cited by examiner

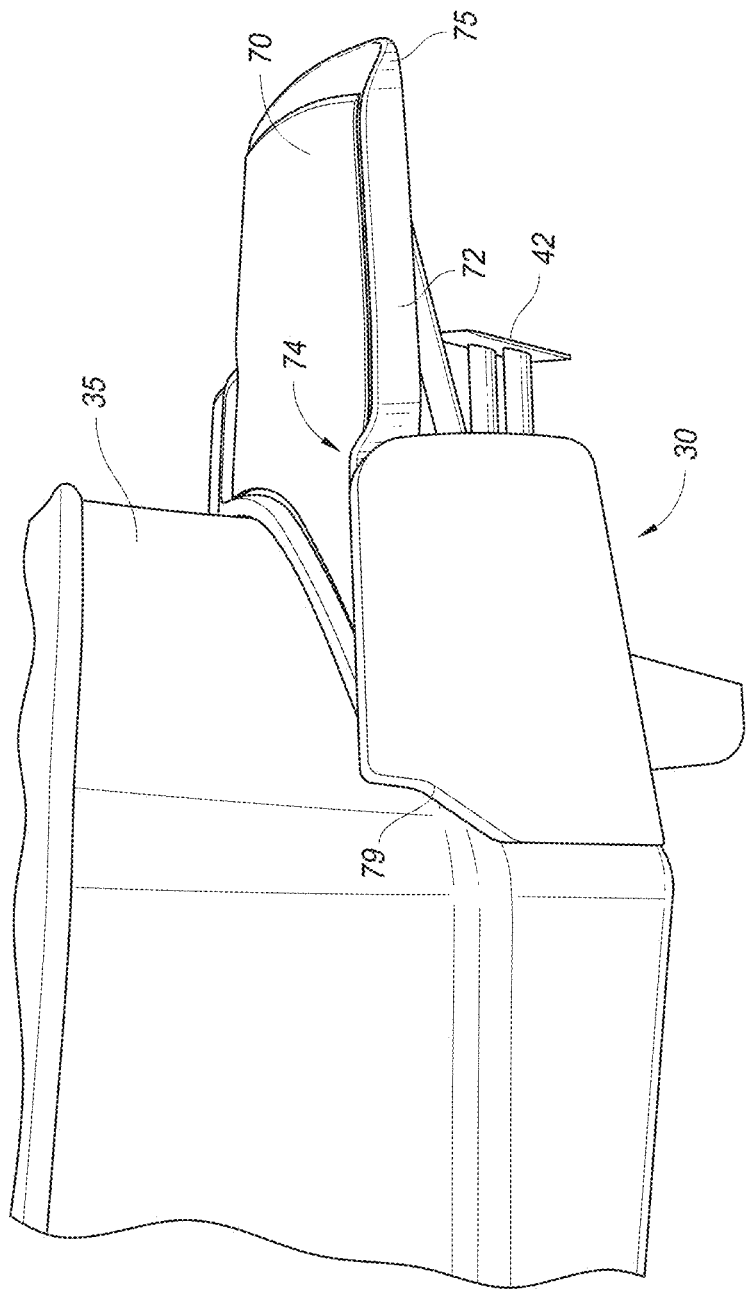

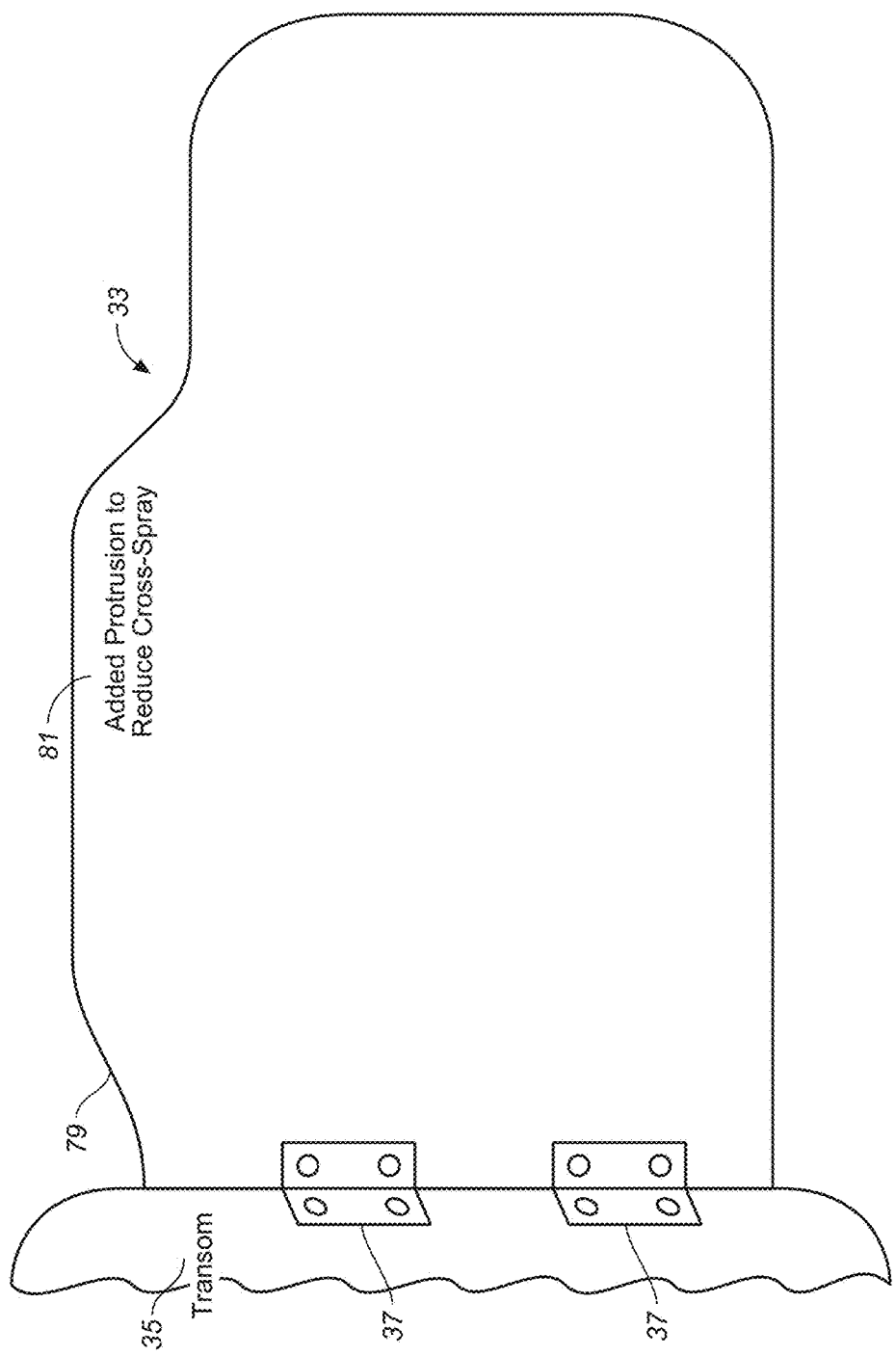

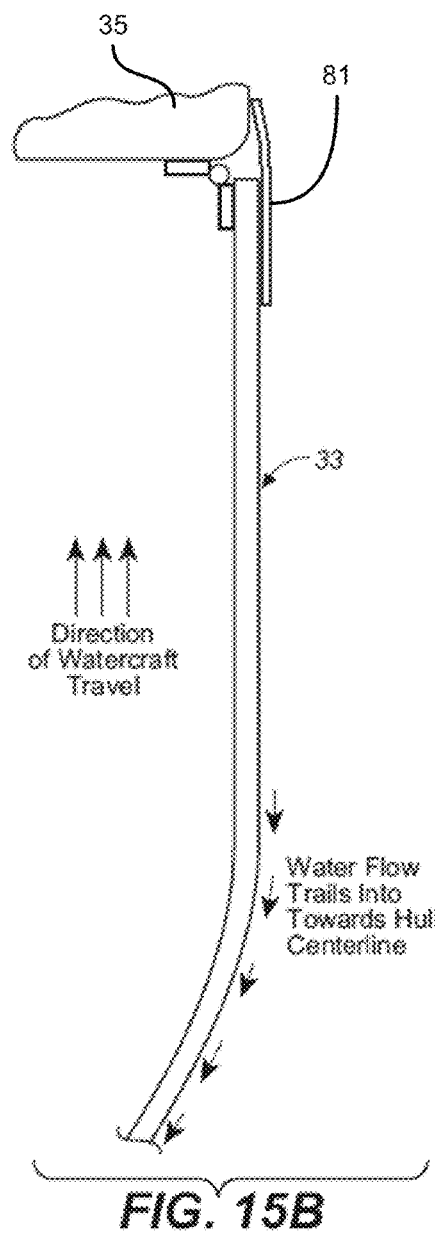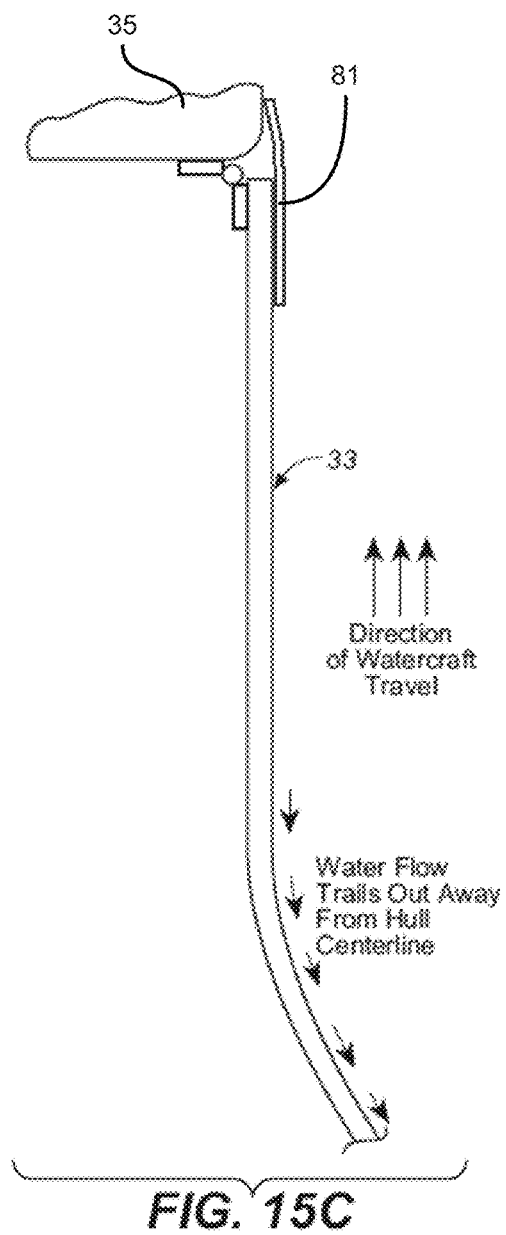

CONTROL SYSTEMS FOR WATER-SPORTS WATERCRAFT

CROSS-REFERENCE TO RELATED APPLICATIONS

This application is a continuation of U.S. patent application Ser. No. 15/210,776, filed Jul. 14, 2016, and titled CONTROL SYSTEMS FOR WATER-SPORTS WATERCRAFT, which claims the benefit under 35 U.S.C. § 119(e) of U.S. Provisional Patent Application No. 62/193,036, filed Jul. 15, 2015, and titled WAKE CONTROL SYSTEM FOR A WATERCRAFT, and U.S. Provisional Patent Application No. 62/269,892, filed Dec. 18, 2015, and titled CONTROL SYSTEMS FOR WATER-SPORTS WATERCRAFT. Each of the above-identified applications is hereby incorporated by reference in its entirety.

INCORPORATION BY REFERENCE

Each of the following is hereby incorporated by reference in its entirety: U.S. patent application Ser. No. 14/082,086, filed Nov. 15, 2013, and titled SURF WAKE SYSTEM FOR A WATERCRAFT; U.S. patent application Ser. No. 14/075,978, filed Nov. 8, 2013, and titled SURF WAKE SYSTEM FOR A WATERCRAFT; U.S. patent application Ser. No. 13/830,356, filed on Mar. 14, 2013, and titled SURF WAKE SYSTEM FOR A WATERCRAFT; U.S. patent application Ser. No. 13/545,969, filed on Jul. 10, 2012, and titled SURF WAKE SYSTEM FOR A WATERCRAFT; U.S. Provisional Patent Application No. 61/559,069, filed on Nov. 12, 2011, and titled SURF WAKE SYSTEM FOR A WATERCRAFT; International Patent Application No. PCT/US2012/055788, with an international filing date of Sep. 17, 2012, and titled SURF WAKE SYSTEM AND METHOD FOR A WATERCRAFT; and U.S. Provisional Patent Application No. 61/535,438, filed on Sep. 16, 2011 and titled SURF WAKE SYSTEM AND METHOD FOR A WATERCRAFT.

BACKGROUND

Field of the Disclosure

This application relates, in general, to wake control systems for a watercraft, and some embodiments relate to surf wake systems for modifying a wake produced by a watercraft travelling through water.

Description of the Related Art

Wake surfing has become increasingly popular in recent years because, unlike an ocean wave, a wake produced by a watercraft is on-demand not to mention continuous and endless as long as the watercraft is moving forward. As a watercraft travels through water, the watercraft displaces water and thus generates waves including bow wave and diverging stern waves on both sides of the watercraft. Due to pressure differences, these waves generally converge in the hollow formed behind the traveling watercraft and/or interfere with each other to form a wake behind the watercraft. Such a wake, however, is generally small, choppy or too close to the watercraft to be suitable and safe for water sports, and particularly not suitable for wake boarding or surfing.

To facilitate surfing, a wake can be formed away from the stern of the watercraft, for example, about ten feet away, and with a waist-height peak, for example, about three feet or higher. Those of skill in the art will understand that a wake for wake surfing can be formed at various different distances behind the watercraft, and the wake can have various different heights. Generally hundreds, and sometimes thousands, of pounds of additional weight or ballast to a rear corner of the watercraft to make the watercraft tilt to one side, displaces more water, and hence generates a larger wake on that side. Such additional weight may be in the form of removable ballast bags, installed ballast tanks or bladders, or passengers positioned to one side of the watercraft, which is primarily used to tip the watercraft to that side. Using such additional weight to produce larger wakes, however, poses several disadvantages. For example, such additional weight may take up significant space and capacity that may otherwise reduce the passenger capacity of the watercraft. Also, such additional weight may unbalance the watercraft creating difficulties in control. Moreover, the additional weight generally must be moved from one side of the water craft to the other in order to generate a wake on the other side of the water craft. Shifting such additional weight may require significant time and effort. For example, filling and emptying ballast tanks to switch from one side to the other may require 20 minutes or more.

In light of the foregoing, it would therefore be useful to provide surf wake system that overcomes the above and other disadvantages.

SUMMARY OF CERTAIN EMBODIMENTS

Various embodiments discussed herein can relate to rider control device for enabling a rider to modify the wake produced by a boat or other watercraft.

Various embodiments disclosed herein can relate to a wake surf system configured to allow a wake surf rider to switch a wake of a water-sports boat from a port-side surf configuration to a starboard-side surf configuration or from a starboard-side surf configuration to a port-side surf configuration while surfing on the wake of the water-sports boat. The wake surf system can include a water-sports boat having a hull configured to produce a wake having a port-side wave and a starboard-side wave that diverge when the hull moves through water, one or more movable wake modifiers configured to enhance the port-side wave to produce a port-side surf configuration when the one or more wake modifiers are position in a first configuration and to enhance the starboard-side wave to produce a starboard-side surf configuration when the one or more wake modifiers are positioned in a second configuration, one or more actuators configured to move the one or more wake modifiers between the first configuration and the second configuration, a cruise control system configured to control an engine of the water-sports boat to move the hull through water at a cruise speed, and a wireless communication interface. The system can include a rider control device having a securement element configured to couple the rider control device to a wake surf rider and a user interface. The user interface of the rider control device can include one or more user input elements for receiving commands from the wake surf rider selecting the port-side surf configuration or the starboard-side surf configuration and one or more user input elements for receiving commands from the wake surf rider to set a new cruise speed for the water-sports boat. The rider control device can include a wireless communication interface configured to wirelessly communicate commands from the rider control device to the wireless communication interface of the water-sports boat. The one or more actuators can be responsive to a selection of the port-side surf configuration on the user interface of the rider control device to position the one or more wake modifiers at the first configuration, and the one or more actuators can be responsive to a selection of the starboard-side surf configuration on the user interface of the rider control device to position the one or more wake modifiers at the second configuration. The cruise control system can be configured to change to the new cruise speed in response to the command received from the rider control device.

The cruise control system can be configured to change to the new cruise speed when the new cruise speed is within a permissible speed range, and the cruise control system can be configured to not change to the new cruise speed when the new cruise speed is outside the permissible speed range. The permissible speed range can be determined based at least in part on a base cruise speed set using a driver user interface. The cruise control system can be configured to disregard the command to change to the new cruise speed when the new cruise speed is outside the permissible speed range. The cruise control system can be configured to set the cruise speed to the boundary of the permissible speed range closest to the new cruise speed when the new cruise speed is outside the permissible speed range.

The water-sports boat can include at least one wake-modifying device configured to move to adjust a height of the wake. The user interface of the rider control device can be configured to receive a command to change a height of the wake. The wireless communication interface of the rider control device can be configured to wirelessly communicate the command to change the height of the wake to the wireless communication interface of the water-sports boat. The at least one wake-modifying device can be responsive to the command received from the rider control device to move the at least one wake-modifying device. The at least one wake-modifying device can include a foil.

The user interface of the rider control device can include a first button for receiving a selection of the port-side surf configuration, a second button for receiving a selection of the starboard-side surf configuration, a third button for receiving a command to raise a height of the wake, a fourth button for receiving a command to lower the height of the wake, a fifth button for receiving a command to increase the cruise speed of the water-sports boat, and a sixth button for receiving a command to decrease the cruise speed of the water-sports boat.

The securement element can include an arm band configured to be worn on the arm of the rider. The securement element can include one or more of a necklace, a vest, a jacket, a clip, a hat, and a buckle. The securement element can be configured to couple to the rider at a location proximate the rider's hand to enable the rider to provide input to the user interface with the same hand for one-handed operation. The rider control device can be buoyant to float in water. The rider control device can include a waterproof housing that is buoyant to float in water. The securement element of the rider control device can be buoyant to float in water independent of the waterproof housing. In some embodiments, the rider control device can include a user output element configured to output information to the rider.

The water-sports boat can include a sound system that includes speakers configured to direct sound rearward of the water-sports boat to the rider, and the user interface of the rider control device can be configured to receive music control commands from the rider. The wireless communication interface of the rider control device can be configured to wirelessly communicate the music control commands to the wireless communication interface of the water-sports boat, and the sound system can be configured to change music output by the speakers in response to the music control commands.

The water-sports boat can include a ballast system configured to add and remove water ballast to adjust the wake, the user interface of the rider control device can be configured to receive a command, and the wireless communication interface of the rider control device can be configured to wirelessly communicate the command to the wireless communication interface of the water-sports boat. The ballast system can be responsive to the command received from the rider control device to change the water ballast.

The one or more wake modifiers can include a port-side flap movable between a non-deployed position and a deployed position and a starboard-side flap movable between a non-deployed position and a deployed position. The one or more actuators can be configured to position the port-side flap in the non-deployed position and the starboard-side flap in the deployed position in response to the selection of the port-side surf configuration. The one or more actuators can be configured to position the port-side flap in the deployed position and the starboard-side flap in the non-deployed position in response to the selection of the starboard-side surf configuration. The water-sports boat can be configured to enhance the port-side wave to have a face that is substantially smoother than a face of the starboard-side wave when in the port-side surf configuration, and the water-sports boat can be configured to enhance the starboard-side wave to have a face that is substantially smoother than a face of the port-side wave when in the starboard-side surf configuration. The water-sports boat can include a driver user interface configured to output a driver notification in response to a command received from the rider control device.

Various embodiments disclosed herein can relate to a water-sports boat having a hull, an engine configured to move the hull through water to produce a wake, and a wireless communication interface. A rider control device can include a securement element configured to couple the rider control device to a rider, one or more user input elements for receiving commands from the rider to change a speed of the water-sports boat to a new speed, and a wireless communication interface configured to wirelessly communicate commands from the rider control device to the wireless communication interface of the water-sports boat. The water-sports boat can be configured to change the speed of the water-sports boat to the new speed in response to the command received from the rider control device when the new speed is within a permissible speed range. The water-sports boat can be configured to not change the speed to the new speed when the new speed is outside the permissible speed range. The permissible speed range can be based at least in part on a base speed set by a driver of the water-sports boat.

The water-sports boat can include a cruise control system configured to control the engine of the water-sports boat to move the hull through water at a cruise speed. The cruise control system is configured to change the cruise speed in response to the commands from the rider control device. The permissible speed range can be determined based at least in part on a base cruise speed set using a driver user interface. The water-sports boat can include a surf system that has one or more movable wake modifiers configured to enhance a port-side wave produced by the water-sports boat to produce a port-side surf configuration when the one or more wake modifiers are position in a first configuration and to enhance a starboard-side wave produced by the water-sports boat to produce a starboard-side surf configuration when the one or more wake modifiers are positioned in a second configuration. The surf system can include one or more actuators configured to move the one or more wake modifiers between the first configuration and the second configuration. The rider control device can include one or more user input elements for receiving commands from the rider selecting the port-side surf configuration or the starboard-side surf configuration. A wireless communication interface of the rider control device can be configured to wirelessly communicate the commands to the water-sports boat. The one or more actuators can be responsive to a selection of the port-side surf configuration on the rider control device to position the one or more wake modifiers at the first configuration, and the one or more actuators can be responsive to a selection of the starboard-side surf configuration on the rider control device to position the one or more wake modifiers at the second configuration.

The rider control device can include a first button for receiving a selection of the port-side surf configuration, a second button for receiving a selection of the starboard-side surf configuration, a third button for receiving a command to raise a height of the wake, a fourth button for receiving a command to lower the height of the wake, a fifth button for receiving a command to increase the speed of the water-sports boat, and a sixth button for receiving a command to decrease the speed of the water-sports boat.

The water-sports boat can include at least one wake-modifying device configured to move to adjust a height of the wake, and the rider control device can be configured to receive a command to change a height of the wake. The wireless communication interface of the rider control device can be configured to wirelessly communicate the command to change the height of the wake to the wireless communication interface of the water-sports boat, and the at least one wake-modifying device can be responsive to the command received from the rider control device to move the at least one wake-modifying device. The at least one wake-modifying device can include a foil.

The securement element can include an arm band configured to be worn on the arm of the rider. The securement element can be configured to be positioned proximate a hand of the rider to enable the rider to provide input to the rider control device using the same hand for one-handed operation.

The water-sports boat can include a sound system that includes speakers configured to direct sound rearward of the water-sports boat to the rider, and the rider control device can be configured to receive music control commands from the rider. The wireless communication interface of the rider control device can be configured to wirelessly communicate the music control commands to the wireless communication interface of the water-sports boat, and the sound system can be configured to change music output by the speakers in response to the music control commands.

The water-sports boat can include a driver user interface configured to output a driver notification in response to a command received from the rider control device.

Various embodiments disclosed herein can relate to a system including a water-sports boat that has a hull, an engine configured to move the hull through water to produce a wake, and a driver user interface. The system can include a rider device having a securement element configured to couple the rider device to a rider, and a proximity sensor configured to determine a distance between the water-sports boat and the rider device. The driver user interface can be configured to output a notification to the driver when a distance between the water-sports boat and the rider device is above a threshold distance. The proximity sensor can include a global positioning system (GPS) on the rider device. The proximity sensor can include a global positioning system (GPS) on the water-sports boat.

The water-sports boat can include a surf system that has one or more movable wake modifiers configured to enhance a port-side wave produced by the water-sports boat to produce a port-side surf configuration when the one or more wake modifiers are position in a first configuration and to enhance a starboard-side wave produced by the water-sports boat to produce a starboard-side surf configuration when the one or more wake modifiers are positioned in a second configuration, and one or more actuators configured to move the one or more wake modifiers between the first configuration and the second configuration. The rider device can include one or more user input elements for receiving commands from the rider selecting the port-side surf configuration or the starboard-side surf configuration. A wireless communication interface of the rider device is configured to wirelessly communicate the commands to the water-sports boat. The one or more actuators can be responsive to a selection of the port-side surf configuration on the rider device to position the one or more wake modifiers at the first configuration, and wherein the one or more actuators can be responsive to a selection of the starboard-side surf configuration on the rider device to position the one or more wake modifiers at the second configuration.

The water-sports boat can include at least one wake-modifying device configured to move to adjust a height of the wake. The rider device can be configured to receive a command from the rider to change a height of the wake. A wireless communication interface of the rider device can be configured to wirelessly communicate the command to change the height of the wake to the water-sports boat. The at least one wake-modifying device can be responsive to the command received from the rider device to move the at least one wake-modifying device.

The water-sports boat can include a cruise control system configured to control the engine of the water-sports boat to move the hull through water at a cruise speed. The rider device can be configured to receive a command from the rider to change the cruise speed to a new cruise speed. A wireless communication interface of the rider device can be configured to wirelessly communicate the command to the water-sports boat, and the cruise control system can be configured to change to the new cruise speed in response to the command received from the rider device.

Various embodiments disclosed herein can relate to a system having a water-sports boat that includes a hull and an engine configured to move the hull through water to produce a wake. The system can include a rider device having a securement element configured to couple the rider device to a rider, and a position sensor for determining a position of the rider device. The system can include a drone having a propulsion system configured to cause the drone to fly through the air and a camera. The drone can be configured to position the camera based at least in part on the position of the rider device.

The position sensor of the rider device can include a global positioning system (GPS). The drone can have a position sensor for determining a position of the drone, and the drone can be configured to position the camera based at least in part on the position of the drone. The position sensor of the drone can include a global positioning system (GPS). The water-sports boat can include a position sensor for determining a position of the water-sports boat, and the drone can be configured to position the camera based at least in part on the position of the water-sports boat. The position sensor of the water-sports boat can include a global positioning system (GP S).

The drone can include an actuator configured to move the camera relative to a body of the drone based at least in part on the position of the rider. The drone can be configured to operate the propulsion system to move the drone to position the camera based at least in part on the position of the rider.

The water-sports boat can include a landing location and one or more imaging markers positioned at one or more locations relative to the landing location. The drone can include a sensor configured to image the one or more imaging markers, and the propulsion system of the drone can be operable to navigate the drone to the landing location based at least in part signals from the sensor imaging the one or more imaging markers. The one or more imaging markers can include one or more infrared light sources, and the sensor can include an infrared imaging sensor. The camera of the drone can include the sensor. The sensor can be an imaging sensor separate from the camera of the drone. At least one of the one or more imaging markers can be positioned at a center portion of the landing location.

One aspect of the present invention is directed to a surf wake system for modifying a wake formed by a watercraft travelling through water. The surf wake system may include a pair of upright water diverters including a port diverter and a starboard diverter, each independently movable from a neutral position to a deployed position in which a respective water diverter extends outboard of a transom of the watercraft to deflect water traveling along a hull of the watercraft and past the transom. In some embodiments, positioning the port diverter in its deployed position while the starboard diverter is in its neutral position modifies the wake to provide a starboard surf wake, and positioning the starboard diverter in its deployed position while the port diverter is in its neutral position modifies the wake to provide a port surf wake.

In various embodiments, in the deployed position, the respective water diverter may extend outboard beyond a side strake of the watercraft to deflect water traveling along the side strake and past the transom.

Each upright water diverter may be pivotally mounted to the watercraft adjacent the transom or a respective side strake.

Each upright water diverter may be pivotally mounted to directly to the transom or a respective side strake.

The surf wake system may include a plurality of positioners operably connected to a respective water diverter for positioning the respective water diverter relative to a longitudinal axis of the watercraft.

At least one of the plurality of positioners may be a linear actuator configured to selectively move a respective water diverter between its neutral and extended positions.

Another aspect of the present invention is directed to a surf wake system including a flap for deflecting water traveling past a transom of the watercraft, a hinge for pivotally mounting the flap relative to the watercraft, the hinge having a pivot axis extending adjacent and along a side edge of the transom, and a positioner operably connected to the flap for positioning the flap relative to a longitudinal axis of the watercraft between a neutral position and an outward position.

The flap may include a substantially planar member.

The flap may be approximately 10-15 inches high and approximately 15-20 inches long.

The flap may be formed of plastic, stainless steel, wood and/or fiberglass.

The hinge may be a jointed device having a first member pivotally affixed to a second member by a pin, wherein the first member is affixed to the watercraft and the second member is affixed to the flap.

The second member may be monolithically formed with the flap.

The actuator may be dimensioned and configured to pivotally move and position the flap between the neutral position, in which the flap pulls inboard, and the extended position, in which the flap extends outboard.

The flap may extend outboard at least approximately 5-15° relative to a longitudinal axis of the watercraft.

The surf wake system may include a manual actuator to selectively position the flap.

The surf wake system may include a controller installed within the watercraft and operably connected to the actuator to selectively position the flap.

The controller may include a display panel for displaying an indication of a position of the flap.

The surf wake system may include a plurality of flaps and hinges, each flap pivotally mounted to the watercraft by a respective hinge.

The plurality of flaps may include a port flap and a starboard flap, each mounted adjacent respective port side and starboard side edges.

The positioner may include a plurality of actuators each secured on the watercraft and operably connected to a respective one of the plurality of flaps.

The surf wake system may include a controller installed within the watercraft and operably connected to the plurality of the actuators to selectively position the plurality of the flaps.

In various embodiments, positioning the port flap in the outward position and the starboard flap in the neutral position enhances a right surf wake, and wherein positioning the starboard flap in the outward position and the port flap in the neutral position enhances a left surfing wake.

Various embodiments disclosed herein can relate to a boat configured to generate a starboard side surf wake for at least goofy-foot (or right-foot-forward) wake surfing and a port side surf wake for at least regular-foot (or left-foot-forward) wake surfing, with the port side surf wake different from the starboard side surf wake. The boat can include an upright port side water diverter movable between a first and second position, where one of said first and second positions produces the starboard side surf wake. The boat can include an upright starboard side water diverter movable between a first and second position, where one of said first and second positions produces the port side surf wake. The boat can include a controller responsive to driver input into an input device, and one or more actuators responsive to the controller to move the port side water diverter from one of the first and second positions to the other of the first and second positions, and move the starboard side water diverter from one of the second and first positions to the other of the second and first positions.

Various embodiments disclosed herein can relate to a boat configured to produce a right side surf wake and a left side surf wake different from the right side surf wake. Both the right side surf wake and left side surf wake can be different from a wake of the boat moving through water without water diverters engaged. The boat can include a memory storing information including wake surf settings, a control responsive to the memory, one or more actuators responsive to the control, an upright right side water diverter operably connected to the actuator(s) to move between a first and second position, where one of the first and second positions produces the left side surf wake, and an upright left side water diverter operably connected to the actuator(s) to move between a first and second position, where one of the first and second positions produces the right side surf wake.

Various embodiments disclosed herein can relate to a boat configured to create an asymmetrical wake suitable for wake surfing. The boat can include first and second upright wake modifiers. The first wake modifier can be configured to engage to form a right side asymmetrical wake, and the second wake modifier can be configured to engage to form a left side asymmetrical wake. Each of the right and left side asymmetrical wakes can be different from a non-surf wake of the boat moving through water without the first and second wake modifiers engaged. In some embodiments, the boat can include a controller responsive to one or more safety features to override engagement of said first or second upright wake modifiers.

The methods and apparatuses of the present invention have other features and advantages which will be apparent from or are set forth in more detail in the accompanying drawings, which are incorporated herein, and the following Detailed Description, which together serve to explain certain principles of the present invention.

Various embodiments of the present disclosure include a boat configured to produce a wake for wake surfing. The boat includes a hull configured to produce a wake when the hull moves through water, a first element having a vertical orientation, the first element electronically positionable to change a flow of water when the hull moves through water, said change of said flow modifying the wake to be surfable on a right side. The boat also includes a first actuator configured to move the first element. The boat also includes a second element having a vertical orientation, the second element electronically positionable to change a flow of water when the hull moves through water, said change of said flow modifying the wake to be surfable on a left side. The boat also comprises a second actuator configured to move the second element. The boat also includes a user input device configured to receive input from a user. The input can include a determination to change the surfable side of the wake. Responsive to said input, at least one of the first and second actuators can move at least a corresponding one of the first and second elements to responsively modify the wake.

Various embodiments of the present disclosure include a boat producing a wake for wake surfing. The boat can include a hull producing a wake as the hull moves through water. The boat also includes a movable first structure producing a first surfable side of the wake, said first surfable side of the wake including a substantially smooth water surface while another side of the wake includes a substantially turbulent water surface, said first structure movable between positions to change a shape of the first surfable side of the wake, said first structure including a vertical orientation. The boat also includes a first actuator configured to move the first structure. The boat also includes a movable second structure capable of producing a second surfable side of the wake, said second surfable side of the wake including a substantially smooth water surface while another side of the wake includes a substantially turbulent water surface, said second structure capable of being movable between positions to change a shape of the second surfable side of the wake, said second structure including a vertical orientation. The boat also includes a second actuator configured to move the second structure. The boat can also include a user input device configured to receive input from a user, and said input can include desired wave shapes. Responsive to said input, at least one of the first and second actuators can move at least a corresponding one of the first and second elements to responsively modify the shape of the wake.

Various embodiments of the present disclosure include a boat configured to produce a wake for wake surfing. The boat can include a hull configured to produce a wake when the hull moves through water. The boat also can include a rudder configured to steer the boat as the hull moves through the water. The boat also can include a plurality of electronically controlled actuators, and an end of each actuator can be operably secured with respect to the transom. The boat also can include first and second water diverters. Each water diverter can be configured to redirect water as it passes a transom of the hull. Each water diverter can be movable by one of said plurality of actuators. Each water diverter can include a vertical orientation configured to shape a side of the wake for surfing, the first water diverter shaping the right side of the wake and the second water diverter shaping the left side of the wake.

Various embodiments of the disclosure relate to a boat configured to produce a wake for wake surfing. The boat can include a hull configured to produce a wake when the hull moves through water. The boat also can include one or more wake modifying elements having a first setting that is configured to produce a right-side surf wake, and a second setting that is configured to produce a left-side surf wake and one or more actuators configured to move the one or more wake modifying elements from the first setting to the second setting. The boat also can include a user input device configured to receive input from a user corresponding to a selection of the left-side surf wake. The boat also can include one or more actuators activated in response to the selection of the left-side surf wake to move the one or more wake modifying elements to the second setting to produce the left-side surf wake and the right-side wake that is unsuitable for surfing. Various embodiments of the disclosure relate to a boat that includes one or more rider notification elements configured to provide a rider notification in response to the selection of the left-side surf wake, wherein the rider notification is configured to inform a wake surfer that the wake will transition, or is transitioning, from the right-side surf wake to the left-side surf wake.

Moreover in various combinations of embodiments, the one or more rider notification elements are configured to provide a visual rider notification. The one or more rider notification elements can include one or more lights. The one or more lights can be on a transom of the boat, on a swim platform of the boat, or on a wake tower of the boat, or some or all of the foregoing. The one or more rider notification elements can be configured to provide an audio rider notification. The one or more rider notification elements can include one or more audio speakers. The rider notification can include a plurality of sounds that precede the transition from the right-side surf wake to the left-side surf wake. The one or more rider notification elements can be configured to provide a visual rider notification and the audio rider notification. The one or more rider notification elements can be configured to provide the rider notification at a first time, and the one or more actuators can activate at a second time that is later than the first time by a delay time. A memory can be configured to store a plurality of delay times, and the user input device can be configured to receive a selection corresponding to a selected delay time. The one or more actuators can activate at the second time that is later than the first time by the selected delay time. The delay time may be based at least in part on one or more of a rider identifier, a rider skill level, a rider weight, a surfboard length, a surfboard type, a wake height, a wake length, and a wake shape. One or more driver notification elements can be configured to provide a driver notification in response to the selection of the left-side surf wake. The driver notification can be configured to inform a driver that the wake will transition, or is transitioning, from the right-side surf wake to the left-side surf wake. The user input device can be configured to be operated by an operator that is not the driver of the boat.

In various embodiments, a boat comprises a hull configured to produce a wake when the hull moves through water. The boat can include one or more wake modifying elements configured to modify the wake and one or more rider notification elements configured to provide a rider notification that the one or more wake modifying elements is changing the wake or will change the wake. The one or more wake modifying elements can be configured to produce an asymmetrical wake having a right-side surf wake or a left-side surf wake, and the one or more rider notification elements can be configured to provide the rider notification when the wake is transitioning, or will transition, from a right-side surf wake to a left-side surf wake or from a left-side surf wake to a right-side surf wake. The one or more wake modifying elements can be configured to modify the height of the wake. The one or more rider notification elements can be configured to provide the rider notification when the wake height is changing or when the wake height will change. The one or more wake modifying elements can be configured to modify the shape of the wake, and the one or more rider notification elements can be configured to provide the rider notification when the wake shape is changing or when the wake shape will change. The one or more wake modifying elements can include a foil (e.g., configured to pull a rear of the boat down into the water as the boat moves through the water). The foil can be movable between two or more positions, and the one or more rider notification elements can be configured to provide the rider notification when the foil is moving or is going to move. The one or more rider notification elements can be configured to provide a visual rider notification. The one or more rider notification elements an be configured to provide an audio rider notification.

Various embodiments can include a boat configured to produce a wake for wake surfing. The boat can include a hull configured to produce a wake when the hull moves through water, and one or more wake modifying elements having a first setting that is configured to produce a right-side surf wake and a left-side wake that is unsuitable for surfing, and a second setting that is configured to produce a left-side surf wake and a right-side wake that is unsuitable for surfing. The boat also can include one or more actuators configured to move the one or more wake modifying elements from the first setting to the second setting and from the second setting to the first setting. The boat also can include a rider control device that includes one or more user input elements configured to enable a rider (e.g., wake surfer) to select the right-side surf wake and configured to enable the wake surfer to select the left-side surf wake. The rider control device can include a wireless communication interface configured to transmit data corresponding to a selection received by the user input elements. A wireless communication interface is configured to receive the transmitted data corresponding to the selection received by the user input elements. One or more actuators can be actuated in response to the data corresponding to the selection received by the user input elements to move the one or more wake modifying elements to the first setting in response to selection of the right-side surf wake and to move the one or more wake modifying elements to the second setting in response to selection of the left-side surf wake.

In various embodiments, the rider control device can include a wearable article configured to be worn on a body of the wake surfer. The wearable article can include one or more of an arm band, a watch, a necklace, a vest, and a jacket. The rider control device can be water resistant. The rider control device can include a waterproof housing. The rider control device can be configured to float in water. The one or more driver notification elements can be configured to provide a driver notification in response to the data corresponding to the selection received by the user input elements. The driver notification can be configured to inform a driver that the wake will transition, or is transitioning, from the right-side surf wake to the left-side surf wake or from the left-side surf wake to the right-side surf wake.

In various embodiments, a boat can include a hull configured to produce a wake when the hull moves through water, one or more wake modifying elements configured to modify the wake, and a rider control device configured to receive input from a rider. The wake modifying elements can be configured modify the wake in response to the input from the rider (e.g., received by the rider control device. In some embodiments, the boat can include a controller configured to modify the wake using the one or more wake modifying elements in response to the input from the rider.

In various embodiments, the rider control device can include a wireless communication interface configured to transmit data corresponding to the input from the rider to the boat (e.g., to the controller). The one or more wake modifying elements can be configured to produce an asymmetrical wake having a right-side surf wake or a left-side surf wake, and the rider control device can include one or more user input elements configured to receive a selection of the right-side surf wake and to receive a selection of the left-side surf wake.

In various embodiments, the rider control device can include one or more user input elements configured to receive a selection corresponding to a wake height or a wake length. The one or more wake modifying elements can be configured to change the wake height or the wake length in response to the selection. For example, a controller can be configured to move the one or more wake modifying elements to change the wake height or the wake length in response to the selection. The one or more wake modifying elements can include a foil configured to pull a rear of the boat down into the water as the boat moves through the water, and the foil can be movable between two or more positions. The foil can be movable in response to the selection received by the rider control device, to modify the wake. For example, a controller can be configured to move the foil in response to the selection received by the rider control device. The rider control device can include a wearable article configured to be worn on a body of the wake surfer, can be water resistant, and can be configured to float in water.

Various embodiments of the disclosure relate to a wearable rider control device for controlling a wake of a boat. The rider control can include a wearable element configured to be worn on a body of a rider and one or more user input elements configured to receive input from the rider associated with a change for a wake of a boat. The device can also include a wireless communication interface configured to transmit data corresponding to a selection received by the user input elements.

In various embodiments, the one or more user input elements can be configured to enable the rider to select a right-side surf wake and configured to enable the rider to select a left-side surf wake. The wearable element can include one or more of an arm band, a watch, a necklace, a vest, and a jacket, and can include a water resistant housing, a waterproof housing, and/or can be configured to float in water.

In various embodiments, the boat can include a hull configured to produce a wake when the hull moves through water and one or more wake modifying elements configured to produce an asymmetrical wake having a right-side surf wake or a left-side surf wake. The boat can include a wireless communication interface configured to receive data from a rider control device. The data can correspond to selection of the right-side surf wake or the left-side surf wake. The one or more wake modifying elements can be configured produce the right-side surf wake in response to the data corresponding to selection of the right-side surf wake and to produce the left-side surf wake in response to the data corresponding to selection of the left-side surf wake. For example, a controller can be configured to modify the wake using the one or more wake modifying elements to have the right-side surf wake in response to the data corresponding to selection of the right-side surf wake and to have the left-side surf wake in response to the data corresponding to selection of the left-side surf wake. In various embodiments, a rider control device can be included.

Various embodiments can includes a boat having a hull configured to produce a wake when the hull moves through water and one or more wake side adjustment elements having a first setting that is configured to produce a right-side surf wake and a left-side wake that is unsuitable for surfing, and a second setting that is configured to produce a left-side surf wake and a right-side wake that is unsuitable for surfing. The boat also can include one or more wake shape adjustment elements movable between two or more positions to adjust one or more of a wake height, a wake length, and a wake steepness. The boat can include a user input device configured to receive selections from a user. The one or more wake side adjustment elements can move to the first setting in response to a selection received by the user input device corresponding to a right-side surf wake. The one or more wake side adjustment elements can move to the second setting in response to a selection received by the user input device corresponding to a left-side surf wake. The one or more wake shape adjustment elements can move in response to a selection receive by the user input device corresponding to a change in one or more of the wake height, the wake length, and the wake steepness. For example, in some embodiments, the boat can include a controller configured to move the one or more wake side adjustment elements to the first setting in response to a selection received by the user input device corresponding to a right-side surf wake, configured to move the one or more wake side adjustment elements to the second setting in response to a selection received by the user input device corresponding to a left-side surf wake, and configured to move the one or more wake shape adjustment elements in response to a selection receive by the user input device corresponding to a change in one or more of the wake height, the wake length, and the wake steepness.

In various embodiments, the one or more wake shape adjustment elements can include a foil movable between a deployed position and a retracted position. The foil can be configured to pull a rear of the boat down into the water as the boat moves through the water when the foil is in the deployed position. The user input device can include a single selection element that corresponds to a right-side surf wake having a first height, and the one or more wake side adjustment elements can move to the first setting and the one or more wake shape adjustment elements can move to a positioned that corresponds to the first height in response to a selection of the single selection element. The user input device can include a second single selection element that corresponds to a left-side surf wake having a second height, and the one or more wake side adjustment elements can move to the second setting and the one or more wake shape adjustment elements can move to a positioned that corresponds to the second height in response to a selection of the second single selection element. The single selection element can include a button.

In various embodiments, a boat can be configured to produce a wake for wake surfing. The boat can include a hull configured to produce a wake when the hull moves through water and one or more wake modifying elements having a first setting that is configured to produce a right-side surf wake and a left-side wake that is unsuitable for surfing, and a second setting that is configured to produce a left-side surf wake and a right-side wake that is unsuitable for surfing. The boat can include a rudder configured to steer the boat as the hull moves through the water and a steering device configured to enable a driver to operate the rudder to steer the boat. The steering device (e.g., steering wheel) can include one or more user input elements configured to receive input from the driver corresponding to a selection of a right-side surf wake or a left-side surf wake. The one or more wake modifying elements can move to the first setting in response to a selection received by the user input elements corresponding to the right-side surf wake. The one or more wake modifying elements can move to the second setting in response to a selection received by the user input elements corresponding to the left-side surf wake. For example, in some embodiments, the boat can include a controller configured to move the one or more wake modifying elements to the first setting in response to a selection received by the user input elements corresponding to the right-side surf wake and configured to move the one or more wake modifying elements to the second setting in response to a selection received by the user input elements corresponding to the left-side surf wake.

In various embodiments, the steering device can include a steering wheel or a joystick. The steering device can include a wireless communication interface configured to transmit data corresponding to a selection received by the one or more user input elements. The boat can include a wireless communication interface (e.g., in communication with the controller) and configured to receive the data transmitted from the wireless communication interface of the steering device. The one or more input elements can be configured to enable the driver to adjust one or more of a wake height, a wake length, and a wake steepness.

In various embodiments, a boat can be configured to produce a wake for wake surfing, and can include comprises a hull configured to produce a wake when the hull moves through water. The boat can include and a left-side upright flap positioned on a left side of the boat, and the left-side upright flap can be movable between a retracted position and a deployed position. The deployed position can be configured to produce a right-side surf wake. The left-side upright flap can include an edge disposed along a corresponding left portion of the hull with a gap between the edge and the left portion of the hull when the left-side upright flap is in the deployed position. The left portion of the hull can be substantially linear, and the edge can be substantially linear.

In various embodiments, the hull can include a chamfer line, and the edge of the left-side upright flap can be substantially entirely disposed below the chamfer line at the left portion of the hull when the left-side upright flap is in the deployed position. A right-side upright flap can be positioned on a right side of the boat, and the right-side upright flap can be movable between a retracted position and a deployed position. The deployed position can be configured to produce a left-side surf wake. The right-side upright flap can include an edge disposed along a corresponding right portion of the hull with a gap between the edge of the right-side upright flap and the right portion of the hull. The right portion of the hull can be substantially linear, and the edge of the right-side upright flap can be substantially linear. The hull can include a chamfer line, and the edge of the right-side upright flap can be substantially entirely disposed below the chamfer line at the right portion of the hull when the right-side upright flap is in the deployed position. The gap can be less than or equal to about 10 mm and/or can be at least about 0.1 mm. A spray reducing element can be configured to at least partially cover or fill the gap between the left-side upright flap and the corresponding left portion of the hull. The spray reducing element can be coupled to the left-side upright flap and can extend past the edge of the left-side upright flap towards the hull when the left-side upright flap is in the deployed position such that the spray reducing element at least partially covers the gap. The spray reducing element can include a rigid plate. The spray reducing element can include a flexible material. The spray reducing element can be configured to abut against the hull when the left-side upright flap is in the deployed position.

BRIEF DESCRIPTION OF THE DRAWINGS

FIG. 11 is a side view of the exemplary surf wake system of FIG. 10.

FIG. 15A, FIG. 15B and FIG. 15C are side and top views of other exemplary flap assemblies in accordance with various aspects of the present invention.

DETAILED DESCRIPTION OF CERTAIN EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Generally, the present invention relates to a surf wake system for a watercraft that is concerned with flow management of water passing the stern as the water craft is moving forward through a body of water, so that water is directed in such a manner to enhance size, shape and/or other characteristics the resulting wake of the watercraft. As will become apparent below, the surf wake system of the watercraft allows diversion of water passing along one side of the stern away from the usual converging area immediately behind the transom of the watercraft, so that the diverging water will enhance the resulting wake on the opposing side of the watercraft. In doing so, the surf wake system of the present invention allows the enhancement of wake without significant pitching or leaning of the watercraft to one side or the other.

Figure 1:
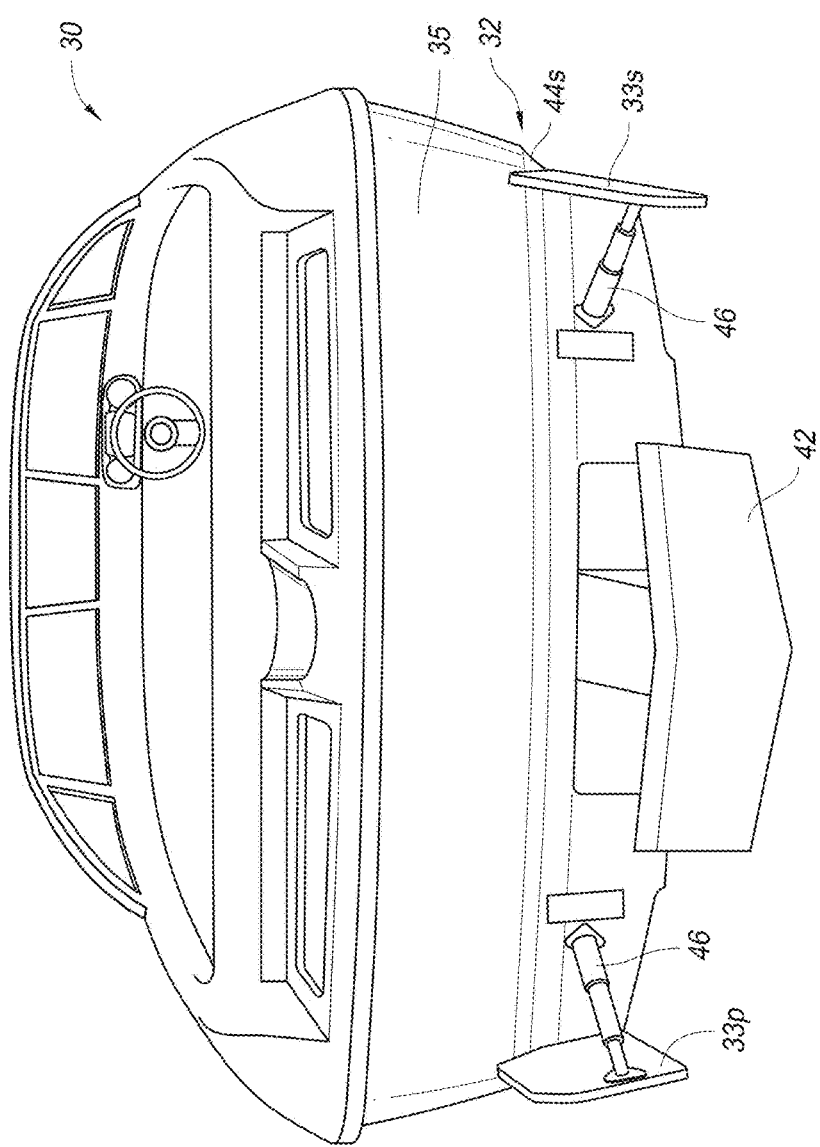
FIG. 1 is a rear perspective view of an exemplary surf wake system including a pair of flap assemblies in accordance with various aspects of the present invention.

Turning now to the drawings, wherein like components are designated by like reference numerals throughout the various figures, attention is directed to FIG. 1 which illustrates a watercraft 30 equipped a surf wake system 32 for modifying a wake formed by the watercraft travelling through water. Advantageously, the surf wake system may enhance surf wakes with or without supplemental ballast and thus it is possible to enhance wake with less watercraft lean. The surf wake system of the present invention in general includes one or more water diverters 33, each water diverter is adjustably mounted relative to the watercraft for deflecting water travelling past a transom 35 of the watercraft. Broadly, the water diverters are movably mounted with respect to transom 35.

In the illustrated embodiment, the water diverters are in the form of flaps 33, pivotally mounted on respective hinges 37, which have a pivot axis 39 extending adjacent and along a side edge 40 of the transom. Although the illustrated embodiment shows the flaps mounted directly on the transom, one will appreciate that the flaps may be moveably mounted directly or indirectly to the transom. For example, the flaps and associated hardware may be mounted on a removable swim platform or other structure that is mounted on or adjacent the transom.

As also shown in FIG. 1, watercraft 30 may be equipped with a wake-modifying device 42 to enhance the overall size of the wake formed by the watercraft. One such device is sold by Malibu Boats as the Power Wedge, which is similar to that described in U.S. Pat. No. 7,140,318, the entire content of which is incorporated herein for all purposes by this reference. Another such device may incorporate pivotal centerline fins of the type developed by Malibu Boats and described in U.S. Patent Application No. 61/535,438, the entire content of which is also incorporated herein for all purposes by this reference. One will appreciate that, while various other wake modifying devices may be very beneficial in enhancing the size and shape of a wake, such other wake modifying devices need not be used, nor is essential to be used, in combination with the surf wake system of the present invention. Similarly, one will appreciate that positioning extra weight or ballast adjacent the transom may also be very beneficial in enhancing the size of a wake, with or without the use of a wake modifying device, however, such weight or ballast need not be used, nor is essential to be used, in combination with the surf wake system of the present invention.

Figure 3:
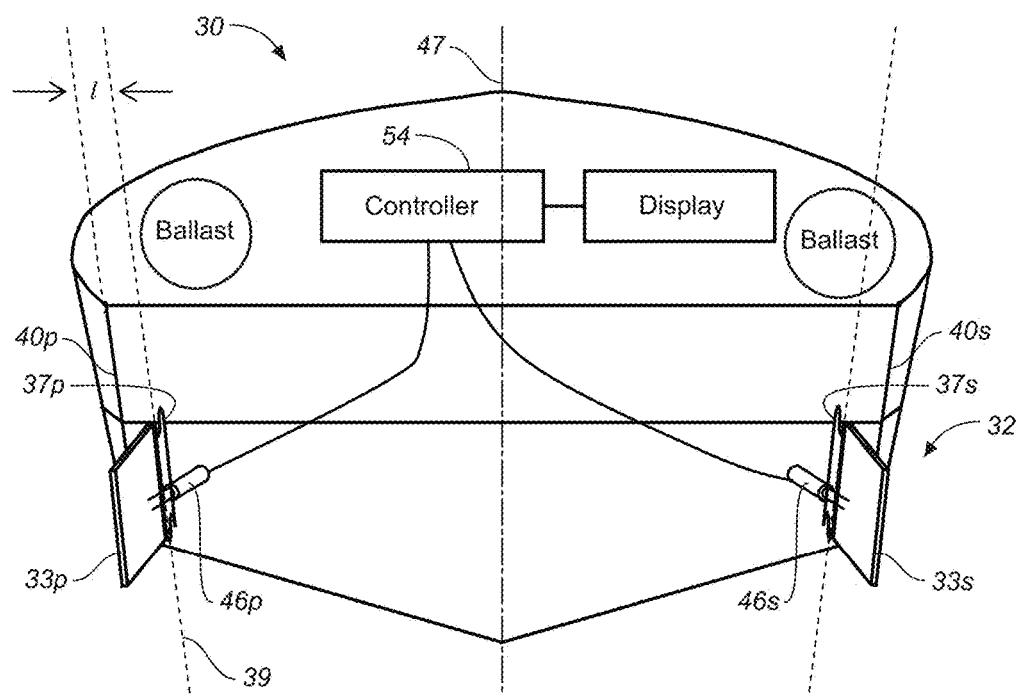
FIG. 3 is a schematic rear view of the exemplary surf wake system of FIG. 1.

Turning now to FIG. 3, a side edge is the intersection of the transom with either a port side strake 44p or a starboard side strake 44s, wherein the suffixes "p" and "s" represent features on the port side and the starboard side, respectively. Therefore, the intersection of the transom with the port side strake is referred to as the port side edge 40p and the intersection of the transom with the starboard side strake is referred to as the starboard side edge 40s. Accordingly, a port side flap 33p refers to a flap adjacent the port side edge, and a starboard side flap 33s refers to a flap adjacent the starboard side edge.

In general, a distance L between a respective pivot axis and the side edge is less than the longest dimension of the flap in order to allow the flap to extend parallel to the side strake of the hull or beyond. The distance is preferably less than 10-5 inches and more preferably less than 5 inches. That is, the flaps are positioned away from an imaginary center line or longitudinal axis of the watercraft and adjacent a respective port side or starboard side.

For illustration purposes, the pivot axis of the hinge shown in this application is drawn parallel to the corresponding side edge. One will appreciate that the pivot axis does not necessary need to be parallel to the corresponding side edge. One will also appreciate that the pivot axis may be substantially vertical, substantially parallel to the side edge, some other angle therebetween, or some angle slightly inclined with respect to the side edge. Preferably the angle between the pivot axis and the side edge is less than approximately 15°, more preferably less than 10°, and even more preferably less than 5°.

Figure 2:
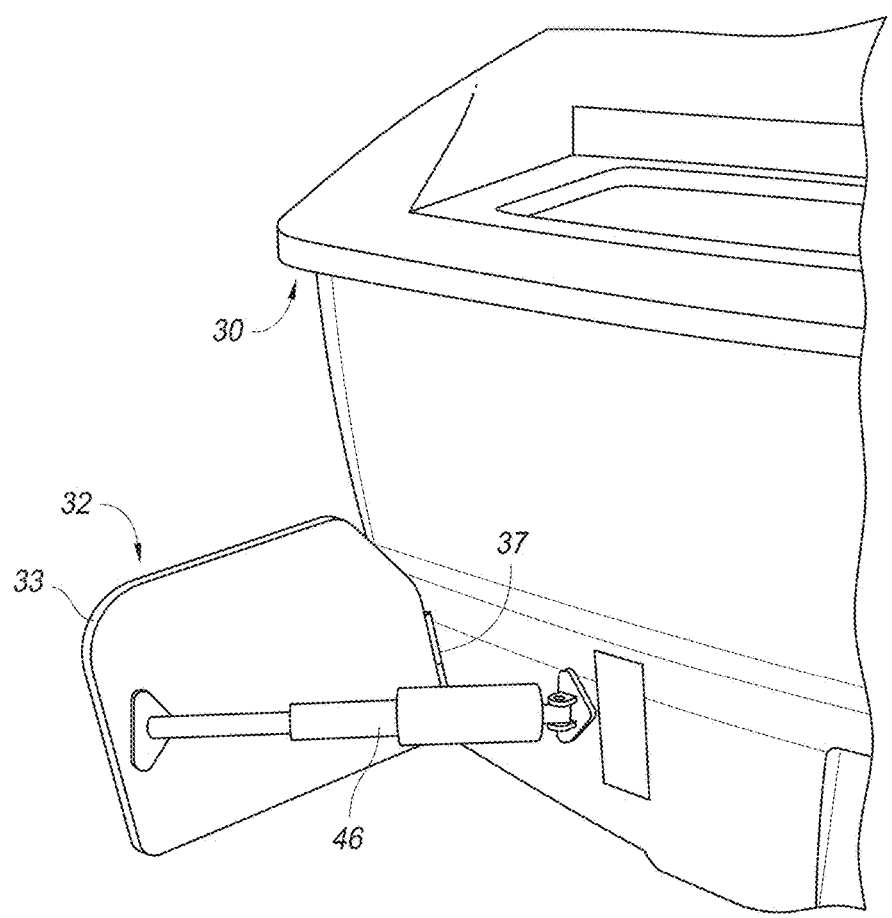
FIG. 2 is an enlarged perspective view of one of the flap assemblies of FIG. 1.

With reference to FIG. 1 and FIG. 2, the surf wake system also includes one or more positioners or actuators 46, each secured on the watercraft and operably connected to a respective flap 33. In the illustrated embodiment, the actuators are linear actuators including electric motors. However, one will appreciate that other suitable actuators may be employed to move the flaps, including hydraulic and pneumatic motors. Preferably the actuators are watertight or water resistant, and more preferably waterproof. The actuators are configured to pivot the flaps about their respective pivot axis and position the flaps in different positions, as will be discussed in greater detail below. One will also appreciate that manual actuators or positioners may be utilized to secure the flaps in a desired position.

In various embodiments, the actuators may be electric actuators of the type manufactured by Lenco Marine Inc. which include a linearly-extendable threaded rod assembly driven by a step motor. In various embodiments, the actuator may be configured to move between an inner retracted position and an outer extended position, while in other embodiments, the actuators are configured to also move to one or more interim positions, for example, every 5°, 10°, 15°, etc. By activating the actuator for predetermined periods of time, the actuator may be accurately and repeatedly controlled to move to the desired position. One will appreciate that the actuator may be configured to accommodate a wide variety of angular ranges as well as interim positions.

One will also appreciate that other actuators may be utilized in accordance with the present invention. For example. hydraulic and pneumatic actuators may be used, as well as manual actuators.

Figure 4A:
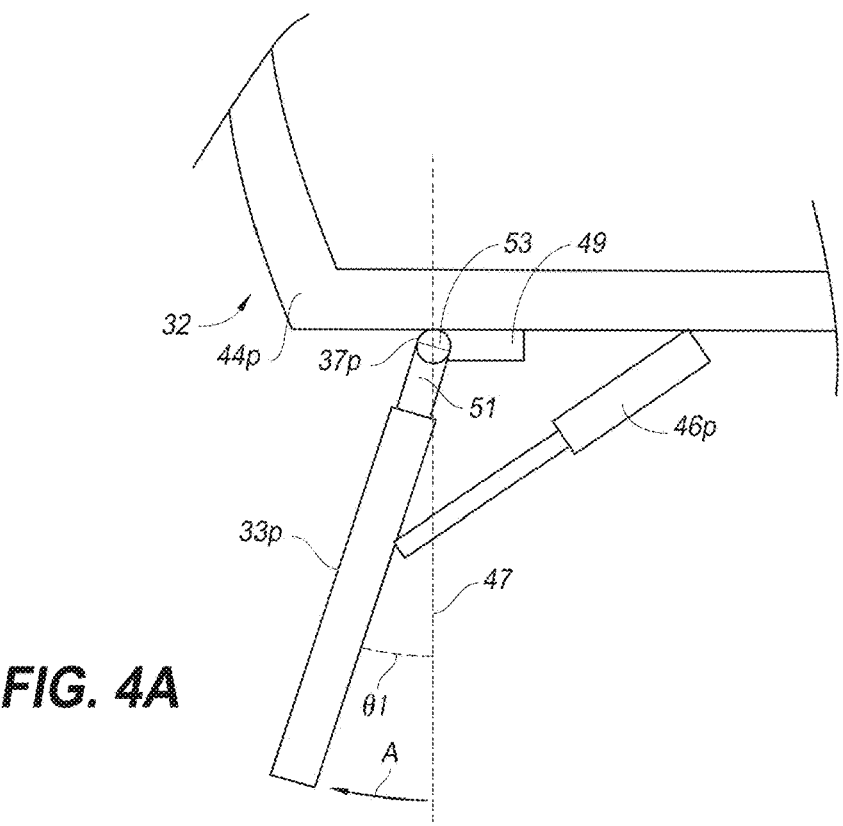
FIG. 4A and FIG. 4B are schematic views of the flap assembly of FIG. 2 in extended and retracted positions, respectively.
Figure 4B:
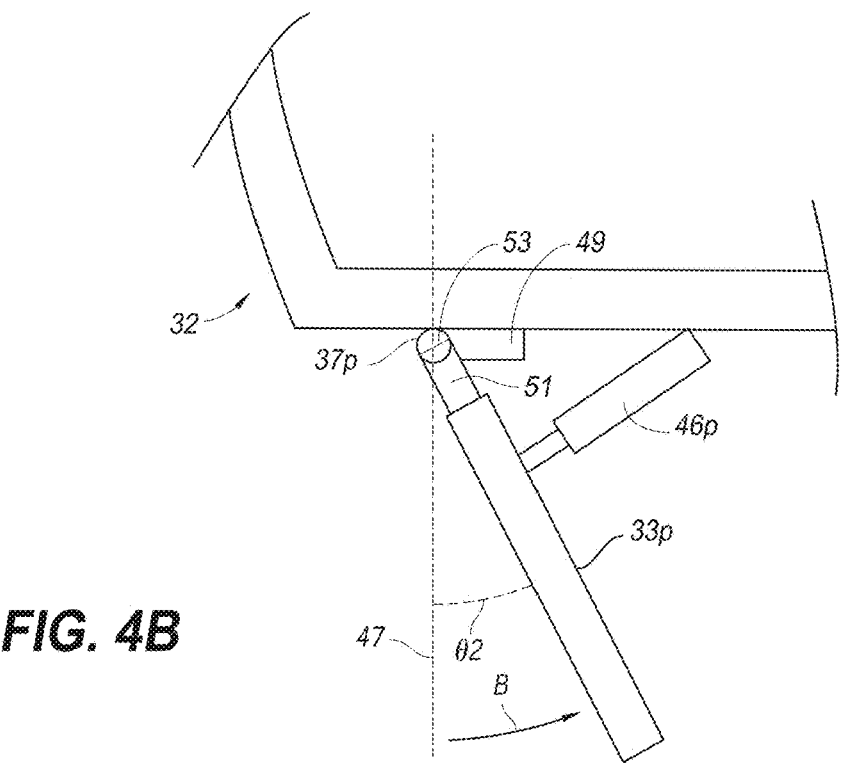

Turning now to FIG. 4A and FIG. 4B, port side flap 33p is shown in two different positions, namely an outward position in FIG. 4A and a neutral position in FIG. 4B. As illustrated, the flap in the outward position extends away from a longitudinal axis 47 of watercraft 30 as the flap moves in the direction illustrated by arrow A. In the illustrated embodiment, the flap and has at least a portion of the flap extending outwardly beyond the side strake and the transom. In the neutral position, the flap extends toward the center line as it moves in the direction illustrated by arrow B and is located behind the transom and inboard of the side strake 44p. In various embodiments of the present invention, the flap has an angle θ1 of approximately 0° to 45°, preferably between 5° to 30°, and more preferably 5° to 15° relative to the longitudinal axis of the watercraft when the flap extends to its outermost position, and has an angle θ2 of approximately 0 to −90°, preferably −15° to −30° relative to the longitudinal axis when the flap extends in its innermost position. One will also appreciate that system may be configured to allow the flap to laterally extend beyond the side strake substantially perpendicular to the longitudinal axis of the watercraft in order to redirect and/or deflect water passing along the water craft as it moves beyond the transom. Alternatively, one will appreciate that the flap may extend parallel to the longitudinal axis to direct water straight back and prevent water from flowing directly behind the transom. While extending the flap beyond the side strake will likely delay convergence of water to a greater degree (as will become apparent below), extending the flap parallel to the longitudinal axis may sufficiently delay convergence of water to produce a desired waveform.

One will appreciate that the surf wake system of the present invention may be configured to hold the flaps in one or more interim positions between their respective outward and neutral positions. For example, the surf wake system may be configured to hold the flaps at 0°, 5°, 10°, 15°, 20°, 25°, 30° and etc. relative to the centerline. Such interim positions may allow the system to further modify or incrementally modify the resulting wake, and may thus accommodate surfer preferences. For example, such interim positions may more precisely shape the wake to accommodate for specific watercraft setup, watercraft speed, watercraft weight, passenger weight variances and distributions, and other variables to provide a desired wake shape and waveform. Moreover, a number of interim positions may optimize waveform for various other parameters such user preferences. For example, experienced surfers may prefer larger faster wakes, while novice surfers may want a smaller, slower manageable wake.

As a watercraft travels through water, the watercraft displaces water and generates waves including bow waves and diverging stern waves. Due to pressure differences and other phenomena, these waves generally converge in the hollow formed behind the watercraft and interfere with each other to form an otherwise conventional wake behind the watercraft, such as that shown in FIG. 6A. As noted above, such a wake is generally small, choppy or too close to the watercraft to be suitable and safe for water sports, and particularly not suitable for wake surfing.

By moving a flap of the present invention to an outward position, however, water is redirected, which may lead to constructive interference to form a larger wake having a higher peak and a smoother face, which wake is conducive for surfing. In addition, the flap may redirect water so that the larger wake is formed further away from the watercraft, and thus creating a safer environment for surfing. Moreover, by placing the flaps along the side edges, the watercraft can generate a suitable surfing wake with less tilt or lean to one side, thus making the watercraft easier to control. One will appreciate that the flaps may enhance wake shape and size with or without the use of significant additional weight or ballast located toward the rear corners of the watercraft. Other advantages will become apparent later on in the description of the operation of the present invention.

In various embodiments of the present invention, the wake system may include one or more flap assemblies, for example, one or more port flap assemblies, and/or one or more starboard flap assemblies may be used. Preferably, the wake system is configured and positioned to have one flap and corresponding hinge immediately adjacent each of the port side edge and the starboard side edge.

In various embodiments of the present invention, the flap is a substantially planar member, as can be seen in FIG. 2. The flap is generally dimensioned and configured such that the top of the flap is located within the resting freeboard distance (i.e., the distance between the waterline and the gunwale) and will be located approximately at the waterline while the watercraft is at use accommodating for both watercraft speed and displacement with additional ballast and/or passenger weight.

In the illustrated embodiment, the flap is approximately 14 inches high, approximately 17 inches long and approximately ¾ inch thick. One will appreciate that the actual dimensions of the flap may vary. Preferably, the flap is approximately 10-18 inches high, approximately 12-22 inches long, and approximately ½ to 1¼ inches thick, and more preferably approximately 12-16 inches high, 15-19 inches long, and ¾ to 1 inch thick. One will appreciate that the deeper the flap extends below the waterline, the more water will be diverted.

In addition, one will appreciate that the flap need not be planar and its actual dimensions will vary depending on the size of the watercraft, the demand of the type of the wake and/or other factors. Other suitable configurations and sizes can be employed, including curved surfaces, curved edges, different geometric profiles, and/or different surface textures. The flap can be made of plastic, stainless steel, fiberglass, composites, and/or other suitable materials. For example, the flap may be formed of gelcoated fiberglass and/or stainless trim plate.

As shown in FIGS. 4A-4B, in the illustrated embodiment, hinge 37, is a jointed device having a first hinge member 49 pivotally affixed to a second hinge member 51 by a pin 53. First member 49 is affixed to the watercraft and second member 51 is affixed to flap 33. One will appreciate that other hinge devices may be utilized. For example, the hinge may include a flexible member allowing relative pivotal motion instead of a pinned joint. In addition, various configurations may be utilized. For example, the second member may be monolithically formed with the flap.

Turning back to FIG. 3, wake system 32 may include a controller 54 that is operationally connected to actuators 46, of the wake system, which actuators selectively control the positions of respective flaps 33.

An exemplary method of operating the surf wake system in exemplary embodiments of the present invention will be explained with reference to FIGS. 5-8. A pair of flaps 33p, 33s with their respective hinges 37p, 37s and actuators 46p, 46s are installed on transom 35 of the watercraft adjacent respective side edges 40, one on the port side and the other on the starboard side of the watercraft. One will appreciate that the present invention is not limited to this specific configuration. The number of the flaps and the positions thereof can be varied as noted previously.

Figure 5A:
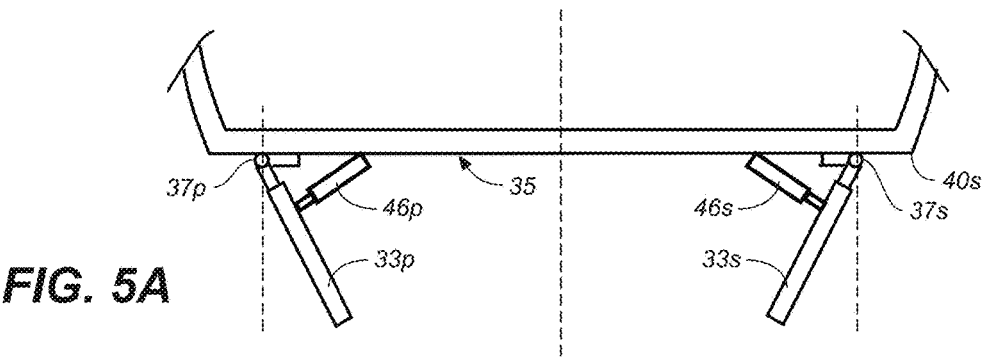
FIG. 5A, FIG. 5B and FIG. 5C are schematic views of the exemplary surf wake system of FIG. 1 in which the flap assemblies are positioned for cruising, a starboard side surf wake, and a port side surf wake, respectively.
Figure 6A:
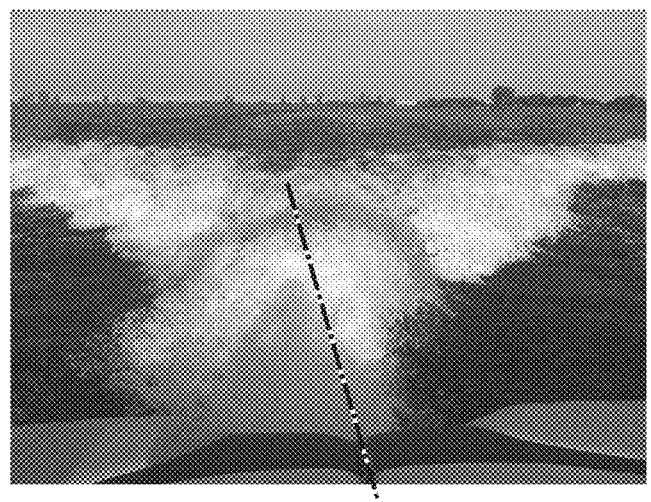
FIG. 6A, FIG. 6B and FIG. 6C illustrate conventional, starboard surf, and port surf wakes, respectively, as produced by the surf wake system of FIG. 1.

As shown in FIG. 5A, both flaps are retracted and positioned in their neutral positions behind transom 35, and not extending outward or outboard form their respective port and starboard side strakes 44p, 44s. At such positions, the flaps in general do not interference with the waves generated by the watercraft travelling through water, and hence have no or negligible effects on the wake, and thus the flaps can be positioned in such configuration for cruising. As shown in FIG. 6A, having the flaps positioned in the manner illustrated in FIG. 5A does not redirect water passing by the transom that thus produces an otherwise conventional wake, that is, one without a smooth face or a high peak, and is thus not suitable for surfing.

Figure 5B:
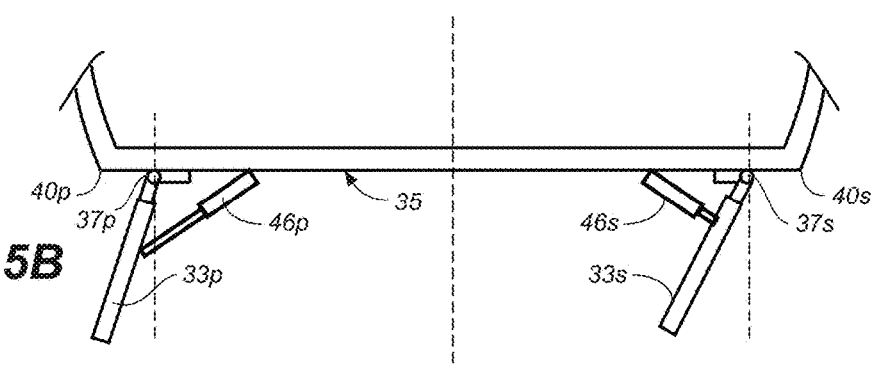
Figure 6B:
Figure 6C:
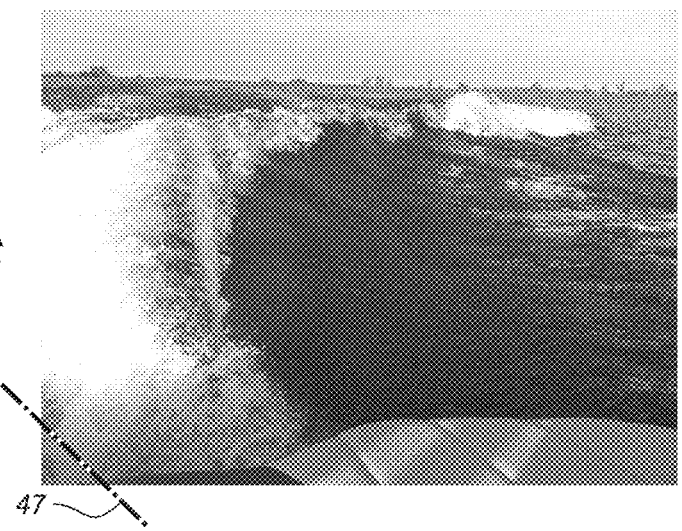
Figure 6D:
FIG. 6D shows a wake having a starboard-side surf wake and a disorganized port-side wake.

Turning to FIG. 5B, when a starboard surf wake is desired, port side flap 33p is positioned in an outward position while the starboard side flap 33s remains in a neutral position. Since the port side flap is in an outward position and thus extends beyond the port side strake 44p, waves on the port side are redirected, which facilitates constructive interference of converging waves to form a larger starboard wake with a higher peak and smoother face that is suitable for starboard surfing, such as that shown in FIG. 6B. Comparing to the non-enhanced wake of FIG. 6A with the starboard wake shown in FIG. 6B, it is evident that surf wake system 32 modified and/or enhanced the wake with a smooth face and a relatively high peak. As can be seen in FIG. 6B, waist-high peaks of three or four feet are attainable, thus providing a reproducible wake that is suitable for surfing. FIG. 6D shows a wake having a starboard-side surf wake that is suitable for wake surfing and a disorganized port-side wake that is not suitable for wake surfing. In some embodiments, when the port side flap 33p is deployed (e.g., in an outward position) and when the starboard side flap 33s is in the neutral position, the wake of the water craft can have a starboard-side surf wake and a disorganized port-side wake (as shown in FIG. 6D).

Figure 5C:
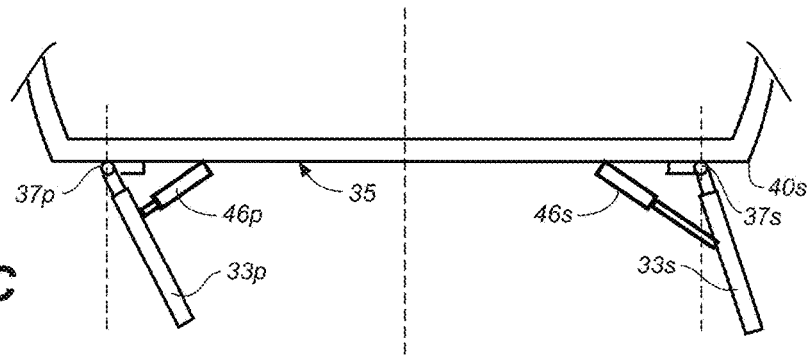
Figure 6E:
FIG. 6E shows a wake having a port-side surf wake and a disorganized starboard-side wake.

Turning to FIG. 5C, when a port side surf wake is desired, starboard side flap 33s is positioned in an outward position while the port side flap 33p remains in a neutral position. Now that the starboard side flap is an outward position, the surf wake system, a port side wake, such as that shown in FIG. 6C is produced in a manner similar to that described above. Such configuration produces a left side surf wake. Comparing to the non-enhanced wake of FIG. 6A with the port side wake shown in FIG. 6C, it is evident that surf wake system 32 modified and/or enhanced the port side wake with a smooth face and a relatively high peak. As can be seen in FIG. 6C, waist-high peaks of three or four feet are attainable, thus providing a reproducible wake that is suitable for surfing. FIG. 6E shows a wake having a port-side surf wake that is suitable for wake surfing and a disorganized starboard-side wake that is not suitable for wake surfing. In some embodiments, when the starboard side flap 33s is deployed (e.g., in an outward position) and when the port side flap 33p is in the neutral position, the wake of the water craft can have a port-side surf wake and a disorganized starboard-side wake (as shown in FIG. 6E).

As noted before, the watercraft equipped with the surf wake system of the present invention can generate a suitable surfing wake with or without adding significant extra weight at a rear corner of the watercraft. As such, weight need not be moved from one side to another, and thus no significant shifting of the watercraft from one side to the other is not required, and thus there are no significant changes to the handling of the watercraft. The surf wake system of the present invention allows switching from a port side wake to a starboard wake, or vice versa, on demand or "on the fly" thus accommodating both regular (or natural) and goofy surfers, as well as surfers that are sufficiently competent to switch from a port side wake to a starboard wake while under way. To this end, the controller is preferably configured to allow operation of the actuators on-demand and on-the-fly.

In addition to modifying wakes for recreational purposes, the water diverters of the surf wake system may be activated for other purposes such as steering assist. For example, the port flap may be actuated to provide turning assist to the left at gear idle, and similarly the starboard flap actuated to provide turning assist to the right. Thus, with an appropriate flap extended, the watercraft may turn within a very small radius around a fallen skier, boarder or surfer. Also, it is sometimes difficult for inboard watercraft to turn to left while moving backwards, the flaps may be activated to assist in such maneuvering. One will appreciate that the control system may be configured to utilize input from the steering system and/or the drive system to determine an appropriate level of "turning assist". For example, the control system may be configured such that turning assist would only work below a predetermined speed, for example 7 mph. One will also appreciate that such turning assist may utilize controls that that are integrated into the surf wake system, or alternatively, such turning assist may utilize discrete controls to that are separately activated in accordance with the needs of turning assistance.

Figure 7:
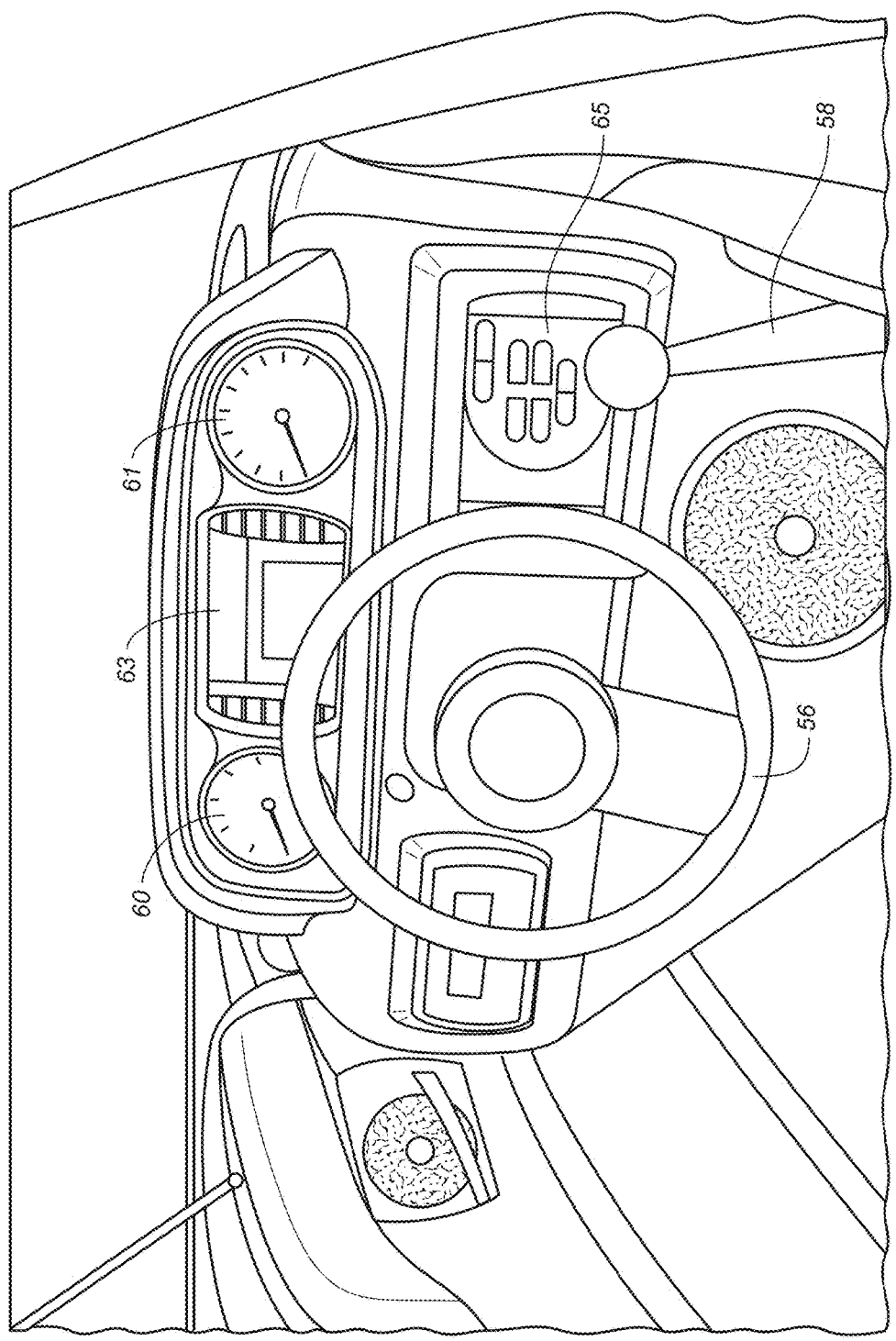
FIG. 7 is a perspective view of an exemplary cockpit of a watercraft incorporating a surf wake system including an input controller for operation of the surf wake system.

Turning now to FIG. 7, watercraft 30 includes a steering wheel 56 and throttle control 58 and instrument panel bearing a tachometer 60 and speedometer 61. In addition, the water craft includes a multipurpose graphical display 63 and/or a discrete input device 65. The graphic display and the touch screen are operably connected to or integrated with controller 54. In the illustrated embodiment, the input device is a discrete touch screen, however, one will appreciate that the graphic display and the input device may be integrated into a single device, for example, a single screen that is suitable for both displaying information and receiving touch screen inputs. Alternatively, a variety of switches, buttons and other input devices may be utilized instead of, or in addition to, a touch screen device.

Display 63 is configured to convey a variety of desired information such as speed of the watercraft, water depth, and/or other useful information concerning the watercraft and operation thereof including, but not limited to, various service alerts, such as low oil pressure, low battery voltage, etc., and/or operational alerts such as shallow water, bilge pump status, etc.

Input device 65 is primarily configured to receive a variety of input commands from the watercraft operator. In accordance with the present invention, and with reference to FIG. 8A, the input display includes a SURF GATE center which serves as input control for operation of surf wake system 32. As shown, the input control may include buttons 67 to activate surf wake system 32 to generate a surfable wake on the left portside or on the right starboard side. For example, if the operator chooses to generate a portside surfable wake, the operator may select left button 67, which in turn would cause controller 54 to extend flap 33s to generate a left port side wake in the manner described above. And the operator may similarly press right button 67 to generate a right starboard side surfable wake. In accordance with the present invention, an operator may reconfigure the watercraft to switch from a left surf wake mode to a right surf wake mode by pressing a single button.

One will appreciate that other suitable input means may be utilized to activate the flaps. For example, a graphic or virtual slide assembly may be provided to activate the flaps as to the desired degree left or right, or a plurality of graphic or virtual buttons may be provided to activate the flaps to the desired degree left or right. In addition, one will appreciate that mechanical and/or electromechanical switches and input devices may also be used to activate the flaps as desired. For example, in some embodiments, one or more levers, knobs, switches, or other mechanical input devices can be used to receive input from a user. The mechanical input devices can be mechanically coupled to the flaps (e.g., water diverters), e.g., via a cable, rod, or other mechanical coupling element, such that actuation of the mechanical input element actuates the flaps (e.g., water diverters).

With reference to FIG. 8A through FIG. 8F, input device 65 serves as an input device for other watercraft systems such as Malibu Boats' POWER WEDGE system, ballast tank systems (see, e.g., FIG. 8C), lighting systems (see, e.g., FIG. 8D), etc.

Figure 8A:
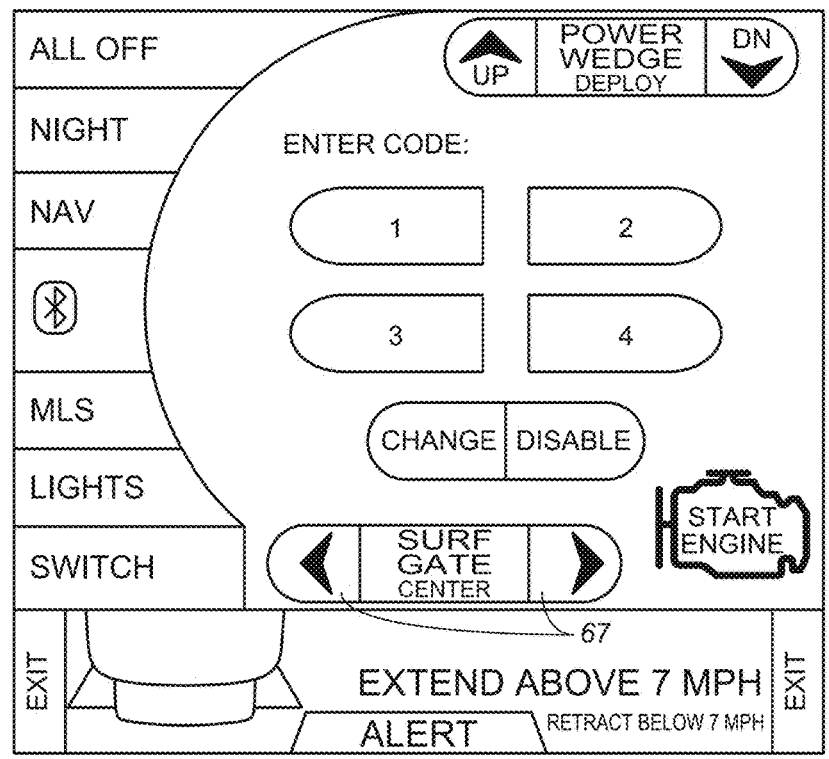
FIG. 8A, FIG. 8B, FIG. 8C, FIG. 8D, FIG. 8E and FIG. 8F are exemplary screen shots of the input controller of FIG. 7.
Figure 8B:
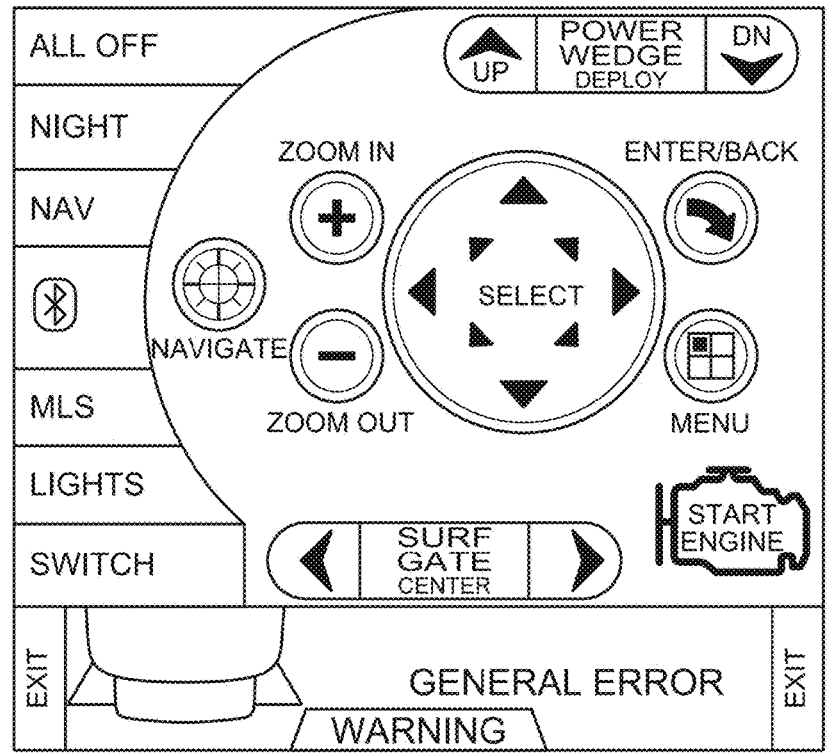
Figure 8C:
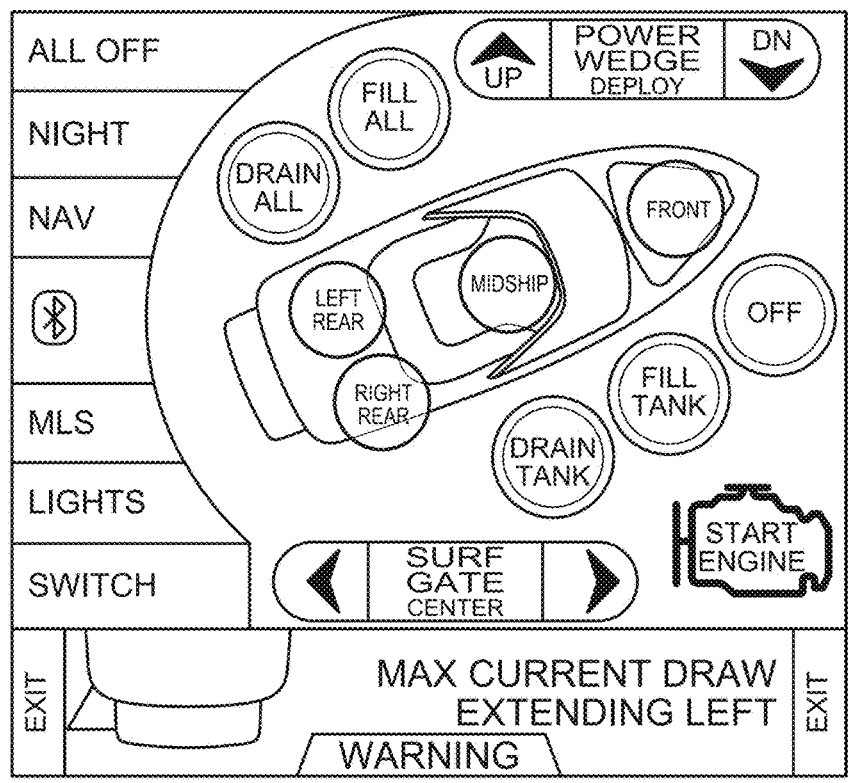
Figure 8D:
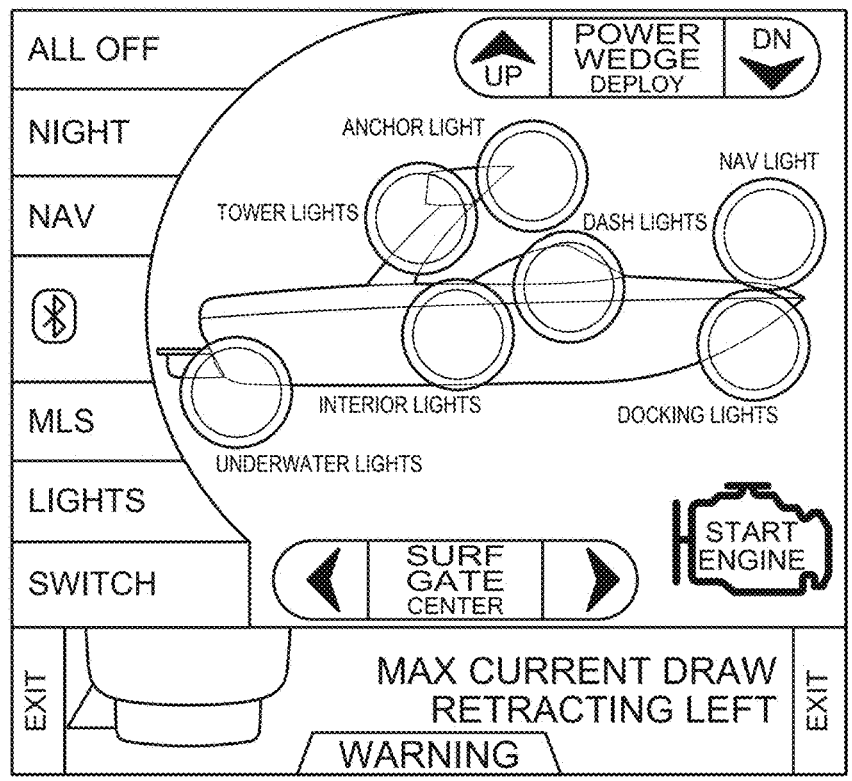
Figure 8E:
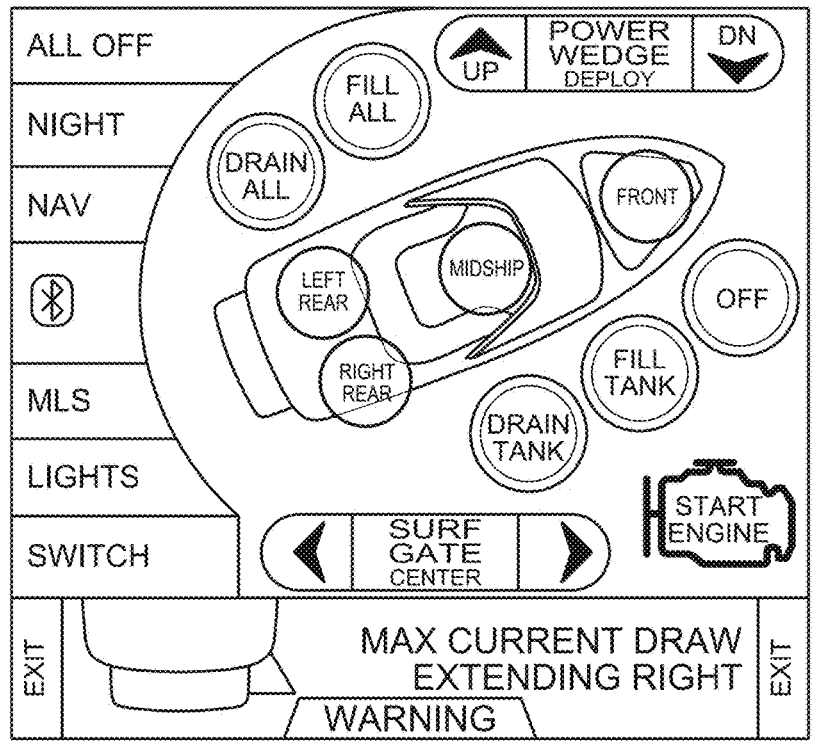
Figure 8F:
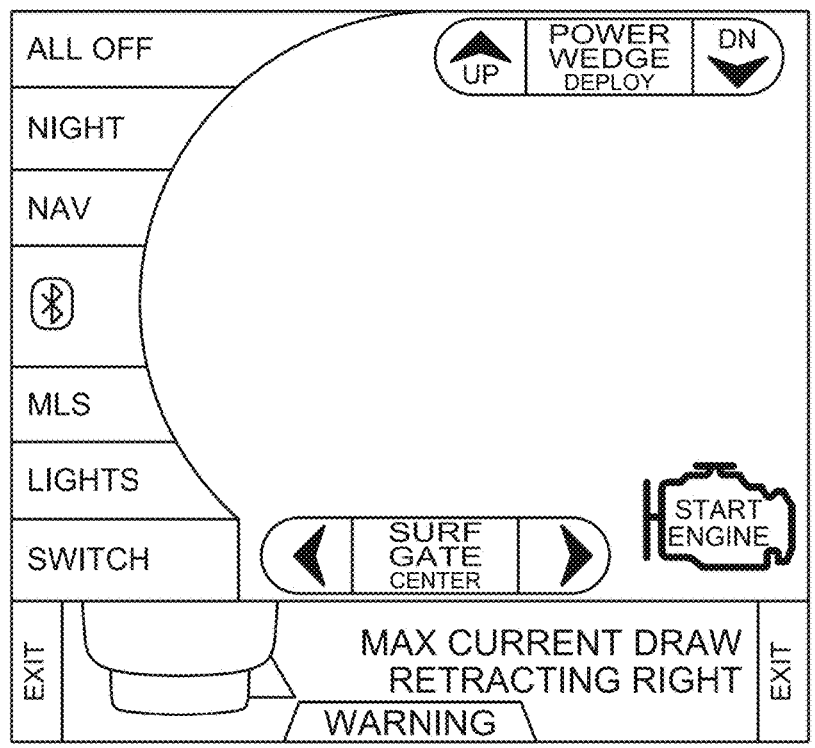

Also, input device 65 may also provide various alerts regarding the operation of the surf wake system. For example, FIG. 8A illustrates an operational alert that the once activated, surf wake system will extend above 7 mph and retract under 7 mph. One will appreciate that the surf wake system may be configured to operate only within various speeds deemed suitable for surfing, and may vary from moving to about 20 mph, and in some cases from about 7 mph to about 13 mph. FIG. 8B illustrates a general error alert, FIG. 8C through FIG. 8F illustrate a maximum current warnings for various stages of flap operation to alert the operator of excessive resistance in moving the flaps form one position to another.

In various embodiments, the surf wake system can be configured with various safety features which limit operation and/or alert the driver to various situations. For example, the system may be configured to provide a visual and/or audible alarm to alert the operator when the watercraft is traveling faster than a predetermined speed, for example 15 mph.

Figure 9:
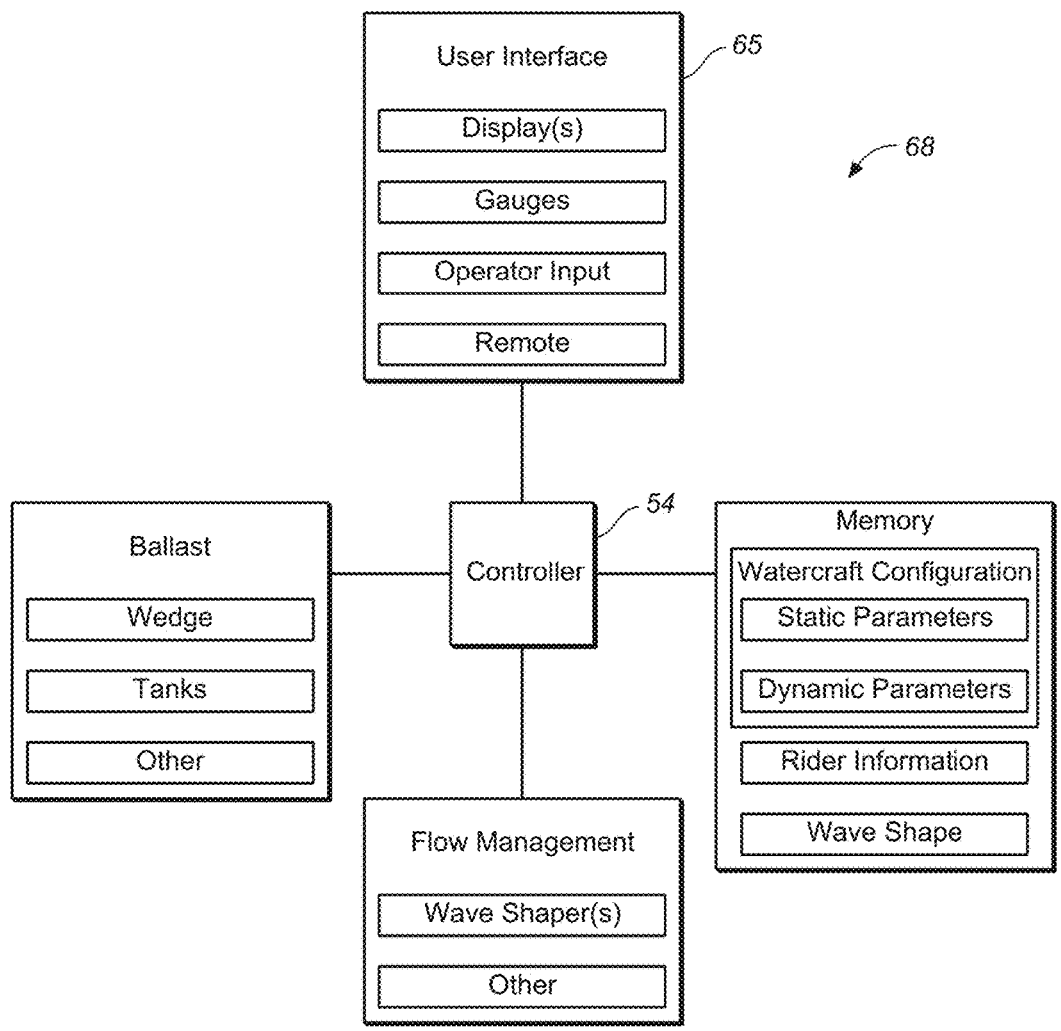
FIG. 9 is a schematic view of an exemplary control system of a surf wake system in accordance with the present invention.

FIG. 9 is a schematic of an exemplary control system 68 in which the user interface, in the illustrated embodiment, input device 65 communicates with controller 54 in order to control flow management by operating associated wave shaper(s), (e.g., flaps 33 and actuators 46). As illustrated and as noted above, input device 65 may also be configured to control other watercraft systems including Malibu Boats' POWER WEDGE system, ballast tank systems.

Control system 32 may also include a memory that is configured to store information regarding watercraft configuration including static parameters such as hull shape, hull length, weight, etc., as well as dynamic parameters passenger weight, ballast, wedge, speed, fuel, depth, wind, etc. The memory may also include "Rider" information regarding the surfer (or boarder or skier), including goofy/regular footed, weight, board length, board type, skill level, etc. Moreover, the memory may be configured to store "presets" that include the information regarding a specific "Rider" including the Rider information as well as the Rider's preferences such as left or right wave, a preferred watercraft speed, a preferred wake height, etc. One will appreciate that the presets could be for the surf wake system as well as other parameters including POWER WEDGE setting, watercraft speed, goofy/regular footed, steep wave face, amount of weight, wave size, etc. One will appreciate that such presets would allow the watercraft operator to quickly reconfigure the surf wake system to accommodate various "Riders", for example very experienced professional wake surfers, beginner wake surfers, and anyone in between.

Control system 32 may also include a remote which may allow a rider to actuate the surf wake system. For example, a remote may allow a rider to further deploy or retract flap 33, to an interim position to vary the size of the wake.

One will appreciate that control system 32 may be integrated into the watercraft, for example, fully integrated with a CAN bus of the watercraft. Alternatively, the control system may be an aftermarket solution which may be installed on a watercraft, either connecting into the CAN bus, or operating completely independently of the CAN bus.

Figure 10:
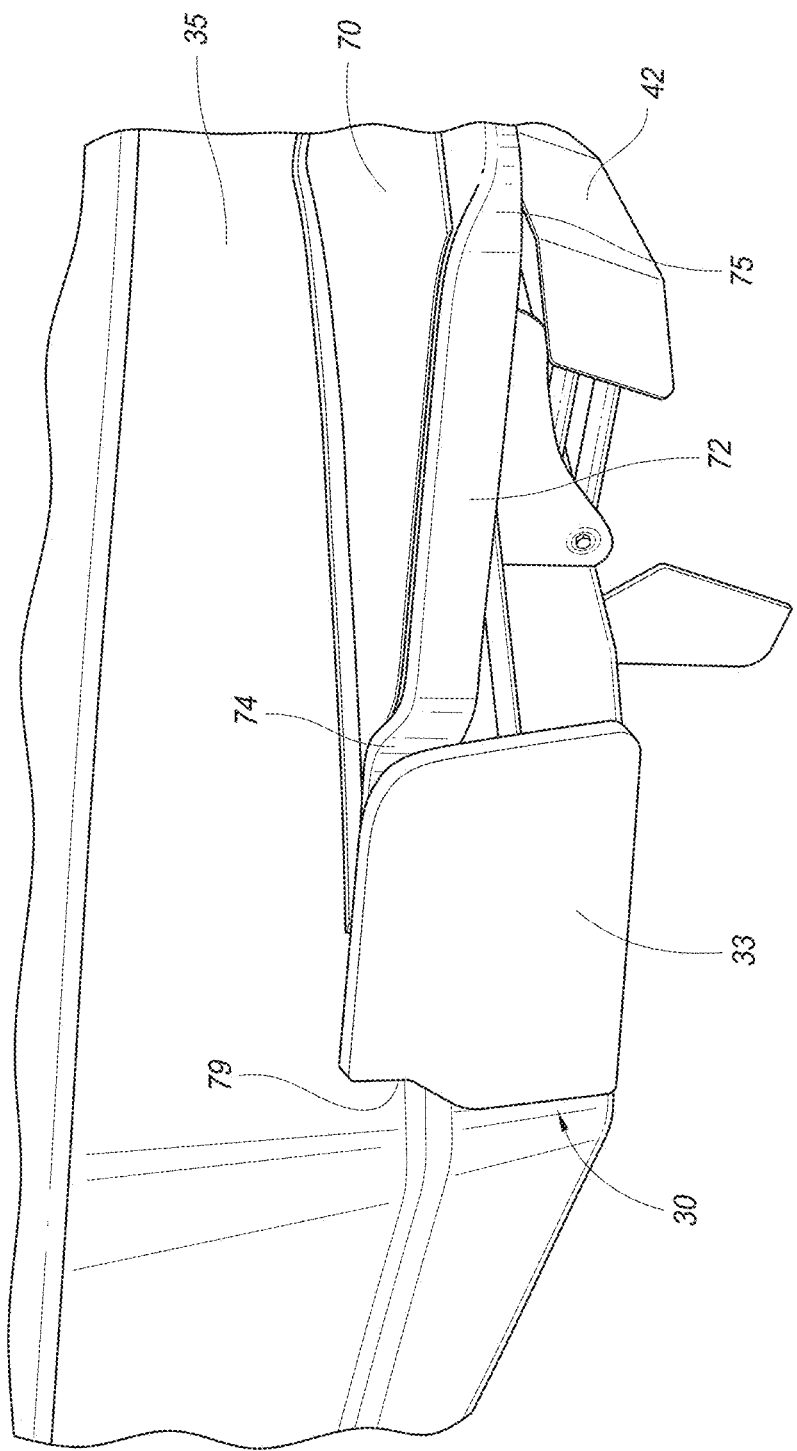
FIG. 10 is a rear perspective view of an exemplary surf wake system including contoured flap assemblies with a complementary swim platform in accordance with various aspects of the present invention.

Turning now to FIG. 10 and FIG. 11, surf wake system 32 may be utilized with a swim platform 70. In the illustrated embodiment, the swim platform includes tapered sides 72 having recessed notches 74 which provide space to receive flaps 33, therein. Such tapered sides and notches allow for flaps 33, to return to neutral positions which have little to no effect on the wake, while allowing for a larger surface area of the swim platform. In the illustrated embodiment, the tapered sides extend inwardly approximately 15-30° from the longitudinal axis, however, one will appreciate that actual angle that the tapered sides angle in may vary, for example, up to approximately 45°. Also, although the depth of the notch is approximately equal to the thickness of the corresponding flap, one will appreciate that the actual dimensions of the notch may vary.

As shown in FIG. 10, the swim platform has rounded corners 75 which are also configured to diminish the effect the swim platform has on the resulting wake. In this regard, the rounded corners lessen the amount of swim platform that contacts water flowing behind the transom, and thus lessens any adverse effect the swim platform may have on the modified wake.

Figure 12A:
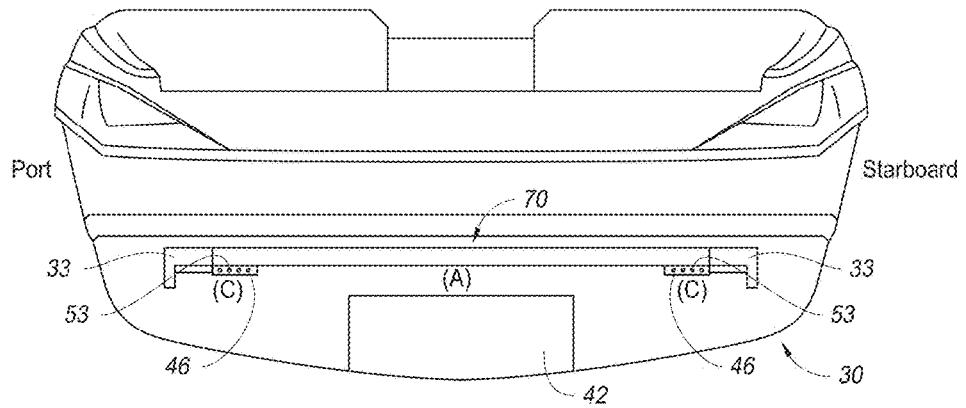
FIG. 12A and FIG. 12B are a rear and plan views of an exemplary surf wake system including a flap assembly integrated with a complementary swim platform in accordance with various aspects of the present invention.
Figure 12B:
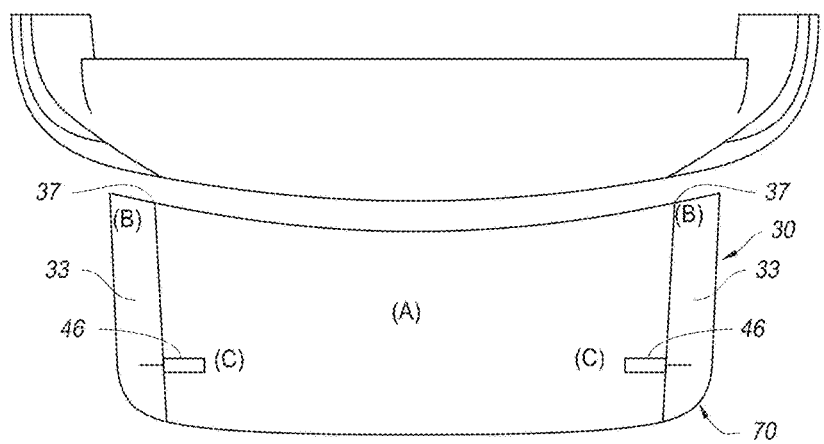

Turning now to FIG. 12A and FIG. 12B, surf wake system 32 is mostly integrated into a swim platform and can thus be readily installed on an existing watercraft in the form of an aftermarket kit. In various embodiments, swim platform 70 may be mounted to a watercraft in an otherwise conventional fashion, but unlike conventional swim platforms, swim platform 70 includes integrated flaps 33, hinges 37, and actuators 46, in which the integrated assembly may be mounted onto a watercraft in much the same manner as an otherwise conventional swim platform. In the illustrated embodiment, actuators 46 are manually adjustable in the form of a telescopic rod assembly which may be secured in various lengths, for example, by a link pin extending through one of a plurality of holes 53, or by other suitable means. Thus, in various embodiments, the surf wake system of the present invention may be a substantially mechanical system in which the angles of flaps 33 are manually set by the user.

In the illustrated embodiment, the actuators are mounted on the swim platform to selectively deploy the flaps, however, one will appreciate that the actuators may be mounted on the transom.

One will also appreciate that actuators 46 may be automated in a manner similar to that described above, for example, the actuators may be electric, electromechanical, pneumatic and/or hydraulic actuators as described above. In the case that the actuators are automated, the actuators may be integrated with the watercraft's existing control system (e.g., by connecting to the CAN bus of the watercraft), or a dedicated control system may be installed to control the actuators that is completely independent of the watercrafts other systems. For example, the control system may include toggle switches or other suitable devices to selectively move actuators 46 and flaps 33 as desired.

Figure 13A:
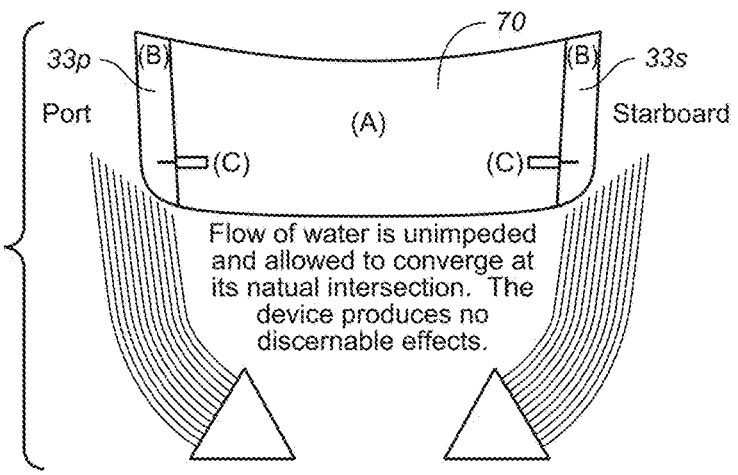
FIG. 13A, FIG. 13B FIG. 13C are schematic plan views illustrating the operation of the exemplary surf wake system in accordance with various aspects of the present invention.
Figure 13B:
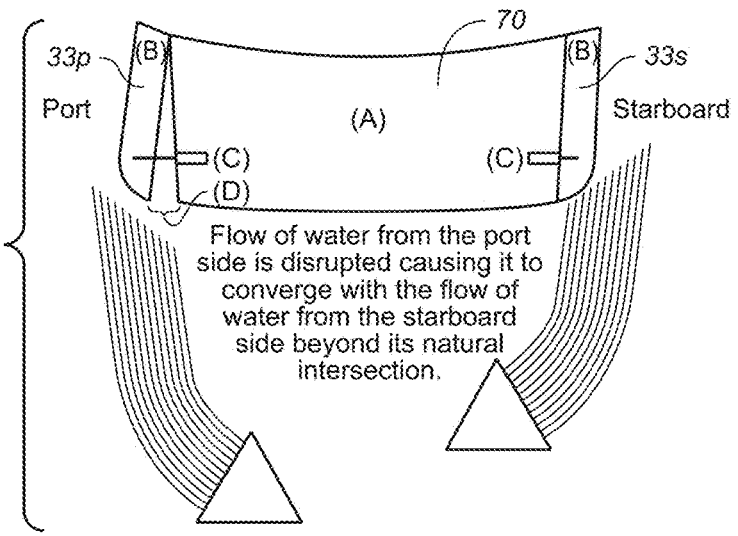

In operation and use, swim platform 70 functions in the same manner as that described above. The neutral position of surf wake system 32 is shown in FIG. 13A in which flaps 33 are in their neutral, retracted position. In this position, the flow of water past the transom is unimpeded by the flaps and the water is allowed to converge at it is natural intersection relatively close to the transom. When a surfable starboard side wake is desired, the operator may deploy the port side flap 33p as shown in FIG. 13B. In this position, the flow of water along the port side past the transom is disrupted such that the flow of water is redirected outwardly and/or rearwardly thereby delaying convergence of the port side flow with starboard side flow to a point further from the transom. Such disruption and redirection facilitates constructive interference of converging waves to form a larger starboard wake with a higher peak and smoother face that is suitable for starboard surfing, such as the waveform shown in FIG. 6B.

Figure 13C:
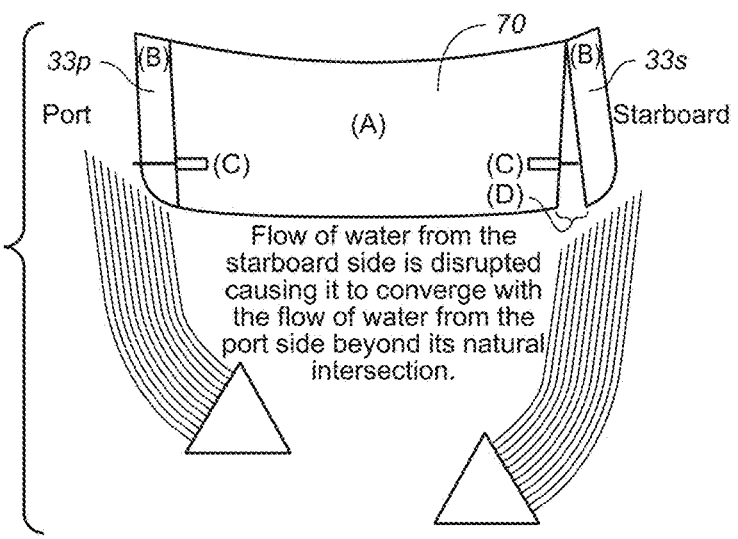

Similarly, when a surfable port side wake is desired, the operator may deploy the starboard side flap 33s as shown in FIG. 13C. In this position, the flow of water along the starboard side past the transom is disrupted such that the flow of water is redirected outwardly and/or rearwardly thereby delaying convergence of the starboard side flow with the port side flow to a point further from the transom, which facilitates constructive interference of converging waves to form a larger portside wake with a higher peak and smoother face that is suitable for starboard surfing, such as the waveform shown in FIG. 6C.

Figures 14A, 14B:
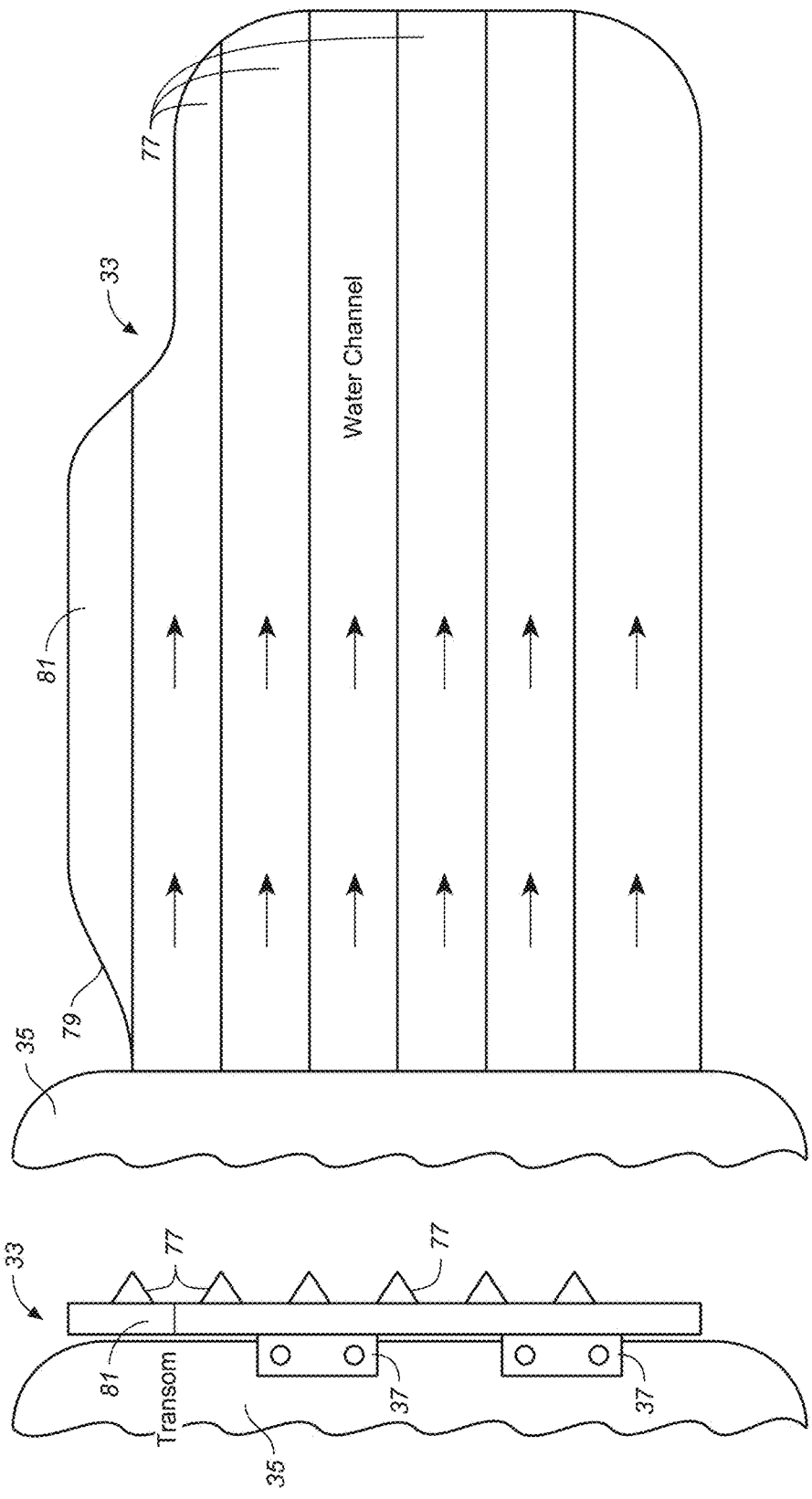
FIG. 14A and FIG. 14B are rear and side views of another exemplary flap assembly in accordance with various aspects of the present invention.

In various embodiments and as noted above, the size and shape of the flaps may vary depending upon varies factors. One such variation is illustrated in FIG. 14A and FIG. 14B, which shows a channeled flap 33, having a series of parallel horizontally extending channels 77. The channels are on the outboard side of the flap and extend linear to the direction of watercraft travel. The channels may assist in creating laminar flow across the gate, thus producing a cleaner waveform.

In the illustrated embodiment, the flap includes five channels, however, one will appreciate that one, two, three or more channels may be utilized to redirect the flow of water as desired. One will also appreciate that the channel need not be linear or horizontal. For example, the channels may extend at an incline upwardly away from transom 35 to direct the flow of water upwardly as it flows along the surface of flap 33, which may provide a net downward force on the flap and, in turn, the transom to further enhance displacement of the watercraft stern. Also, the channels may be curved in order to gently redirect water upwardly or downwardly. One will also appreciate that other patterns and/or textured surfaces may also be utilized to manage the direction of flow of water along the flap.

The peripheral shape of flap 33 is similar to that shown in FIG. 10, as well as that shown in FIG. 15A. Flap 33 includes a transom indentation 79 and a cross-spray protrusion 81. The transom indentation allows for the flap to be positioned immediately adjacent to the hull such that a minimal gap exists between the transom and the flap, and thus promoting a smooth flow of water along the hull and along the flap. One will appreciate that the actual size and shape of the transom indentation may vary to accommodate for a wide variety of hulls. The cross-spray protrusion 81 is provided to reduce the amount of water at the water line that is inadvertently kicked up in the form of cross-spray, thus reducing the amount of cross-spray formed by deployment of the flaps. In some embodiments, the spray reducing element 81 can be a portion of the flap 33 that extends above the water line when the flap 33 is deployed and that is positioned to block spray from the flap 33 (e.g., resulting from a gap or interface between the transom 35 and the flap 33). In some embodiments, the spray reducing element 81 can be an integral portion of the flap 33, which can be integrally formed with the water diverting portion of the flap 33.

In some embodiments, the spray reducing element 81 can be configured to cover or fill at least a portion of a gap between the transom 35 and the water diverter (e.g., flap 33), as shown, for example, in FIGS. 15B and 15C. The spray reducing element 81 can be coupled to an outside surface of the water diverter 33 (e.g., to a surface of the water diverter 33 that faces generally away from the longitudinal axis of the boat). The spray reducing element 81 can encourage water to flow from the side of the hull to the water diverter 33 without being deflected (e.g., towards the longitudinal axis).

Figure 15D:
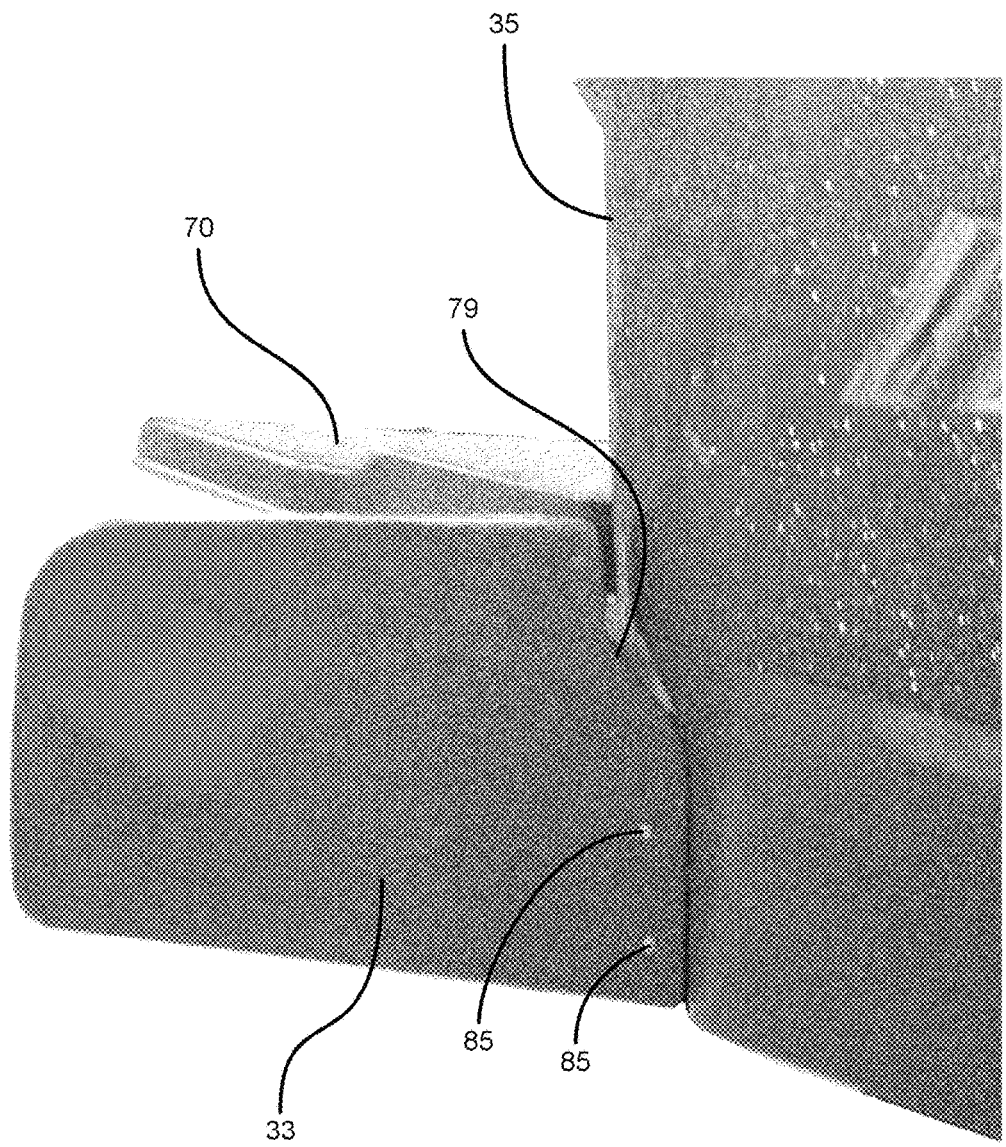
FIG. 15D shows an example embodiment of a water diverter that includes an indentation that corresponds to the shape of the transom.

FIG. 15D shows a water diverter 33 in a deployed position. In some embodiments, a gap can be located between at least a portion of the water diverter 33 and the hull of the boat (e.g., the transom 35) and the water diverter 33. For example, a gap can be located between the transom indentation 79 of the water diverter 33 and the transom 35 of the boat. The transom indentation 79 can correspond to a tapered shape of the transom 35 and the shape of the transom indentation 79 can allow the water diverter 79 to be angled towards the centerline of the boat when in the retracted or neutral position (see FIG. 4B). However, when the water diverter 33 moves to the extended or deployed position (see FIG. 4A), the transom indentation 79 can cause there to be a gap between the transom 35 and the water diverter 33. Water flowing from the boat hull to the water diverter 33 can be diverted by the gap. For example, the leading edges of the water diverter 33 can cause the water to spray inward towards the centerline of the boat. In some circumstances, the water can spray onto the wave that is formed on the side of the boat opposite the deployed water diverter 33, which can degrade the shape of the wave. The spray can also cause discomfort for passengers in the boat and can reduce visibility of the rider from the boat. In some embodiments, a spray reducing element 81 can be used to reduce or eliminate the spray.

Figure 15E:
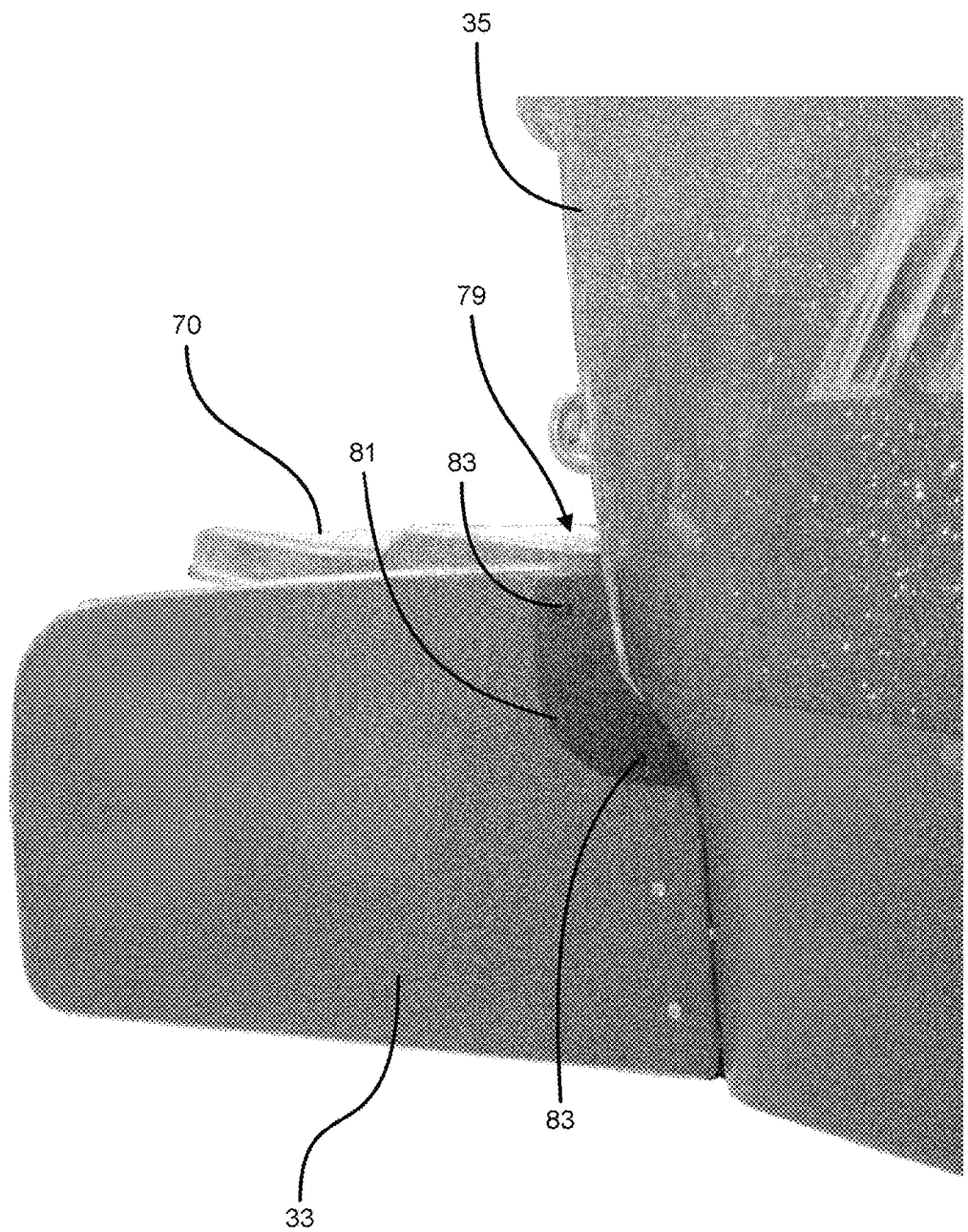
FIGS. 15E-15J show various example embodiments of spray reducing elements that can be configured to reduce or eliminate cross-spray from the water diverters.
Figure 15F:
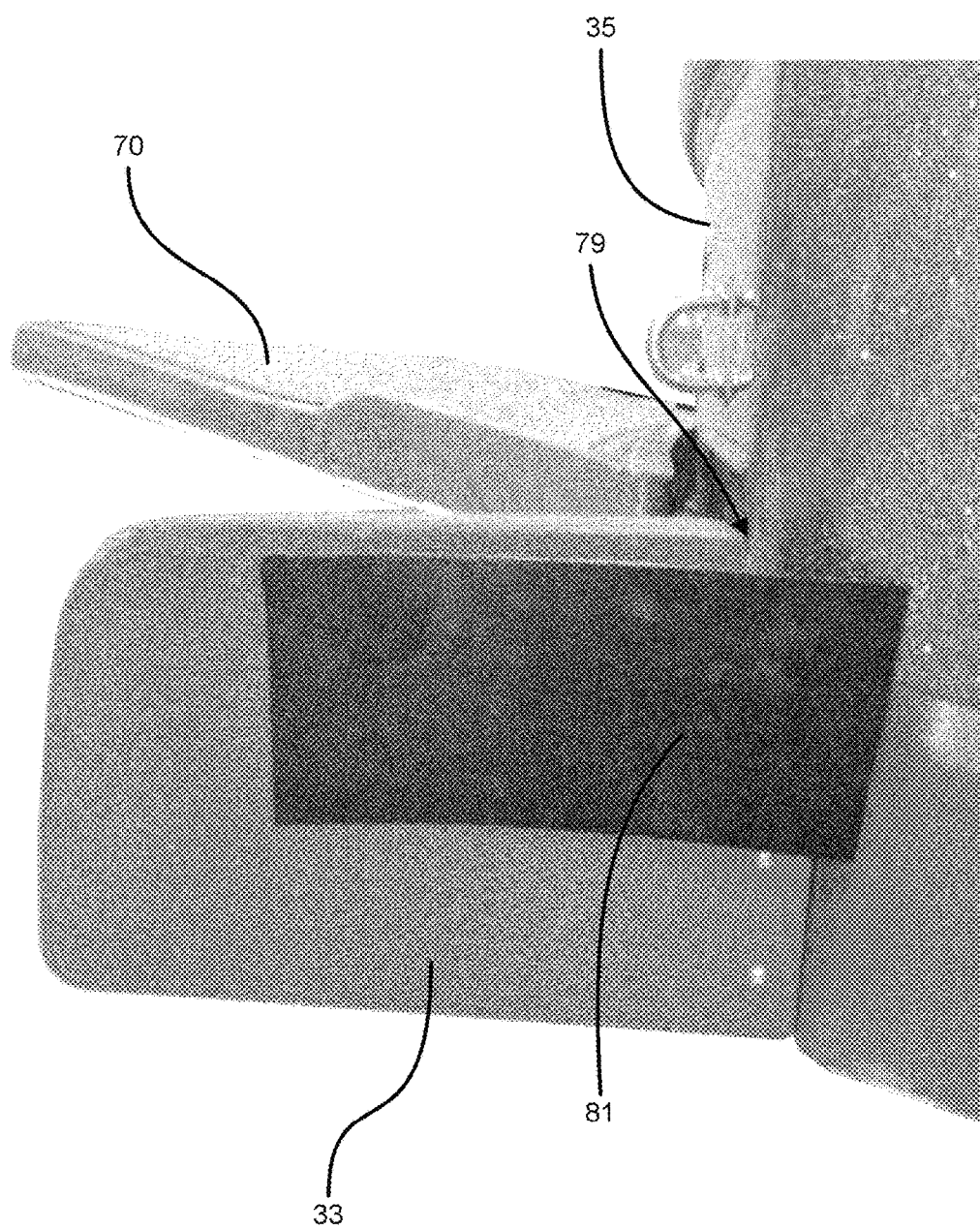

As shown in FIG. 15E, in some embodiments, the spray reducing element 81 can include a cover piece that covers at least a portion of the gap to impede the water from entering the gap as it flows from the boat hull to the water diverter 33. The cover piece can be disposed outside of the gap between the water diverter 33 and the boat hull, so that the cover piece does not interfere with the movement of the water diverter 33 toward the retracted or neutral position (FIG. 4B). The cover piece can be coupled to the outside surface of the water diverter 33 using bolts 83, or using an adhesive, or any other suitable coupling mechanism. When the water diverter 33 is in the extended or deployed position (FIG. 4A), the cover piece can abut against the hull or come within close proximity to the hull, thereby reducing or eliminating the cross-spray. The spray reducing element 81 can include a rigid, semi-rigid, or a flexible material. For example, in some embodiments, the spray reducing element 81 can include a flexible material and can be configured to contact the hull when then water diverter is in the deployed position. FIG. 15F shows an implementation of a spray reducing element 81 that abuts against the hull when the water diverter 33 is in the deployed position.

In some embodiments, the spray reducing element 81 can be coupled to the water diverter 33 so that it moves with the water diverter 33, e.g., between the neutral and deployed positions. In some embodiments, the spray reducing element 81 can be coupled to the boat, so that the spray reducing element 81 does not move with the water diverter 33. For example, with reference to FIG. 15F, the spray reducing element 81 can be coupled to the side of the hull, and can cover at least part of the gap between the transom 35 and the water diverter 33 when the water diverter is in the deployed position.

Figure 15G:
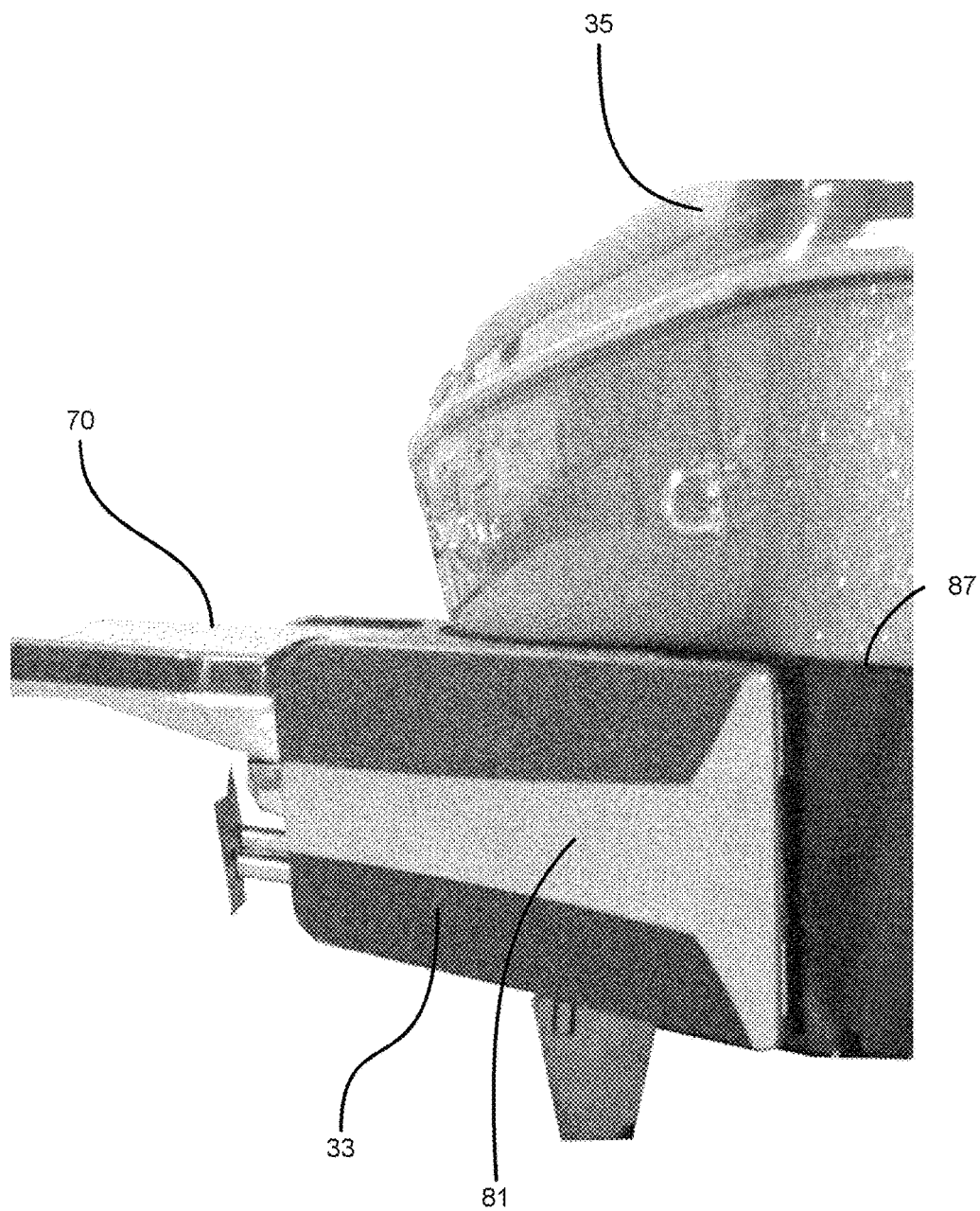
Figure 15H:
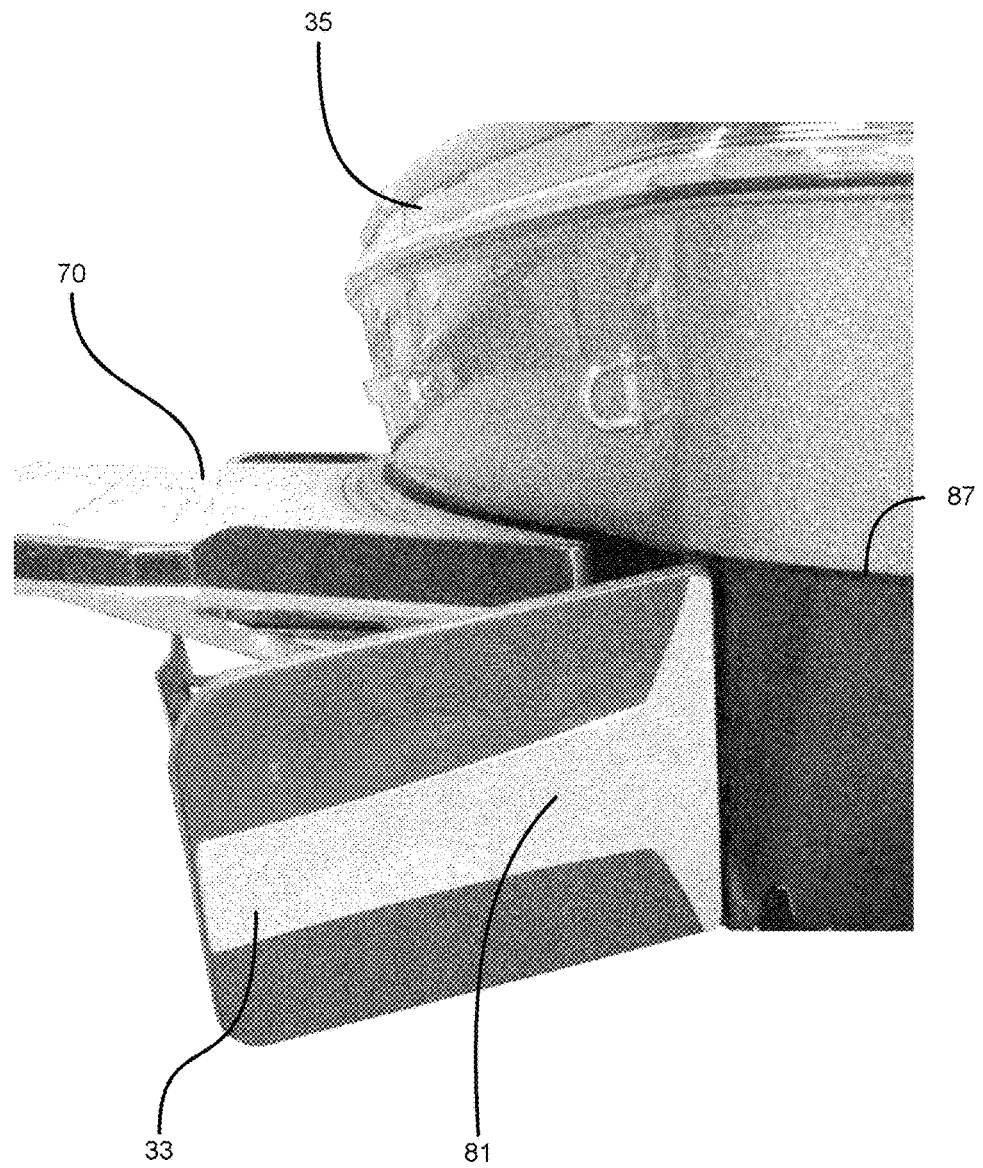

FIGS. 15G and 15H show an implementation with a water diverter 33 that includes a cover piece, which can be a plate (e.g., made of metal or another rigid material), over at least a portion of the outer surface thereof. FIG. 15G shows the water diverter in a retracted or neutral position. FIG. 15H shows the water diverter in an extended or deployed position. The cover piece can be a spray reducing element 81. The cover piece can extend past the edge of the water diverter 33 so that the plate covers at least a portion of the gap between the water diverter 33 and the hull of the boat when the water diverter 33 is in the deployed position. The plate can remained spaced apart from the hull by a small distance when the water diverter 33 is deployed. In some embodiments, the cover piece can cover one or more bolts, screws, or other attachment mechanisms (e.g., the bolts 85 show in FIG. 15D) that couple the water diverter 33 to the boat. In some embodiments, the cover piece can include a plurality of sections, and the different sections can extend past the edge of the water diverter 33 by different distances, e.g., such that the cover piece generally conforms to the shape of the boat hull that is near the cover piece when the water diverter is deployed. In some embodiments, the edge of the cover piece that extends past the edge of the water diverter 33 can have a shape that generally conforms to at least a portion of the shape of the edge of the water diverter 33, or that generally conforms to the shape of the boat hull that is near the cover piece when the water diverter is deployed. For example, in some embodiments, the cover piece can have a transom indentation (e.g., similar to the transom indentation 79 on the water diverter 33).

In some embodiments the shape of the hull of the boat can be configured to reduce or eliminate the spray by reducing the size of the gap between the deployed water diverter 33 and the hull, or eliminating the gap altogether. For example, in some embodiments, the boat hull can have a substantially linear shape extending across substantially the entire height of the water diverter 33, as shown in FIGS. 15G and 15H. Thus, in some embodiments, the water diverter 33 does not include a transom indentation 79. A perfectly linear hull shape may not be required, and the hull shape can be sufficiently linear for at least a portion of the hull near the water diverter to impede cross-spray. The edge of the water diverter 33 that is disposed nearest the boat hull can be substantially linear, in some embodiments. Although a perfectly linear shape may not be required, the edge of the water diverter 33 can be sufficiently linear to impede cross-spray. In some embodiments, the water diverter 33 can be disposed substantially entirely below a chamfer line 87 of the boat hull. Although in some implementations, a small portion of the water diverter 33 can be at or above the chamfer line 87, a sufficient amount of the water diverter 33 can be disposed below the chamfer line 87 to provide a small enough gap between the water diverter 33 and the hull to reduce or eliminate cross-spray.

In some embodiments in which the water diverter 33 includes a transom indentation 79 that is configured to correspond to the shape of the hull when the water diverter is in the retracted or neutral position, the hull can include a bulge or a hull shape that causes the transom indentation 79 to also correspond to the shape of the hull when the water diverter 33 is in the extended or deployed position.

In some embodiments, the gap between the hull and the deployed water diverter 33 (or between the hull and the spray reducing element 81) can be less than or equal to about 10 mm, less than or equal to about 7.5 mm, less than or equal to about 5 mm, less than or equal to about 2.5 mm, less than or equal to about 1 mm, or less. In some embodiments, the gap can be at least about 0.1 mm, at least about 0.5 mm, at least about 1 mm, at least about 1.5 mm, at least about 2.0 mm, or more (e.g., for embodiments having a plate or other rigid spray reducing element 81 that does not abut against the hull). Those of skill in the art will understand based on the disclosure herein that various other gap sizes can be used outside of the ranges discussed herein, and that the size of the gap can be minimized to a size that does not produce significant spray (which can degrade the shape of the wave), and that in some embodiments the gap size can be large enough to reliably prevent the deployed water diverter 33 from contacting the hull.

Figure 15I:
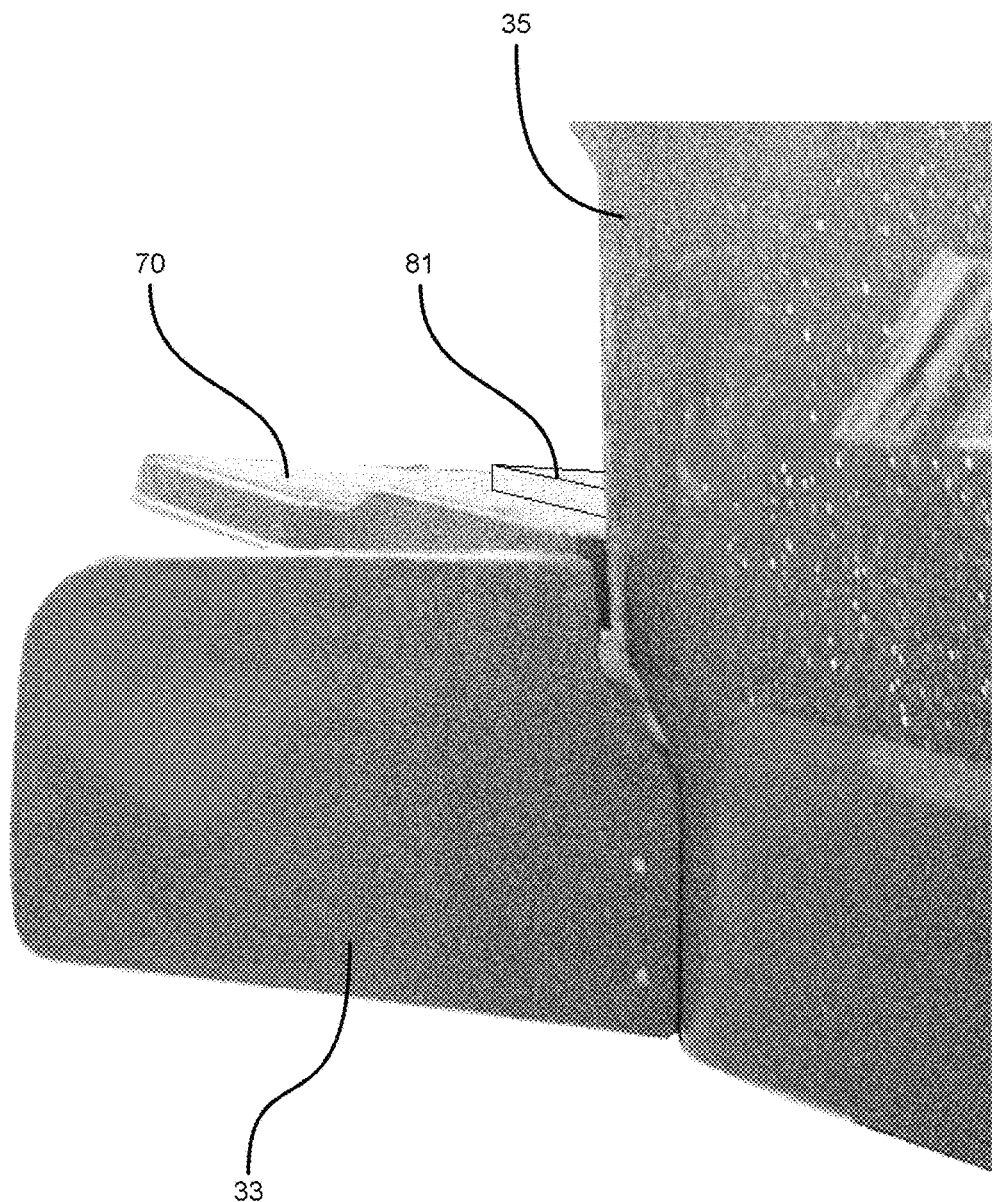
Figure 15J:
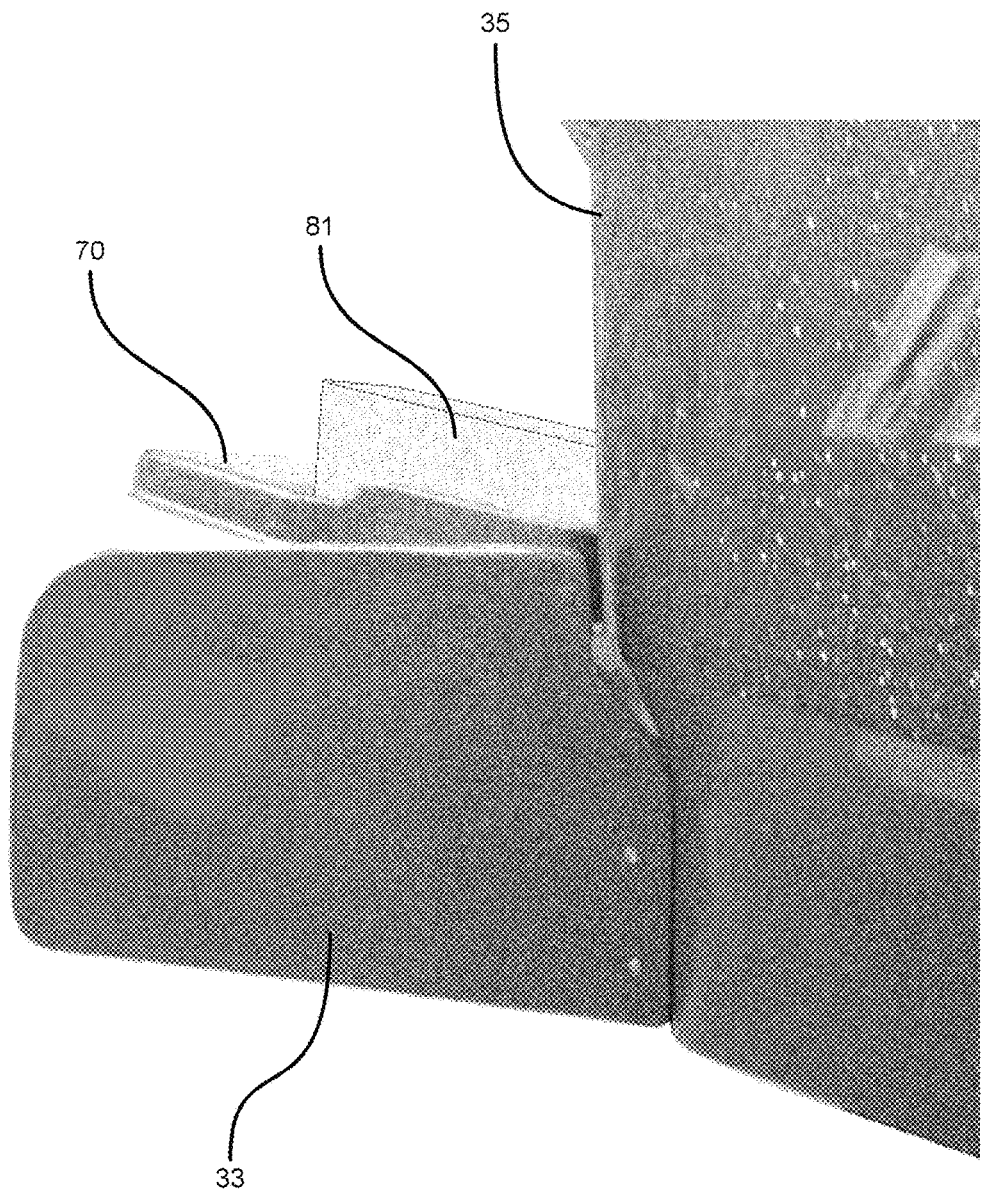

With reference to FIGS. 15I and 15J, the spray reducing element 81 can include a spray blocker that is positioned in the path of the spray, e.g., to prevent the spray from reaching the wave. The spray blocker can knock the spray down into the water or divert the spray to a more favorable direction. The implementation shown in FIG. 15I has a spray reducing element 81 that includes a ledge disposed generally above and inward from the water diverter 33. The ledge can be generally horizontal, although various other orientations are possible. The ledge can be positioned in the path of the cross-spray so that the ledge can knock the cross-spray down to impede the water from spraying onto the wave formed by the boat. Those of skill in the art will recognize from the disclosure herein that many other configurations are possible. For example, with reference to FIG. 15J, in some embodiments, the spray reducing element 81 can include a wall (e.g., extending upward from the swim platform 70), which can be generally vertical, although various other orientations are possible. The wall can be positioned in the path of the cross-spray so that the wall can impede the water from spraying across to the wave on the side of the boat opposite the deployed water diverter 33.

Although only one water diverter 33 is shown in FIGS. 15A through 15J, spray reducing elements 81 can be used to reduce or eliminate spray from both of the water diverters 33. The spray reducing element 81 can be implemented in various other manners. For example, in some embodiments, a compressible material (e.g., an open cell or a closed cell foam) can be coupled to the water diverter 33 and/or to the boat (e.g., to the transom 35) so that the compressible material at least partially fills the gap between the water diverter 33 and the boat hull when the water diverter 33 is in the deployed position. In some embodiments, a spray reducing element 81 can be coupled to the boat hull (e.g., to the transom 35 or the side strake of the hull), e.g., such that the spray reducing element 81 fills or covers at least a portion of the gap between the water diverter 33 and the boat hull, or otherwise impedes spray.

With reference again to FIGS. 15A and 15B, in various embodiments, the flaps may be planar or non-planar. For example, FIG. 15B shows a convexly-flared flap 33, which allows water flow along the outer surface of the flap that gently trails in towards the hull centerline, while FIG. 15C shows a concave flap 33, that allows water flow along the outer surface of the flap to be further redirected outward away from the centerline of the hull. One will appreciate that a curved flap may effectively extend or otherwise adjust the range of deployment allowing for the use of variously sized actuators. For example, concave flaps may effectively extend the range of deployment such that smaller displacement actuators may be used. Furthermore, convex flaps may reduce face friction, promote laminar flow, or otherwise enhance or modify the wake.

One will appreciate that other flap shapes and configurations may also be utilized in accordance with the present invention, including, but not limited to, oval shaped flaps, other polygonal shapes, perforate surfaces, patterned surfaces, and etc. One will also appreciate that the flaps may be replaceable and interchangeable such that a user may replace flaps of one type with flaps of another type in order to further customize the performance of the surf wake system. Alternatively, supplemental "bolt-on" shapes may be provided which can be attached to an existing flap to further modify its overall shape.

Figure 16A:
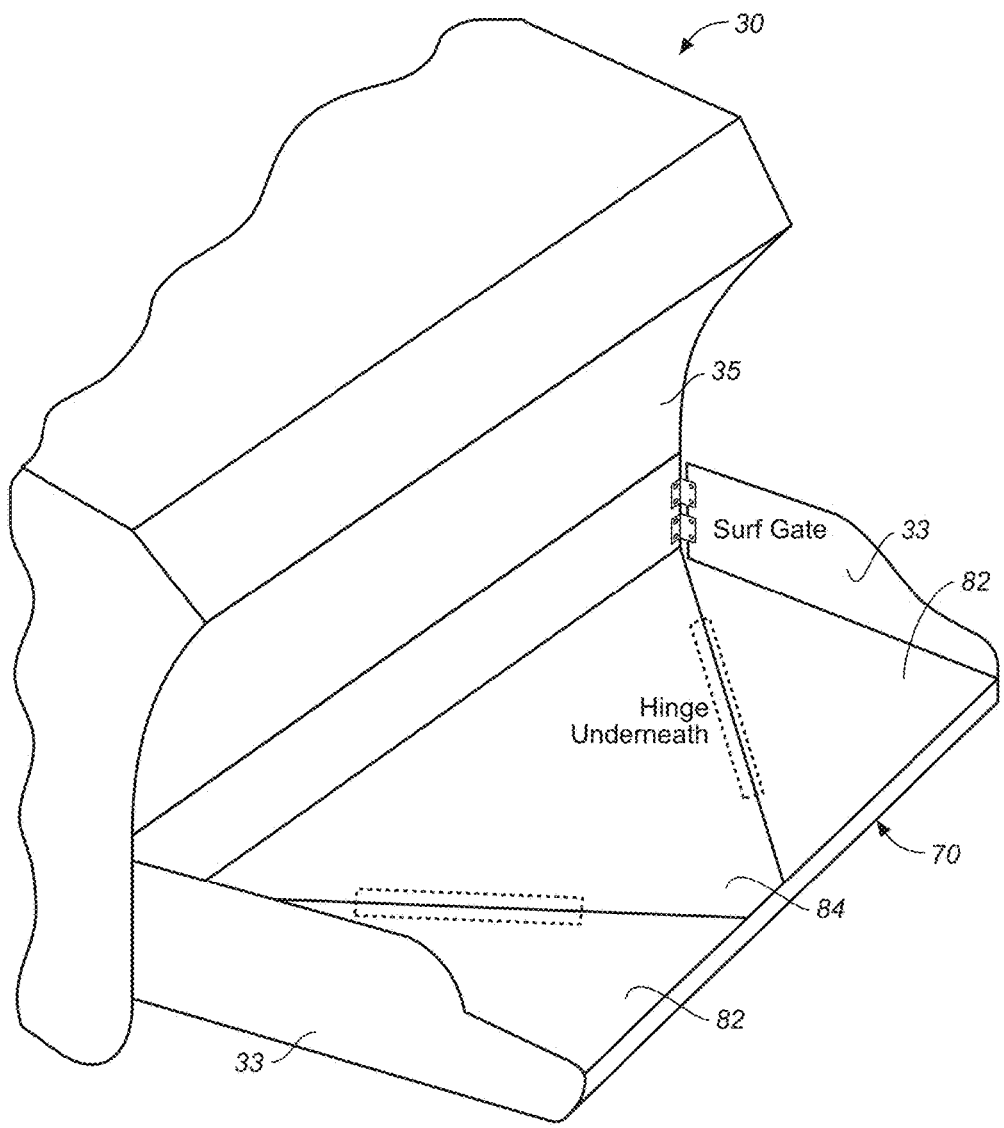
FIG. 16A and FIG. 16B are rear perspective and rear elevation views, respectively of another exemplary flap assembly integrated with a complementary swim platform in accordance with various aspects of the present invention.
Figure 16B:
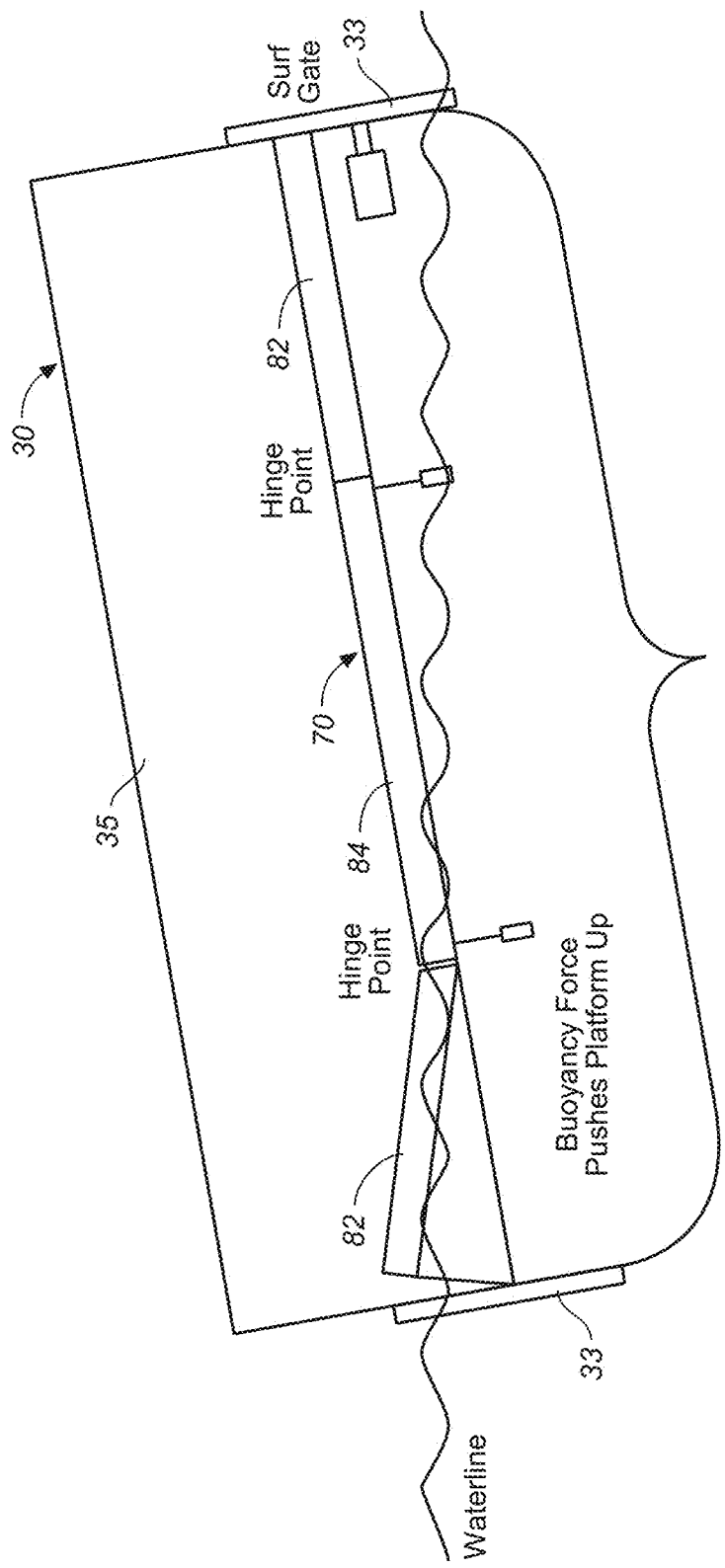

In various embodiments, upper surfaces of the swim platform may be hinged to facilitate the flow of water past the swim platform. Conventional swim platforms generally impede waveform by suppressing water flow on surf side when boat is rolled to the same side. As shown in FIG. 16A and FIG. 16B, swim platform 70 may be provided with hinged surfaces 82 which are configured to pivot up and away from flow of water as respective side of the swim platform approaches the waterline. The hinged surfaces are designed to allow only upward movement from the resting plan of the swim platform. As shown in FIG. 16B, hinged surface 82 is configured to allow water forces to push the hinged portion up and away from the flow of water creating the resulting surf wave. In the illustrated embodiment, hinged surface 82 is pivotally attached to a fixed main portion 84, whereby the hinged surface may pivot up and not impede waveform. In the illustrated embodiment, the hinged surface is pivotally attached to the fixed main portion by a hinge, however, one will appreciate that other suitable means may be utilized to allow the hinged portion to flex upwardly. One will appreciate that swim platform 70 and hinged surfaces 82 may be used in conjunction or separate from the surf wake system of the present invention.

Figure 17:
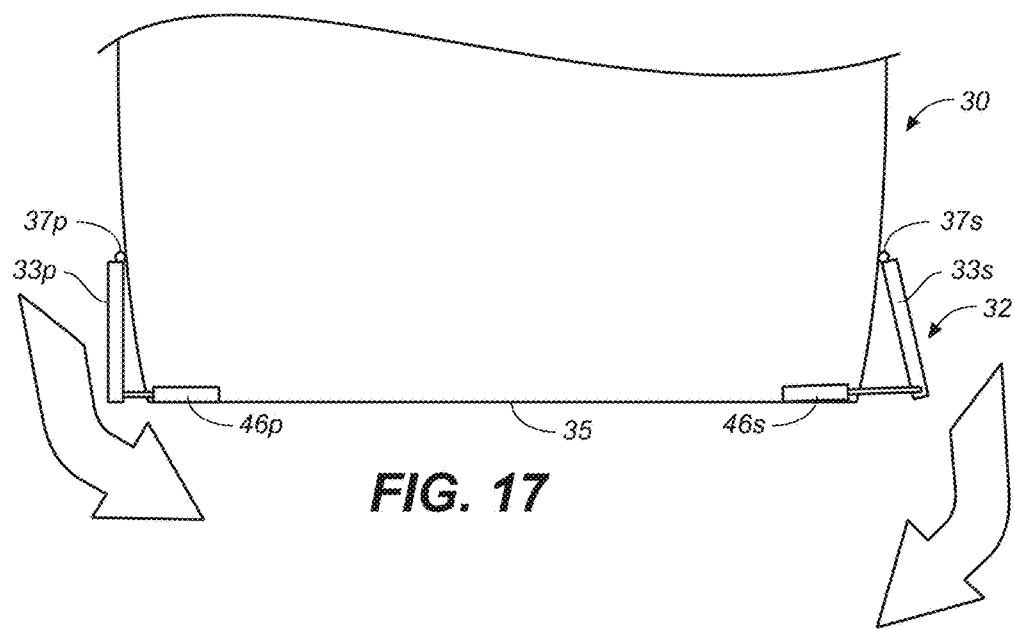
FIG. 17 is a schematic view of an exemplary surf wake system including side-hull flap assemblies in accordance with various aspects of the present invention.

In another exemplary embodiment of the present invention, surf wake system 32 is similar to the systems described above but includes flaps 33 that are mounted on the side of the hull instead of the transom, as shown in FIG. 17. In this embodiment, the actuators are mounted on an appropriate section of the hull to effect deployment from a neutral position, as illustrated by flap 33p, to an extended deployed position, as illustrated by flap 33s. In a manner similar to the systems described above, deploying a flap will disrupt the flow of water along the side of the hull past the transom such that the flow of water is redirected outwardly and/or rearwardly to facilitate constructive interference of converging waves in a manner that is described above with respect to FIG. 13B and FIG. 13C.

One will appreciate that the various flap and actuator configurations described above may be utilized with a hull-side configuration.

Figure 18:
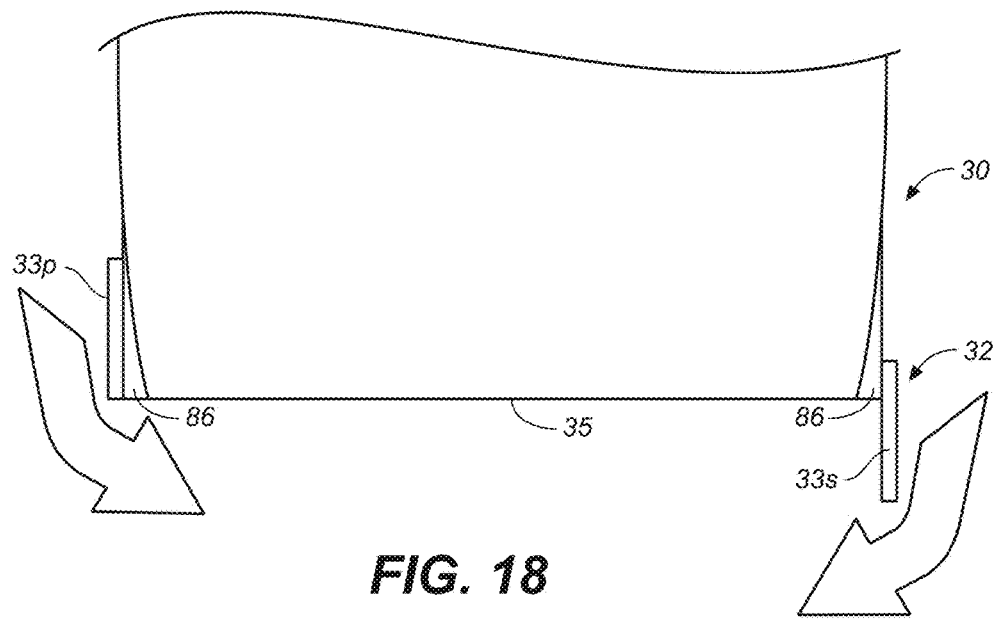
FIG. 18 is a schematic view of an exemplary surf wake system including longitudinally extendable flap assemblies in accordance with various aspects of the present invention.

In still another exemplary embodiment of the present invention, surf wake system 32 is similar to the systems described above but includes flaps 33 that are mounted to extend rearward of transom 35, as shown in FIG. 18. Flaps may be mounted to slide along a track assembly 86 mounted on the side of the hull, or alternatively, may be configured to extend directly outwardly from the hull. In this embodiment, actuators (not shown) are mounted on an appropriate section of the hull or track assembly to effect deployment from a neutral position, as illustrated by flap 33p, to an extended deployed position, as illustrated by flap 33s. In a manner similar to the systems described above, deploying a flap will disrupt the flow of water along the side of the hull past the transom such that the flow of water is redirected rearwardly to facilitate constructive interference of converging waves in a manner that is described above with respect to FIG. 13B and FIG. 13C.

One will appreciate that the various flap and actuator configurations described above may also be utilized with such a retractable flap configuration.

Figure 19:
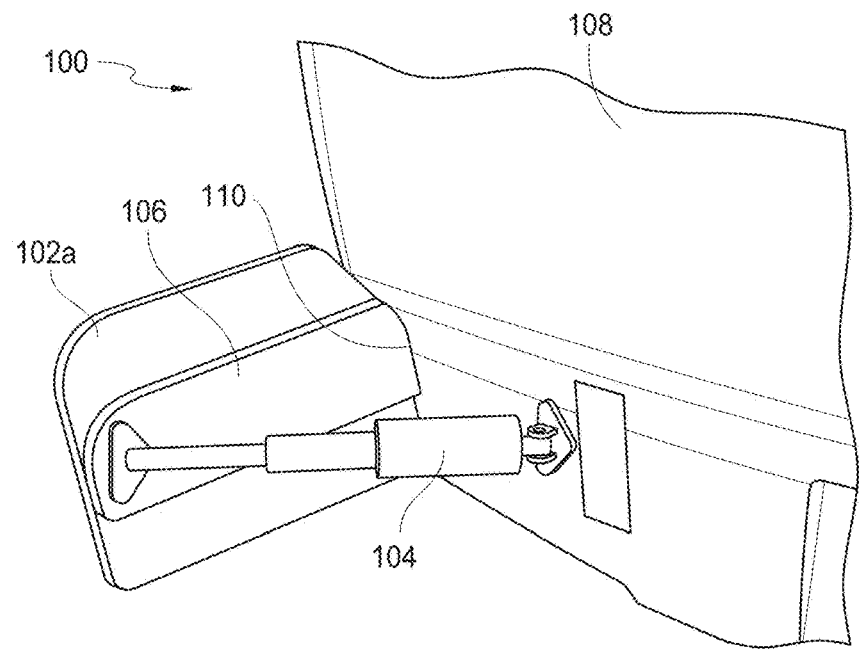
FIG. 19 is a partial perspective view of an example embodiment of a water removable water diverter coupled to a coupling member on a boat.
Figure 20:
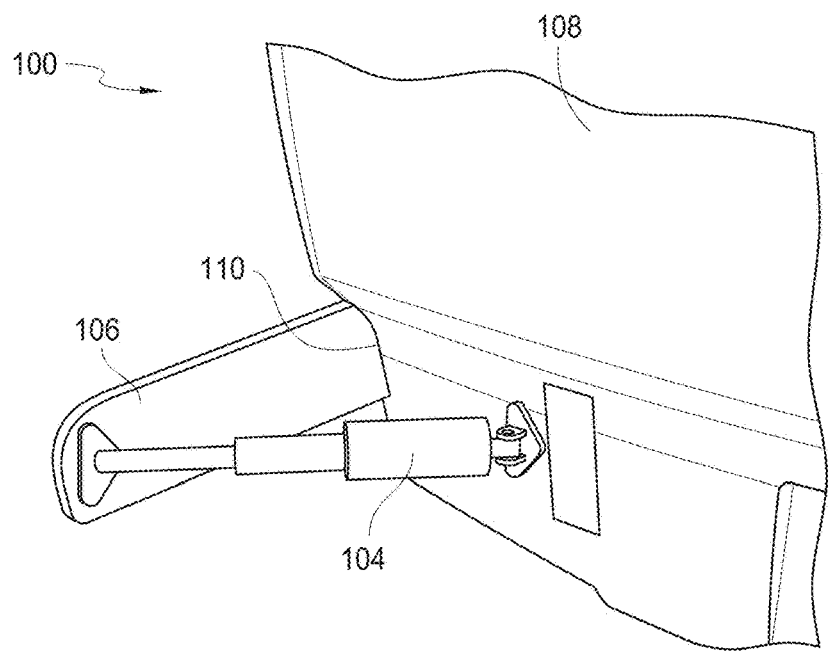
FIG. 20 is a partial perspective view of the coupling member of FIG. 20 on the boat with the water diverter removed therefrom.
Figure 21:
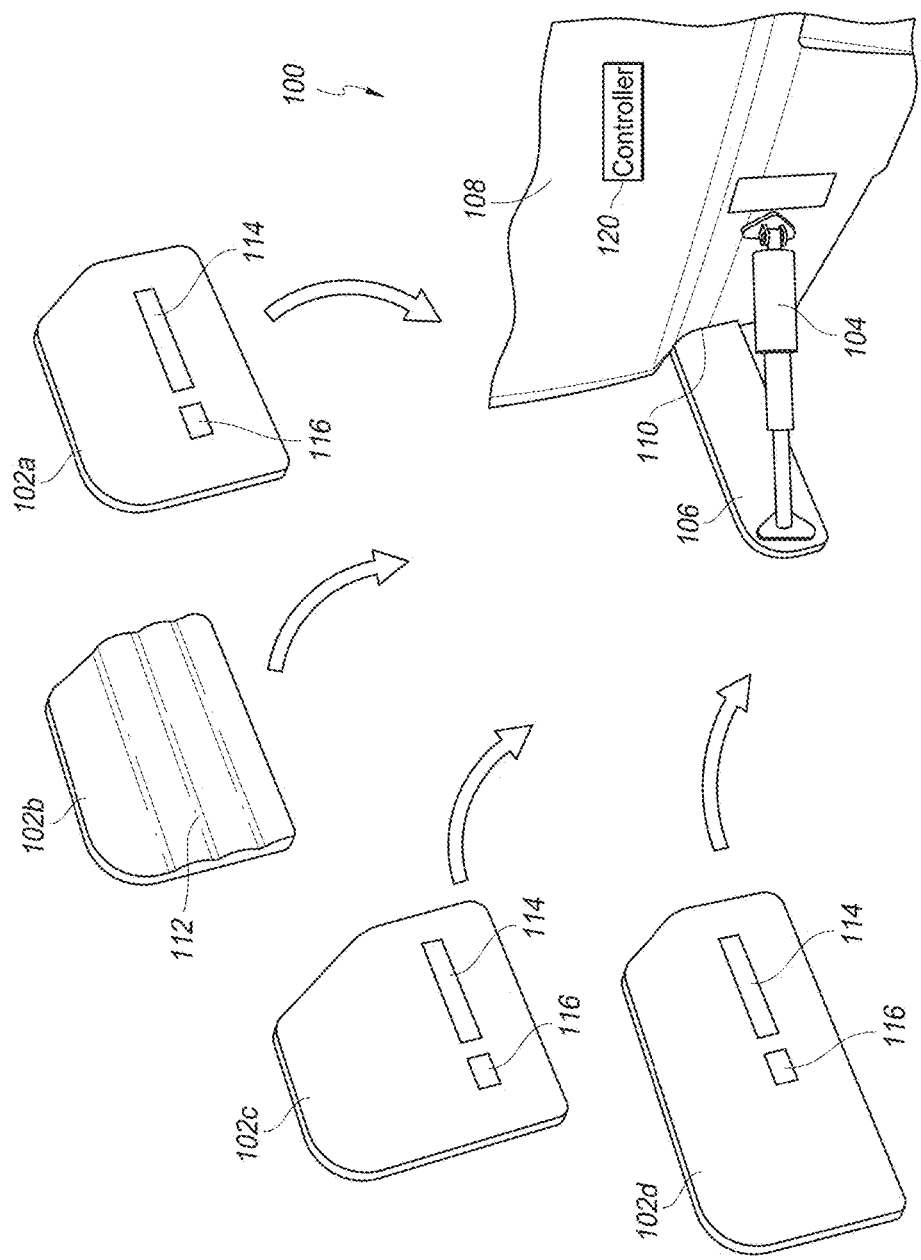
FIG. 21 is a partial perspective view showing multiple example embodiments of water diverters compatible for use interchangeably with the boat.

With reference to FIGS. 19-21, in some embodiments, a wake shaping system 100 can be configured to use removable and/or interchangeable water diverters 102a-d, which can have different sizes, different shapes, or other different configurations. FIGS. 19-21 are partial views of the wake shaping system 100, and show example embodiments of port-side water diverting elements. Although not shown in FIG. 19-21, the wake shaping system 100 can include similar starboard-side water diverting elements. The wake shaping system 100 can include one or more actuators 104 configured to selectively position the water diverters 102a-d. The one or more actuators 104 can include an electric motor, a hydraulic motor, a pneumatic motor, or other mechanism suitable to move the water diverters 102a-d. The actuators 104, the water diverters 102a-d, and various other elements of the wake shaping system 100 can be similar to, or the same as, corresponding elements in various other embodiments disclosed herein, and various features described in connection with the other embodiments can be incorporated into the wake shaping system 100 even when not specifically described in connection with FIG. 19-21.

The system 100 can include a coupling member 106 that is configured to couple the removable water diverters 102*a-d* to the actuator 104 and/or to the boat 108 (e.g., to the transom of side portion thereof). The coupling member 104 can be attached to the boat 108 by a joint or other mechanism that enables the coupling member 104 to move with respect to the boat 108. For example, the coupling member 106 can be pivotally coupled to the boat 108 (e.g., by joint 110) so that the coupling member 106 can pivot between two or more positions that are configured to modify wake shape. The coupling member 106 can slidably be coupled to the boat 108, such that the coupling member 106 can slide (e.g., in a direction that is generally transverse to the longitudinal axis, generally parallel to the longitudinal axis, or any angle therebetween) between two or more position that are configured to modify wake shape. The coupling member 105 can be coupled to the actuator 104 such that the actuator 104 can selectively position the coupling member, 106 as described herein. The coupling member 106 can be permanently or semi-permanently attached to the boat 108 and/or to the actuator 104 (e.g., using screws, bolts, rivets, or other suitable fasteners). For example, in some embodiments, the coupling member 106 can disassembled from the boat 108 and/or actuator 104 (e.g., for repair), but the coupling member 106 is not removably by a user during normal operation of the wake shaping system 100.

The coupling member 106 can be configured to removably receive a water diverter 102*a-d*. FIG. 19 shows a port-side coupling member 106 with a water diverter 102*a* attached thereto. FIG. 20 shows the port-side coupling member 106 with no water diverter attached thereto. In some embodiments, the coupling member 106 can be used as a water diverter (e.g., of relatively small size) without any additional water diverter 102*a-d* attached thereto. FIG. 21 shows four example water diverters 102*a-d* that can each be removably attached to the coupling member 106. The water diverters 102*a-d* can have different sizes, different shapes, or other different configurations configured to affect wake shape in different ways. For example, the water diverter 102*b* can include ridges or channels 112 (e.g., similar to the embodiments discussed in connection with FIGS. 14A and 14B. For ease of illustration, the water diverter 102*b* is shown oriented differently than the water diverters 102*a*, 102*c*, and 102*d*, such that the outboard side of the water diverter 102*b* is visible. As another example, the water diverter 102*c* can be taller than the water diverter 102*a*. As yet another example, the water diverter 102*d* is longer than the water diverter 102*a*. Many other variations are possible. The different water diverters 102*a-d* can be configured to divert water in different manners, e.g., to achieve different wake shaping effects. For example, different water diverters 102*a-d* can be used depending on the desired wake size, the desired wake steepness, the desired wake position, the rider's weight, age, or skill level, the depth of the water, etc.

The water diverters 102*a-d* and/or the coupling member 106 can include one or more coupling mechanisms 114 configured to removably attach a water diverter 102*a-d* to the coupling member 106. For example, a sliding engagement mechanism 114 can be disposed on an inboard side of the water diverters 102*a-d*, and a corresponding mechanism (hidden from view in FIG. 21) can be configured to engage the sliding engagement mechanisms 114 of the water diverters 102*a-d* to secure a water diverter 102*a-d* to the coupling member 106. Many other types of coupling mechanisms 114 can be used, such as clamps, snaps, friction-fit elements, or any other suitable mechanism that can enable a user to remove one water diverter 102*a-d* and replace it with a different water diverter 102*a-d* during normal operation of the wake shaping system 100.

Some embodiments can include water diverters that include removable portions. For example, a water diverter 102 can include a coupling mechanism that is configured to removably receive a supplemental portion (e.g., an extension portion) that changes the size and/or shape of the water diverter 102. For example, the supplemental portion can be added to make the water diverter 102 taller or longer, etc. to modify the wake produced by the boat. In some configurations, both the main water diverter portion and the supplemental portion can be configured to divert water when deployed.

In some embodiments, the wake shaping system 100 can include a controller 120 that can adjust various features on the boat 108 based on various factors or inputs to achieve a desired wake condition, as discussed herein. In some embodiments, the controller 120 can adjust one or more actuators 104 (e.g., to position the water diverters 102*a-d*) differently depending on the type of interchangeable water diverter 102*a-d* that is coupled thereto. Accordingly, in some embodiments, a memory can store an indication of the type of water diverter 102*a-d* that is being used. A user input device can enable a user to input the indication of the type of water diverter 102*a-d*.

In some embodiments, the wake shaping system 100 can be configured to automatically change the indication of the type of water diverter being used in response to an interchange of the water diverters 102*a-d*. The wake shaping system 100 can be configured to detect the type of water diverter 102*a-d* that is attached thereto. For example, the water diverters 102*a-d* can include an indicator element 116 that is different for the different types of water diverters 102*a-d*. The coupling member 106 can be configured to detect what type of water diverter 102*a-d* is attached thereto based at least in part on the indicator element 116. For example, the indicator element 116 can include a pin or protrusion that can be positioned at a different location on different types of water diverters 102*a-d*. The coupling member 106 can detect the location of the pin or protrusion (e.g., with a series of buttons or a pressure sensor). An indication of the type of water diverter 102*a-d* can be transferred (e.g., from coupling member 106) to the controller 120, such as using a cable or a wireless communication link. Many variations are possible. For example, in some embodiments, the indicator element 116 can be a radio-frequency identification (RFID) tag, and the system 100 can be configured to detect what water diverter 102*a-d* is being used by the RFID tags therein.

In some embodiments, the wake control system 100 can be configured to provide a notification to a rider that depends, at least in part on the positions of the water diverters 102. For example the rider notification can be an indication of which side of the wake is currently adapted for surfing, a notification that the surf wake is changing from one side to the other, a notification that the surf wake will soon change from one side to the other, an indication of a current wake property (e.g., height, steepness, etc.), a notification that a wake property is changing or is about to change, etc. A controller 120 can be configured to provide a signal to one or more rider notification elements 122 that are configured to provide the notification to the rider (e.g., a wakesurfer riding the wake of the boat 108). The rider notification elements 122 can be positioned at or near the transom of the boat 108 such that they are visible to a rider, although other positions are possible (e.g., on a wake tower). In some embodiments, the controller 120 can send a notification (e.g., by a wireless communication link) to a remote notification device, which can be worn by the rider (e.g., on the wrist), located on the wake surfboard, etc.

Figure 22:
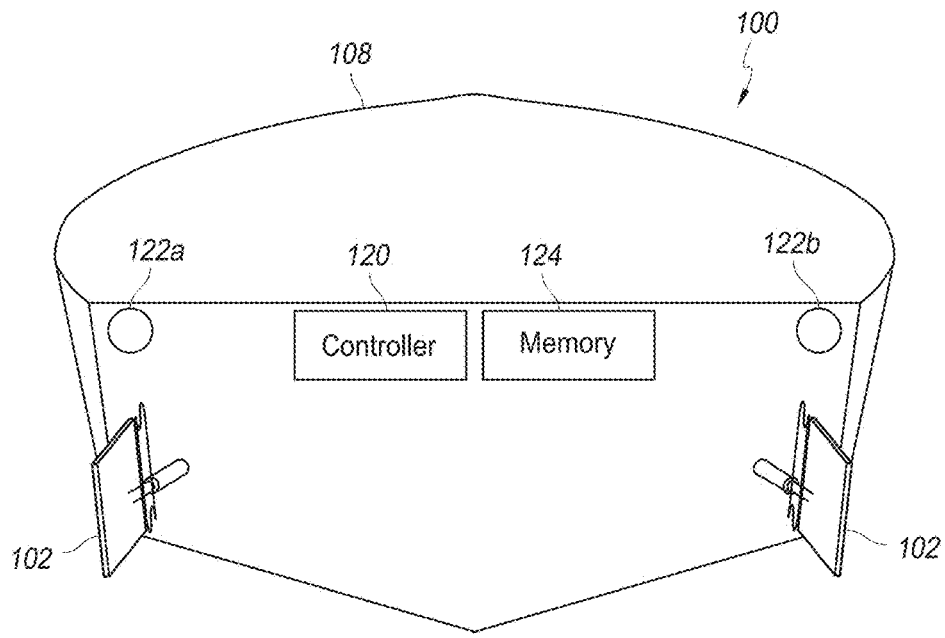
FIG. 22 shows an example embodiment of a boat with a wake shaping system that includes rider notification elements.

In some embodiments, the system 100 can include a port notification element 122a and a starboard notification element 122b, as shown, for example in FIG. 22. The port and starboard notification elements 122a and 122b can include one or more lights. As shown in FIG. 22, for example, the system 100 can include a port notification light 122a and a starboard notification light 122b, and the controller 120 can operate the lights 122a and 122b to provide notifications to the rider. For example, if the wake shaping system 100 is configured to provide a port-side surfing wake, the port notification light 122a can be illuminated and the starboard notification light 122b can be off (or vice versa). In some embodiments, both the port notification light 122a and the starboard notification light 122b (or neither) is be illuminated while the water diverters 102 change the side of the wake that is adapted for surfing from one side to the other. In some embodiments, one or both of the port indicator light 122a and the starboard indicator light 122b can flash to indicate that the water diverters 102 will soon change the side of the wake that is adapted for surfing from one side to the other. For example, if the controller 120 receives an instruction to change the side of the surf wake (e.g., from the driver via a user interface 142 or from instructions stored in memory 124), the controller 120 can wait for a delay period before making the change, and the controller can provide a notification of the upcoming change to the rider during some or all of the period of delay (e.g., for about 2 seconds to about 10 seconds prior to the start of the transition). Many variations are possible.

Figure 23:
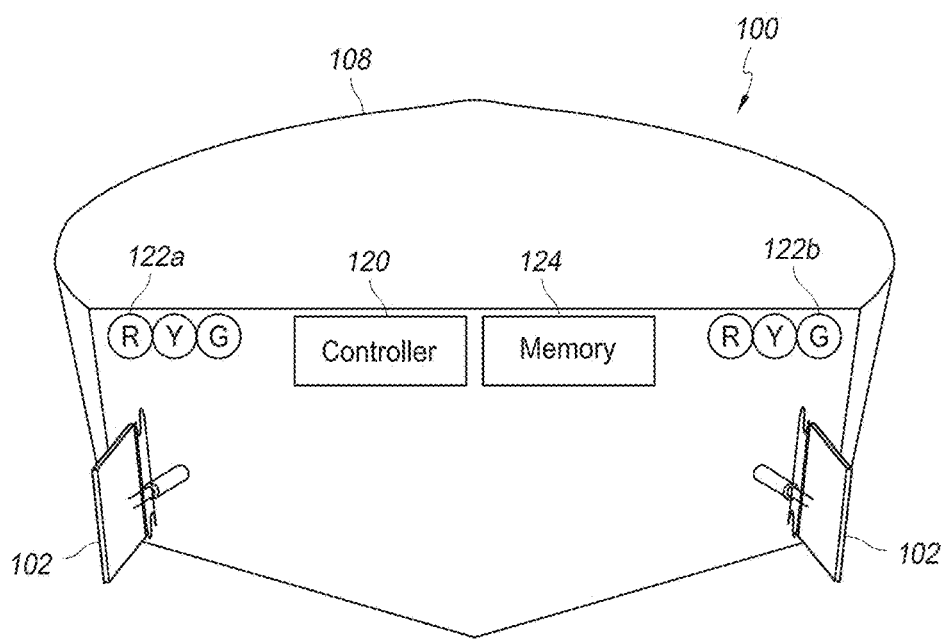
FIG. 23 shows another example embodiment of a boat with a wake shaping system that includes rider notification elements.

As shown in FIG. 23, in some embodiments, the port notification element 122a can be configured to emit multiple colors of light (e.g., red, yellow, and green), such as from multiple light sources. Similarly, the starboard notification element 122b can be configured to emit multiple colors of light (e.g., red, yellow, and green), such as from multiple light sources. In some embodiments, a first color (e.g., green) can be emitted when the wake is adapted for surfing on the same side as the light. A second color (e.g., yellow) can be emitted when the surf wake is moving from one side to the other, or as an indication that the surf wake will soon move from one side to the other. A third color (e.g., red) can be emitted when the wake is adapted for surfing on the opposite side as the light. The colors can be used to provide information to the user regarding other wake properties. For example, a first color (e.g., green) can be emitted to indicate that the wake has a relatively low height or a relatively low steepness (e.g., a beginner wake). A second color (e.g., yellow) can be emitted to indicate that the wake has an intermediate height or an intermediate steepness (e.g., an intermediate wake). A third color (e.g., red) can be emitted to indicate that the wake has a relatively large height or is relatively steep (e.g., an advanced wave). An individual flashing color can be used to indicate that the wake properties are changing, or are about to change. The lights on one side 122a or 122b can be all off to indicate that the wake is adapted for surfing on the side of the boat 108 opposite the lights that are off. In some embodiments, the lights on both sides can be turned on, or off, or can flash to indicate that the surf wake is changing from one side to the other or that the surf wake will soon change from one side to the other. For example, lights on both sides can flash to notify the rider that the surf wake will soon change sides. The rate at which the lights flash can indicate how long before the transition will start. For example a faster rate of flashing can indicate that the transition will start relatively soon (e.g., within 1 second or less), and a slower rate of flashing can indicate more time (e.g., about 3 seconds or more) until the transition will start. During the transition of the surf wake from one side to the other (e.g., during actuation of the water diverters 102), one or more lights on both sides can be turned on. Many variations are possible.

Figure 24:
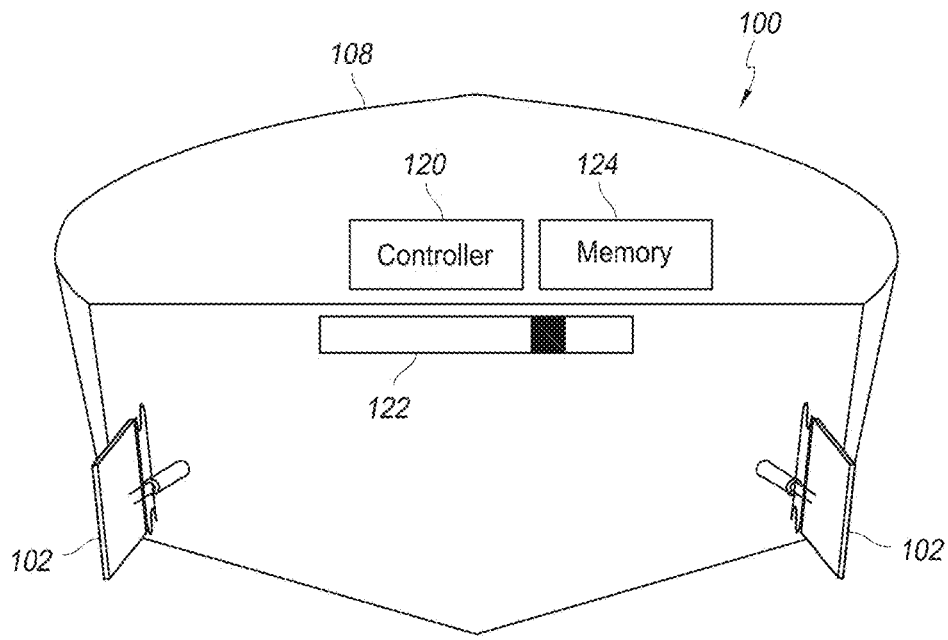
FIG. 24 shows another example embodiment of a boat with a wake shaping system that includes rider notification elements.
Figure 25:
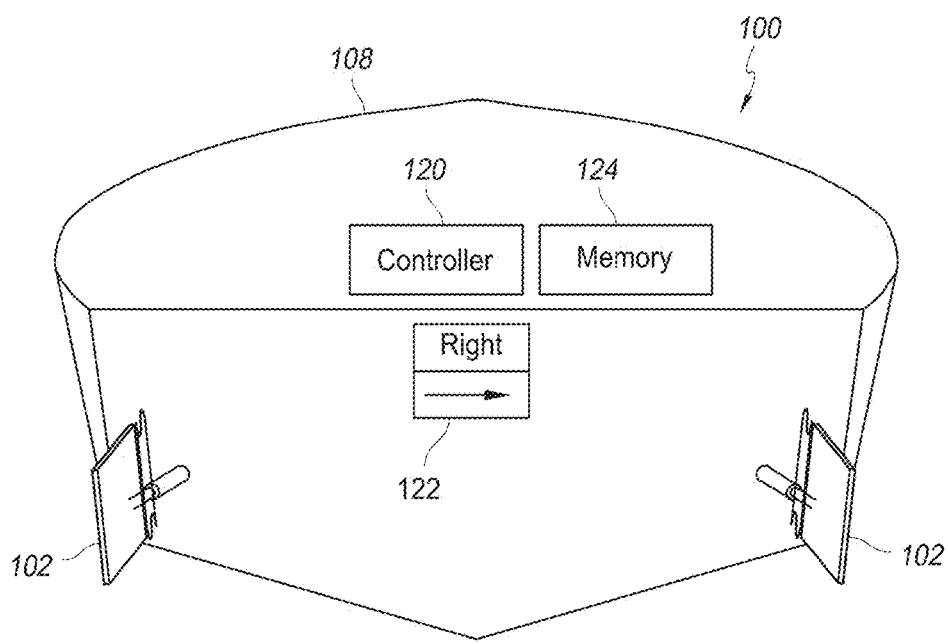
FIG. 25 shows an example embodiment of a boat with a wake shaping system that includes rider notification elements.

With reference to FIG. 24, the rider notification element 122 can include a graphical slide 122 that can be configured to provide a notification based on the position of one or both of the water diverters 102. For example, the graphical slide 122 can indicate where one or both of the water diverters 102 is positioned between the fully deployed and the fully retracted positions. Thus, a slide indication that is somewhat to the right (as shown in FIG. 24) can indicate that the starboard side of the wake is adapted for surfing and that the at least one water diverter implanting the starboard-side surf wake is not fully deployed.

In some embodiments, the rider notification element 122 can include a display, such as an alpha-numeric display or a graphical display. The display 122 can be configured to display the rider notification, e.g., either as text or as a graphical image. The display 122 can display other information to the rider, such as an identification of a trick to be performed, boat speed, ballast information, a score awarded during a competition, etc. The rider notification element 122 can display a countdown to the rider, where the countdown indicates an amount of time until an event such as a transition from a port-side wave to a starboard-side wave, or vise versa, or a change in wave shape (e.g., steepness or size).

Although some examples have been given, it will be understood that many different types of rider notification elements can be used. For example, the rider notification element 122 can include an audio speaker, and the controller 120 can be configured to play audio notifications for the rider. The audio speaker can be disposed at or near the transom of the boat 108, and can be directed toward the rider (e.g., rearward). The audio speaker can be a speaker dedicated to rider notifications (e.g., having a special location or orientation). In some embodiments, the controller 120 can be in communication with speakers that can also be used to play music or other sounds, and those same speakers can be used to send an audio rider notification. The audio rider notification can be a sound (e.g., a load blast) indicating that the surf wake is changing sides, or will soon change sides. In some implementations, different sounds can be used to indicate different things to the rider. For example, the rider notification can include an audio countdown, which can be similar to the visual countdown discussed above. In some embodiments, the audio rider notification can include a series of sounds (e.g., beeps) that have a frequency that corresponds to a change in the wake. For example, the frequency of the sounds can increase as the time approaches for the wake to transition from one side to the other side. In some embodiments, the frequency of the short sounds (e.g., beeps) can increase until the water diverters 33 begin the transition, and a longer continuous sound can indicate that the wake is transitioning from one side to the other. In some embodiments, a series of short sounds can have an increasing (or decreasing) frequency as the wake transitions from one side to the other, thereby indicating the progress of the wake transition as it occurs.

Those of skill in the art will understand from the disclosure herein that many variations are possible. In some embodiments, the rider notification element can be a single light source. For example, the light can be off when the parameters of the surf wake are static. The light can turn on or flash as a notification that the surf wake is changing sides or is about to change sides. In some embodiments, the rider notification can include a combination of visual and audio elements to notify the rider of adjustments in the wake. In some embodiments, the rider notification element 122 can include one or more movable mechanical elements. For example, the rider notification element 122 can be configured to raise a flag or move an indicator from a first location to a second location (e.g., to notify the rider that a wake adjustment is beginning or about to begin). In some cases, a plurality of flags or other indicators can be movable to different positions to notify the rider of different types of wake adjustments (e.g., transition from right-side to left-side, transition from left-side to right-side, a change in wake height, or the wake position behind the boat, etc.). In some embodiments, the visual rider notifications element 122 can be located at a location that is easy for the rider to see while riding the wave produced by the boat 108, such as on the transom of the boat 108, on the swim platform, on a low portion of the boat 108 (e.g., on the hull, near the water line). In some embodiments, the one or more rider notification elements 122 (e.g., visual or audio) can be located on the rider control 134 (which is discussed below in connection with FIG. 27A). In some embodiments, one or more rider notification elements 122 (e.g., visual or audio) can be located on a tow rope handle, and the rider notification data can be communicated to the tow rope handle via a wireless communication interface or via a wire extending in or along the tow rope. In some embodiments, the one or more rider notification elements 122 can be located on the wake surfboard or can be coupled to the wake surfboard. For example, the wake surfboard can include a mount configured to couple an electronic device to the wake surfboard, wherein the electronic device includes the one or more rider notifications elements 122. In some embodiments, one or more rider notification elements 122 can be positioned on a tower (e.g., a wake boarding tower), such as on one or both of the side bars of the tower and/or on the cross bar that connects the side bars of the tower. In some embodiments, rider notification data can be communicated (e.g., wirelessly) to the rider (e.g., to the rider control 134 or to the wake surfboard). The rider notification data can be communicated (e.g., wirelessly) to allow the notifications to be presented to spectators, to passengers on the boat 108, to other competitors in a competition, etc. In some embodiments, the rider notification elements 122 can include audio and visual elements, which can be coordinated or can complement each other. For example, one or more speakers can emit a plurality of sounds (e.g., a series of beeps), and one or more lights can emit light (e.g., a series of flashes) at the same time as the sounds.

In some embodiments, the rider notifications can be adjustable. For example, a wake change (e.g., change of sides, change of size, change of shape) can occur after a delay time after the rider notification, and the delay time can be adjustable. For example, one rider may prefer to receive a notification half-a-second before the wake change, and another rider may prefer to receive a notification 1 second, 1.5 seconds, or 2 seconds, etc. before the wake adjustment. Different delay times can be used for different types of wake changes. For example, a rider may want to receive a notification 1 second before the wake changes from the right-side surf wake to a left-side surf wake, and the rider may want to receive a notification half-a-second before the wake changes from a flat shape to a steep shape. The memory 124 can include stored setting for the lengths of the delay times. The controller can be configured to operate the rider notification element 122 based in part on the stored settings. The settings can be adjusted, e.g., via a user interface. Different settings can be set for different riders. In some embodiments, the rider notification settings (e.g., the delay from the notification to the transition) can depend at least in part on the rider's experience, the rider's weight, the board size, the board type (e.g., skimmer board or finned surfboard), wave height, wave length, wave shape, the rider's position on the wave, etc. For example, a rider may prefer a different amount of delay between the rider notification and the transition depending on whether the wave has a relatively large height and relatively short length or a relatively small height and a relatively long length. For example, if the wave has a longer length, the rider may be rider further from the back of the boat and may need more time to prepare to transition from one side of the wake to the other.

In some embodiments, the wake shaping system 100 can be configured to execute a predetermined sequence of wake shaping operations. The same predetermined sequence of wake shaping operations can be performed multiple times in order to provide a preset run for use during a wakesurfing competition. Also the same predetermined sequence of wake shaping operations can be performed multiple times in order to provide a consistent environment for a rider to learn or practice particular maneuvers or tricks. For example, when a rider is learning the maneuver of transitioning from one side of the wake to the other, the rider can have more success if the surf wake moves from one side to the other in the same manner each time the rider attempts the maneuver.

Figure 26:
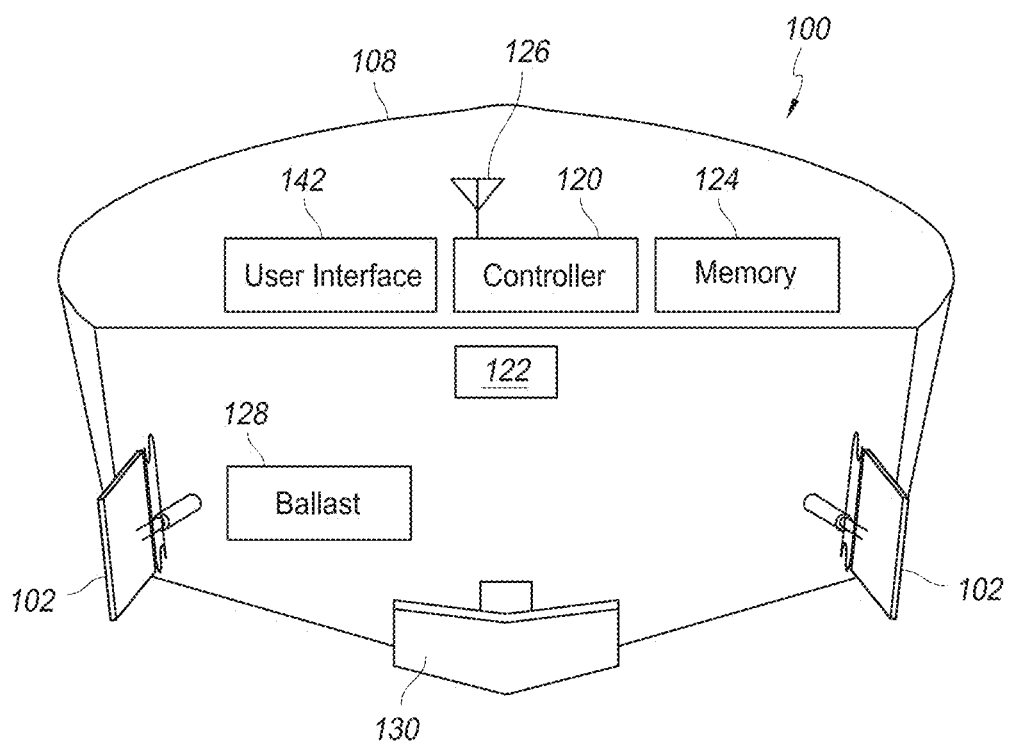
FIG. 26 shows an example embodiment of a boat with a wake shaping system.

With reference to FIG. 26, the wake shaping system 100 can include a memory 124 that stores one or more sets of wake shaping operations (e.g., as one or more preset runs). A user interface 142 (e.g., on the boat 108) can allow a user (e.g., a driver, a competition judge, etc.) to select a preset run to be delivered to the controller 120. The user interface 142 can also allow a user to adjust the parameters of a preset run or define new preset runs. For example, a set of wake shaping operations can include a first type of port-side surf wake for 30 seconds, then a second type of port-side surf wake for 14 seconds, then a transition from a port-side surf wake to a starboard-side surf wake lasting 2 seconds, then a first type of starboard-side surf wake for 30 seconds, and ending with a second type of starboard-side surf wake for 14 seconds. This example would provide a 1.5 minute long preset run that can be used to allow multiple riders to compete in a run that is dynamic and exciting to observe, while also being consistent across each execution of the run, thereby enabling an exciting and fair competing environment. Many variations are possible, and many types of preset runs can be used (e.g., stored in memory 124). The preset run can last for a relatively short time (e.g., about 5 to about 30 seconds) or for relatively long times (e.g., about 5 minutes to 30 minutes). The preset run can include two or more wake shaping operations, wherein the second wake shaping operation is to be performed at a later time than the first wake shaping operation. Additional wake shaping operations can be included and can be performed at times later than the first and second operations. For example, 5, 10, 20, or more wake shaping operations can be included in a single preset run. In some embodiments, the operations can be configured to effect gradual changes in the wake shaping features, and the effects of the different operations can overlap each other, in some instances. In some cases, the wake shaping operations can be distinct from each other, in that one operation is configured to create a wake type independent from the other operations of the preset run.

The controller 120 can receive instructions (e.g., from memory 124, from a user interface 142, or via a communication interface 126 from a remote device (e.g., a remote computer or mobile device such as a phone or tablet)) corresponding to the sequence of wake shaping operations, and the controller 120 can implement the wake shaping operations by adjusting one or more wake shaping features on the boat 108. Example wake shaping features include, by way of example, water diverters 102 (which can be configured to control which side of the wake is adapted for surfing and/or other surf wake properties), ballast tanks 128, boat speed, one or more wake-modifying devices 130 (e.g., the Power Wedge discussed above), one or more trim tabs (not shown in FIG. 26), etc. These wake shaping features can be used in various different combinations of settings to achieve surf wakes of various different types. In some embodiments, the controller 120 can receive instructions that specify the settings for the various wake shaping features that correspond to desired sequence of surf wakes, and the controller can implement the desired sequence of surf wakes by applying the specified settings to the various wake shaping features.

In some embodiments, the controller 120 can receive instructions that include a sequence of desired surf wake types (e.g., as mentioned in the example above). The controller 120 can be configured to determine what settings should be applied at what times to the various wake shaping features to achieve the specified sequence of surf wake types. In some embodiments, the controller 120 can consider factors specific to the boat 108 when determining how to implement the specified sequence of surf wake types. For example, controller 120 can consider the type of water diverters 102 (especially for systems that include interchangeable water diverters), the weight in the boat (dynamic ballast), the distribution of weight in the boat 108, the hull shape and/or boat model, the depth of the water, etc. (e.g., which information can be entered by a user via the user interface or can be received from sensors or from a remote source via the communication interface 126). Accordingly, a preset sequence of wake shaping operations can be consistently applied by different boats, or by the same boat at different times, by using a controller that is configured to determine the settings for implementing the desired surf wake types.

In some embodiments, the system 100 can include one or more rider notification elements 122, as discussed above. The rider notification element 122 can notify a rider of upcoming changes in the surf wake type, of a type of preset run, a score, etc. The rider notification element 122, or other features similar to thereto, can also be used provide information to observers of a wakesurfing competition, so that observers are informed of the dynamic setting of the competition.

Figure 27A:
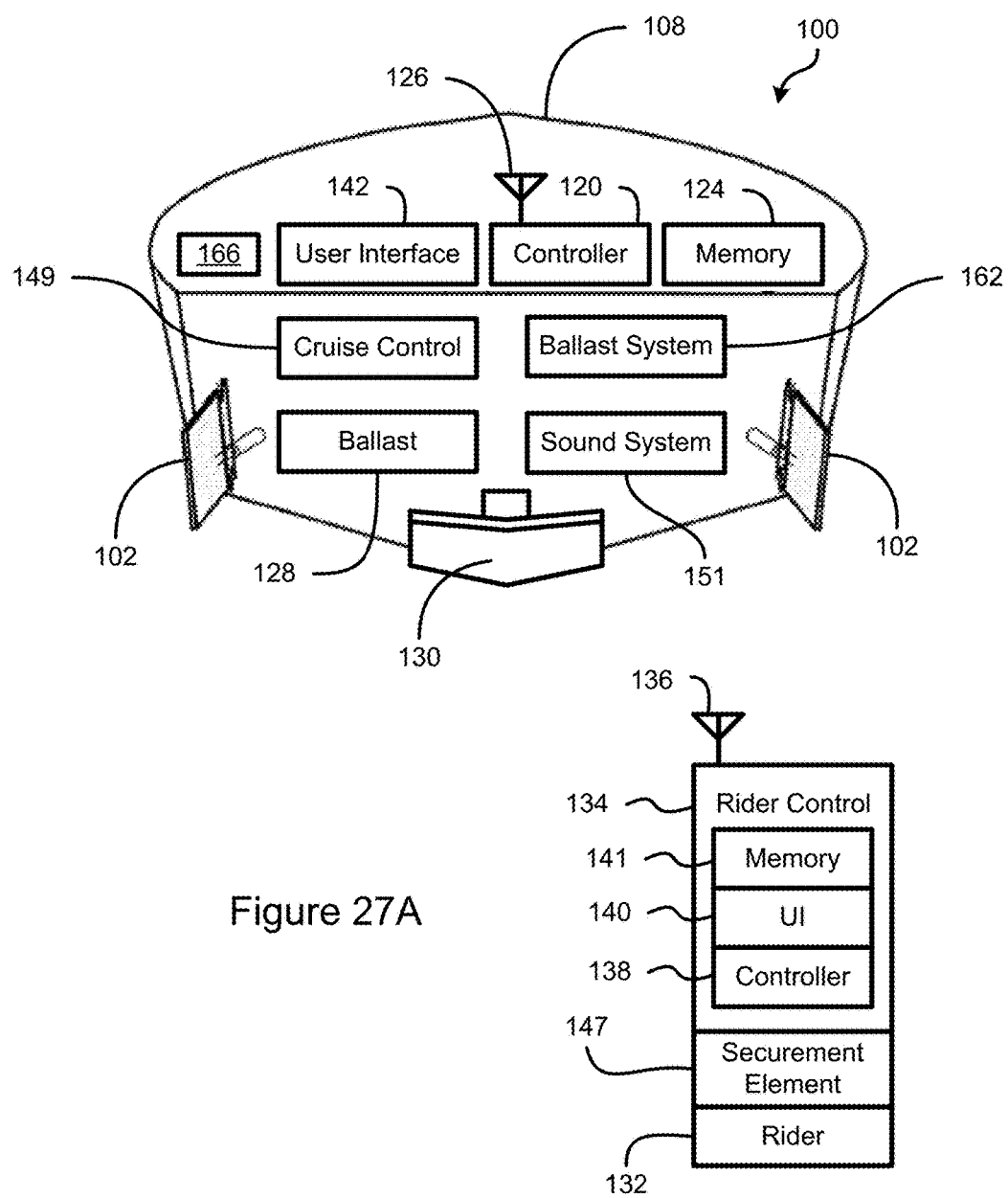
FIG. 27A shows an example embodiment of a wake shaping system that includes a rider control device.

With reference to FIG. 27A, in some embodiments, the wake shaping system 100 can be configured to allow a rider 132 to control the surf wake. For example, the controller 120 can be configured to receive instructions from a rider control device 134 via a communication interface 126. The system 100 can include a rider control device 134 that is configured to send instructions to the controller 120 via a communication interface 136. The communication interfaces 126 and 136 can communicate, for example, via a wireless communication link such as by Bluetooth, WiFi, or via other suitable communication protocol. The user control device 134 can include a user interface 140 configured to receive input from the rider 132. The user control device 134 can include a memory 141 that can store input from the rider 132 or various other information discussed herein. The rider control device 134 can include a controller 138 which can be configured to handle the transfer of data between the user interface 140, the memory 141, and the communication interface 136 of the rider control device 134. In some embodiments, the controller 138 can perform various determinations discussed herein. For example, various determinations that are discussed as being performed by the controller 120 can be performed instead by the controller 138 on the rider control device 134. Various determinations can also be made by an outside controller (e.g., on a remote computer or a mobile device such as a phone or tablet) and results of the determinations can be received by one or both of the communication interfaces 126 and 136.

In some embodiments, the rider control device 134 can be buoyant such that it floats in water (e.g., if it becomes separated from the rider 132). The rider control device 134 can be water resistant or waterproof. For example, the rider control device 134 can include a water resistant or waterproof housing. The rider control device 134 can be wearable device that is configured to worn on the rider's body, for example as an arm band, watch, necklace, hat, hood, life jacket, life vest, etc. The rider control device 134 can be a fob or a handheld device, in some embodiments. The rider control device 134 be attached to, or integrated into, a wake surfboard. The rider control device 134 can be attached to or integrated into a tow rope handle. Many other configurations are possible.

The rider control device 134 can be configured to allow a rider 132 to change settings of one or more of the wake shaping features on the boat 108, such as the water diverters 102 (which can be configured to control which side of the wake is adapted for surfing and/or other surf wake properties), one or more ballast tanks 128, boat speed, one or more wake-modifying devices 130 (e.g., the Power Wedge discussed above), one or more trim tabs (not shown in FIG. 26), etc. The settings can be adjusted individually, and the settings can also be adjusted together, e.g., by selecting a preset configuration. The user interface 140 can enable the rider 132 to input information, such as the rider's height, weight, and skill level, selection of a preset rider profile, board type or dimensions (e.g., length, volume, rocker, etc.), dynamic ballast information (e.g., amount of weight in boat 108 and distribution of weight in the boat 108), the type of water diverters 102 being used, etc. Various selections and operations that are discussed as being performed on the user interface 140 can be performed on the user interface 142 on the boat 108, and vice versa. For example, the rider 132 can select, modify, or define preset runs that can be stored in the memory 141 or in the memory 124. The rider control device 134 can allow a rider 132 to control various settings on the fly, while riding the surf wake. For example, a rider 132 may push a button (or otherwise provide input) corresponding to a maneuver that is associated with a particular surf wake type, and the system 100 can be configured to adjust the settings of the wake shaping features to achieve the desired surf wake type. The rider control device 134 can enable a rider 132 to input a command to change the surf wake from one side to the other, which can give the rider 132 better control over the wake surfing experience. For example when attempting a maneuver that involves transitioning from one side of the boat to the other, the rider 132 can send the command to change sides when the rider 132 is ready to perform the maneuver, instead of having to depend on input from a driver or other user which may come at a time when the rider 132 is not prepared to attempt the maneuver.

The rider control device 134 can include the rider notification elements 122 discussed herein. Accordingly the rider control device 134 can be used to receive input from the rider 132 and to output information to the rider 132, e.g., by sound or visually. For example the rider control device 134 can include a display (e.g., a touchscreen).

In some embodiments, the system can be configured to enable the driver to disable the rider control device 134. For example, if the driver wants to have control over the boat 108 independent of the rider commands (e.g., so that rider commands do not affect the boat steering), the diver can provide an input to the user interface 142 to disable the rider control device 134, or to ignore commands received therefrom. The user interface 142 on the boat 108 can be configured to receive a command (e.g., from the driver) to disable or ignore the rider control device 134. The controller 120 can be configured to disable or ignore the rider control device 134 in response to the command (e.g., from the driver).

In some embodiments, the user interface 142 on the boat 108 can be configured to provide a notification to the driver based on input received from the rider control device 134. For example, if a rider 132 sends a command to change the surf wake from one side to the other, a visual or audio notification can be issued to the driver via the user interface 142. This can alert the driver to adjust the steering of the boat 108 to compensate for the change in the water diverters 102. The system 100 can be configured to notify the driver of changes made by the rider 132 to settings on other wake shaping features as well, especially for changes that may affect the steering of the boat 108. In some embodiments, a visual driver notification can be displayed to the driver. For example, a heads-up-display (HUD) can display a visual driver notification, e.g., by projecting the visual driver notification onto the windshield of the boat 108. A visual driver notification can be displayed on the rear-view mirror. For example, the controller 120 can be in communication with the mirror, e.g., via a wire or a wireless (e.g., Bluetooth) data connection. Data can be sent to the mirror, and the visual notification can be displayed on the mirror. For example, the rear-view mirror can include one or more lights, or a display for displaying graphical or text information, etc. In some embodiments, one or more driver notification elements can be mounted onto the rear-view mirror. For example a driver notification module can include one or more driver notification elements (e.g., visual or audio notification elements), a communication interface (e.g., a wireless communication interface) that is configured to receive information from the controller 120, and a driver notification element controller that is configured to operate the one or more driver notification elements in response to data received from the controller 120 via the communication interface. The driver notification elements can operate similar to the rider notification elements 122 discussed herein.

Allowing the rider 132 to control the wake can be advantageous for certain competitive settings. For example, in a freestyle competition a competitor may have the freedom to select various different combinations of wake surf types, which can allow for unique and creative combinations of maneuvers and tricks (which can provide improved entertainment to observers of the competition). Thus, in a freestyle competition, the competitors can be scored partially on the creativity and dynamic nature of the run selected (or input on the fly) by the competitor. The increased freedom afforded by the user control device 134 can also improve the wakesurfing experience in casual and practice settings.

Figure 27B:
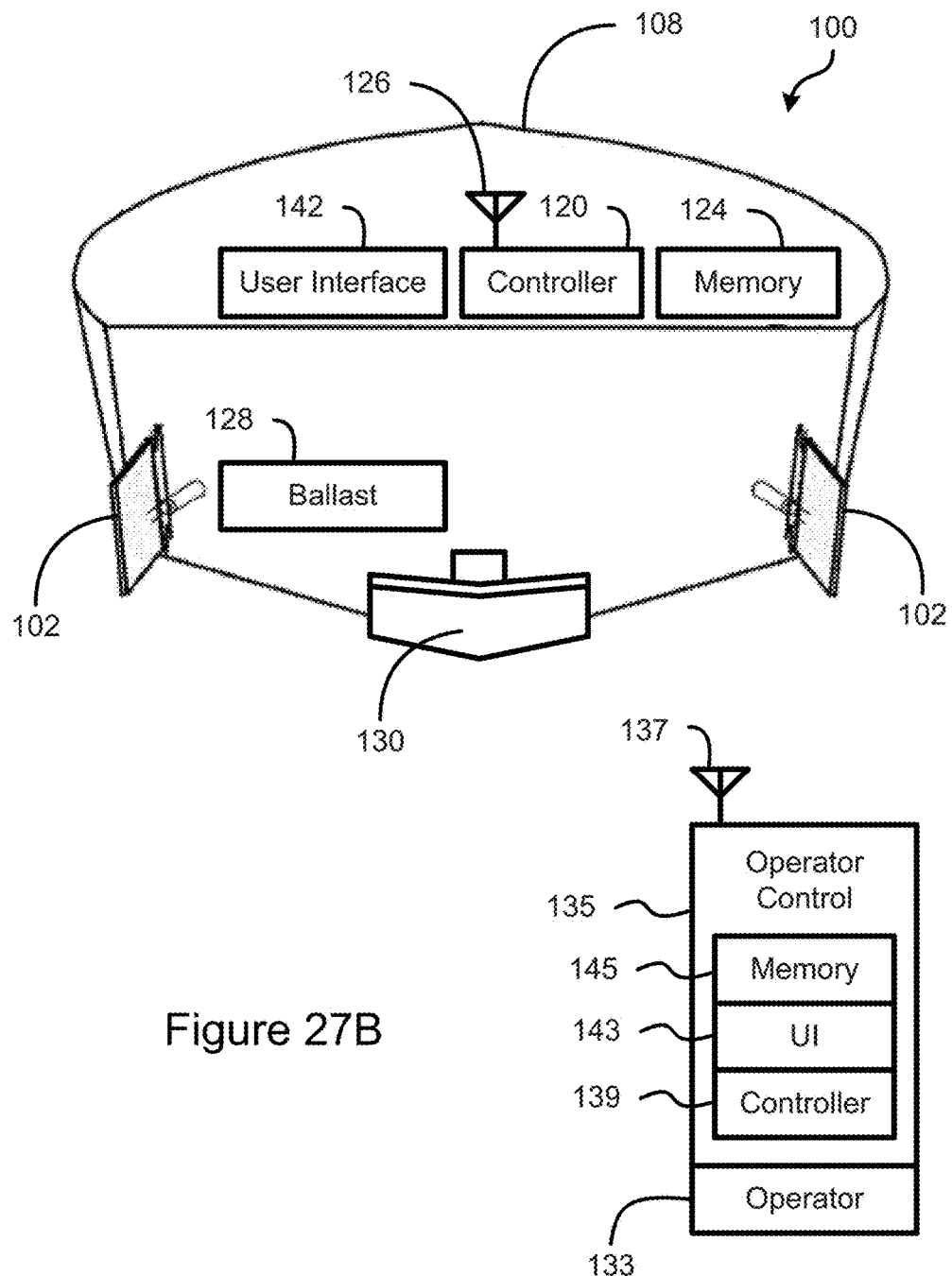
FIG. 27B shows an example embodiment of a wake shaping system that includes an operator control device.

With reference to FIG. 27B, in some embodiments, the wake shaping system 100 can be configured to allow an operator 133 to control the surf wake (e.g., the side, shape, steepness, length, size, etc. of the wake). In some embodiments, the operator 133 can be a person other than the driver and other than the rider, and in some embodiments the rider or driver can control the surf wake. For example, in some embodiments, a passenger in the boat 108, a judge or administrator of a competition, etc. can operate an operator control device 135 to control the surf wake. The operator control device 135 can allow for control of the wake shaping system 100 by someone inside the boat 108 or outside the boat 108. In some embodiments, a passenger in the boat 108 can use an operator control device 135 to modify the wake while the rider is wake surfing. In some cases, the passenger can watch the rider wake surf and can receive instructions from the rider (e.g., verbal or hand signals) and the passenger can adjust the wake based at least in part on the instructions from the rider. In some embodiments, operator control device 135 can include a memory 145, a user interface 143, a controller 139, and a communication interface 137. The operator control device 135 can operate similar to the rider control device 134 discussed herein, and many of the features discussed in connection with the rider control device 134 also apply to the operator control device 135. The operator control device 135 can be a handheld electronic device. In some embodiments, the operator control device 135 can water resistant or waterproof. The operator control device 135 can be a wearable article. The operator control device 135 can be incorporated into a floating article. In some embodiments, the operator control device 135 can be a device dedicated to the operation of the wake shaping system 100. In some embodiments, the operator control device 135 can be an electronic device that can perform additional functions unrelated to the wake shaping system 100. For example the operator control device can be a mobile computing device (e.g., a phone or tablet or laptop) running a program or app that enables the mobile computing device to control the wake shaping system 100. The operator control device 135 can be a hand-held remote. In some embodiments, the operator control device 135 can be attached to or built into the boat. For example, the operator control device 135 can be similar to the driver control systems described herein, except that the operator control device 135 can be positioned at a non-driver location on the boat (e.g., where a passenger would sit). For example, the operator control device 135 can be built into the boat or attached to the boat at or near the passenger side of the dash, at or near the transom (e.g., so the operator can face rearward towards the rider), or at other passenger locations on the boat. The operator control device 135 can include features similar to, or the same as, the input device 65, the user interface 142, or other user interfaces described herein. The operator control device 135 can include a display for providing information to the operator. The display can be a touchscreen, which can be configured to receive input from the operator. In some embodiments, the operator control device 135 does not include a display. The operator control device 135 can include a joystick. The operator control device 135 can communicate with the controller 120 via a wireless communication interface, or via one or more wires.

In some embodiments, when the operator control device 135 modifies the wake, the system 100 can issue a rider notification and/or a driver notification, as discussed herein.

Figure 29:
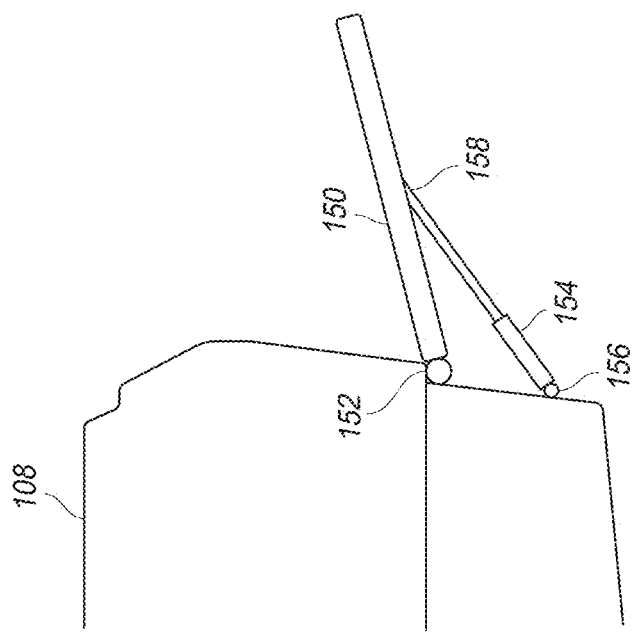
FIG. 29 shows the movable swim platform of FIG. 28 in a raised position.
Figure 28:
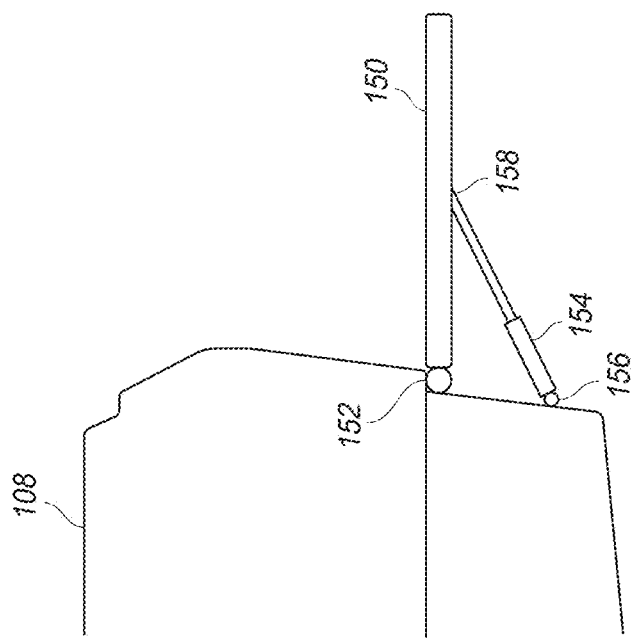
FIG. 28 shows an example embodiment of a boat having a movable swim platform.

With reference to FIGS. 28 and 29, in some embodiments, the swim platform 150 can be movable (e.g., pivotable) with respect to the boat 108, such that the swim platform 150 can be moved to a raised position to reduce the effect of the swim platform 150 on the wake. For example, the swim platform 150 can be coupled to the boat 108 (e.g., to the transom) by a joint 152 that enables the swim platform 150 to move between a neutral position (e.g., shown in FIG. 28) and a raised position (e.g., shown in FIG. 29). In some embodiments, an actuator 154 can be configured to move the swim platform between the neutral and raised positions. The actuator 154 can include an electric motor, a hydraulic motor, a pneumatic motor, or any other suitable mechanism for actuating the swim platform 150. In some embodiments, the actuator 154 can be coupled to the boat 108 (e.g., to the transom at a location below the swim platform 150) by a joint 156 that allows the actuator 154 to pivot with respect to the boat 108 (e.g., to accommodate a change in the position of the actuator 154 (e.g., the angle between the actuator 154 and the boat 108) as the swim platform 150 moves). Similarly, the actuator 154 can be coupled to the swim platform 150 (e.g., to the underside or edges thereof) by a joint 158 that allows the actuator 154 to move (e.g., pivot) with respect to the swim platform 150.

In some embodiments, the actuator 154 can be in communication with the controller 120 and can be configured to move the swim platform in response to instructions received from the controller 120. For example, a user can provide a command (e.g., via the user interface 140 or 142) to raise or lower the swim platform. In some embodiments, the swim platform 150 can automatically raise when the boat 108 goes above a predetermined speed (e.g., about 7 mph) and/or can automatically lower when the speed of the boat 108 goes below a predetermined speed (e.g., about 7 mph).

In some embodiments, the system 100 can be configured such that the swim platform 150 will not move (e.g., from the raised to neutral position and/or from the neutral to the raised position) when the boat speed is below a threshold value (e.g., about 5 mph). Also, in some embodiments, the system 100 can monitor the resistance on the actuator 154 as it moves the swim platform 150, and the controller 120 can stop (or reverse) movement of the swim platform 150 if the resistance goes above a threshold value. The threshold value can correspond to a force that is low enough that it would not injure a person's body portion (e.g., a child's leg) if it were to be caught by the swim platform 15, and that is high enough to move the swim platform 150 between the neutral and raised positions. For example, the threshold value can correspond to a force between about 3 lbs. and about 200 lbs., between about 5 lbs. and about 100 lbs., between about 10 lbs. and about 50 lbs., between about 20 lbs. and about 40 lbs., or between about 25 lbs. and about 35 lbs., although values outside these ranges can used. The system can be configured to monitor a signal (e.g., power, amperage, etc.) provided to the actuator 154 to determine whether stop (or reverse) movement of the swim platform 150. For example, the threshold value can be between about 3 amps and about 12 amps, between about 4 amps and about 10 amps, between about 6 amps and about 8 amps, or about 6.5 amps, although the threshold value can be outside these ranges in some embodiments. Similarly, in some embodiments, system 100 can be configured such that the water diverters 102 will not move (e.g., from the neutral position to the deployed position and/or from the deployed position to the neutral position) when the boat speed is below a threshold value (e.g., about 5 mph). Also, in some embodiments, the system 100 can monitor the resistance on the one or more actuators 104 as they move the water diverter(s) 102, and the controller 120 can stop (or reverse) movement of the water diverter(s) 102 if the resistance goes above a threshold value. The threshold value can correspond to a force that is low enough that it would not injure a person's body portion (e.g., a child's leg) if it were to be caught by the water diverter 102, and that is high enough to move the water diverter 102 between positions. For example, the threshold value can correspond to a force between about 3 lbs. and about 200 lbs., between about 5 lbs. and about 100 lbs., between about 10 lbs. and about 50 lbs., between about 20 lbs. and about 40 lbs., or between about 25 lbs. and about 35 lbs., although values outside these ranges can used. The system can be configured to monitor a signal (e.g., power, amperage, etc.) provided to the actuator 104 to determine whether stop (or reverse) movement of the water diverter 102. For example, the threshold value can be between about 3 amps and about 12 amps, between about 4 amps and about 10 amps, between about 6 amps and about 8 amps, or about 6.5 amps, although the threshold value can be outside these ranges in some embodiments.

With reference again to FIGS. 28 and 29, in some embodiments, the swim step 150 can be manually movable between the neutral and raised positions. For example a locking mechanism can be include (e.g., on the joint 152) that is configured to lock the swim platform 150 in the neutral and/or raised positions. A release mechanism (e.g., on the joint 152) can enable a user to release the swim platform 150 from the locked state so that it can be moved. In some embodiments, the locking mechanism and release mechanism can be incorporate together as a single mechanism (e.g., on the joint 152). In some embodiments, the swim platform 150 can be positioned (e.g., locked) at one or more of intermediate positions (or can be infinitely positionable between the raised and neutral positions), either by the actuator 154 or by the locking and release mechanism(s). In some embodiments, a spring or shock can be used to facilitate movement of the swim platform 150 between positions.

In some embodiments, the swim platform 150 can be configured to redirect water to improve wake shape. For example, in some embodiments, instead of raising the swim platform 150 to reduce its effect on the wake (as discussed in connection with FIGS. 28 and 29), a water redirecting mechanism (not shown) can be coupled to the swim platform 150 (e.g., on the underside thereof) or can be positioned under the swim platform 150 (e.g., coupled to the boat 108). The water redirecting mechanism can be configured to redirect water (e.g., water that would otherwise hit the swim platform 150) into the wake produced by the boat 108, thereby improving wake shape and/or size.

In some embodiments, the user interface 140 or 142 can be configured to display fuel efficiency information. Some wake shaping features can cause reduced fuel efficiency when used. Accordingly, the system 100 can provide the user with information to enable to the user to decide whether to disable features that reduce fuel efficiency, or to adjust those features to a setting that provides acceptable fuel efficiency. In some embodiments, the controller 120 can be configured to consider fuel efficiency when adjusting the wake shaping features to achieve a specified wake type. In some embodiments, the user interface 142 can allow a user to specify a priority level for fuel efficiency. For example if the priority level is set to a low value, the controller 120 can give low priority to improving fuel efficiency, and if a high priority level is specified by the user the controller 120 can give higher priority to improving fuel efficiency.

In some embodiments, the user interface 140 or 142 can be configured to receive input from a user for feedback regarding wake quality. For example, a user can specify a quality value for the wake created by the boat 108 under its current settings. The controller 120 store the user feedback (e.g., in memory 124) and can take the user's prior feedback into account when determining the settings to use for the wake shaping features. Thus, the controller 120 can be configured to "learn" a user's preferences and use those preferences to improve wake shape (e.g., for a particular rider).

In some embodiments, the user interface 142 can include a joystick configured to receive input (e.g., from the driver) for controlling the wake shaping features. The joystick can allow for various buttons or other user input elements to be readily available to a user's hand. Thus, if the joystick is configured to steer the boat 108 (e.g., in some embodiments, no steering wheel is used), the wake shaping input controls can be readily available to the driver's hand even while the drier operates the steering mechanism (e.g., joystick). Also a joystick can have improved water resistance and/or improved resilience as compared to some user input devices (e.g., a touchscreen). The wake shaping system 100 disclosed herein includes various features applicable to improving the shape of a wake (e.g., for wake surfing). Various wake shaping features described herein can operate in concert to achieve various different wake types. The wake shaping system 100 can provide a wide range of user freedom and control to achieve optimal wake shape and size for a wide variety of uses.

Figure 30:
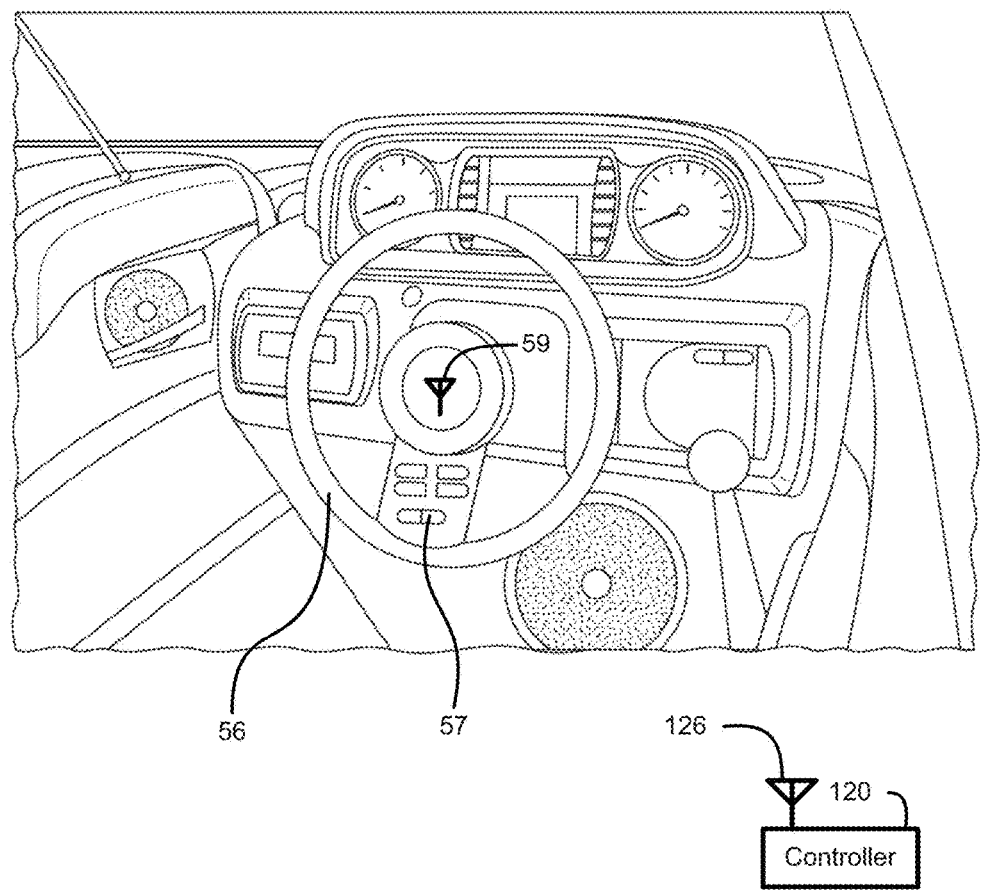
FIG. 30 shows an example embodiment of a steering wheel with wake control input elements incorporated therein to facilitate control of the wake by a driver.

With reference to FIG. 30, in some embodiments, the steering wheel 56 can include user input elements 57 to allow a driver to control the wake shaping features. The user input elements 57 can include features similar to the other embodiments discussed herein. The user input elements 57 can include buttons (or other features) that allow a user to select a right-side surf wake, a left-side surf wake, an amount of ballast, settings for other wake-modifying devices (e.g., a power wedge), etc. In some embodiments, the user input elements 57 can allow the driver to select a wave type and the controller can adjust the wake shaping features to achieve the specified wake type. In some embodiments, the user input elements 57 can be coupled to the controller 120 via a wire. In some embodiments, the user input elements 57 can be coupled to the controller 120 via a wireless communication interface 59 (e.g., Bluetooth), which can be advantageous in some instances.

The wake shaping system 100 can allow a user (e.g., a driver, rider, or other operator) to select a wake type. For example, the user can select a right-side surf wake or a left-side surf wake. Different wake shapes can be optimal for different types of wake surfing and for different types of tricks and maneuvers. For example, in some cases a rider using a skimmer wake surfboard may want a wake that has a relatively consistent, linear slope, while a rider using a conventional wake surfboard may want a wake that has a relatively curved shape that is steep near the top of the wave. Also, a rider may have particular preferences regarding the height and length of the wave, and various other wave features.

Figure 31:
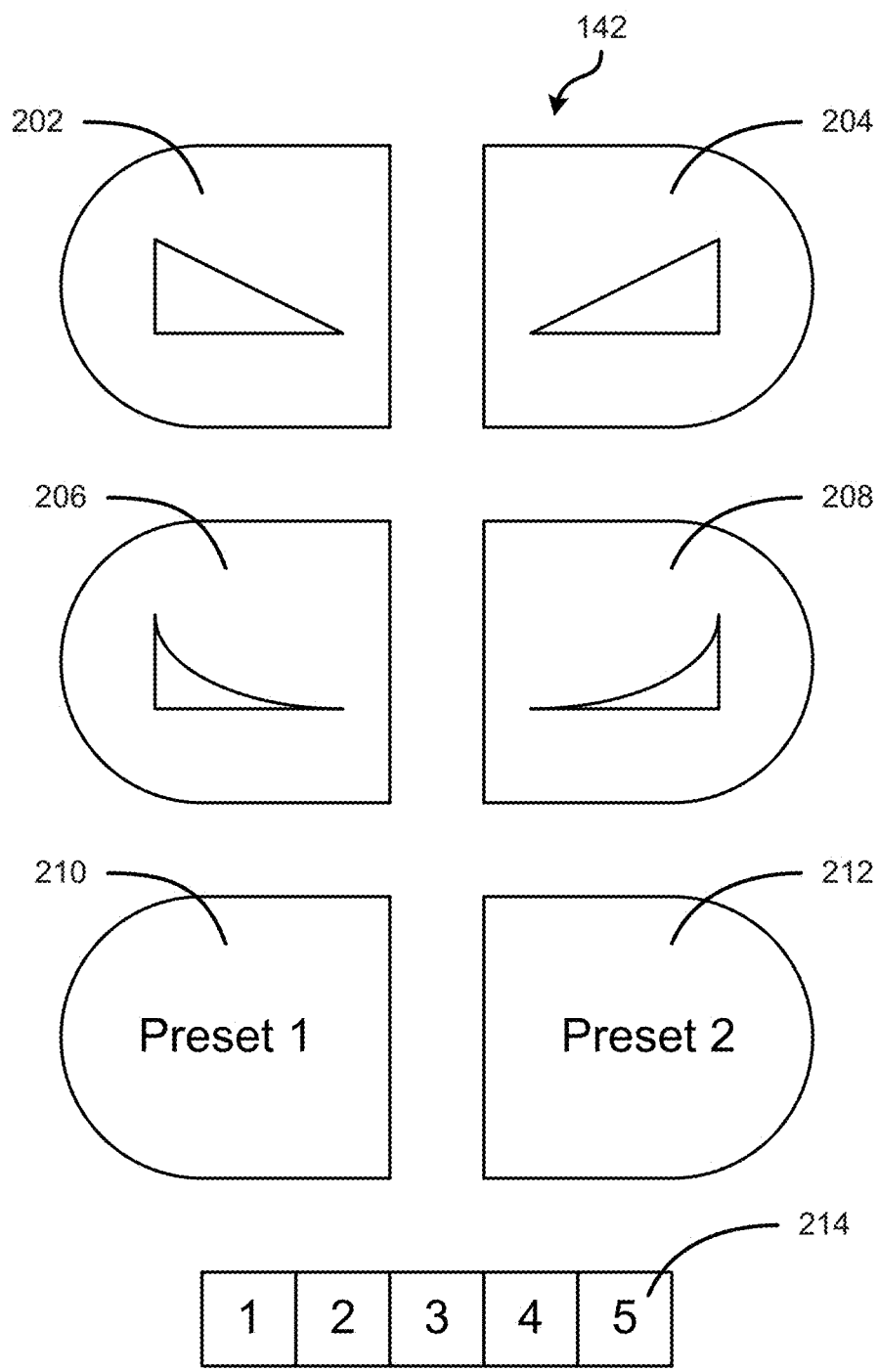
FIG. 31 shows an example embodiment of a user interface for selecting different types of surf wakes.
Figure 32:
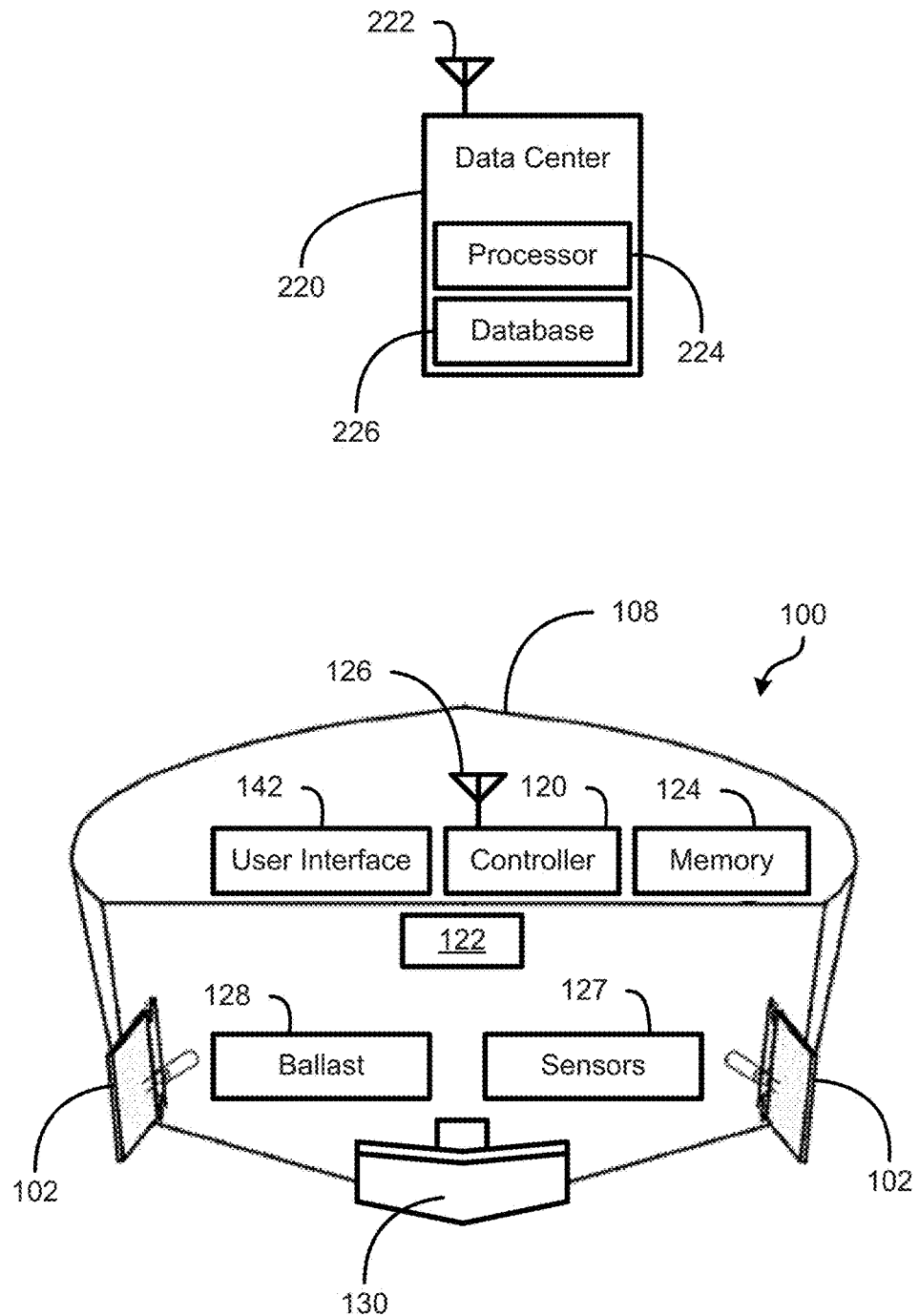
FIG. 32 shows an example embodiment of a boat and a data center that can send and receive data from the boat.

FIG. 31 shows an example user interface 142 for selecting a wake type. FIG. 32 shows a wake shaping system incorporating the user interface 142. In the illustrated example, the user interface 142 can include a button 202 that corresponds to a relatively linear left-side surf wake, a button 204 that corresponds to a relatively linear right-side surf wake, a button 206 that corresponds to a relatively curved left-side surf wake, and a button 208 that corresponds to a relatively curved right-side surf wake. Additional buttons can be included for selecting other wake types or other wake features (e.g., wake height, length, etc.). The user interface 142 can include additional buttons 210 and 212 for user specified preset wake types. The user interface 142 can include user input elements (e.g., buttons) that allow a user to adjust one or more aspects (e.g., wake height, length, steepness, etc.) of the wake. For example, a user can select a default wake type (e.g., by selecting one of buttons 202-208), and the user can push a button to adjust the wake to differ from the default wake. For example, the user can press buttons to selectively increase or decrease the height of the wake, to selectively increase or decrease the length of the wake, or to selectively increase or decrease the steepness of the wake. In some cases, the user input elements can allow for both micro adjustments and macro adjustments. The user interface 124 can permit a user to store the adjusted settings (e.g., in the memory 124) for later use (e.g., as a new present wake that can be selected by buttons 210 or 212).

The controller 120 can be configured to adjust multiple wake shaping features (e.g., water diverters 102, wedge 130, and/or ballast 128, etc.) based on the selection of a single wake-type button. For example, if the user pushes button 206, which corresponds to a relatively curved left-side surf wake, the controller 120 can deploy the right-side water diverter 102 to create a left-side surf wake, and the controller can deploy the wedge 130 to a position that creates a relatively curved wave shape. If the user pushes button 204, which corresponds to a relatively linear right-side surf wake, the controller 120 can deploy the left-side water diverter 102 to create a right-side surf wake, and the controller can move the wedge 130 to a position that creates a relatively linear wave shape. The wedge 130 can pull the back of the boat down into the water when the wedge 130 is in a deployed position, which can produce a relatively taller and steeper wake shape. When the wedge 130 is in a neutral position, the boat can produce a wake that is less tall and less steep than the wake produced with the wedge 130 deployed. In some cases, positioning the wedge in the neutral position can produce a longer surf wake with a surfable area that extends further from the back of the boat than the wake produced with the wedge 130 deployed. The controller 120 can also adjust the ballast 128, as well as other wave shaping features such as trim tabs, boat speed, positions of the water diverters, etc. to produce the selected wake type.

In some embodiments, the controller 120 can be configured to set the boat speed, or to present a recommended boat speed. In some case, a faster boat speed can cause the surfable area on the wake to lengthen behind the boat, which can be advantageous for certain tricks and maneuvers. However, a faster boat speed can also reduce the height of the wake. A slower boat speed (that is still sufficiently fast enough to create a surf wake) can produce a taller wave that has a shorter surfable length behind the boat. In some embodiments, the controller 120 can set the boat speed, upon the selection of the wake type. In some embodiments, the controller 120 can determine a recommended boat speed and can communicate (e.g., via a visual display or an audio speaker) the recommended boat speed to the driver. In some embodiments, the amount or distribution of the ballast can be changed by the controller 120 in response to a user selection of a wave type. The ballast (e.g., water held in containers in the boat) can be automatically moved from one side of the boat (e.g., right side) to the other side of the boat (e.g., left side) based on a selection that changes the surf wake from one side to the other. The amount of ballast can be increased (e.g., to increase the size of the surf wake) or reduced (e.g., to reduce the size of the surf wake) in response to a user selection of a wake type. The distribution of the ballast can be changed by the controller 120 based on a user selection of a wake type. For example, more ballast in the back of the boat can result in a wake that has a taller wave height and/or a shorter surfable area behind the boat. More ballast in the front of the boat can result in a wake that has a shorter wave height and/or a longer surfable area behind the boat. Thus in response to a user selection of a wake type, the controller 120 can automatically move ballast in the boat from the front to the rear or from the rear to the front of the boat. In some embodiments, one or more trim tabs can be used, and the controller 120 can automatically move the one or more trim tabs in response to a user selection of a wake type. For example, one or more trim tabs in a deployed position can raise the back of the boat, which can result in a surf wake with a shorter wave height and/or a longer surfable area behind the boat. Setting the one or more trim tabs to a neutral position can produce a surf wake with a taller wave height and/or a shorter surfable area behind the boat. Those of skill in the art will understand based on the disclosure herein that various different combinations of settings for the different wake shaping features can be used to produce a variety of different wake shapes.

In some embodiments, the water diverters 102 can be adjustable. For example, the water diverters 102 can be positioned at intermediate positions between the fully retracted and the fully deployed positions. In some embodiments, the water diverters 102 can be movable in other directions in addition to the movement between the retracted and deployed positions. For example, in some cases the water diverters can be raised and lowered. If a large about of weight is on the boat 108 (e.g., as ballast 128, or passengers, or equipment), the water diverters 102 can be raised to compensate for the boat riding lower in the water. In some embodiments, the water diverters can be movable forward (towards the bow), rearward, and/or from side to side (e.g., towards the starboard or port sides of the boat 108. The positions of the water diverters 102 can be changed by the controller 120 based on other parameters, such as boat speed, etc. Various mechanisms can be used to move the water diverters 102 (e.g., rails, slides, hydraulic actuators, etc.)

In some embodiments, the controller can consider both static variables (such as the type of boat) and dynamic variables (such as the depth of the water, the number of passengers on board, etc.) when setting the wake shaping features to achieve a specified wake type. Because the dynamic variables can have different values at different times, the controller can be configured to adjust the wake shaping features differently at different times even when trying to achieve the same wake type. For example, the controller 120 may use less ballast 128 when more passengers are on the boat 108. In some embodiments, the controller 120 can be configured to adjust the wake shaping features on the fly, while the boat is moving, for example, to try and keep the wake consistent when dynamic variables change. For example, if the depth of water under the boat changes, the shape of the wake can also change, and the controller can be configured to adjust the wake shaping features to compensate for the change in water depth to minimize the change in shape in the wake. In some embodiments, the system 100 can include one or more sensors 127 to measure dynamic variables. For example, a water depth sensor can be included. A boat speed sensor can be included, especially where the user is permitted to adjust the speed of the boat. The boat can include weight sensors for determining how much passenger weight is on the boat and/or the distribution of the passenger weight. Weight sensors can be located in the seats and/or in the floor of the boat 108. In some embodiments, the user interface 142 can be configured to receive input from the user regarding at least some of the dynamic variables. For example the user interface 142 can allow a user to specify a number of passengers on the boat and/or the distribution of the passengers on the boat 108.

The user interface 142 shown in FIG. 31 includes a wake quality input element 214, which can allow a user to grade the quality of the wake produced by the boat 108. For example, if the user pushes button 204, which corresponds to a relatively linear right-side surf wake, but the user observes that the produced wake is more curved than desired, the user can give the wake a low score (e.g., by pushing a button for a lower number such as 1 or 2). On the other hand, if the user observes that the current settings produce a wake that conforms well to the specified wake shape, the user can give the wake a high score (e.g., by pushing a button for a higher score such as a 4 or 5). The user interface 142 can include user input elements that are configured to permit the user to provide quality feedback regarding a particular aspect of the wake. For example, the user can select a button corresponding to wake height and can make a selection that indicates the height of the wake. The system can use the collected data to improve the wake and to "learn" the preferences of the rider. In some cases, the memory 124 can store different settings for different riders, to account for the individual rider preferences. The user interface 142 can allow the user to identify the rider.

In some embodiments, settings and/or algorithms for particular wake shapes can be downloaded to the memory 124 of the wake shaping system 100, e.g., from a remote source such as a data center 220. The data center 220 can include a processor 224 and a database 226 that includes settings and/or algorithms for various wake types. The algorithms can specify how the settings should change as a result of changes in the dynamic variables. The data center 220 can communicate with the wake shaping system 100 via a communication interface 222 associated with the data center and the communication interface 126 on the boat 108. For example, a wireless communication link can be established between the data center 220 and the boat 108, so that data can be downloaded to the memory 124 in the boat 108 from the database 226 of the data center 220. In some embodiments, updates can be released for the settings and/or algorithms for the types of wakes, and the updates can be downloaded to the boat memory 124 from the data center 220. In some embodiments, data can be transferred from the boat memory 124 to the data center 220. For example, a user can upload personalized settings to the data center 220 for storage, and the personalized settings can later be downloaded to a different boat. Thus, the user can have personal settings saved independent of the specific boat that was used to develop the personalized settings. Thus if the user is on a different boat (e.g., during a competition or when traveling), the user can still access the personalized settings that were stored in the data center. In some embodiments, the data center 220 can allow a user to download settings and/or algorithms that were uploaded and/or developed by other users. For example, the data center can allow a user to download the same settings and/or algorithms used by a professional wake surfer, by the user's friend, etc. In some embodiments, the data center 220 can allow the users to score, grade, or rank the settings and/or algorithms of others, and the data center 220 can communicate the scores, grades, or ranks to others. The data center 220 and/or the interface 142 can permit a user to search for settings for a particular wake type. Thus, a user searching for settings and/or an algorithm for producing a particular type of wave can identify settings and/or algorithms for that wake type that were well received by other users. In some embodiments, the processor 224 can be configured to perform statistical analysis on the data uploaded by the users. The statistical analysis can be used to generate additional settings and/or algorithms. In some embodiments, a mobile device (e.g., a cell phone or tablet computer) can include the interface 142 (e.g., as part of a mobile device program or app). The mobile device can communicate with the data center 220 as discussed above. In some embodiments, the mobile device can communicate (e.g., via a wired or wireless communication interface) with the boat controller 120. Thus, a user can use the mobile device to control the wake, and some or all the functions described in connection with the controller 120 can be performed by the mobile device. The user can use the mobile device to send data to, or receive data, from the data center 220, as discussed herein. In some embodiments, the boat can include a wireless communication interface 126, which can communicate with the data center 220 via a wireless network when a user parks the boat in a garage or at another location that is accessible to the wireless network. In some embodiments, the wireless communication interface 126 on the boat can communicate with the data center 220 when the boat is in use (e.g., on a lake).

A wake surfing competition can be operated in various different manners, and can include various different features. Various features and ideas that can be incorporated into a wake surfing competition are discussed below. Riders can receive scores based on one or more of power, flow, and variety of tricks. In some embodiments, a rider's run can end after a set amount of time or after a set number of falls, or the sooner of the two. In some embodiments, there is no penalty for falling (other than loss of time), thereby providing an incentive to attempt innovative and difficult tricks. In some embodiments, a rider can receive scores for each trick performed during a run, and the overall score for the run and be based at least in part on a set number of one or more top trick scores. For example, the total score for a run can be based at least in part on the sum of the top two or three trick scores. This can create an incentive for riders to perform difficult and innovative tricks during the run, as opposed to a large number of relatively easy maneuvers. In some embodiments, scores can be given for a group of tricks that are strung together, as opposed to each individual trick. In some embodiments, the run can be divided into sections, for example, a pre-set run may have a first section on the right side, a second section on the left side, a third section on the right side, and a fourth section on the left side. Each section of the run can receive a score, and the overall score for the run can be based on a set number of one or more top section scores.

In some embodiments, scores can be provided to the rider while the rider is performing the run. This real-time scoring can allow the rider to adjust strategy during the run based on the scores received. The rider notification elements 122 discussed herein can be used to provide scores to the rider. The scores can be provided visually (e.g., on a display) and/or audibly (e.g., from an audio speaker). The scores can be provided to spectators during the run as well, which can heighten spectator enjoyment. One or more video cameras can be mounted onto the boat 108 or can be held by one or more camera operators on the boat 108. The video data can be transmitted during the run (e.g., via a wireless signal from the communication interface 126), so that the video can be viewed live by judges, other competitors, and/or by spectators. In some embodiments, multiple competitors can be on the same boat 108, so that the competitor can rotate through runs quickly. In some embodiments, one or more judges, coaches, or spectators can be on the boat 108 during the competition.

In some embodiments, a rider can start a run by using a tow rope, and the user can use the tow rope to gain extra speed for performing an initial trick or maneuver. The rider can drop the tow rope and perform the remainder of the run without the tow rope. In some embodiments, the rider can receive a separate score for the initial trick or maneuver that was performed with the initial boost in speed. In some embodiments, tricks and maneuvers performed while transitioning from a right-side surf wake to a left-side surf wake (or vice versa) can be scored differently than maneuvers and tricks that are performed when the surf wake is not in transition. In some cases, the contest can include an award for the best transfer from one side to the other. The contest can also include awards for the best single trick, the best air, the best trick performed with a speed boost from the tow rope, etc. The contest can also include an overall winner based on the aggregate of several scores.

In some embodiments, the run can include obstacles, ramps, or other physical structures that the rider can incorporate into the tricks and maneuvers. In some embodiments, the run can pass over different areas that have different water depths in order to vary the shape of the wake. In some embodiments, a rider can ride the surf wake formed behind a first boat, and a second boat can produce a wake that interacts with and modifies the surf wake of the first boat. In some embodiments, the wakes from the two boats can interfere with each other to increase the size of the surf wake produced by the first boat. In some embodiments, the two boats can travel in the same direction so that the wake can maintain an increased size. In some embodiments, the boats can travel in different directions so that the two wakes interact only temporarily, e.g., creating a temporary water ramp. The rider can try to time one or more tricks to take advantage of the temporarily modified wake shape.

In some embodiments, multiple riders can perform runs without stopping the boat. For example, jet skis can be used to tow the riders into the wake at the start of a run. Jet skis can also pick up riders when they fall. In some embodiments, a rider's run ends when the rider falls, so that the boat does not need to stop to pick up the fallen rider and so that the next rider can start a run. For example, when a rider falls, a jet ski can tow the next rider into the wake to start the next run.

In some embodiments, the runs can be short and the runs can be performed in an area that is visible to spectators. This can increase spectator enjoyment of the competition. For example, the distance of the runs can be less than or equal to about 200 meters, less than or equal to about 100 meters, less than or equal to about 50 meters, less than or equal to about 25 meters, or less. The distance of the runs can be at least about 10 meters, at least about 20 meters, at least about 30 meters, at least about 50 meters, or more. For example, runs that cover a distance of about 50 meters can last for about 15 seconds each. The competition can include a large number of runs preformed in rapid secession. In some embodiments, multiple boats can be used. While one boat is performing a run, another boat can be preparing to start a run. In some embodiments, a queue of boats (e.g., 3, 4, 5, or more) can be used to reduce time between runs. When a boat finishes a run, it can travel back to the starting side and can enter the back of the queue. In some embodiments, boats can travel in two directions across the course. For example, two boats can be positioned at opposing ends of the course. A first boat can perform a run and travel across the course in a first direction. After the first boat performs a run, the second boat and perform a run and travel across the course in a second, generally opposite direction. While one boat is performing a run, the other boat can turn around and prepare for its next run.

In some embodiments, the riders can perform the same preset run, as discussed herein, which can provide a consistent environment for the competition. The preset run can be selected or created by the rider, the driver, an operator, a judge, one or more spectators, etc. In some instances, a group of people (e.g., riders, judges, spectators) can vote in order to select a preset run that will be used by multiple riders. In some embodiments, riders that are regular-footed (left-foot-forward) can use a first preset run that includes a plurality of wake shape changes and/or a plurality of transitions from one side to the other. Riders that are goofy-footed (right-foot-forward) can use a second preset run that includes the same wake shape changes and transitions except that the sides are reversed. For example, a first preset run (for regular-footed riders) can start with a left-side surf wake and can transition to a right-side surf wake, while the second preset run (for goofy-footed riders) can start with a right-side surf wake and can transition to a left-side surf wake. Thus both regular-footed and goofy-footed riders would ride frontside (front of the rider facing the surf wake) for the same portions of the run, and they would also ride backside (back of the rider facing the surf wake) for the same portions of the run. In some embodiments, the rider can have control over the wake shaping operations (e.g., using the rider control device 134), which can allow for more freedom and creativity during the competition because the rider can choose when to transition from one side to the other and the rider can modify the wake shape to optimize the maneuvers that the rider wants to perform.

In some embodiments, an operator on the boat can control the wake (e.g., using operator control 135). The rider can give instructions (e.g., verbally or using hand signals) to the operator. In some cases, the operator can be a coach or a colleague associated with the rider. In some cases, the operator can also be the driver of the boat. The operator and rider can practice together to coordinate wake shape changes and wake side transitions with particular tricks and maneuvers. Thus, the competition can involve not only the skill of the riders, but also the skill of the operators in timing the wake shape changes and wake side transitions. For example, a rider can instruct the operator that the rider intends to perform a particular trick that involves a modification of the wake (e.g., a transition from a left-side surf wake to a right-side surf wake). The rider can begin to perform the maneuver, and the operator can issue a command (e.g., using the user interface 143) at a particular time during the maneuver (e.g., based on prior practice performed by the rider and operator).

Figure 33:
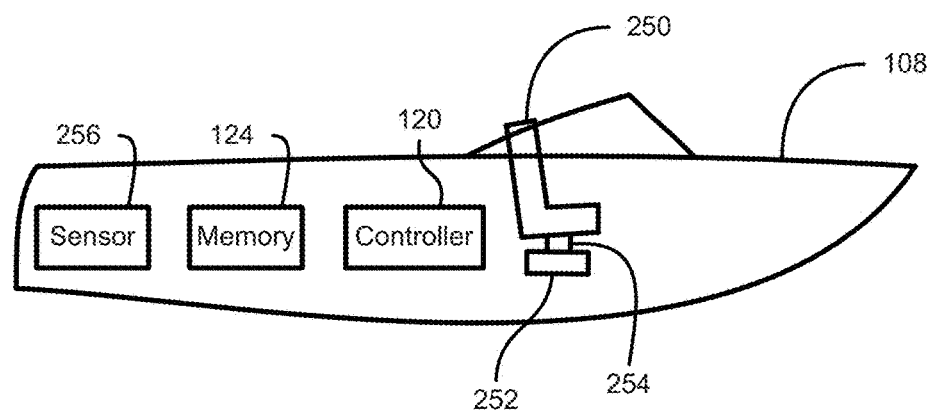
FIG. 33 shows a boat in a relatively level orientation with a chair at a first position.
Figure 34:
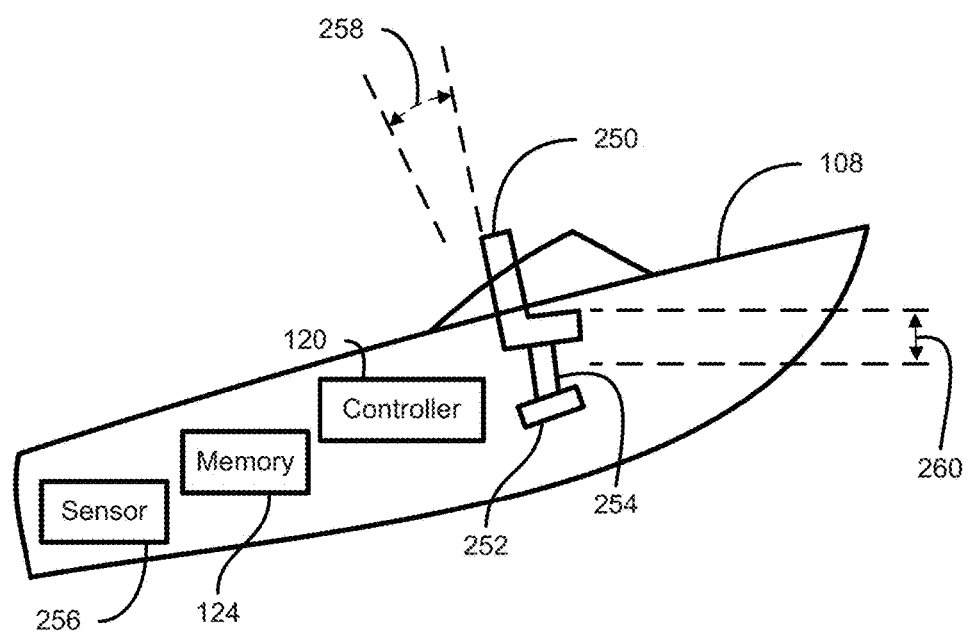
FIG. 34 shows a boat with the bow lifted upward and the chair in a second position.

With reference to FIGS. 33 and 34, the boat 108 can include a chair 250 that is movable to help the driver see over the bow of the boat 108 (e.g., when the bow is raised). In some situations, the bow of the boat 108 can lift upward. For example, when the boat 108 starts moving or accelerates the bow of the boat 108 can lift upward. In some cases, the bow of the boat 108 can remain raised until the boat 108 reaches a speed that causes the hull to plane. When the bow of the boat 108 is raised, the stern of the boat 108 can be lowered deeper into the water, which can increase the size of the wake produced by the boat 108. Accordingly, the driver can drive the boat 108 at a speed that keeps the stern deep in the water, which can also keep the bow lifted upward. In some embodiments, the boat 108 can include one or more wake-modifying devices (e.g., the Power Wedge 130 discussed herein) that are configured to pull the stern of the boat 108 downward, which can raise the bow of the boat 108. FIG. 33 shows the boat 108 in a relatively level position. FIG. 34 shows the boat 108 in a position with the bow lifted upward. The lifted bow can obstruct the visibility of a driver that is seated in the driver's seat 250. The driver can stand to see over the raised bow, but standing can be uncomfortable for the driver, and can make it more difficult for the driver to operate the controls of the boat 108, which may be designed to be accessible to a seated driver.

The boat 108 can include a chair 250 that is movable to help the driver see over the raised bow. The chair 250 can have a first (e.g., neutral) position, as shown in FIG. 33, and the chair 250 can have a second (e.g., raised and/or forward) position, as shown in FIG. 34. In some embodiments, the chair 250 can be positioned higher in the second position than in the first position. The distance 260 between the first position of the chair 250 and the second position of the chair 250 can be at least about 10 cm, at least about 20 cm, at least about 30 cm, at least about 40 cm, at least about 50 cm, at least about 60 cm, or more. The distance can be less than or equal to about 100 cm, less than or equal to about 75 cm, less than or equal to about 50 cm, or less. In some embodiments, the chair 250 can be raised higher than the ranges provided above. In some embodiments, the chair 250 can angle forward when it moves from the first position to the second position. The angle 258 between the first position and the second position can be at least about 2°, at least about 5°, at least about 10°, at least about 15°, at least about 20°, or more. The angle 258 can be less than or equal to 45°, less than or equal to 30°, less than or equal to 20°, less than or equal to 15°, or less. The chair 250 can be angled forward by an amount outside the ranges provided below, in some embodiments.

One or more actuators 254 can be coupled to the chair 250 can be configured to move the chair 250 between the first and second positions. In some embodiments, the actuators 254 can be configured to position the chair 250 at intermediate positions between the first and second positions. The actuators 254 can include one or more hydraulic and/or pneumatic actuators, rails and slides, electric motors, etc. In some embodiments, multiple actuators 254 can be used to enable the chair 250 to move in multiple degrees of motion. For example, chair 25 can be raised and lowered, rotated forward and rearward, slide forward and rearward, etc. A seat portion of the chair 250 and a back portion of the chair 250 can move together, independently, and/or relative to each other. In some embodiments, a base member 252 can couple the chair 250 to the boat 108.

In some embodiments, the chair 250 can include manual controls configured to permit a user to set the position of the chair 250. Accordingly, a user can manually adjust chair to the second position when the bow is raised. For example, buttons, dials, or other user control elements can be provided (e.g., on the chair 250 or on a control panel), and the user can actuate the user control elements to move the chair 250. The user control elements can include a first button, and the controller 120 can move the chair 250 to the first (e.g., neutral) position in response to user selection of the first button. The user control elements can include a second button, and the controller 120 can move the chair 250 to the second (e.g., raised and/or forward) position in response to user selection of the second button. The memory 124 can include saved settings for the first and second positions of the chair 250, and in some embodiments the user can adjust the saved settings. For example, the user can adjust the chair 250 to a desired first position (e.g., using the user control elements) and the user can save the settings for the desired first position. Similarly, the user can adjust the chair 250 to a desired second position (e.g., using the user control elements) and the user can save the settings for the desired second position. The memory 124 can have saved settings for multiple drivers. The memory 124 can have saved settings for first and second positions for each of multiple drivers. The user input elements can be configured to allow a user to change the selected driver, and also to change between the first and second chair positions for the selected driver.

In some embodiments, the controller 120 can move the chair from the first position to the second position automatically when the bow is raised. The boat 108 can include a sensor 256, which can be configured to determine whether the bow is raised. For example, the sensor 246 can be an orientation sensor (e.g., comprising an accelerometer) or a level sensor that is configured to measure the orientation of the boat 108. In some embodiments, when the angle of the boat 108 is below a threshold value, the controller 120 can position the chair 250 at the first position, and when the angle of the boat 108 is above a threshold value, the controller 120 can position the chair 250 at the second position. In some embodiments, the controller 120 moves the chair 250 to the second position when the angle of the boat 108 is above the threshold angle for a threshold amount of time. This can avoid movement of the chair 250 when the boat 108 is only in a raised-bow position for a short time. The controller 120 can be configured to move the chair 250 gradually between the first position and the second position as the angle of inclination of the boat 108 increases. The controller 120 can be configured to move the chair 250 gradually toward the first position as the angle of inclination of the boat 108 decreases towards a level orientation. Thus, in some embodiments, the chair 250 can move gradually to various different positions as orientation of the boat 108 moves gradually between various different angles.

In some embodiments, one or more driver control features can move when the chair 250 moves. For example, the angle and/or height of the steering wheel can change as the chair 250 moves toward the first position or toward the second position. The throttle control, touch screen, buttons, driver output elements (e.g., a speedometer or a display), and/or other driver control features can be movable in similar manner to maintain proximity and orientation relative to the driver as the chair 250 moves back and forth between the first position and the second position.

The driver control features can be coupled to the chair 250 such that they move together, e.g., as part of a movable driver station that includes the chair 250 and the driver control features. In some embodiments, the driver control features can include one or more actuators separate from the one or more chair actuators 254. The driver control features can move independent from or relative to the chair 250, in some cases.

In some embodiments, the driver's chair and the driver control features (e.g., steering wheel, etc.) can be positioned in a generally central portion of the boat 108, as opposed to a starboard or port side.

Figure 35:
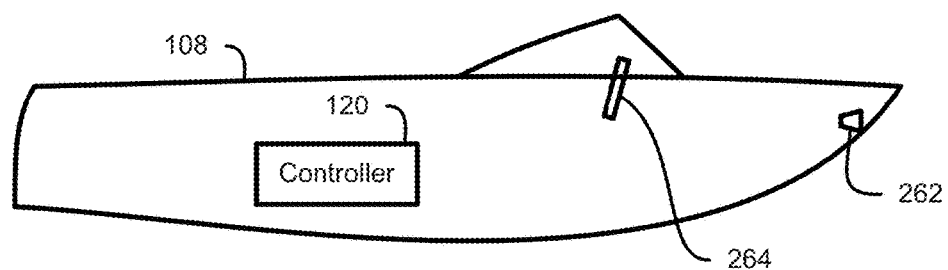
FIG. 35 shows an example embodiment of a boat that includes a forward-facing camera and a display configured to display images of the area in front of the boat.

With reference now to FIG. 35, in some embodiments, the boat 108 can include a camera 262 (e.g., a video camera) that is positioned to generate pictures or video of an area in front of the boat 108. The pictures or video can be displayed (e.g., to a driver) on a display 264, e.g., to thereby show the viewer where the boat 108 is going. In some embodiments, the controller 120 can receive the pictures or video from the camera 262 (e.g., via a wire or a wireless communication link), and the controller 120 can display the pictures or video on the display 264. The camera 262 can be positioned in or on a bow portion of the boat 108 and can be pointed forward. Various other positions are possible for the camera 262. The camera 262 and display 264 can improve the visibility of the driver, especially when the bow of the boat 108 is raised, as discussed herein.

Figure 36:
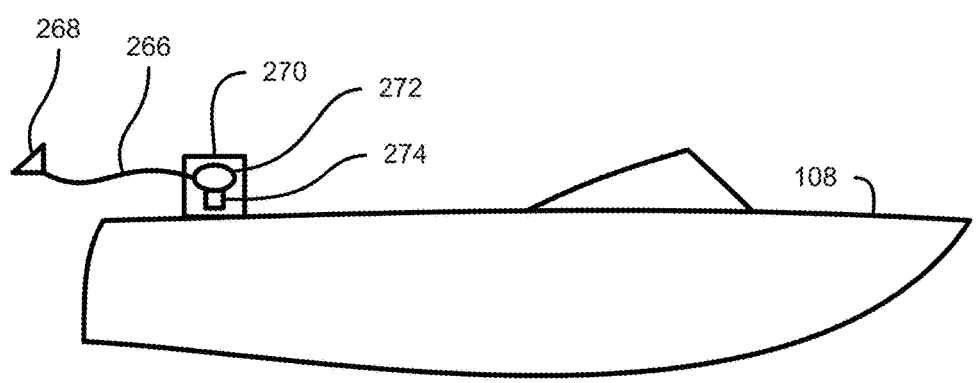
FIG. 36 shows an example embodiment of a boat that includes a retractable tow rope.

With reference to FIG. 36, in some cases, a rider can hold on to a rope 266 (e.g., to a handle 268 on the rope 266) during the start of a wake surf run. The rope 266 can pull the rider up out of the water as the boat 108 starts moving. Once the rider is positioned on the surf wake, the rider can release the rope 266 and can ride the surf wake without the assistance of the rope 266. In some instances, the rope 266 can interfere with the rider. For example, a rider may toss the rope 266 aside, but the flow of water can drive the rope 266 back towards the rider, which can cause the rider to fall and/or become tangled in the rope 266. When the rider releases the rope 266, a passenger in the boat 108 can gather the rope 266 into the boat, which can be burdensome on the passenger. In some embodiments, the boat 108 can include a retractable rope 266. The rope 266 can automatically retract (e.g., into the boat 108) when the rider releases the rope 266.

In some embodiments, the boat 108 can include a rope retracting mechanism 270. The rope retracting mechanism 270 can include a spool 272, which can be rotatable about an axis. The rope can be coupled to the spool 272 such that rotation of the spool 272 in a first direction causes the rope 262 to wrap around the spool 272. Accordingly, rotation of the spool 272 in the first direction can cause the rope 266 to be gathered into the rope retracting mechanism. Rotation of the spool 272 in a second direction can release the rope 266 from the spool 272, which can allow the rope 266 to exit the rope retracting mechanism. The rope retracting mechanism 270 can include a biasing element 274 that is configured to bias the spool 272 in the first direction. The biasing element 274 can be a spring coupled to the spool 272 such that rotation of the spool 272 in the second direction causes potential energy to build up in the spring. If the rope 266 is in an extended position and there is insufficient force to hold the rope 266 in the extended position (e.g., when the rider releases the rope 266), the biasing element 274 can cause the spool 272 to rotate in the first direction to retract the rope 266. When a sufficient force is applied to the rope 266 to overcome the biasing element 274 (e.g., when a rider is holding the rope and being towed behind the boat 108), the rope 266 can remain in the extended position. When the rider releases the rope 266, the rope 266 can be automatically retracted to the boat 108.

In some embodiments, the rope 266 can be locked at a desired length. For example, one or more engagement features on the spool 272 can be selectively engaged by one or more locking features, which can lock the spool 272 in place, thereby preventing the spool 272 from retracting the rope 266 and/or preventing the spool 272 from releasing more of the rope 266. An actuator (e.g., a button or lever) can be configured to engage and/or disengage the locking features and the engagement features. The engagement features and locking features can include one or more teeth and one or more pawls. For example, the spool 272 can included various teeth distributed around the spool 272, and an actuator can cause a pawl to engage the teeth to lock the spool. To lock the rope 266 at a particular length, the rope can be extracted to the particular length, and the actuator can be actuated to engage the locking features with the engagement features.

In some embodiments, the rope 266 can be set to a selectable maximum length while rope retraction is enabled. Different riders may prefer to use different lengths of rope. Different lengths of rope may be preferable for different wake types and different wake settings. Accordingly, in some embodiments, a maximum length of the rope 266 can be set, such that the spool 272 is impeded from rotating further in the second direction. The spool 272 can be permitted to rotate in the first direction (e.g., due to a force applied by the biasing element 274). Thus, in some embodiments, when the locking mechanism is activated, the length of rope 266 behind the boat 108 can only shorten and cannot increase in length. In some embodiments, the locking mechanism can include a ratchet system, e.g., which can include one or more pawls and one or more teeth. When engaged with each other, the pawls and teeth can be configured to ratchet in a first direction (e.g., to allow the spool 272 to rotate in the first direction to retract the rope 262) and to prevent rotation of the spool 272 in the second direction. The locking mechanism can be released (e.g., by pushing a button or moving a lever, etc.), which can cause the pawls and teeth to disengage, which can allow rotation of the spool 272 in both directions.

In some embodiments, the water diverters 102 can be set manually. In some embodiments, the features for manually setting the water diverters 102 can be used in place of the actuators and electronic controllers discussed herein. In some embodiments, the features for manually setting the water diverters 102 can be included along with the actuators and electronic controllers discussed herein. For example, if a malfunction occurs with the electronic system for setting the water diverters 102, the manual features can be used as a backup. In some embodiments, the actuators can be decoupled from the water diverters 102 (e.g., by removing a pin or bolt, or by releasing a clamp or other releasable attachment mechanism). Thus, the water diverters 102 can be detached from the actuators when the manual positioning system is used. In some embodiments, the manual positioning system can be used while the actuators remain coupled to the water diverters 102.

Figure 37:
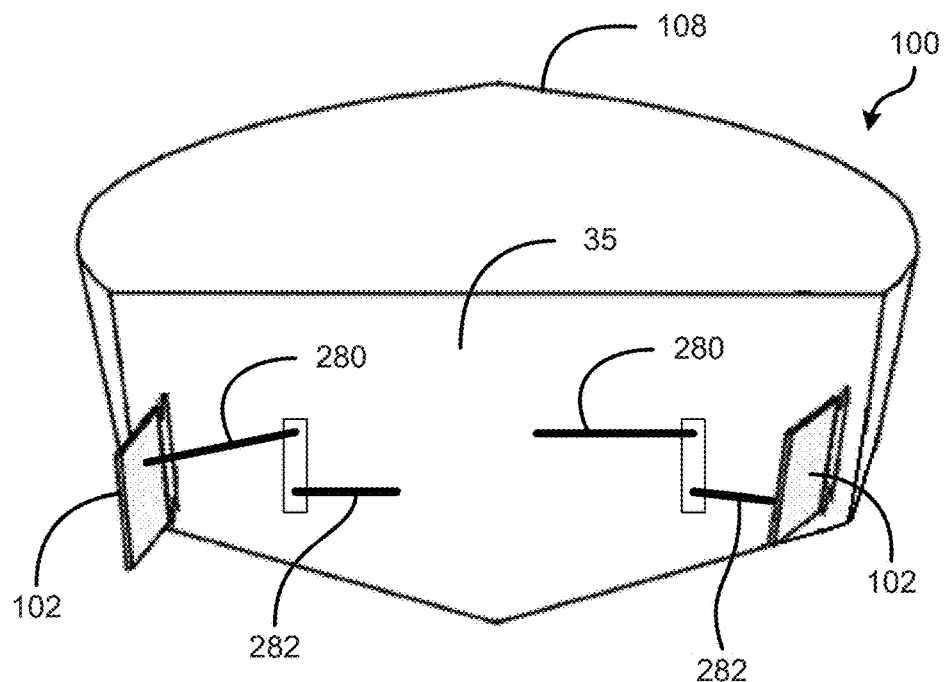
FIG. 37 shows an example embodiment of a boat that includes features for manually positioning the water diverters.

Various types of mechanisms can be used to manually set the water diverters 102. With reference to FIG. 37, in some embodiments, the manual features can include first positioning elements 280 configured to position the water diverters 102 at the extended or deployed position (as shown on the left side of FIG. 37). In some embodiments, second positioning elements 282 can be included and can be configured to position the water diverters 102 at a neutral or retracted position (as shown on the right side of FIG. 37). In some embodiments, the positioning elements 280 and/or 282 can be movably (e.g., pivotally) coupled to the boat 108 (e.g., to the transom), and the positioning elements 280 and/or 282 can be moved aside when not coupled to the water diverters 102. For example, the positioning elements 280 and/or 282 that are not in use can be engage retaining mechanisms that are configured to hold the positioning elements 280 and/or 282 against or near the hull of the boat 108. The water diverters 102 can include retaining mechanisms that are configured to couple the positioning elements 280 and/or 282 to the water diverters 102 to position the water diverters at the respective deployed and neutral positions. The first positioning elements 280 can be longer than the second positioning elements 282 such that the first positioning elements 280 are configured to cause the water diverters 102 to extend past the side of the transom when the first positioning elements 280 are coupled to the water diverters 102, which can create a surf wake, as discussed herein. In some embodiments, the positioning elements 280 and/or 282 can be removably attachable to the water diverters 102 via pins, bolts, clamps, snap fit elements, friction fit elements, or other suitable releasable attachment elements. In some embodiments, the second positioning elements 282 can be omitted. For example, in some cases, a water diverter 102 can be removable when not deployed.

Many variations are possible. In some embodiments, the water diverters 102 can rotate towards the center line of the boat 108 until they are near, or abutting against, the transom 35 of the boat 108. A retaining member on the transom can couple with a corresponding retaining member on the water diverter 102 to hold the water diverter at against or near the transom 35. In some embodiments, the water diverters 102 can be removable. For example, the water diverters 102 can slide into a slot formed on the boat 108 (e.g., on or near the transom 35), and the slot can be configured to position the water diverter 102 in the extended or deployed positions to create a surf wake as discussed herein. To create a right-side surf wake, the left-side water diverter 102 can be positioned in the deployed position (e.g., using the slot), and the right-side water diverter 102 can be removed.

Figure 38:
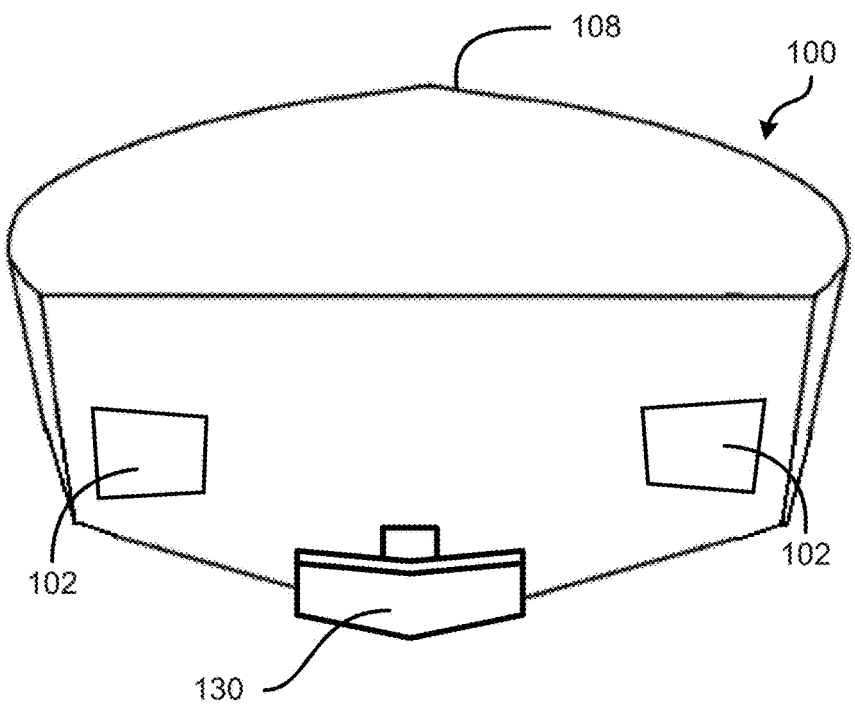
FIG. 38 shows an example embodiment of a boat with the water diverters in a collapsed position.

In some embodiments, the water diverters 102 can be removable, or the water diverters can move (e.g., pivot) to a collapsed position that facilitates storage of the boat 108. In some cases, the swim platform can be removed to make the boat 108 more compact for storage (e.g., in a garage). The water diverters 102 can also be removable (as discussed above), which can facilitate storage of the boat 102. In some embodiments, the water diverters 102 can be movable (e.g., pivotable) to a collapsed position, which can be further inward than the neutral or retracted position. For example, in the collapsed position, the water diverter 102 can extend generally parallel with the transom 35. In the collapsed position, the water divert 102 can extend towards the center line of the boat 108. For example, FIG. 38 shows an example embodiments of a boat 108 with the swim platform 70 omitted or removed, and with the water diverters 102 pivoted inward to the collapsed position. In some embodiments, the swim platform 70 would prevent the water diverters 102 from pivoting to the collapsed position when the swim platform 70 is attached. With the swim platform 70 removed, the water diverters 102 can be moved to the collapsed position. In some embodiments, the water diverters 102 can slide forward to the collapsed position, to reduce the amount of the water diverters that extends past the rear of the boat 108. In some embodiments, the water diverters 102 do not extend rearward past the other portions of the boat when in the collapsed position and/or when the swim platform 70 is removed. In some embodiments, the water diverters 102 extend rearward no more than about 1 cm, no more than about 3 cm, no more than about 5 cm, no more than about 10 cm, no more than about 20 cm, or more past the other portions of the boat 108 (e.g., the boat hull, the Power Wedge 130, etc.) when the water diverter 102 is in the collapsed position and/or when the swim platform 70 is removed.

Figure 39:
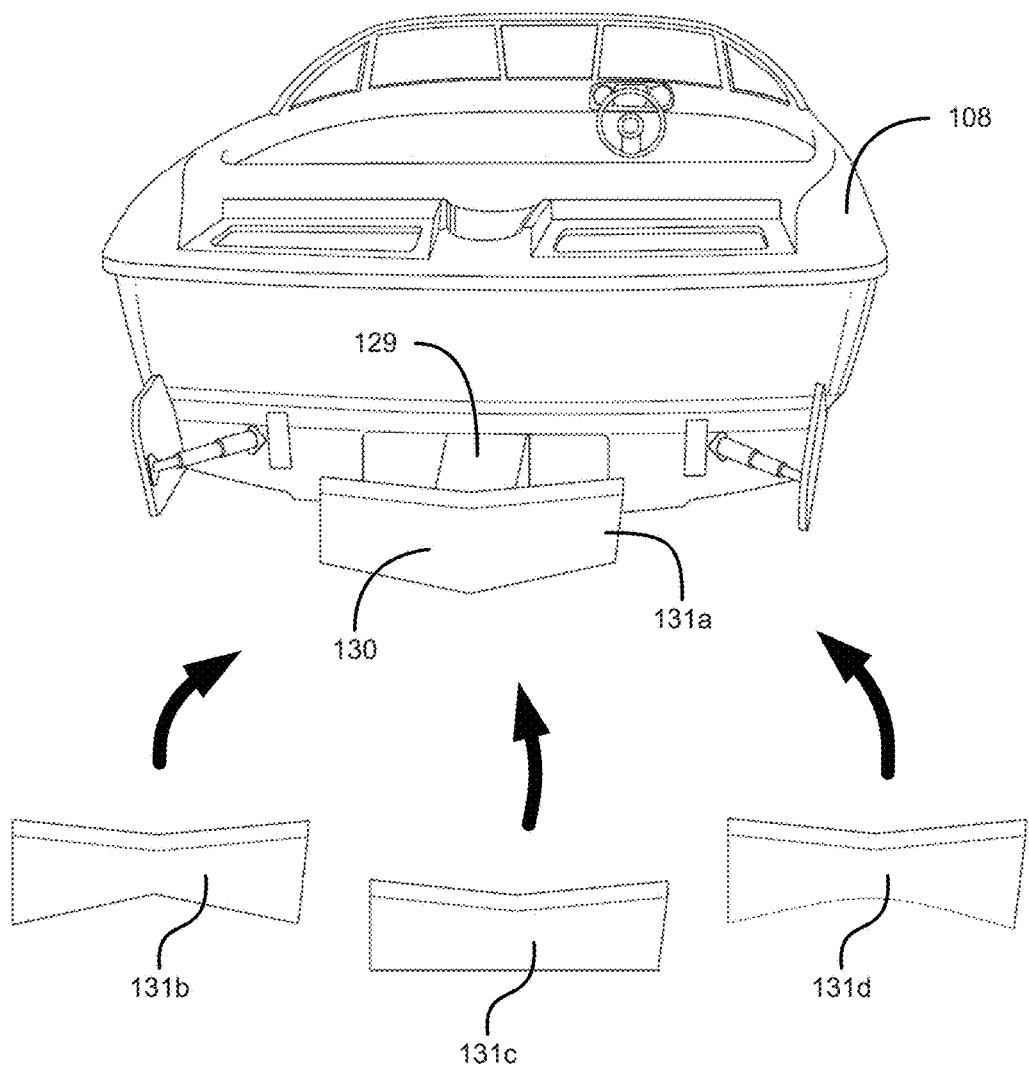
FIG. 39 shows an example embodiment of a boat with interchangeable foils on a wake shaping element.

With reference to FIG. 39, in some embodiments, the wake-modifying device 130 (which can be a Power Wedge similar to that described in U.S. Pat. No. 7,140,318, the entire contents of which is incorporated by reference herein for all that it discloses) can have removable and/or interchangeable wake shaping features. For example the wedge 130 can have interchangeable foils 131a-d. The different foils 131a-d can have different shapes, different orientations, and/or different sizes, which can be configured to produce different wake shaping effects. The interchangeable foils 131a-d can have features that are similar to, or the same as, the interchangeable water diverters 102a-d discussed in connection with FIGS. 19-21, and much of the disclosure of associated with FIGS. 19-21 is applicable to the interchangeable foils 131a-d and is not repeated here. The wedge 130 can include a positioning element 129 (e.g., a shaft) and the boat 108 can include an actuator configured to move the positioning element 129 between at least a deployed position and a neutral position. FIG. 39 shows the wedge 130 in a neutral position. In some embodiments, the actuator can position the wedge at interim positions between the neutral position and the deployed position (e.g., depending on a selected wake type). The positioning element 129 can be coupled to the boat 108 (e.g., by a joint) such that the positioning element 129 can pivot (e.g., about an axis that is substantially transverse to a longitudinal axis of the boat 108). The positioning element 129 can be configured to removably receive the foils 131a-d, and the foils 131a-d can be configured to removably attach to the positioning element 129. The foils 131a-d and/or the positioning element 129 can include coupling mechanisms (not shown in FIG. 39) configured to removably attach one of the foils 131a-d to the positioning element 129. For example, a sliding engagement members, snap fit engagement members, friction fit engagement members, clamps, pins, or any other suitable engagement members can be used to removably couple the foils 131a-d to the positioning element 129.

Figure 40A:
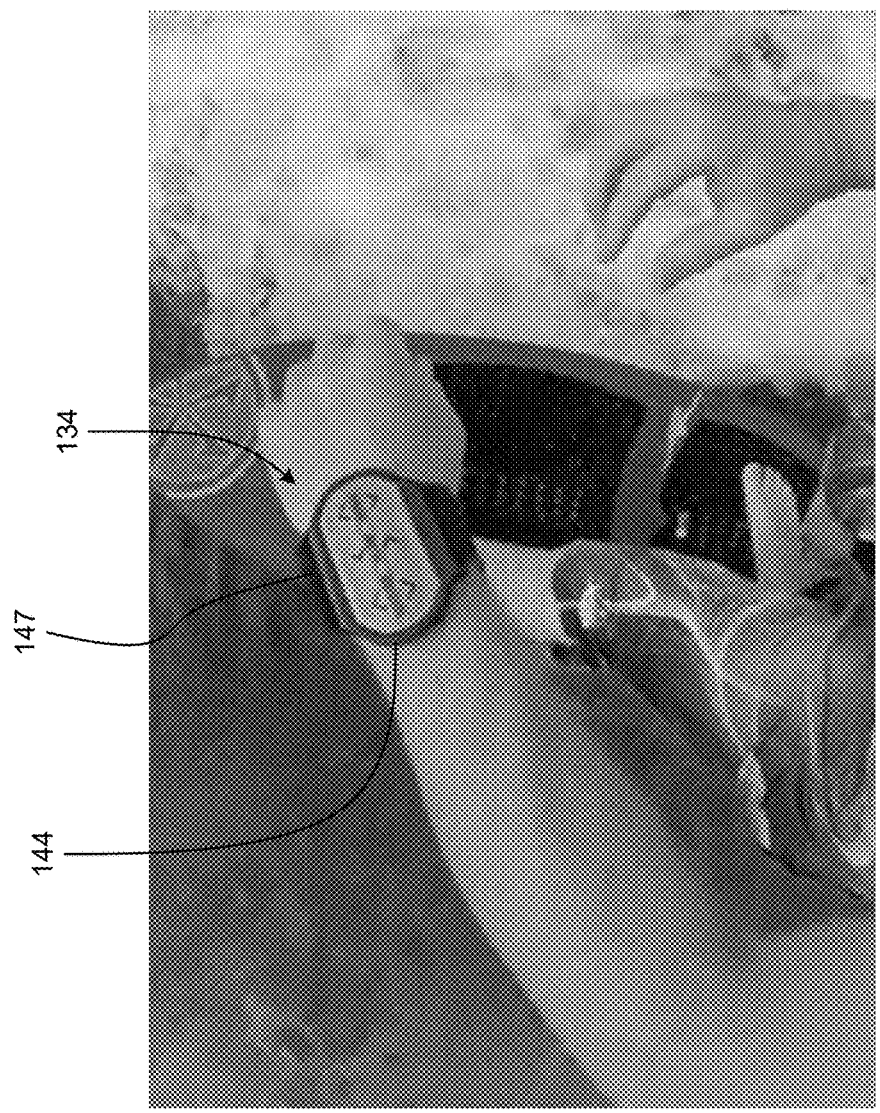
FIGS. 40A and 40B show an example embodiment of a rider control device worn on the wrist of a wake surf rider.
Figure 40B:
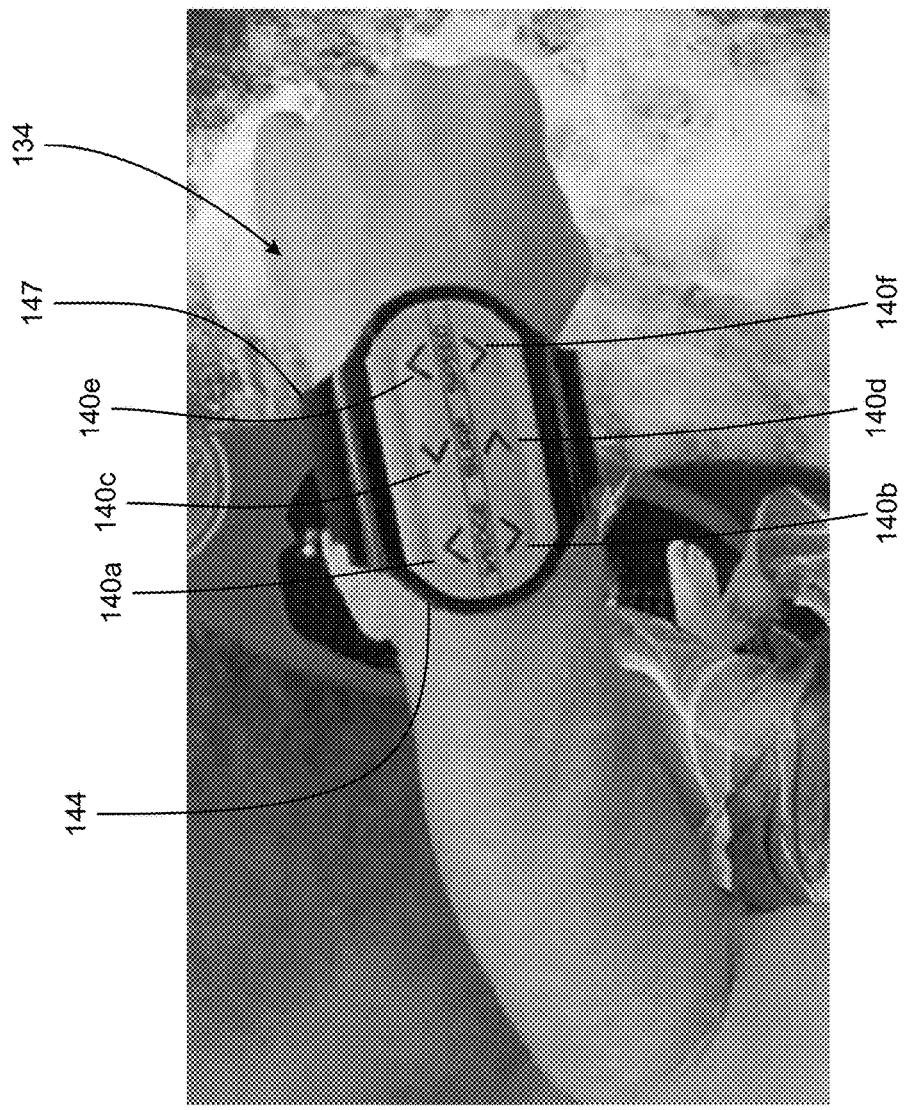
Figure 41:
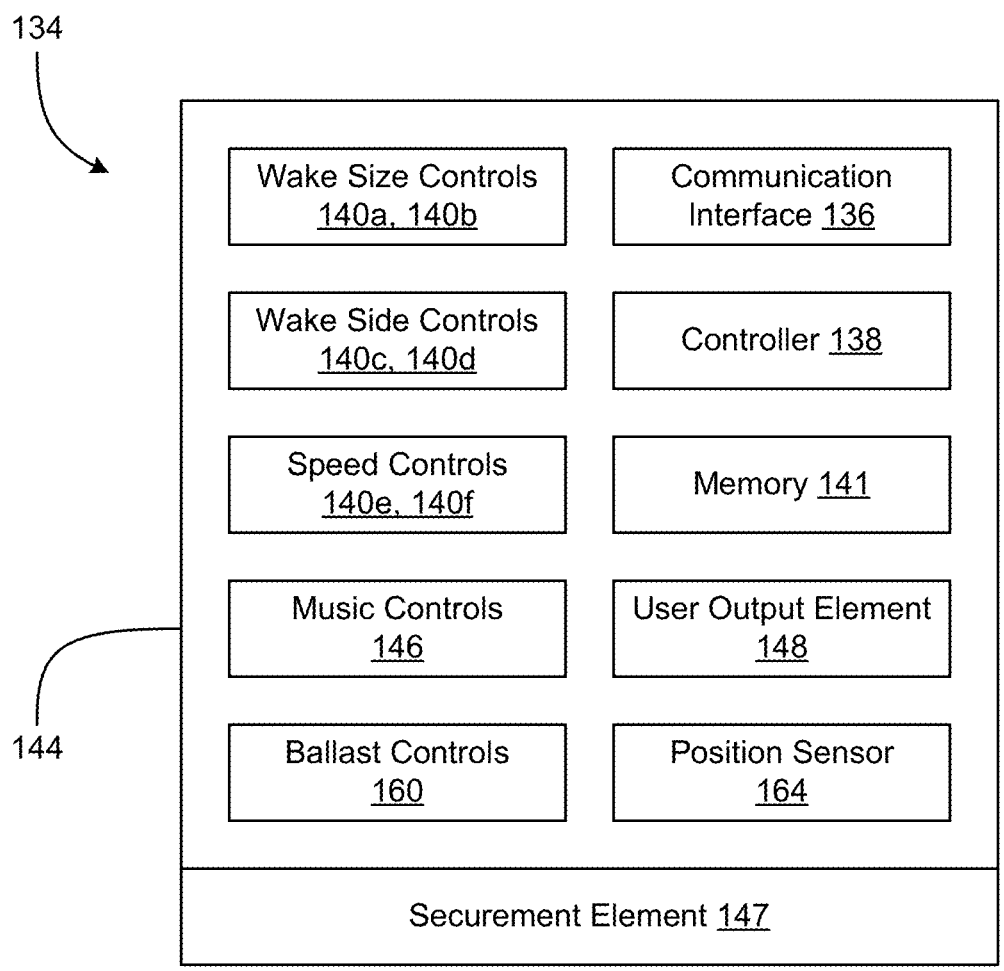
FIG. 41 shows an example embodiment of a rider control device.

With reference again to FIG. 27A, a rider control device 134 can be used to enable a rider (e.g., who is wake surfing or wakeboarding behind a water-sports boat or other suitable watercraft) to modify the wake of the watercraft, as discussed herein. The rider control device 134 can be a wrist remote, although various other implementations are possible. FIGS. 40A and 40B show an example embodiment of a rider control device 134 worn on the wrist of a rider. FIG. 41 schematically shows an example embodiment of a rider control device 134. The rider control device 134 can include a securement element 147 configured to secure the rider control device 134 to the rider (e.g., to the rider's wrist, hand, vest, life jacket, etc.). The securement element 147 can be a wrist strap configured to secure to the rider's wrist (e.g., via hook-and-loop fasteners (Velcro), a clasp, a buckle, a strap, or other suitable engagement mechanism). The rider control device 134 can be configured to be worn on the body or clothing of the rider. The rider control device can be a fob or other handheld device. The rider control device 134 can include one or more user input elements 140a-f, which can be buttons, switches, dials, a touchscreen having virtual buttons, etc., to provide input for controlling the wake produced by the watercraft. The rider control device 134 can enable the rider to control the size, length, and or shape of the wake produced by the watercraft, as discussed herein.

The rider control device 134 can have a waterproof housing 144. The rider control device 134 can be buoyant so that it does not sink if it becomes separated from the rider in the water. In some implementations, the housing 144 of the rider control device 134 is buoyant to float in water independent of the securement element 147, and the securement element 147 can also be buoyant to float in water independent of the housing 144 of the rider control device 134. The rider control device 134 can have a color that is configured to provide contrast with water (e.g., bright yellow, bright orange, etc.) to facilitate locating of the rider control device 134 if it should become separated from the rider. In some embodiments, the rider control device 134 can be used with interchangeable securement elements 147 (e.g., interchangeable bands or straps). The interchangeable securement elements 147 can provide different sizes, different colors, and/or different attachment types (e.g., wrist band, hook for vest, etc.). The rider control device 134 can include a power supply, such as a battery (e.g., a lithium battery or any other suitable battery type).

Figure 43:
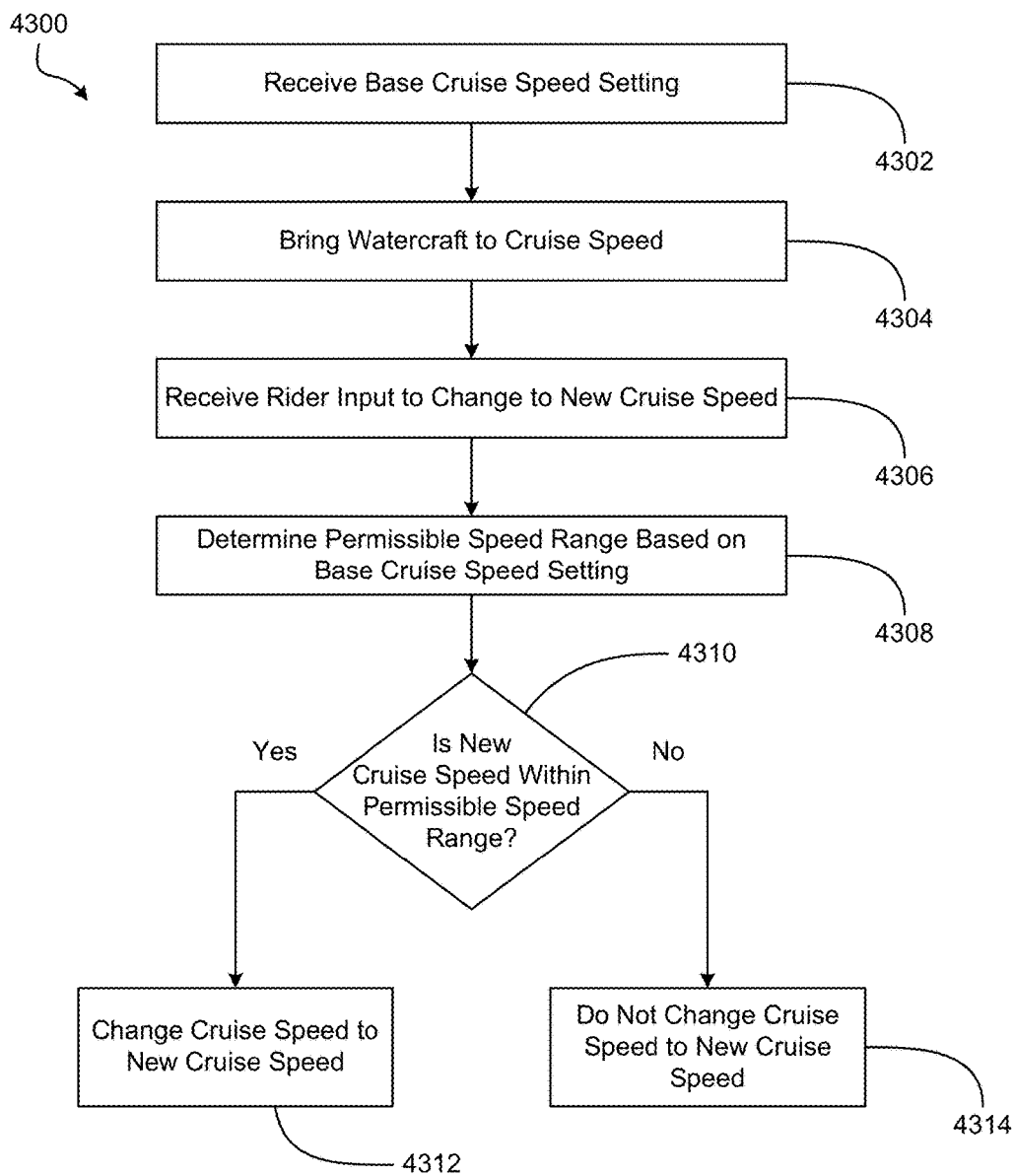
FIG. 43 shows an example embodiment of a method for controlling the speed of a watercraft.

In some embodiments, the rider control device 134 can be configured to enable the rider to provide input using the same hand to which the rider control device 134 is attached. For example, the rider control device 134 can be configured to be worn on the inside (e.g., palm) of the hand so that the rider's fingers on the same hand can provide input (e.g., by pressing buttons or actuating other user input elements). FIG. 43 shows an example embodiment of a rider control device 134 configured to be worn on the inside or palm of the rider's hand. The rider control device 134 can have an elongate housing 144 configured to enable a user to wrap the user's fingers around the housing 144. The housing 144 can have a generally cylindrical shape. The housing 144 can have contours (not shown in FIG. 43) configured to fit with the shape of the hand, such as similar to a pistol grip. The securement element 147 can be a strap that wraps around the back of the hand so that the rider control device 134 remains connected to the hand and/or positioned on the palm even if the rider opens the hand and releases grip on the rider control device 134. The rider control device 134 can include user input elements 140a-d positioned to be actuated by the fingers and/or thumb on the same hand to which the rider control device is attached. This can enable the rider to provide inputs to the rider control device while using both arms for balance while riding. In some embodiments, the rider control device 134 can include five buttons, one for each of the fingers and thumb on the hand. In some embodiments, multiple buttons can be positioned for use by a single finger or thumb. For example, in the embodiment illustrated in FIG. 43, the buttons 140c and 140d are both positioned on the top side of the rider control device 134 to be actuated by the rider's thumb. In some embodiments, a single user input element can be positioned on the top side for actuation by the thumb. For example, a single button can be pushed by the thumb for changing the surf wake from one side to the other regardless of which side the surf wake is currently on.

Figure 42:
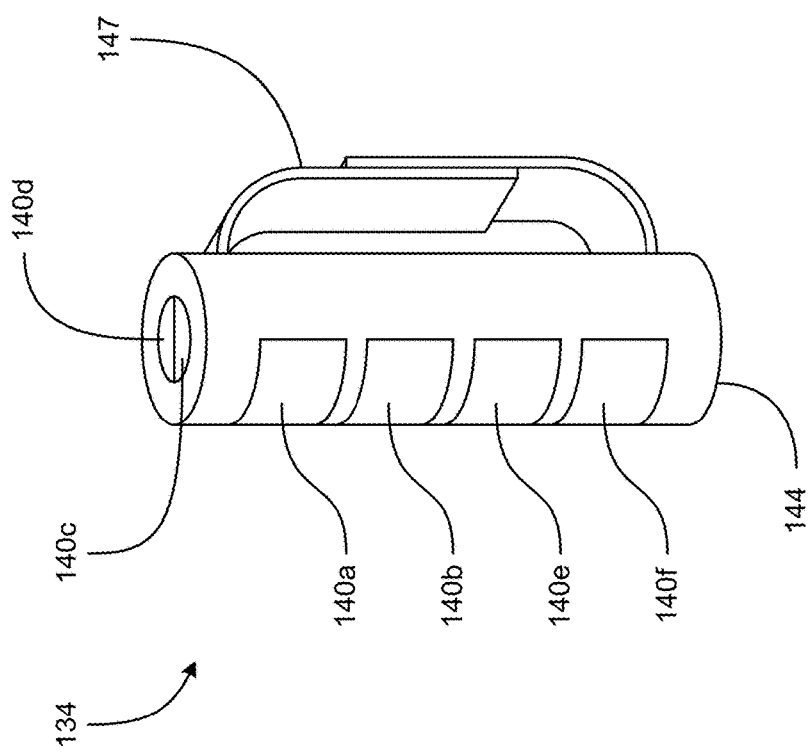
FIG. 42 shows an example embodiment of a rider control device that can be configured for one-handed use.

With reference to FIGS. 40-42, by way of example, the rider control device 134 can include buttons 140a and 140b to move (e.g., raise and lower) a foil 130 (e.g., a Power Wedge, which is sold by Malibu Boats) or other wake shaping device or feature (e.g., the ballast system) that is configured to adjust how much the hull of the watercraft is pulled down into the water (e.g., to increase or decrease the size of the wake) or lifted upward (e.g., to reduce the size of the wake). Pressing the button 140a one time can raise the foil 130 by one increment (e.g., a predetermined angle or distance), and pressing the button 140a multiple times (e.g., 2 or 3 times) can raise the foil 130 by a corresponding number of increments (e.g., 2 or 3 increments). Holding down the button 140a can cause the foil to raise continuously while the button 140a is held down, and when the button 140a is released, the foil 130 can stop or can move to the next or closest incremental position. In some implementations, holding down the button 140a can cause the target position of the foil 130 to raise one increment per an amount of time (e.g., half a second) that the button 140*a* is held down. For example, holding down the button for one second can raise the foil 130 by two increments, whereas holding down the button for two seconds can raise the foil by four increments. The button 140*b* can operate the foil 130 in like manner to button 140*a*, except that button 140*b* can lower the foil. The incremental raising and lowering of the foil 130 can rotate the foil 130 by an incremental angle between about 1 degree and about 15 degrees, such as about 2 degrees, 3 degrees, 5 degrees, 7 degrees, or any value therein or any range bounded by the above values. In some embodiments, actuating a user input element (e.g., pressing button 140*b*) can cause the foil 130 to move to a particular position regardless of the current position. For example, pressing the button 140*b* can, in some implementations, cause the foil 130 to move to the fully deployed position regardless of where the foil 130 is currently positioned.

In some embodiments, the foil 130 can be configured to move only when the watercraft is traveling at certain speeds. For example, movement of the foil 130 can be disabled if the watercraft is moving slower than a lower threshold speed and/or faster than a higher threshold speed. If a command to move the foil 130 is received while the watercraft is traveling at a speed (or stopped) such that movement of the foil is disabled, the command to move the foil can be disregarded, or the command can delayed and the foil can be moved according the command at a later time once the speed of the watercraft permits movement of the foil 130. In some embodiments, the command to move the foil can be delayed for a predetermined amount of time (such as 3 seconds, 5 seconds, 7 seconds, 10 seconds, 15 seconds, 30 seconds, 60 seconds, or any values therebetween, or any ranges bounded by the above values), and after the predetermined amount of time the command can be disregarded if it has not yet been implemented to move the foil 130. In some embodiments, if the rider provides a command to move the foil 130 (e.g., to change a height of the wake) before the watercraft has gotten up to a threshold speed that is appropriate for the watersport activity (e.g., about 7 mph for wake surfing), the foil 130 can move in response to the rider command without delay, or the foil 130 can wait to move in response to the rider command until the threshold speed has been reached, or the rider command can be disregarded. Various wake shaping devices other than a foil can be used to adjust the size of the wake (e.g., by diverting water). For example, a pivoting plate can be attached to the watercraft at a lower, center portion of the transom so that the plate can be actuated by an actuator to deflect water, e.g., to adjust how much water is displaced by the stern of the watercraft. Movement and control of other wake shaping devices can be similar to the movement and control of the foil discussed herein.

By further way of example, buttons 140*c* and 140*d* can enable the rider to adjust the wake. For example, the rider can select a surf-right configuration (e.g., by pressing button 140*d*), which can configure the watercraft to produce a wave on the right side of the boat that is suitable for surfing (e.g., while the wave on the left side can be turbulent and not suitable for surfing). Conversely, the rider can press button 140*c* to select a surf-left configuration, which can configure the watercraft to produce a wave on the left side of the boat that is suitable for surfing (e.g., while the wave on the right side can be turbulent and not suitable for surfing). In some embodiments, the rider control device 134 can be configured to enable the rider to change from a surf-right configuration to a surf-left configuration or from a surf-left configuration to a surf-right configuration by actuating a single user input element (e.g., by pressing a single button) or otherwise providing a single command. In some embodiments, the rider control device 134 can include a "switch sides" button (not shown) which can switch the surfable side regardless of which side currently has a surfable wave. In some embodiments, the rider control device 134 can enable the rider to position one or more water diverters (such as water diverters 102 in FIG. 27A, although other types of water diverters can be used) to redirect water to produce the wave suitable for surfing. The rider control device 134 (e.g., via buttons 140*c* and 140*d*) can enable the rider to move the one or more water diverters between a neutral position, a deployed position, and one or more interim positions between the neutral and deployed positions, in order to control the shape of the wake (e.g., the steepness, size, and length) and/or the side of the boat that has a wake suitable for surfing.

In some embodiments, actuating a single user input element (e.g., pressing button 140*c* or 140*d*) can change the wake from a surf-right configuration to a surf-left configuration or from a surf-left configuration to a surf-right configuration. Actuating a single user input element (e.g., pressing button 140*c* or 140*d*) can move both the port-side (or left-side) element (e.g., flap 33*p*) and the starboard-side (or right-side) element (e.g., flap 33*s*). For example, selecting a surf-left (or port-side surf) configuration (e.g., by pressing button 140*c*) can cause the port-side element (e.g., flap 33*p*) to move to the non-deployed position and can also cause the starboard-side element (e.g., flap 33*s*) to move to the deployed position. Selecting a starboard-side surf configuration (e.g., by pressing button 140*d*) can cause the port-side element (e.g., flap 33*p*) to move to the deployed position and can also cause the starboard-side element (e.g., flap 33*s*) to move to the non-deployed position. In some embodiments, the port-side element (e.g., flap 33*p*) and the starboard-side element (e.g., flap 33*s*) can be independently positionable using the rider control device 134. For example, in some implementations separate user input elements (e.g., buttons) can be used to independently move the port-side element (e.g., flap 33*p*) and the starboard-side element (e.g., flap 33*s*).

In some embodiments, commands received by the rider control device 134 can cause adjustments to the wake shape without changing the surf wake from one side to the other. For example, pressing button 140*c* once can move one or both of the port-side element and the starboard-side element by one increment in a first direction (e.g., toward the deployed position for the port-side element and toward the non-deployed position for the starboard-side element). Pressing the button 140*c* multiple times (e.g., 2 or 3 times) can move one or both of the port-side element and the starboard-side element in the first direction by a corresponding number of increments (e.g., 2 or 3 increments). Holding down the button 140*c* can cause the one or both of the port-side element and the starboard-side element to move continuously while the button 140*c* is held down, and when the button 140*c* is released, the one or both of the port-side element and the starboard-side element can stop or can move to the next or nearest incremental position. In some implementations, holding down the button 140C can cause the target position of the one or both of the port-side element and the starboard-side element to move in the first direction by one increment per an amount of time (e.g., half a second) that the button 140*c* is held down. For example, holding down the button 140*c* for one second can move one or both of the port-side element and the starboard-side element by two increments, whereas holding down the button 140*c* for two seconds can move the one or both of the port-side element and the starboard-side element by four increments. The button 140*d* can operate the one or both of the port-side element and the starboard-side element in like manner to button 140*c*, except that button 140*d* can move the one or both of the port-side element and the starboard-side element in a second direction opposite of the first direction. The incremental movement of the one or both of the port-side element and the starboard-side element can be rotation by an incremental angle between about 1 degree and about 15 degrees, such as about 2 degrees, 3 degrees, 5 degrees, 7 degrees, or any value therein or any range bounded by the above values.

In some embodiments, the wake modifying elements (e.g., the port-side flap 33*p* and the starboard-side flap 33*s*) can be configured to not deploy when the watercraft is traveling above a threshold speed (e.g., 15 mph in some implementations). If a rider command is received to deploy or adjust the wake modifying elements while the watercraft is moving at a speed such that the wake modifying elements are disabled, the rider command can be disregarded, or the rider command can be implemented once the watercraft is moving at a speed that will permit implementation of the rider command. In some embodiments, the rider command can be delayed for a predetermined amount of time (such as 3 seconds, 5 seconds, 7 seconds, 10 seconds, 15 seconds, 30 seconds, 60 seconds, 2 minutes, 3 minutes, 5 minutes, 10 minutes, or any values therebetween, or any ranges bounded by the above values), and after the predetermined amount of time the command can be disregarded if it has not yet been implemented to move the wake modifying elements. In some embodiments, the watercraft can receive an indication of a type of activity (e.g., wake surfing, wakeboarding, or waterskiing), for example by a driver user interface. The watercraft can enable and disable operation of the surf system (including the wake modifying elements) based on which activity is indicated. If wakeboarding or waterskiing are indicated, for example, the watercraft can disable operation of the wake modifying elements of the surf system and can disregard commands from the rider control device 134 that relate to the wake modifying elements of the surf system.

The rider control device 134 can give the rider control over the surf system of the watercraft, such as an integrated surf platform. In some embodiments, the rider control device 134 can be used provide commands for modifying the wake using one or more fins as described in PCT Application No. PCT/US2012/055788, having an international filing date of Sep. 17, 2012, and titled SURF WAKE SYSTEM AND METHOD FOR A WATERCRAFT, which is incorporated by reference in its entirety.

By further way of example, buttons 140*e* and 140*f* can enable the rider to control the speed of the watercraft. For example, button 140*e* can increase the watercraft speed, and button 140*f* can decrease the watercraft speed. The system can limit rider control of the watercraft speed to a range of suitable speeds, such as between about 3 mph to about 20 mph, between about 5 mph to about 15 mph, between about 7 mph to about 10 mph, and any values therebetween. Different speeds and ranges can be used for different activities (e.g., wake surfing is generally at slower speeds than wake boarding or waterskiing). The permissible speed range can be determined based at least in part on a base speed set by the driver of the watercraft. For example, in some embodiments, the system can limit the rider control of the watercraft speed based on the speed of the watercraft at the time that rider control was enabled. For example, the driver can bring the boat up to a suitable surf speed (e.g., about 9 mph) and can then enable rider control. The system can limit the rider adjustment of the speed to within a set value (e.g., 3 mph) of the speed that the boat what at when rider control was enabled (e.g., from about 6 mph to about 12 mph, in this example). The system can limit the rider adjustment of the speed to within a percentage of the speed set by the driver (e.g., the speed of the boat when rider control is enabled, or by a cruise control system, or the speed the boat would travel without input from the rider). For example, the system can limit the rider adjustment of the speed to within 10% of the speed set by the driver (e.g., a speed of 10 mph could be modified by the rider to 9 mph or 11 mph). Other percentages can be used, such as within 3%, within 5%, within 7%, within 15%, within 20%, within 25%, within 30%, within 40%, within 50%, or more.

In some embodiments, the watercraft can include a cruise control system 149 that can adjust operation of the engine of the watercraft to move the watercraft through water at a cruise speed. The cruise control system 149 can change the cruise speed in response to commands received from the rider control device 134. The driver can override the cruise control speed by direct control of the throttle. Input from the driver to the throttle can take priority over input from the rider to change the cruise speed of the cruise control system 149. When the rider presses the button 140*e* one time, the cruise control system 149 can increase the cruise speed by one increment (e.g., a predetermined amount of speed), and pressing the button 140*e* multiple times (e.g., 2 or 3 times) can increase the cruise speed by a corresponding number of increments (e.g., 2 or 3 increments of speed). Holding down the button 140*e* can cause the target cruise speed to raise (e.g., continuously) while the button 140*e* is held down, and when the button 140*e* is released the cruise speed can stop changing or can bet set to the next or closest incremental speed setting. In some implementations, holding down the button 140*e* can cause the cruise speed to raise one increment per an amount of time (e.g., half a second) that the button 140*e* is held down. For example, holding down the button for one second can raise the cruise speed two increments, whereas holding down the button 140*e* for two seconds can raise the cruise speed by four increments. The button 140*f* can change the cruise speed in like manner to button 140*e*, except that button 140*f* can lower the cruise speed. The incremental raising and lowering of the cruise speed can be increments of 0.05 mph, 0.1 mph, 0.25 mph, 0.5 mph, 1 mph, or any values therebetween, or any ranges bounded by the above values.

FIG. 43 shows an example embodiment of a method 4300 for a rider adjusting the speed of the watercraft. At block 4302 the cruise control system 149 can receive a base cruise speed setting. For example, the base cruise speed setting can be received from the driver. The driver can enter a specific base cruise speed via a driver user interface, such as using a numeric keypad, dial, touchscreen buttons, or other user input elements. In some embodiments, the driver can bring the boat up to speed and then set the current speed of the boat as the base cruise speed (e.g., by pressing a button or via another type of user input element). At block 4304 the watercraft can be brought up to the cruise speed (which can be the base cruise speed set by the driver). At block 4306, the rider control device 134 can receive input from the rider to change to a new cruise speed. As discussed above, by way of example, the rider can press buttons 140*e* or 140*f* to set a new cruise speed.

At block 4308, a permissible speed range can be determined. The permissible speed range can be determined based on the base cruise speed (e.g., set by the driver). For example, the permissible speed range can be set having the base cruise speed at a center of the permissible speed range. The permissible speed range can be the base cruise speed plus or minus a predetermined speed value, such as 0.5 mph, 1.0 mph, 1.5 mph, 2 mph, 3 mph, 5 mph, or any value therebetween, or any range bounded by any of the values above. By way of example, a driver can set a base cruise speed of 9 mph, and the permissible speed range can be determined to be 9 mph plus or minus 2 mph, which would result in a permissible speed range of 7 mph to 11 mph within which the rider can adjust the cruise speed for the watercraft. The permissible speed range can be determined in other manners. For example, the permissible speed range can be a predetermined range associated with a water-sport activity. For example, the permissible speed range can be set to 7 mph to 13 mph (or any other suitable range) when an indication is received (e.g., via the driver user interface) that the watercraft is being used for wake surfing. The permissible speed range can be higher when an indication is received (e.g., via the driver user interface) that the watercraft is being used for wakeboarding or waterskiing. The permissible speed range can be determined as a percentage of the base cruise speed. For example, the permissible speed range can be the base cruise speed plus or minus 25%, or 75% to 125% of the base speed range, although other suitable percentages can be used.

At block 4310, a determination is made (e.g., by the controller 120 or the cruise control system 149) of whether the new cruise speed (e.g., designated by the rider) is within the permissible speed range. If the new cruise speed is within the permissible speed range, the process proceeds to block 4312 and the cruise control system changes the cruise speed to the new cruise speed. The base cruise speed and/or the permissible speed range can be stored (e.g., in a computer-readable memory) for additional comparisons at block 4310 if a different new cruise speed is later designated by the rider. If the new cruise speed is not within the permissible speed range, the process can proceed to block 4314 and the cruise speed is not changed to the new cruise speed. In some embodiments, if the requested new cruise speed is outside the permissible speed range, the cruise speed can be set to the value at the boundary of the permissible speed range closest to the requested new cruise speed. For example, if the current cruise speed is 9 mph and the permissible speed range is 7 mph to 11 mph, a request for a new cruise speed of 12 mph can cause the cruise speed to be set to 11 mph. In some embodiments, a request for a new cruise speed that is outside the permissible speed range can be disregarded. For example, if the current cruise speed is 9 mph and the permissible speed range is 7 mph to 11 mph, a request for a new cruise speed of 12 mph can be disregarded so that the cruise speed remains 9 mph. In some embodiments, the cruise speed can be changed to the boundary of the permissible range (e.g., as discussed above), such as if the new requested cruise speed is outside the permissible speed range but within a threshold range containing the permissible speed range, and the request for a new cruise speed can be disregarded if it is outside the threshold range. For example, a permissible speed range can be 7 mph to 11 mph, and a threshold range can be 5 mph to 15 mph (or any other suitable range). In that example, a new requested cruise speed between 11 mph and 15 mph would cause the cruise speed to be set to 11 mph, and a new requested cruise speed between 5 mph and 7 mph would cause the cruise speed to be set to 7 mph, and a new requested cruise speed of less than 5 mph or higher than 15 mph would be disregarded (e.g., assumed to be a malfunction or user error). Where example speed values are listed herein, other speed values could also be used such as depending on the water-sports activity or user skill level or user preferences, etc.

In some implementations, a determination of whether a new requested cruise speed is within the permissible speed range at block 4310 can be performed each time the rider presses, or releases, the button 140*e* or the button 140*f*. For example, if the rider presses button 140*e* repeatedly, the cruise speed can be incrementally raised each time that the determination at block 4310 indicates that the incrementally higher requested new cruise speed is within the permissible speed range. In some implementations, multiple inputs to the rider control device 134 within a set amount of time (e.g., one second, or any other suitable time) can be treated as a single request. For example, if a user presses the increase speed button 140*e* three times in rapid succession (e.g., within one second) a single request can be produced for a new cruise speed that is three increments higher than the current cruise speed. In some implementations, inputs can be grouped together into a single command until a pause of a set amount of time (e.g. half a second, or any other suitable time) occurs without input. For example, if the user presses the button 140*e* four times without pausing for more than half a second, for example, a single request can be produced for a new cruise speed that is four increments higher than the current cruise speed. If a button is held down, a single request can be produced upon release of the button, and the request can depend on the amount of time that the button was held down. By way of example, each fourth of a second that the rider holds down button 140*e* or 140*f* can produce an incremental change in the requested new cruise speed. If the rider held down the button 140*e* for half a second, then a request to increase the cruise speed by two increments can be produced when the button 140*e* is released. In some implementations, when the button is held down, multiple requests can be sent as the button is held down. For example, if the user held down the button 140*e* for 0.75 seconds, three requests to incrementally increase the cruise speed can be produced and each of the three requested new cruise speeds can be evaluated at block 4310 to determine whether the three new cruise speeds are within the permissible speed range.

The determination of whether the requested new cruise speed is within the permissible speed range at block 4310 can be performed for each requested new cruise speed. The permissible speed range can be stored (e.g., in computer-readable memory) so that it does not need to be determined at block 4308 for each evaluation. A new permissible speed range can be determined after a change to the base cruise speed (e.g., a new base cruise speed set by the driver). In some implementations, the permissible speed range can be determined or confirmed before each time the comparison at block 4310 is performed. The base cruise speed can be stored (e.g., in computer-readable memory). The base cruise speed can be used to determine the permissible speed range, even if the current cruise speed is different than the base cruise speed (e.g., because the rider may have already adjusted the cruise speed).

The process 4300 can have many variations. In some embodiments, a base cruise speed setting can be set by the rider, by a passenger user interface, by an entity external to the watercraft, etc. The base cruise speed can be a default value not specifically set by a user of the watercraft. A preset wake surf setting for the watercraft can have a base cruise speed or permissible cruise speed range as part of the preset settings. The driver, rider, or other entity, can select the preset wake surf setting to set the base cruise speed or permissible range. In some instances, the cruise speed can be changed (e.g., by the rider) before the watercraft is brought to the cruise speed. Accordingly, block 4304 can be omitted or moved to a different part of the process. If the rider changes the cruise speed before the watercraft has gotten up to speed, the change can adjust the target speed only without changing the throttle of the boat as it comes up to speed. Many other variations are possible.

Figure 44:
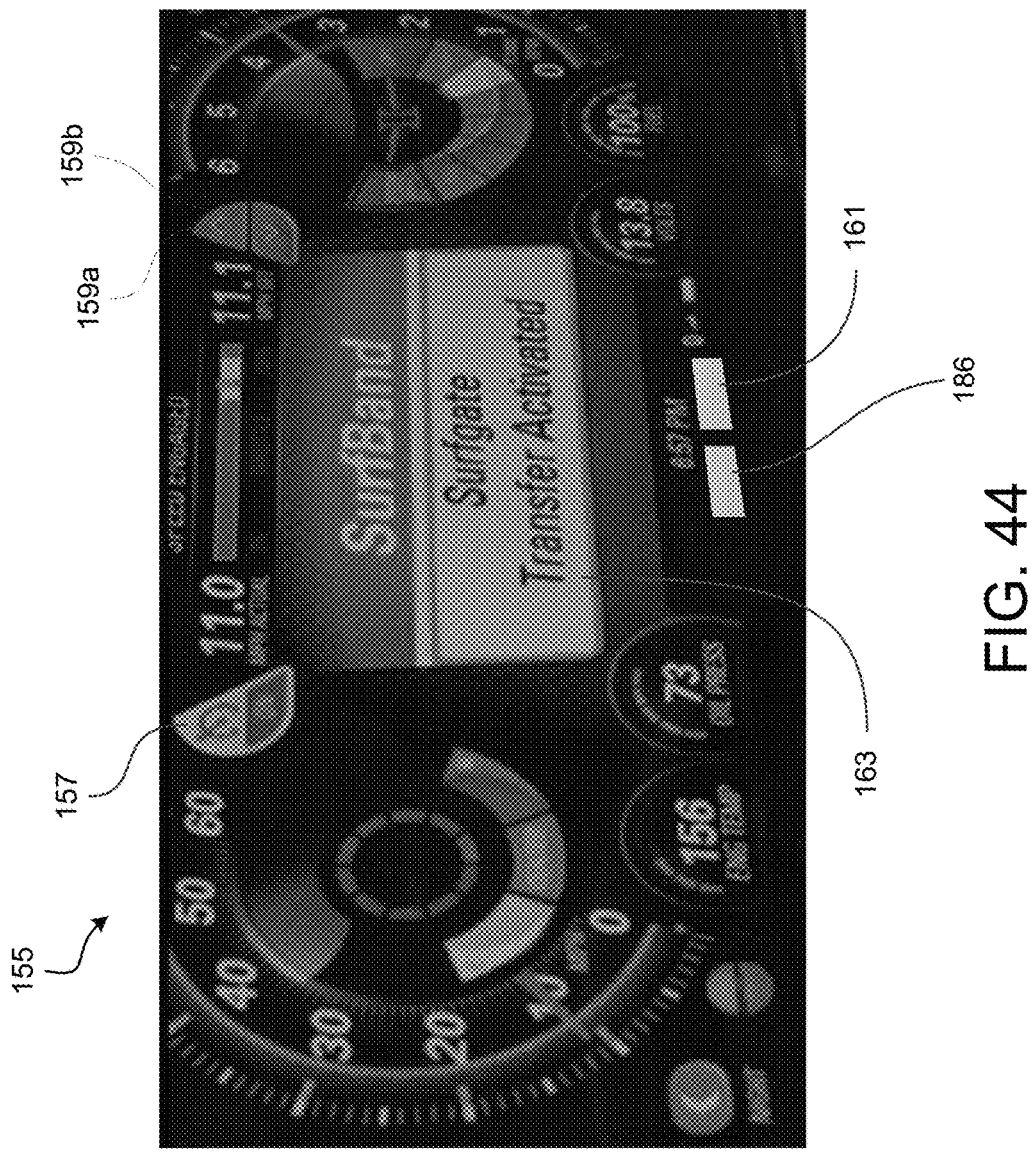
FIG. 44 shows an example embodiment of a driver user interface.

FIG. 44 shows an example embodiment of a driver user interface 155 on the watercraft, which can be a driver command center. The driver user interface 155 can include user input elements, which can be buttons, dials, stitches, or virtual buttons on a touchscreen, etc. The driver user interface 155 can include controls for the cruise control system 149. A user input element 157 can turn cruise control on and off. One or more user input elements 159*a* and 159*b* can enable increasing or decreasing the cruise speed (e.g., set point). For example, virtual button 159*a* can increase the cruise speed (e.g., similar to the button 140*e* on the rider control device 134, except that the driver user interface 155 can adjust the base cruise speed), and 159*b* can decrease the cruise speed (e.g., similar to the button 140*f* on the rider control device 134, except that the driver user interface 155 can adjust the base cruise speed).

The driver user interface 155 can provide a user input element 161 (e.g., a button, switch, or touchscreen that provides a virtual button, etc.) to allow the driver the enable and disable rider control. If the driver enables rider control, then input from the rider to the rider control device 134 can control features on the boat (e.g., boat speed, foil, water diverters, etc.). If the driver disables rider control, then input from the rider to the rider control device 134 can be ignored. In some embodiments, some features of the rider control device 134 can be enabled while others are disabled. For example, the watercraft speed adjustment can be disabled, while the surf side selection is enabled, or the surf side selection can be disabled while the watercraft speed adjustment and/or wake size adjustment is enabled (e.g., when wakeboarding). The enablement and disablement of various features can be made in response to input received by user input elements on the driver user interface 155. The driver user interface 155 can enable various other user inputs, as discussed herein (e.g., indicating a type of activity such as wake surfing, wakeboarding, or waterskiing), adjusting the foil 130, the wake modifying elements 102 of the surf system, the ballast, etc.

In some embodiments, features on the boat (e.g., speed, foil position control, and water diverter control) can be disabled for driver control while the rider control device 134 is enabled, while in some embodiments the driver can still control those features while the rider control device 134 is enabled. In the event of conflicting commands from the driver and the rider control device 134, the system can give priority to commands received from the driver, although priority could alternatively be given to the rider control device 134. In some embodiments, rider control can be disabled automatically when the driver performs certain actions (e.g., lowering the throttle, adjusting the throttle, adjusting the foil, adjusting the water diverters, and/or any action that adjusts the wake other than steering). In some embodiments, the watercraft can follow commands from both the driver (e.g., via the driver user interface 155) and the rider (e.g., via the rider control device 134), and if conflicting commands are received the watercraft can follow the most recent command. In some embodiments, the watercraft can be configured to follow commands from the rider control device 134 only if the rider command is not inconsistent with a driver command that was received within a threshold amount of time. Accordingly, if the driver (e.g., via the driver user interface 155) specifies a position for the foil 130, a speed for the watercraft, or a position for the surf system wake modifiers 102, the watercraft can disregard commands from the rider control device 134 that would conflict with the driver command for a threshold amount of time (e.g., 5 seconds, 10 seconds, 30 seconds, 1 minute, 3 minutes, 5 minutes, 10 minutes, 15 minutes, or any value therebetween, or any ranges bounded by the above values).

The driver user interface can provide information to the driver regarding commands received by the rider control device 134. For example, the driver user interface can include a display or speaker or other output device that provides alerts or notifications to the driver when a feature on the watercraft is changing or is going to change as a result of a command received by the rider control device 134. If the rider selects to have the speed of the watercraft increase, a display can show a picture or text 163 for altering the driver that the speed is increasing or will increase, and/or a sound (e.g., a beep or recorded voice message) can provide the indication. In some embodiments, a sound can indicate that a change is occurring or will occur, and that can prompt the driver to view the display, which can provide an indication of what the change is (e.g., change speed, lower foil, switch side of surf wake, etc.). In the example embodiment shown in FIG. 44, the driver alert is a graphical text message indicating that the rider has initiated a transfer of the surf wake from one side of the boat to the other side of the boat. In some embodiments, the system can cause a delay (e.g., 0.25 seconds, 0.5 seconds, 1 second, 1.5 seconds, 2 seconds, 3 seconds, or any value therebetween, or any ranges bonded by these values) before implementing the change resulting from the rider command, such as to give the driver a chance to be informed of the change. In some embodiments, the driver interface 155 can include a user input element for the driver to provide input to approve the change requested by the rider (e.g., via the rider control device 134). In some embodiments, the watercraft can wait to receive approval from the driver (e.g., via the user input element on the driver interface 155) before implementing the change requested by the rider.

The rider control device 134 can include other control elements not shown in FIGS. 40A and 40B. For example, in some embodiments, the rider control device 134 can include music controls 146, which can include one or more user input elements to enable the rider to control music volume, song selection, etc. The watercraft 100 can include a sound system 151, which can include speakers configured to direct sound rearward of the watercraft to the rider. The sound system 151 can change music output by the speakers in response to commands received from the rider via the music controls 146 on the rider control device 134. The music controls 146 can include multiple user input elements, in some embodiments, such as for changing the volume of the music and for changing the song. The music system can have music controls on the boat (e.g., via a radio or music system interface, such as at the driver station or elsewhere in the boat). In some instances, the music controls on the rider control device and the music controls on the boat can both control the music system (e.g., a rider can raise the volume, while a driver or passenger on the boat changes the song). In the event that conflicting commands are received from the rider control device and the controls on the boat, the system can defer to the controls on the boat (e.g., ignoring the commands from the rider control device). The deference to controls on the boat can apply to the music controls, as well as the other features that can be controlled using the rider control device (e.g., wake size, surf side, speed, ballast, etc.).

Various other features of the boat can be controlled from the rider control device 134 as would be apparent to one of skill in the art based on the disclosure herein. In some embodiments, the rider control device 134 can include ballast controls 160, which can enable the rider to make adjustments to the ballast system 162 of the watercraft, such as adding water ballast, removing water ballast, moving water ballast from one portion of the watercraft to another portion of the watercraft.

In some embodiments, the rider control device 134 can include a user output element 148 configured to output information to the rider. The user output element 148 can include a display screen (e.g., a touchscreen, which can also serve as a user input element), one or more lights, a speaker for outputting sound to the rider, a vibrating element, etc. By way of example, a display can show one or any combination of the current speed, the target cruise speed, the current foil 130 position, the target foil position 130, the wake size setting, the current position of one or more wake modifying elements of the surf system (e.g., flaps 33), the target position of one or more wake modifying elements of the surf system (e.g., flaps 33), an indication of which side of the wake is configured for wake surfing (e.g., a surf-right configuration or a surf-left configuration), an indication of the water-sport activity (e.g., wake surfing, wakeboarding, or waterskiing), an indication of the wake steepness, ballast settings, etc. The above information can be displayed graphically or by text on a display, for example. The user output element 148 can display music information, such as the music volume level, the current song name, a playlist name, song metadata, etc.).

In some embodiments, the user output element 148 can include one or more lights. For example, the user output element 148 can have a first light setting (e.g., a first color light can be illuminated, or no light illuminated) when the wake settings are static, and the user output element 148 can have a second light setting (e.g., a second color light can be illuminated) when the rider has indicated a change for a setting, but the change has not yet completed implementation. For example, a rider can request a change in the position of the foil 130 (e.g., to increase the size of the wake), and it may take a period of time for the foil 130 to move to the new position. While the foil 130 is moving, the second light setting (e.g., red light) can be presented to the rider, and after the foil 130 has reached the new position, the first light setting (e.g., green light) can be presented to the rider. This can help the rider decide whether to make additional adjustments to the settings, by informing the rider of whether the prior requested adjustment has been implemented. Similarly, if a rider requests an increase in the speed of the watercraft, it may take some time for the speed to change (e.g., especially if the requested change is for several increments of increased speed, or if the driver is controlling the speed to override the request from the rider). The second light setting (e.g., red light) can be presented to the rider after the request and until the new speed has been reached, and the first light setting (e.g., green light) can be presented to the rider once the new requested speed has been reached. This can help the rider decide when and whether to make additional changes to the speed.

The display can show a text or graphical indication of whether the settings are static, or changing, or whether a prior request is pending or completed, similar to the discussion above. In some embodiments, the watercraft can present the information discussed in connection with the user output element 148 to the rider (e.g., as discussed herein regarding rider notification or rider alerts). For example, the watercraft can include lights or other visual indicators (e.g., on the transom, the swim step, and/or the tower) that can present the information discussed above to the rider. Also, the watercraft can present the above information to the rider using the sound system 151 (e.g., using beeps, or voice messages, or any other suitable sounds). Various other items of information can be presented to the rider. For example, if a command received from the rider (e.g., via the rider control device 134) is disregarded, such as if the driver disabled rider control, or if the rider command would be inconsistent with driver input, or if the setting requested to be changed has already reached the permitted boundary, the watercraft or the rider control device 134 can present a rider notification (e.g., a beep, an error sound, a voice message, a particular color of light, a graphical message, a text message, etc.).

As discussed herein, the rider control device 134 can include a communication interface 136, which can be configured to communicate with the communication interface 126 on the watercraft. The communication interfaces 126 and 136 can be wireless communication interfaces (e.g., communicating via WiFi, or via any other suitable communication protocol). In some implementations, the communication interfaces 126 and 136 can communication via a wired communication link. For example, a wire or cable can extend through a tow rope that is connected to the rider control device 134. For example, the rider control device 134 can be a tow rope handle. In some embodiments, the communication between the wireless communication interfaces 126 and 136 can have a limited range (e.g., 10 meters, 20 meters, 30 meters, 40 meters, 50 meters, 75 meters, 100 meters, or more, or any values therebetween, or any ranges bounded by these values), which can impede signals from the rider control device 134 from being sent to the wrong watercraft and vice versa. In some embodiments, the rider control device 134 can be registered with the particular watercraft, such that signals from the rider control device will only be acted on by the correct watercraft, and so that the rider control device 134 will only accept input from the correct watercraft.

In some embodiments, multiple rider control devices 134 can be used by multiple riders. For example, while one rider is riding behind the boat, the next rider can be preparing to ride, and both riders can be wearing rider control devices 134. The driver user interface and/or the rider control devices 134 can include user input elements to enable transferring of rider control between the multiple rider control devices 134.

In some embodiments, one or more of the user input elements (e.g., the buttons 140*a-f*) can be programmable, so that what the watercraft does in response to a particular user input element (e.g., button) on the rider control device 134 can be changed (e.g., using the driver interface 155). For example, a single user input element (e.g., button) can change multiple settings. Preset configurations can be set (e.g., using the driver interface 155). A user can define a preset configuration for particular settings for one or more of speed, foil position, wake surf side, wake modifying element (s) (e.g., flags 33) setting, ballast, etc. Actuating a single user input element (e.g., a button) on the rider control device can implement the preset configurations for the various setting specified. Different riders may prefer different functionality for the rider control device 134. A rider profile can be selected (e.g., via the driver interface 155 or the rider control device 134) and the functionality previously specified for that user profile can be applied. For example, a first rider profile may be mapped so that buttons one and two on the rider control device implement presets one and two, and a second rider profile may be mapped so that the same buttons one and two on the rider control device implement presets three and four.

In some embodiments, the rider control device 134 can include a position sensor 164, which can be a global positioning system (GPS). In some embodiments, the watercraft can include a position sensor 166, which can be a global positioning system (GPS). In some embodiments, the position sensors 164 and/or 166 can be a proximity sensor, which can indicate a distance between the rider control device 134 and the watercraft. When the distance between the watercraft and the rider control device 134 is above a threshold distance (e.g., 5 meters, 10 meters, 20 meters, 30 meters, 40 meters, 50 meters, 75 meters, 100 meters, or more, or any values therebetween, or any ranges bounded by these values), the watercraft can deliver a notification to the driver that the rider has fallen. For example, the watercraft can play a sound to alert the driver, or the watercraft can display a message (e.g., by text or graphical) on the driver user interface 155) to notify the driver that the rider has fallen.

In some embodiments, rider device can include the position sensor 164 without the control elements. For example, a device worn by the rider, or on the rider's equipment (e.g., surfboard) can include the position sensor 164, and the various other features of the rider control device 134 can be omitted.

Figure 45:
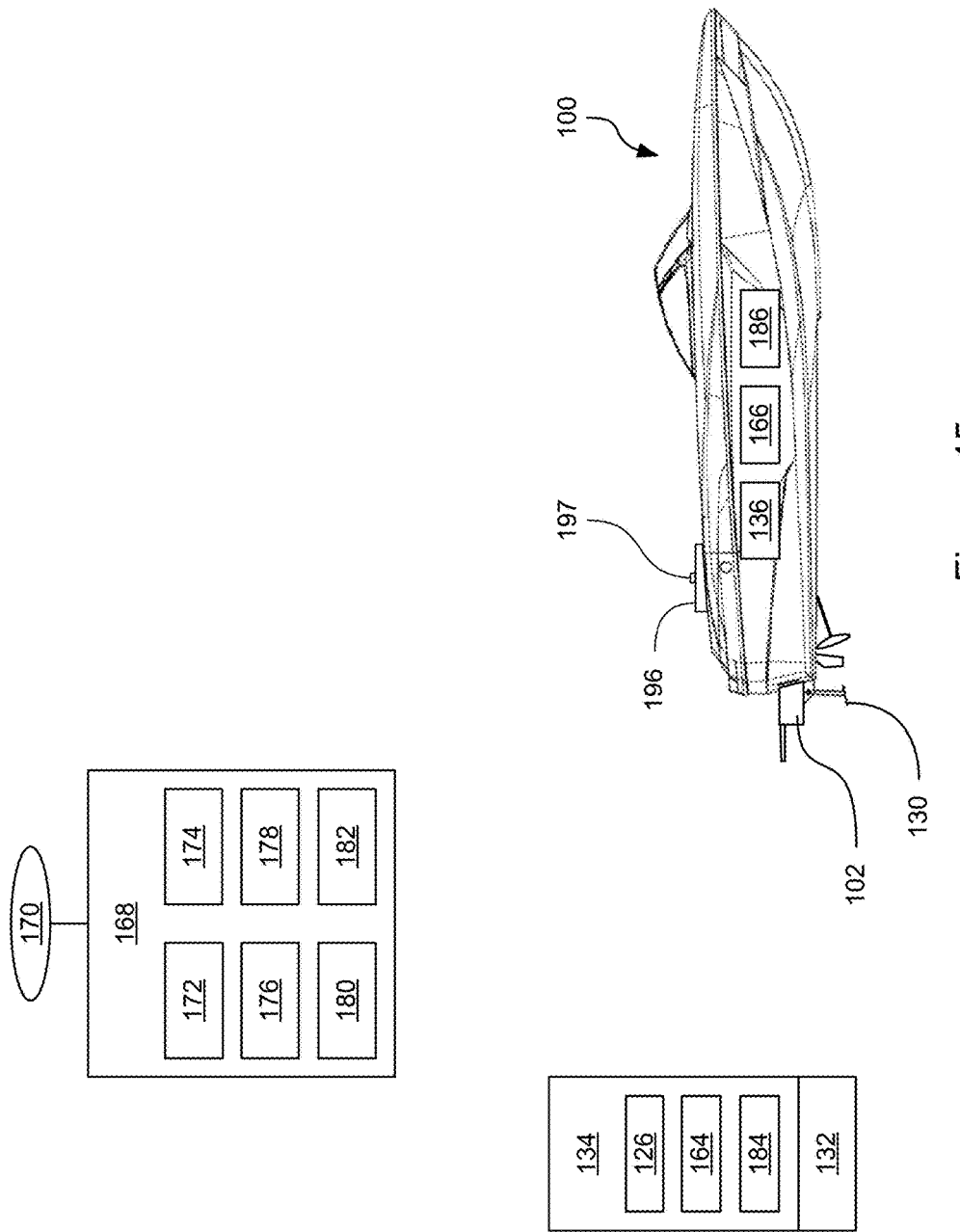
FIG. 45 shows an example embodiment of a system having a watercraft, a rider control device, and a drone.

FIG. 45 shows a drone 168, which can be used to take video or still images of the rider 132 and/or the watercraft 100. The watercraft 100 and the rider control device 134 can have features similar to or the same as the other embodiments discussed herein, even where not specifically shown or discussed in connection with FIG. 45. In some embodiments, the position sensor 164 on the rider control device 134 (or rider device without control elements) and/or the position sensor 166 on the watercraft can be used to control the drone 168. Although various embodiments here are discussed as using a rider control device 134 with a position sensor, in some implementations the position sensor can be on a rider device that does not include control elements. The drone 168 can include a propulsion system 170 to cause the drone 168 to fly through the air. The propulsion system 170 can include one or more rotors and one or more engines configured to drive the rotors to produce lift. The proposition system 170 can steer the drone 168 as it flies through the air. For example, the position of the one or more rotors can move to steer the drone 168. The drone 168 can include a camera 172. The camera 172 can be configured to take still images and/or video. The camera 172 can be waterproof. In some embodiments, the camera 172 can be movable on the drone 168. For example, the drone 168 can include a motor that is configured to position the camera relative to the drone 168 in order to capture images in a desired direction. The drone 168 can include a position sensor 174, which can be a global positioning system (GPS).

The drone 168 can include a communication interface 176, which can be a wireless communication interface. The communication interface 176 can communicate with the watercraft 100 (e.g., via the communication interface 126) and/or the rider control device 134 (e.g., via the communication interface 136) using WiFi or any other suitable wireless communication protocol. The rider communication device 134 can communicate directly with the drone 168 (e.g., via communication interfaces 136 and 176) or information can be relayed through the watercraft 100 for communication between the drone 168 and the rider control device 134. The drone 168 can include a controller 178, which can include one or more computer processors and can control operation of the drone 168, as described herein. The drone 168 can include memory 180 (e.g., non-transitory computer readable memory), which can include computer-executable instructions that can be executed by the controller 178 to cause the drone 168 to perform the operations discussed herein. The memory 180 can also store video and/or still images generated by the camera 172. In some embodiments, the memory 180 can include multiple memory units, and operating software can be stored on a separate memory unit from the video and/or still images. In some embodiments, a memory unit can be removable from the drone 168. The drone 168 can include a memory unit port configured to removably receive a memory unit (e.g., for storing video and/or still images).

The drone can be configured to follow the watercraft 100 and/or the rider control device 134 (or a non-control rider device coupled to the rider). For example, the drone 168 can receive information from the position sensor 164 of the rider control device and/or from the position sensor 166 of the watercraft 166, and the drone 168 can operate the propulsion system 170 based on that information to follow the watercraft 100 and/or the rider control device 134. In some embodiments, the drone 168 can use information from the position sensor 174 of the drone 168 to position the drone 168 and/or camera 172. The drone 168 can operate the propulsion system 170 to generally match the speed and direction of travel of the watercraft 100 and/or the rider control device 134, e.g., so that the drone 168 can keep up with the watercraft 100 and rider. If the watercraft 100 changes direction or changes speed, the drone 168 can operate the propulsion system 170 accordingly to make corresponding changes to the direction and/or speed of the drone 168. The drone 168 can position the camera 172 based on the information from the position sensor 164 and/or the position sensor 166. In some embodiments, the camera 172 can be movable relative to the body of the drone 168, and an actuator can be configured to move the camera relative to the body of the drone based on the position information of the watercraft 100 and/or rider control device 134. In some embodiments, the drone 168 can position the camera 172 by operating the propulsion system 170 to position the drone at a height, location, and/or orientation that corresponds to the desired camera position. The drone 168 can position the camera 172 to generate video and/or still images of the rider 132 behind the watercraft 100, and/or of the watercraft 100. In some embodiments, the drone 168 can include an orientation sensor 182 (e.g., an accelerometer), which can provide information about the orientation of the drone 168. The drone 168 can use the orientation information to position the drone 18 and/or the camera 172.

The operation of the drone 168 can be automated, partially automated, or manually controlled. In some embodiments, the drone 168 can be configured to use the position information described above to fly the drone 168 and/or position the camera 172 without user input. In some embodiments, the drone 168 can receive commands (e.g., from the rider 132, from the driver of the watercraft, from a passenger in the watercraft, or from a source outside the watercraft), and can change operation of the propulsion system 170 or the camera 172 in response to the commands. The rider control device 134 can include drone controls 184 (see FIG. 45). The drone controls 184 can include one or more user input elements (e.g., buttons, switches, dials, virtual buttons, touchscreen features, etc.) for providing input to the drone 168. Input received by the drone controls 184 can be communicated from the rider control element 134 to the drone 168 (e.g., via communication interfaces 126 and 176), or can be relayed through the watercraft 100 to the drone 168 (e.g., via the communication interface 136 on the watercraft). In some embodiments, the watercraft 100 can include drone controls 186. For example, the driver user interface 155 can include drone controls 186 (see FIG. 44) to enable the driver to provide input to the drone 168. A user interface with drone controls 186 can be positioned on the watercraft 100 at other locations configured to be used by a passenger in the watercraft 100 instead of the driver. In some implementations, a portable controller (e.g., similar to the rider control device 134 or operator control device 135 discussed herein) can include drone controls 186 and can be configured to be held by, or coupled to, an operator (e.g., a passenger in the watercraft 100). The drone controls 184 and/or 186 can include user input elements for providing various commands to the drone 168, such as for example, fly closer to the target (e.g., the rider 132 or the watercraft 100), fly further away from the target, zoom in with the camera 172, zoom out with the camera 172, flow at a lower height, fly at a higher height, increase or decrease the distance that the drone 168 flies behind the watercraft 100, select or change the side of the watercraft that the drone 168 flies one (e.g., port side or starboard side), toggle through preset drone locations or maneuvers or settings, etc. In some embodiments, the drone controls 184 and/or 186 can include manual controls that can enable an operator (e.g., the rider, watercraft driver, passenger in the watercraft, etc.) to manually fly the drone 168, which can override the automated system for flying the drone 168. In some embodiments, the drone controls 184 and/or 186 can include a display for showing the video and/or still images from the camera 172.

In some embodiments, the drone 168 can receive an indication of a watersport activity (e.g., wake surfing, wakeboarding, or waterskiing) and the drone 168 can operate the proposition system 170 and/or camera 172 differently depending on the indicated activity. For example, the drone 168 can fly closer and/or zoom the camera in more for wake surfing than for wakeboarding or waterskiing. In some embodiments, the drone 168 can receive an indication that the surf wake is changing or will change from one side to the other, and the drone 168 can change operation of the propulsion system 170 and/or camera 172 in response to the indicated change. For example, if the surf wake changes from one side (e.g., the port side) to the other side (e.g., the starboard side), the drone 168 can change sides as well. In some implementations, the drone 168 can fly on the same side of the watercraft 100 as the surf wake and the rider 132. In other implementations, the drone 168 can fly on the opposite side of the watercraft 100 as the surf wake and the rider 132.

In some embodiments, the rider 132 provide a command (e.g., via the drone controls 184 on the rider control device 134) to the drone 168 to perform a predetermined operation, such as when the rider 132 intends to perform a particular trick. By way of example, the drone 168 can lower the flying height, fly closer to the rider, zoom in the camera 172, circle around the rider 132, change to the other side of the watercraft 100, etc. in response to the command from the rider 132. The drone 168 operations and user input elements of the drone controls 184 can be programmable to enable a user to define particular drone operations based on the rider's preferences. In some embodiments, a single command (e.g., from the rider 132 or watercraft driver) can cause changes to the watercraft 100 and changes to the drone 168. For example, a rider 132 can provide a command through the rider control device 134 to change the watercraft 100 from a surf-left configuration to a surf-right configuration, as discussed herein. That same single command from the rider can also be sent to the drone 168 (e.g., directly from the rider control device 134 or relayed through the watercraft 100), and the drone 168 can change operation of the propulsion system 170 and/or the camera 172 in response to the command.

In some embodiments, the driver user interface 155 can provide a driver alert if the distance between the watercraft 100 and the drone 158 is above a threshold distance (e.g., 20 meters, 30 meters, 40 meters, 50 meters, 75 meters, 100 meters, or more, or any values therebetween, or any ranges bounded by these values). The driver user interface 155 can provide a notification to the driver of the distance and/or direction to the drone 168. For example, if the drone 168 lands on the water, the driver can use the information on the driver user interface to locate the drone 168 for retrieval. The drone 168 can be buoyant so that it floats in water, and the drone can include at least one waterproof housing for the camera and/or other electronic components.

Figure 46:
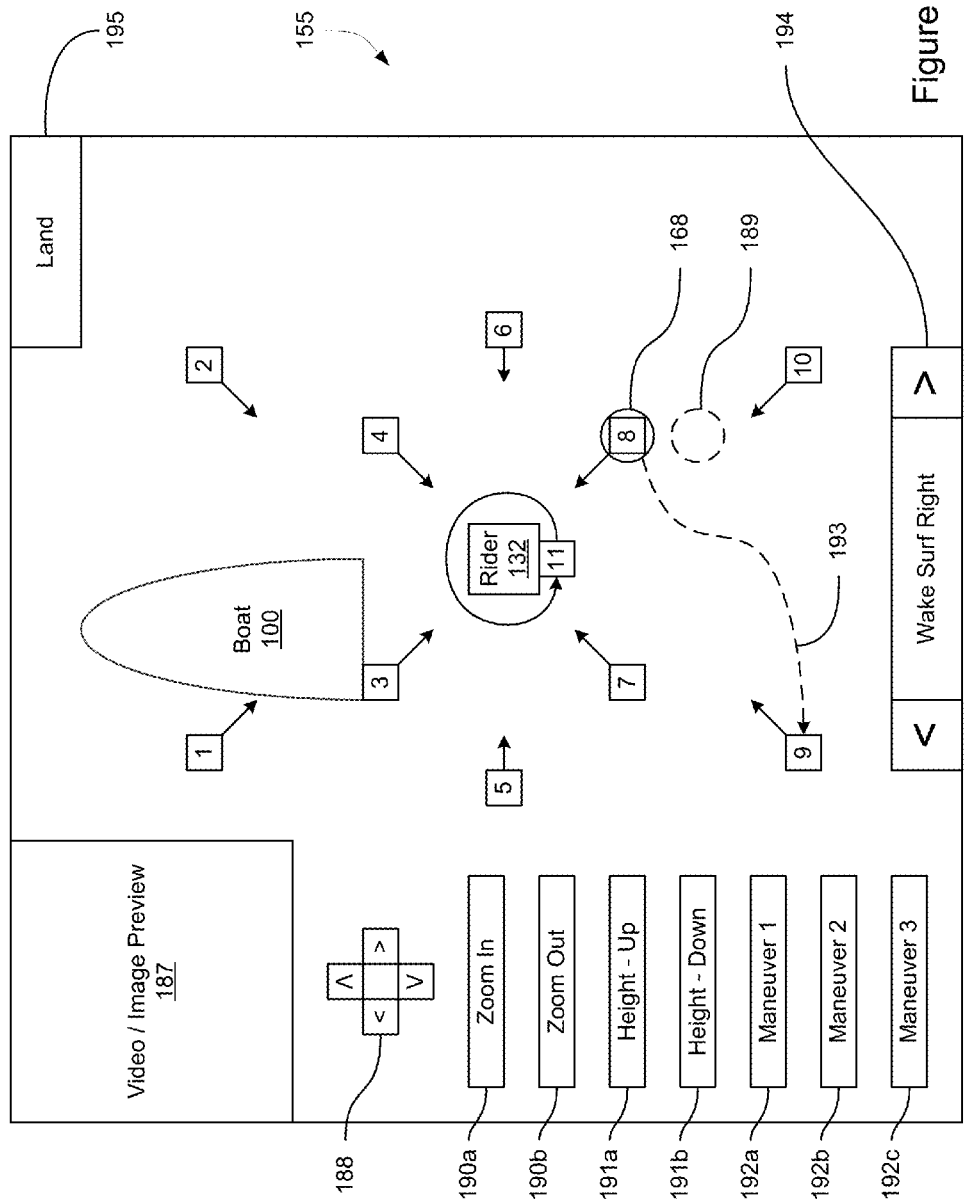
FIG. 46 shows an example embodiment of a user interface for controlling a drone.

FIG. 46 is an example embodiment of a user interface (e.g., a driver user interface 155 or a user interface on another control device) for controlling a drone 168. The user interface can include an indicator for the boat 100 and/or the rider 132. The user interface can include an indicator for the location of the drone 168. The user interface can include multiple preset drone locations (e.g., numbered 1 to 10 in FIG. 46) that can define locations for the drone relative to the watercraft 100 and/or the rider 132 (via the rider control device 134). The preset drone locations can include a camera orientation (e.g., shown by arrows in FIG. 46). The preset drone locations can include additional parameters such as an amount of camera zoom, a drone height, etc. A user (e.g., a driver) can select one of the preset drone locations. In response to the selection, the drone 168 can move to the corresponding location relative to the watercraft 100 and/or the rider 132. The drone 168 can use the propulsion system 170 so that the drone 168 flies through the air to generally maintain the drone 168 at the corresponding location relative to the watercraft 100 and/or to the rider 132 as the watercraft 100, rider 132, and drone 168 move along the body of water. In the example of FIG. 46, the drone 168 is located at preset drone location number 8. If the watercraft turns to change direction, the drone 168 can change direction as well so that the drone 168 is generally maintained at the location 8 relative to the watercraft 100 and/or the rider 132. If the operator were to select location number 9, the drone 168 can move from location number 8 to location number 9 in response to the selection. In some embodiments, the user interface can be a touchscreen, and the operator can provide input and selections by touching the screen. For example, touching the screen at the location of the number 9 and provide a selection to move the drone 168 to the preset drone location number 9. Other user input elements can be used. For example, mechanical buttons, switches, dials, etc. can be used. In some embodiments, the user interface can receive audio inputs (e.g., dictated by the driver or other operator).

In some embodiments, the user interface can include a video or image preview 187 that can display the image or video captured by the drone camera 172 (e.g., at a reduce image resolution). This can enable the operator to assess the drone location and other settings and decide if changes to the drone location or other settings would improve the image or video. The user interface can include user input elements to enable the operator to adjust the drone settings (e.g., location, height, camera zoom, etc.). The user input elements can be virtual buttons on a touchscreen, mechanical buttons, switches, dials, etc.

Drone location controls 188 can receive user commands to change the location of the drone 168. The drone location controls 188 can include user input elements for selecting movement forward, back, right, and left. By way of example, pressing the back movement button can cause the drone 168 to move from location number 8 to a new location 189. The drone 168 can generally maintain its position at the new location 189 relative to the watercraft 100 and/or the rider 132, e.g., until a new command is provided to the drone 168. The drone location controls 188 can depend on the orientation of the watercraft 100 (e.g., water-sports boat). For example, the forward direction user input element can cause the drone 168 to move in a direction parallel to a line from the stern of the watercraft 100 to the bow of the watercraft 100, which can change as the watercraft 100 turns. In some embodiments, the done location controls 188 can include a joystick. If the user selects location number 8, the drone 168 can move from the new location 189 back to location number 8. If the user selects another location (e.g., location number 7), the drone 168 can move from the new location 189 to the other location (e.g., location number 7).

The user interface can include one or more zoom control user input elements 190a-b, which can include one or more virtual buttons, slides, etc. on a touchscreen, buttons, switches, dials, etc. In the example of FIG. 46, a zoom in user input element 190a can be selected for zooming in the camera to reduce the field of view, and a zoom out user input element 190b can be selected for zooming out the camera to increase the field of view. In some embodiments, the user interface can include directional controls (e.g., similar to the directional user input elements 188) for changing the orientation of the camera. Up, down, right, and left buttons can be used, for example, to rotate the camera orientation up, down, right, or left. The camera orientation can be adjusted relative to the body of the drone 168, or in some instances the orientation of the drone body can move to adjust the camera orientation. The user interface can include one or more drone height control user input elements 191a-b. The user input element 191a can cause the drone 168 to raise up to fly higher, and the user input element 191b can cause the drone 1689 to lower down to fly lower.

In some embodiments, the system can include a rider lock feature that can facilitate keeping the camera directed toward the rider. The camera orientation can adjust automatically as the height of the drone is adjusted so that the camera continues to point at the rider 132. Similarly, the drone height and/or position can automatically be changed in response to changes to the orientation of the camera so that the camera continues to point at the rider 132. In some embodiments, the rider lock feature can be enabled and disabled, such as using a button, switch, or other user input element. In some embodiments, the system can include a boat lock feature that can facilitate keeping the camera directed towards the boat. The camera orientation can adjust automatically as the height of the drone is adjusted so that the camera continues to point at the boat 100. Similarly, the drone height and/or position can automatically be changed in response to changes to the orientation of the camera so that the camera continues to point at the boat 100. In some embodiments, the boat lock feature can be enabled and disabled, such as using a button, switch, or other user input element.

The system can enable an operator to modify the preset drone locations or to define new preset drone locations or other settings. By way of example, after the operator moves the drone to the new location 189, the operator can select the new location 189 to be a new preset location. The preset location number 8 can be moved to the new location 189, or a new preset location can be created that is separate from the preexisting preset location number 8.

In some embodiments, the system can enable the operator to select a preset maneuver to be performed by the drone 168. For example, selecting item number 11 on the example user interface 155 of FIG. 46 can cause the drone 168 to track a complete circle around the rider 132. The camera orientation can be adjusted as the drone 168 moves, for example to keep the camera directed toward the rider 132 during the maneuver. In the example user interface 155 of FIG. 46 the user input elements 192a-c can receive selections of different maneuvers to be performed by the drone 168. In some embodiments, a selectable maneuver can start and/or stop at one of the preset drone locations. In some embodiments, a selectable maneuver can be performed as the drone moves from one of the preset drone locations to another. For example, selectable maneuvers can cause the drone to move between preset location numbers 8 and 9 in a generally straight path, an arcuate path, an s-curve path (as shown by arrow 193 in FIG. 46), with a dip or lift in height, etc. In some embodiments, the user can select a destination preset location (e.g., location number 9) and a maneuver type (e.g., s-curve) to control the transition of the drone 168. In some embodiments, the user interface can display the maneuver to be executed (e.g., by arrow 193 in FIG. 46), and the operator can provide an input to confirm the maneuver, and the drone 168 can execute the maneuver in response to the command.

In some embodiments, the user interface can enable the operator to input a series of commands, which can be executed by the drone 168. The series of commands can be stored in a memory. In some embodiments, the series of drone commands can be executed as part of a preset run (as discussed herein). For example, the drone maneuvers and positions can be coordinated with changes to the surf settings of the boat as the boat goes through the preset run.

In some embodiments, the drone settings can change based on the water-sports activity (e.g., tubing, wake surfing, wakeboarding, and waterskiing). In the example user interface of FIG. 46, the system can be in a wake surf right mode, shown by label 194. One or more user input elements (e.g., right and left arrows) can be used to change the mode to wake surf left, tubing, wake boarding, or waterskiing. In some embodiments, the water-sports activity mode can change automatically, e.g., based on the speed of the boat 100, the settings for the wake shaping features, the position of the rider 132 relative to the boat 100. For example, wake surfing is generally performed at slower speed and closer to the boat than wakeboarding or waterskiing. When the water-sports activity mode changes the preset drone locations and maneuvers can also change. For example, when in wakeboarding mode, the preset drone locations can be positioned further away than corresponding preset drone locations in wake surfing mode. In some embodiments, the preset drone locations of the right (starboard) side and left (port) side surf modes can be generally symmetrical to each other across the longitudinal axis of the boat 100. For example, when in wake surf right mode (e.g., as shown in FIG. 46), the preset location 8 can position the drone behind the rider and offset to the right, e.g., with the boat in the background of the image. If the rider 132 and/or boat 100 transition to a wake surf left mode (e.g., with the rider 132 now surfing on the left or port side, as discussed herein), the preset location 8 can change to be behind the rider and offset to the left, e.g., with the boat in the background of the image. The drone 168 can move from the older preset location 8 to the new preset location 8 in response to the change of the water-sports activity mode (implemented by the rider (e.g., via a rider control device 134) or driver or other operator, etc.).

In some embodiments, the preset drone location can be a defined area or range, and the drone 168 can move within that defined area or range depending on the position of the rider. In some embodiments, the drone's position can be based on the boat 100 (e.g., the position, speed, heading, etc. of the boat 100) while the orientation of the camera 172 on the drone 168 can be based on the rider 132 (e.g., the position, speed, direction of movement, etc. of the rider). In some embodiments, the drone 168 can operate independent of the rider's position, and can be used without a rider device having a location sensor (e.g., GPS). For example, the general location of the rider can be inferred based on the speed and position of the boat and the designated water-sports activity, and the camera 172 can be orientated based on the inferred position of the rider without any specific rider location information (e.g., from a GPS on a rider-worn device). In some embodiments, the drone 168 can operate based on the rider (e.g., the position, speed, direction of movement, etc. of the rider) and independent of the boat 100 (e.g., the position, speed, heading, etc. of the boat). For example, since the rider follows the boat (e.g., by being towed or to ride the wake) the rider location information can be used to enable the drone 168 to follow the boat. In some embodiments, when the rider falls the drone 168 can cease following the boat 100 and can stay near the rider. In some embodiments, the operation of the drone 168 can be based on both the rider (e.g., the position, speed, and/or direction of movement, etc. of the rider) and the boat 100 (e.g., the position, speed, and/or heading, etc. of the boat), which can in some instances provide more precise control of the drone 168 as compared to operating the drone 168 based only on the boat or only on the rider. For example, a change in the direction of the rider could mean that the boat has changed direction or that the rider is performing a maneuver (e.g., crossing from one side of the wake to the other side of the wake). If the drone 168 is controlled based on both the boat 100 and rider 132 location data, then it can be determined whether the boat has changed direction or whether the rider is merely performing a maneuver and the drone 168 can be controlled accordingly.

Although various examples disclosed herein describe position sensors using GPS, alternatives to GPS can be used. In some embodiments, the system can use an infrared tracking system and/or a laser tracking system to enable the drone 168 to track the watercraft 100 and/or to track the rider 132. In some embodiments, image recognition software can be used on the images captured by the camera 172 of the drone 168 to identify the boat 100 and/or the rider 132, and the position of the boat 100 and/or rider 132 in the images can be used to enable the drone to track the boat 100 and/or the rider 132. In some embodiments, these techniques can be used to enable the drone camera 172 to track the rider 132 when the rider jumps (e.g., over the wake when wake boarding). In some implementations that use GPS systems, the altitude can be difficult to determine with accuracy. Accordingly, a secondary tracking technique (e.g., image recognition, infrared tracking, or laser tracking) can be used to determine when the camera 172 orientation and/or drone 168 position should be altered to track the rider when the rider jumps. In some embodiments, the secondary tracking technique can be used to confirm or check the accuracy of the GPS tracking. For example, if an error occurs with the GPS tracking such that the drone 168 moves to a position that takes the rider 132 and/or the boat 100 out of the view of the camera unexpectedly, the secondary tracking technique can provide an alert that a malfunction may have occurred.

Figure 47:
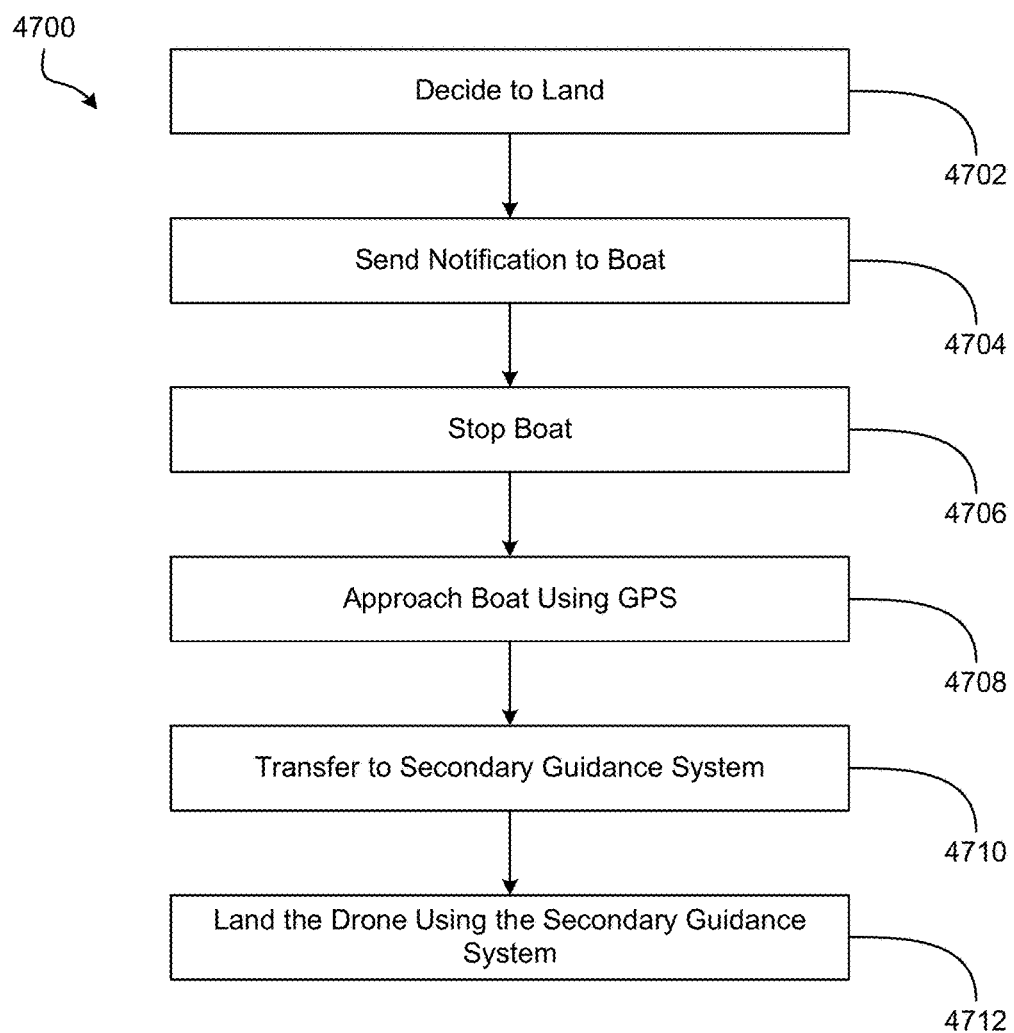
FIG. 47 is a flowchart of an example embodiment of a method for landing a drone on a watercraft.

In some embodiments, a landing system can be used to facilitate landing the drone 168 (e.g., onto the watercraft 100). FIG. 47 is a flowchart of an example embodiment of a method for landing the drone 168 on the watercraft 100. At block 4702, the drone can decide to land on the watercraft 100. The user interface 155 can include a "land" user input element 195 to instruct the drone 168 to land on the watercraft 100. In some embodiments, the drone 168 can make the decision to land without receiving a command from the user, such as if the battery of the drone 168 is low, or if the camera memory is full, or if a malfunction is detected. The drone 168 can send an alert to the watercraft 100 that the drone 168 needs to land (e.g., at block 4704). The user interface 155 can provide a notification to the driver or other operator that the drone 168 needs to land. The notification can be a visual notification, such as a graphical or textual message displayed on the display of the user interface, and/or an audio notification, such as one or more beeps or other sounds. In some embodiments, the system can enable the driver or other operator to decline a lending request from the drone 168. For example, the drone 168 can be set to send a landing request to the boat 100 when the battery has reached 5%. If the driver of the boat 100 concludes that it would not be acceptable to stop the boat at the time of the landing request (e.g., because it would not be safe to stop the boat or in order to finish the current run without interrupting the rider), the operator can decline or delay the landing request (e.g., by providing an input via a user input element on the user interface 155). In some embodiments, the boat 100 can stop before the drone 168 lands (e.g., at block 4706). The user interface 155 can provide an instruction to the driver to stop the boat. In some embodiments, the drone 168 can land when the boat is moving below a threshold speed. The user interface 155 can provide a notification to the driver (e.g., a graphical or textual message on the display) of whether the boat 100 is sufficiently slowed or stopped for the drone 168 to land, and can provide an instruction to slow or stop the boat if it is traveling above the threshold speed.

The drone 168 can land on a landing location 196 on the watercraft 100, such as on a sundeck or a swim platform. In some embodiments, the position sensor 166 of the watercraft 100 and the position sensor 174 of the drone 168 can be used to guide the drone 168 to the landing location 196. In some implementations both of the position sensors 166 and 174 can use GPS. For example, the landing location 196 can be positioned having a defined offset from the GPS location on the watercraft 100. The drone 168 can use the propulsion system 170 to land the drone 168 onto the landing location 196 based on the position of the watercraft 100 as defined by the position sensor 166 (e.g., GPS), the position of the drone 168 as defined by the position sensor 174 (e.g., GPS), and the defined offset to the landing location.

In some embodiments, a secondary guidance system can be used for landing the drone 168. The secondary guidance system can use infrared tracking, laser tracking, or image recognition to guide the drone 168 for landing. The drone 168 can use the primary guidance system (e.g., GPS) to approach the boat 100 (at block 4708). The drone 168 can transfer to the secondary guidance system (at block 4710), and the drone 168 can use the secondary guidance system for landing on the boat 100 (at block 4712). In some implementations, the secondary guidance system can have less range than the primary guidance system (e.g., GPS), and the secondary guidance system can have better accuracy than the primary guidance system (e.g., GPS) to facilitate the precision landing maneuver.

By way of example, the boat 100 can include one or more imaging markers 197 that can be identified by the camera 172 on the drone or by a separate sensor (not shown) on the drone 168. The one or more imaging markers 197 can be one or more infrared light sources, and the camera 172 or separate infrared sensor can be used to image the one or more infrared light sources, and the propulsion system 170 can land the drone 168 onto the landing location 196 based on the position of the one or more infrared light sources on the image from the camera 172 or separate sensor. In some embodiments, the one or more imaging markers 197 (e.g., a single infrared light source) can be positioned at a center portion of the landing location 196, and the drone 168 can use the secondary guidance system to aim the drone 168 directly for the one or more imaging markers when landing. Having the one or more imaging markers 197 at the center portion of the landing location 196 can enable the drone to apply the same landing approach when approaching the boat 100 from various different directions. In some embodiments, a single imaging marker 197 can be used. In some embodiments, multiple imaging markers 197 (e.g., multiple infrared light sources) can be spaced apart, and imaging the imaging markers 197 can enable the drone 168 to determine its orientation and/or range relative to the landing location 196. In some embodiments, the drone 168 can slow down as the distance to the landing location 196 decreases so that the drone 168 can land softly on the landing location 196. In some embodiments, the imaging markers 197 can be raised above the landing location 196 (e.g., by a stand or arm) to enhance the visibility of the imaging markers 197 to the drone 168. In some embodiments, the drone 168 can be configured to land at a location that is offset from the position of the one or more imaging markers 197 (e.g., if the imaging markers 197 are not positioned at the center portion of the landing location 196). In some embodiments, a warning (e.g., a visual or audio warning or alert on the user interface 155) can be issued if the drone 168 cannot locate the one or more imaging markers 197 (e.g., when the drone 168 is within a predetermined distance from the boat 100). For example, the imaging markers 197 could be covered, which would impede imaging of the markers 197. The warning or alert can prompt the user to check that the imaging markers 197 are visible.

In some embodiments, the one or more imaging markers 197 can be provided using laser light and the secondary guidance system can be a laser tracking system, which can operate similar to the infrared secondary guidance system discussed above. In some embodiments, the one or more imaging markers 197 can include a visible element that can be identified in the image of the drone camera 172 by image recognition (such as a one or more brightly colored spots, or a crosshair, or an identifiable symbol. The image recognition secondary guidance system can facilitate landing the drone 168 similar to the infrared example embodiment discussed herein.

In some embodiments, the landing location 196 can be a movable landing pad. The movable landing pad can be positioned on the sundeck on the swim platform or any other position with suitable space for landing the drone 168. The movable landing pad can include the one or more imaging markers 197, or its own GPS, to facilitate landing the drone 168 on the movable landing pad.

The drone 168 can approach the boat 100 using the primary guidance system (e.g., GPS) and can transition to the secondary guidance system (e.g., infrared tracking, laser tracking, or image recognition, when the drone 168 is determined to be within a threshold distance from the boat 100, and/or when the secondary guidance system is sufficiently operational. For example, once the one or more imaging markers 197 are visible to the camera 174 or separate sensor at a threshold visibility or confidence level, the guidance of the drone 168 can be transferred to the secondary guidance system for landing the drone 168.

Many variations are possible. For example, the one or more imaging markers 197 can be positioned on the drone 168 while the camera or other sensor for imaging the markers 197 can be located on the boat 100. The boat 100 could then send guidance information to the drone 168 (e.g., via communication interfaces 176 and 136) to guide the drone 168 during landing. In some embodiments, a light source and camera or other imaging sensor can both be located on the boat 100 and the drone 168 can include one or more reflective features configured to reflect light from the light source back to the camera or other sensor in order to track the position of the drone 168 relative to the boat 100. In some embodiments, a light source and camera or other imaging sensor can both be located on the drone 168 and the boat 100 can include one or more reflective features (e.g., on or near the landing location 196) configured to reflect light from the light source back to the camera or other sensor in order to track the position of the drone 168 relative to the boat 100. Various portions of the landing process can be omitted, performed in a different order than described, performed together, etc. For example, block 4704 can be omitted, for example, if the boat provides a command to the drone 168 to land (e.g., in response to a command received from a user via a user interface).

Some aspects of the systems and methods described herein can be implemented using, for example, computer software, hardware, firmware, or any combination of computer software, hardware, and firmware. Computer software can include computer executable code stored in computer readable medium (e.g., non-transitory computer readable medium) that, when executed, causes one or more computing devices to perform the functions described herein. In some embodiments, computer-executable code is executed by one or more general purpose computer processors. It will be appreciated, in light of this disclosure, that any feature or function that can be implemented using software to be executed on one or more general purpose computer processors can also be implemented using a different combination of hardware, software, and/or firmware. For example, such a feature or function can be implemented completely in hardware using one or more integrated circuits. Alternatively or additionally, such a feature or function can be implemented completely or partially using one or more specialized computers.

Any features of the embodiments shown and/or described in the figures that have not been expressly described in this text, such as distances, proportions of components, etc. are also intended to form part of this disclosure. However, in some instances, various features may not be shown to scale. Additionally, although these inventions have been disclosed in the context of various embodiments, features, aspects, and examples, it will be understood by those skilled in the art that the present inventions extend beyond the specifically disclosed embodiments to other alternative embodiments and/or uses of the inventions and obvious modifications and equivalents thereof. Accordingly, it should be understood that various features and aspects of the disclosed embodiments can be combined with, or substituted for, one another in order to perform varying modes of the disclosed inventions. The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure.

For convenience in explanation and accurate definition in the appended claims, the terms "inward" and "outward", "inboard" and "outboard", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wake surf system configured to allow a wake surf rider to switch a wake of a water-sports boat from a port-side surf configuration to a starboard-side surf configuration or from a starboard-side surf configuration to a port-side surf configuration while surfing on the wake of the water-sports boat, the wake surf system comprising:
    a water-sports boat comprising:
        a hull configured to produce a wake having a port-side wave and a starboard-side wave that diverge when the hull moves through water;
        one or more movable wake modifiers configured to enhance the port-side wave to produce a port-side surf configuration when the one or more wake modifiers are position in a first configuration and to enhance the starboard-side wave to produce a starboard-side surf configuration when the one or more wake modifiers are positioned in a second configuration;
        one or more actuators configured to move the one or more wake modifiers between the first configuration and the second configuration;
        a sound system that includes speakers configured to direct sound rearward of the water-sports boat to a wake surf rider; and
        a wireless communication interface; and
    a rider control device comprising:
        a securement element configured to couple the rider control device to the wake surf rider;
        a user interface comprising:
            one or more user input elements for receiving commands from the wake surf rider, wherein the user interface is configured to receive:
                a surf side control command;
                a boat speed control command; and
                a music control command; and
        a wireless communication interface configured to wirelessly communicate commands from the rider control device to the wireless communication interface of the water-sports boat;
    wherein the one or more actuators are responsive to the surf side control command to move the one or more wake modifiers from the first configuration to the second configuration to switch from the port-side surf configuration to the starboard-side surf configuration or to move the one or more wake modifiers from the second configuration to the first configuration to switch from the starboard-side surf configuration to the port-side surf configuration;
    wherein the water-sports boat is responsive to the boat speed control command to change the boat speed; and
    wherein the sound system is responsive to the music control command to change a characteristic of music output by the speakers.

2. The wake surf system of claim 1, wherein the one or more user input elements comprises a switch-surf-side user input element, wherein actuation of the switch-surf-side user input element causes the one or more actuators to move the one or more wake modifiers from the first configuration to the second configuration to switch from the port-side surf configuration to the starboard-side surf configuration, and wherein actuation of the same switch-surf-side user input element causes the one or more actuators to move the one or more wake modifiers from the second configuration to the first configuration to switch from the starboard-side surf configuration to the port-side surf configuration.

3. The wake surf system of claim 1, wherein the water-sports boat is configured to change the boat speed in response to the boat speed control command within a permissible speed range and to not change the boat speed outside the permissible speed range.

4. The wake surf system of claim 3, wherein the permissible speed range is determined based at least in part on a base speed set by a driver of the water-sports boat.

5. The wake surf system of claim 3, wherein a lower permissible speed adjustment threshold is determined based at least in part on a base speed before rider speed adjustment minus a value, and wherein an upper permissible speed adjustment threshold is determined based at least in part on the base speed before rider speed adjustment plus the value.

6. The wake surf system of claim 1, wherein the change to the characteristic of the music comprises a change of music volume.

7. The wake surf system of claim 1, wherein the change to the characteristic of the music comprises a song selection.

8. The wake surf system of claim 1, wherein the water-sports boat comprises at least one wake-modifying device configured to move to adjust a height of the wake, wherein the user interface of the rider control device is configured to receive a command to change a height of the wake, wherein the wireless communication interface of the rider control device is configured to wirelessly communicate the command to change the height of the wake to the wireless communication interface of the water-sports boat, and wherein the at least one wake-modifying device is responsive to the command received from the rider control device to move the at least one wake-modifying device.

9. The wake surf system of claim 8, wherein the at least one wake-modifying device comprises a foil.

10. The wake surf system of claim 1, wherein the user interface of the rider control device comprises a display.

11. The wake surf system of claim 1, wherein the rider control device is configured to be worn on the wrist and wherein the securement element comprises a wrist strap.

12. The wake surf system of claim 1, wherein the water-sports boat comprises a ballast system configured to add and remove water ballast to adjust the wake, wherein the user interface of the rider control device is configured to receive a ballast control command, wherein the wireless communication interface of the rider control device is configured to wirelessly communicate the ballast control command to the wireless communication interface of the water-sports boat, and wherein the ballast system is responsive to the ballast control command received from the rider control device to change the water ballast.

13. The wake surf system of claim 1, wherein the one or more wake modifiers comprise:
a port-side flap movable between a non-deployed position and a deployed position; and
a starboard-side flap movable between a non-deployed position and a deployed position;
wherein the one or more actuators are configured to position the port-side flap in the non-deployed position and the starboard-side flap in the deployed position to produce the port-side surf configuration, and wherein the one or more actuators are configured to position the port-side flap in the deployed position and the starboard-side flap in the non-deployed position to produce the starboard-side surf configuration.

14. The wake surf system of claim 1, wherein the water-sports boat comprises a driver user interface configured to output a driver notification in response to a command received from the rider control device.

15. A wake surf system configured to allow a wake surf rider to switch a wake of a water-sports boat from a port-side surf configuration to a starboard-side surf configuration or from a starboard-side surf configuration to a port-side surf configuration while surfing on the wake of the water-sports boat, the wake surf system comprising:
a water-sports boat comprising:
a hull configured to produce a wake having a port-side wave and a starboard-side wave that diverge when the hull moves through water;
one or more movable wake modifiers configured to enhance the port-side wave to produce a port-side surf configuration when the one or more wake modifiers are position in a first configuration and to enhance the starboard-side wave to produce a starboard-side surf configuration when the one or more wake modifiers are positioned in a second configuration;
one or more actuators configured to move the one or more wake modifiers between the first configuration and the second configuration; and
a wireless communication interface; and
a rider control device comprising:
a user interface comprising a switch-surf-side user input element; and
a wireless communication interface configured to wirelessly communicate commands from the rider control device to the wireless communication interface of the water-sports boat;
wherein actuation of the switch-surf-side user input element when the water-sports boat is in the port-side surf configuration causes the one or more actuators to move the one or more wake modifiers from the first configuration to the second configuration to switch from the port-side surf configuration to the starboard-side surf configuration, and wherein actuation of the same switch-surf-side user input element when the water-sports boat is in the starboard-side surf configuration causes the one or more actuators to move the one or more wake modifiers from the second configuration to the first configuration to switch from the starboard-side surf configuration to the port-side surf configuration;
wherein the user interface of the rider control device is configured to receive boat speed control commands, and wherein the water-sports boat is responsive to the boat speed control commands to change the boat speed; and
wherein the water-sports boat is configured to change the boat speed in response to the boat speed control command within a permissible speed range and to not change the boat speed outside the permissible speed range.

16. The wake surf system of claim 15, wherein the permissible speed range is determined based at least in part on a base speed before rider speed adjustment.

17. The wake surf system of claim 15, wherein the rider control device is waterproof and buoyant to float in water.

18. The wake surf system of claim 15, configured to switch from the port-side surf configuration to the starboard-side surf configuration or from the starboard-side surf configuration to the port-side surf configuration while the water-sports boat hull is moving through water.

19. The wake surf system of claim 15, wherein the one or more wake modifiers comprise:
a port-side flap movable between a non-deployed position and a deployed position; and
a starboard-side flap movable between a non-deployed position and a deployed position;
wherein the one or more actuators are configured to position the port-side flap in the non-deployed position and the starboard-side flap in the deployed position to produce the port-side surf configuration, and wherein the one or more actuators are configured to position the port-side flap in the deployed position and the starboard-side flap in the non-deployed position to produce the starboard-side surf configuration.

20. A wake surf system configured to allow a wake surf rider to switch a wake of a water-sports boat from a port-side surf configuration to a starboard-side surf configuration or from a starboard-side surf configuration to a port-side surf configuration while surfing on the wake of the water-sports boat, the wake surf system comprising:
a water-sports boat comprising:
a hull configured to produce a wake having a port-side wave and a starboard-side wave that diverge when the hull moves through water;
one or more movable wake modifiers configured to enhance the port-side wave to produce a port-side surf configuration when the one or more wake modifiers are position in a first configuration and to enhance the starboard-side wave to produce a starboard-side surf configuration when the one or more wake modifiers are positioned in a second configuration;
one or more actuators configured to move the one or more wake modifiers between the first configuration and the second configuration; and
a wireless communication interface; and
a rider control device comprising:
a user interface comprising a switch-surf-side user input element; and a wireless communication interface configured to wirelessly communicate commands from the rider control device to the wireless communication interface of the water-sports boat;

wherein actuation of the switch-surf-side user input element when the water-sports boat is in the port-side surf configuration causes the one or more actuators to move the one or more wake modifiers from the first configuration to the second configuration to switch from the port-side surf configuration to the starboard-side surf configuration, and wherein actuation of the same switch-surf-side user input element when the water-sports boat is in the starboard-side surf configuration causes the one or more actuators to move the one or more wake modifiers from the second configuration to the first configuration to switch from the starboard-side surf configuration to the port-side surf configuration; and wherein the water-sports boat comprises a music system, wherein the rider control device is configured to receive music control commands from the rider, wherein the wireless communication interface of the rider control device is configured to wirelessly communicate the music control commands to the wireless communication interface of the water-sports boat, and wherein the music system is configured to make a music change in response to the music control commands.

21. A wake surf system configured to allow a wake surf rider to switch a wake of a water-sports boat from a port-side surf configuration to a starboard-side surf configuration or from a starboard-side surf configuration to a port-side surf configuration while surfing on the wake of the water-sports boat, the wake surf system comprising:

a water-sports boat comprising:
a hull configured to produce a wake having a port-side wave and a starboard-side wave that diverge when the hull moves through water;
one or more movable wake modifiers configured to enhance the port-side wave to produce a port-side surf configuration when the one or more wake modifiers are position in a first configuration and to enhance the starboard-side wave to produce a starboard-side surf configuration when the one or more wake modifiers are positioned in a second configuration;
one or more actuators configured to move the one or more wake modifiers between the first configuration and the second configuration;
a sound system that includes speakers configured to direct sound rearward of the water-sports boat to a wake surf rider; and
a wireless communication interface; and a rider control device comprising:
a user interface comprising one or more user input elements for receiving commands from the wake surf rider, wherein the user interface is configured to receive:
a surf side control command; and
a boat speed control command; and
a wireless communication interface configured to wirelessly communicate commands from the rider control device to the wireless communication interface of the water-sports boat;

wherein the one or more actuators are responsive to the surf side control command to move the one or more wake modifiers from the first configuration to the second configuration to switch from the port-side surf configuration to the starboard-side surf configuration or to move the one or more wake modifiers from the second configuration to the first configuration to switch from the starboard-side surf configuration to the port-side surf configuration;

wherein the water-sports boat is responsive to the boat speed control command to change the boat speed, and wherein the water-sports boat is configured to change the boat speed in response to the boat speed control command within a permissible speed range and to not change the boat speed outside the permissible speed range.

22. The wake surf system of claim 21, wherein the permissible speed range is determined based at least in part on a base speed before rider speed adjustment.

23. The wake surf system of claim 21, wherein the permissible speed range is determined based at least in part on a base speed set by a driver of the water-sports boat.

24. The wake surf system of claim 21, wherein the rider control device is waterproof and buoyant to float in water.

25. The wake surf system of claim 21, configured to switch from the port-side surf configuration to the starboard-side surf configuration or from the starboard-side surf configuration to the port-side surf configuration while the water-sports boat hull is moving through water.

26. The wake surf system of claim 21, wherein the one or more wake modifiers comprise:
a port-side flap movable between a non-deployed position and a deployed position; and
a starboard-side flap movable between a non-deployed position and a deployed position;
wherein the one or more actuators are configured to position the port-side flap in the non-deployed position and the starboard-side flap in the deployed position to produce the port-side surf configuration, and wherein the one or more actuators are configured to position the port-side flap in the deployed position and the starboard-side flap in the non-deployed position to produce the starboard-side surf configuration.

27. The wake surf system of claim 21, wherein the water-sports boat comprises a driver user interface configured to output a driver notification in response to a command received from the rider control device.

28. A wake surf system configured to allow a wake surf rider to switch a wake of a water-sports boat from a port-side surf configuration to a starboard-side surf configuration or from a starboard-side surf configuration to a port-side surf configuration while surfing on the wake of the water-sports boat, the wake surf system comprising:

a water-sports boat comprising:
a hull configured to produce a wake having a port-side wave and a starboard-side wave that diverge when the hull moves through water;
one or more movable wake modifiers configured to enhance the port-side wave to produce a port-side surf configuration when the one or more wake modifiers are position in a first configuration and to enhance the starboard-side wave to produce a starboard-side surf configuration when the one or more wake modifiers are positioned in a second configuration;
one or more actuators configured to move the one or more wake modifiers between the first configuration and the second configuration;
a sound system that includes speakers configured to direct sound rearward of the water-sports boat to a wake surf rider; and a wireless communication interface; and
a rider control device comprising:
- a user interface comprising one or more user input elements for receiving commands from the wake surf rider, wherein the user interface is configured to receive:
  - a surf side control command; and
  - a music control command; and
- a wireless communication interface configured to wirelessly communicate commands from the rider control device to the wireless communication interface of the water-sports boat;

wherein the one or more actuators are responsive to the surf side control command to move the one or more wake modifiers from the first configuration to the second configuration to switch from the port-side surf configuration to the starboard-side surf configuration or to move the one or more wake modifiers from the second configuration to the first configuration to switch from the starboard-side surf configuration to the port-side surf configuration;

wherein the sound system is responsive to the music control command to change a characteristic of music output by the speakers.

29. The wake surf system of claim 28, wherein the change to the characteristic of the music comprises a change of music volume or a song selection.

30. The wake surf system of claim 28, wherein the rider control device is waterproof and buoyant to float in water.

31. The wake surf system of claim 28, configured to switch from the port-side surf configuration to the starboard-side surf configuration or from the starboard-side surf configuration to the port-side surf configuration while the water-sports boat hull is moving through water.

32. The wake surf system of claim 28, wherein the one or more wake modifiers comprise:
- a port-side flap movable between a non-deployed position and a deployed position; and
- a starboard-side flap movable between a non-deployed position and a deployed position;
- wherein the one or more actuators are configured to position the port-side flap in the non-deployed position and the starboard-side flap in the deployed position to produce the port-side surf configuration, and wherein the one or more actuators are configured to position the port-side flap in the deployed position and the starboard-side flap in the non-deployed position to produce the starboard-side surf configuration.

33. The wake surf system of claim 28, wherein the water-sports boat comprises a driver user interface configured to output a driver notification in response to a command received from the rider control device.

* * * * *